US006650386B1

(12) United States Patent
Shimoshikiryoh

(10) Patent No.: US 6,650,386 B1
(45) Date of Patent: Nov. 18, 2003

(54) NEMATIC LIQUID CRYSTAL DISPLAY DEVICE WITH MULTI-DOMAIN PIXELS AND COMPENSATION WITH NC>NA>NB

(75) Inventor: Fumikazu Shimoshikiryoh, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/342,776

(22) Filed: Jun. 29, 1999

(30) Foreign Application Priority Data

Jun. 29, 1998 (JP) .......................................... 10/183111
Aug. 25, 1998 (JP) .......................................... 10/239308
May 11, 1999 (JP) .......................................... 11/130665

(51) Int. Cl.[7] .......................................... G02F 1/1335
(52) U.S. Cl. .................................... 349/118; 349/119
(58) Field of Search .............................. 349/73, 144, 5; 359/494, 584

(56) References Cited

U.S. PATENT DOCUMENTS

| | | | | |
|---|---|---|---|---|
| 5,237,438 A | * | 8/1993 | Miyashita et al. | ............. 359/73 |
| 5,745,206 A | * | 4/1998 | Koike et al. | ................. 349/129 |
| 5,956,110 A | * | 9/1999 | Fujita et al. | ................. 349/118 |
| 6,025,958 A | * | 2/2000 | Yamaoka et al. | ........... 359/494 |
| 6,141,074 A | * | 10/2000 | Bose et al. | .................. 349/129 |

FOREIGN PATENT DOCUMENTS

| | | | | |
|---|---|---|---|---|
| JP | 04-258923 | * | 9/1992 | ......... G02F/1/1335 |
| JP | 05-061038 | | 3/1993 | |
| JP | 05-289097 | | 11/1993 | |
| JP | 5-289097 | | 11/1993 | |
| JP | 05289097 A | * | 11/1993 | ......... G02F/1/1347 |
| JP | 05-323289 | | 12/1993 | |
| JP | 07-191313 | | 7/1995 | |
| JP | 07-333617 | | 12/1995 | |
| JP | 08-240714 | | 9/1996 | |
| JP | 09-101515 | | 4/1997 | |
| JP | 09-105932 | | 4/1997 | |
| JP | 09-171177 | | 6/1997 | |
| JP | 09/203894 | | 8/1997 | |
| JP | 10/003081 | | 1/1998 | |

\* cited by examiner

*Primary Examiner*—Robert H. Kim
*Assistant Examiner*—Timothy Rude
(74) *Attorney, Agent, or Firm*—David G. Conlin; William J. Daley, Jr.; Edwards & Angell, LLP

(57) ABSTRACT

Featured is a liquid crystal display device including first and second transparent substrates and a liquid crystal layer interposed there between that includes a plurality of domains in each pixel region. Also included are first and second polarizing plates and first and second phase compensators; the fist compensator is provided between the first polarizing plate and first substrate and the second compensator is between the second polarizing plate and second substrate. The phase-delay axes for the first and second compensators are parallel to each other and substantially perpendicular to a phase-delay axis of the liquid crystal layer. A third phase difference compensator is provided between the first and/or second polarizing plate and the corresponding first or second compensator The three main axes (na,nb,nc) for the refractive index ellipse of the third compensator satisfies the relationship nc>na>nb.

3 Claims, 74 Drawing Sheets

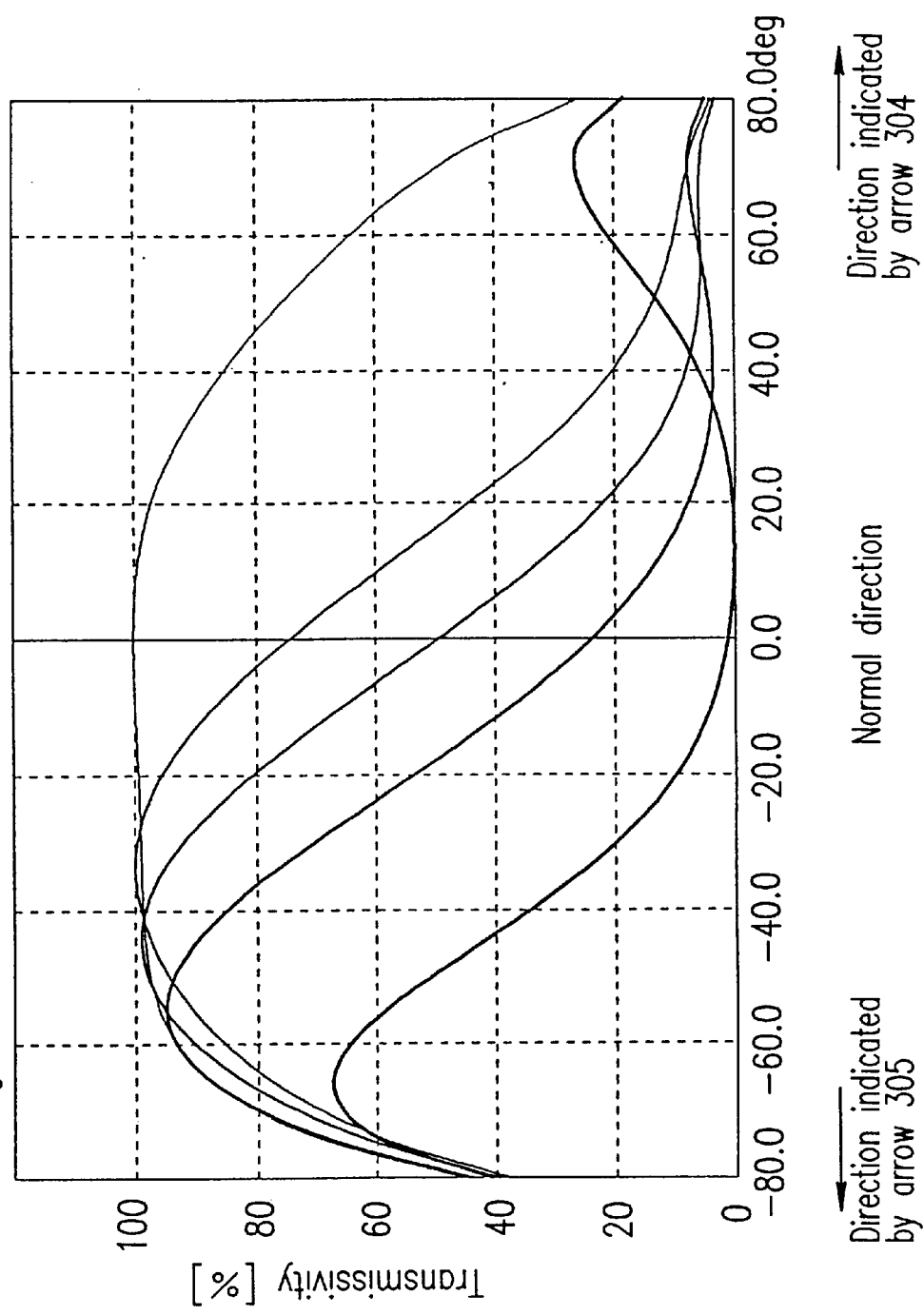

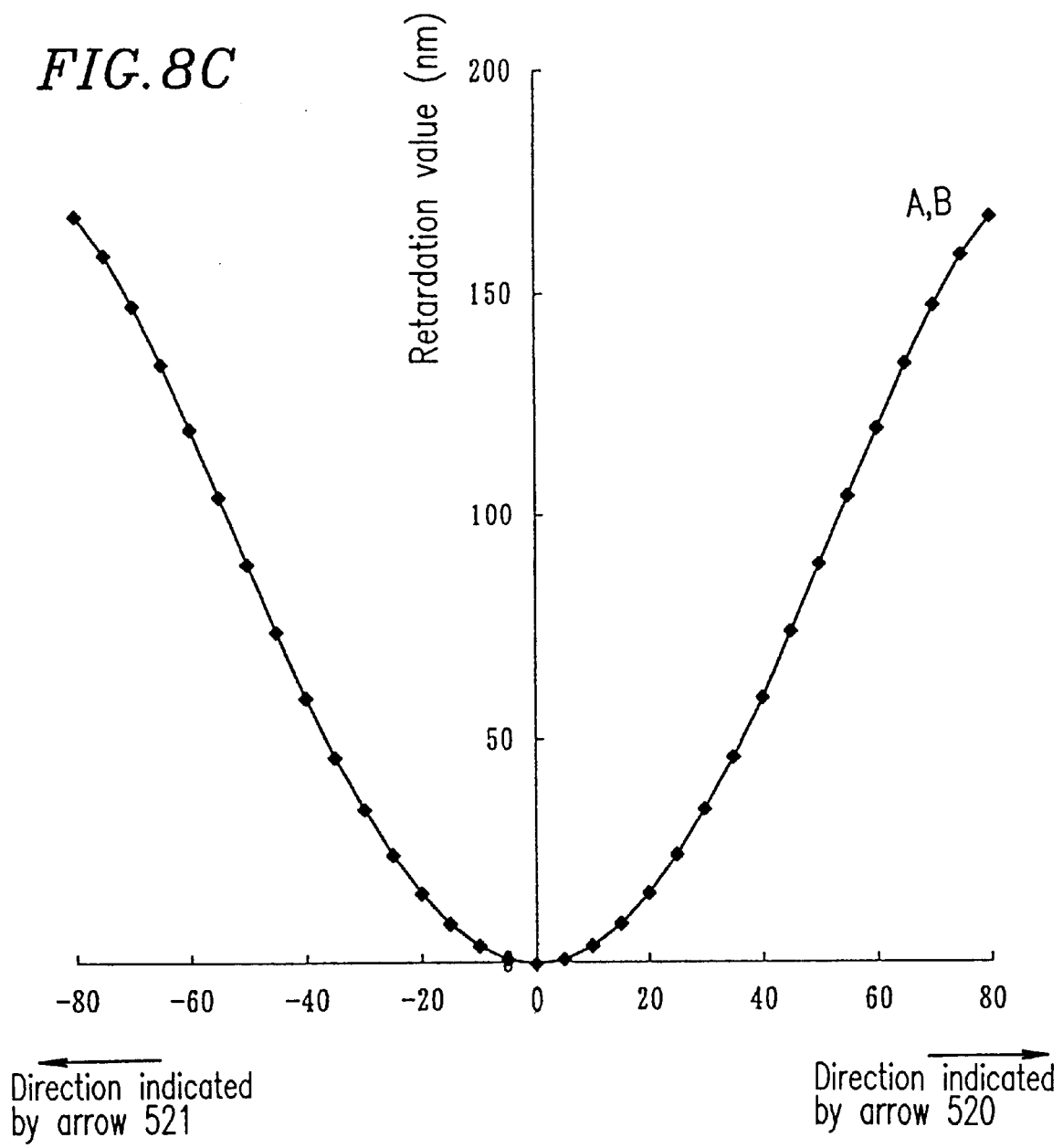

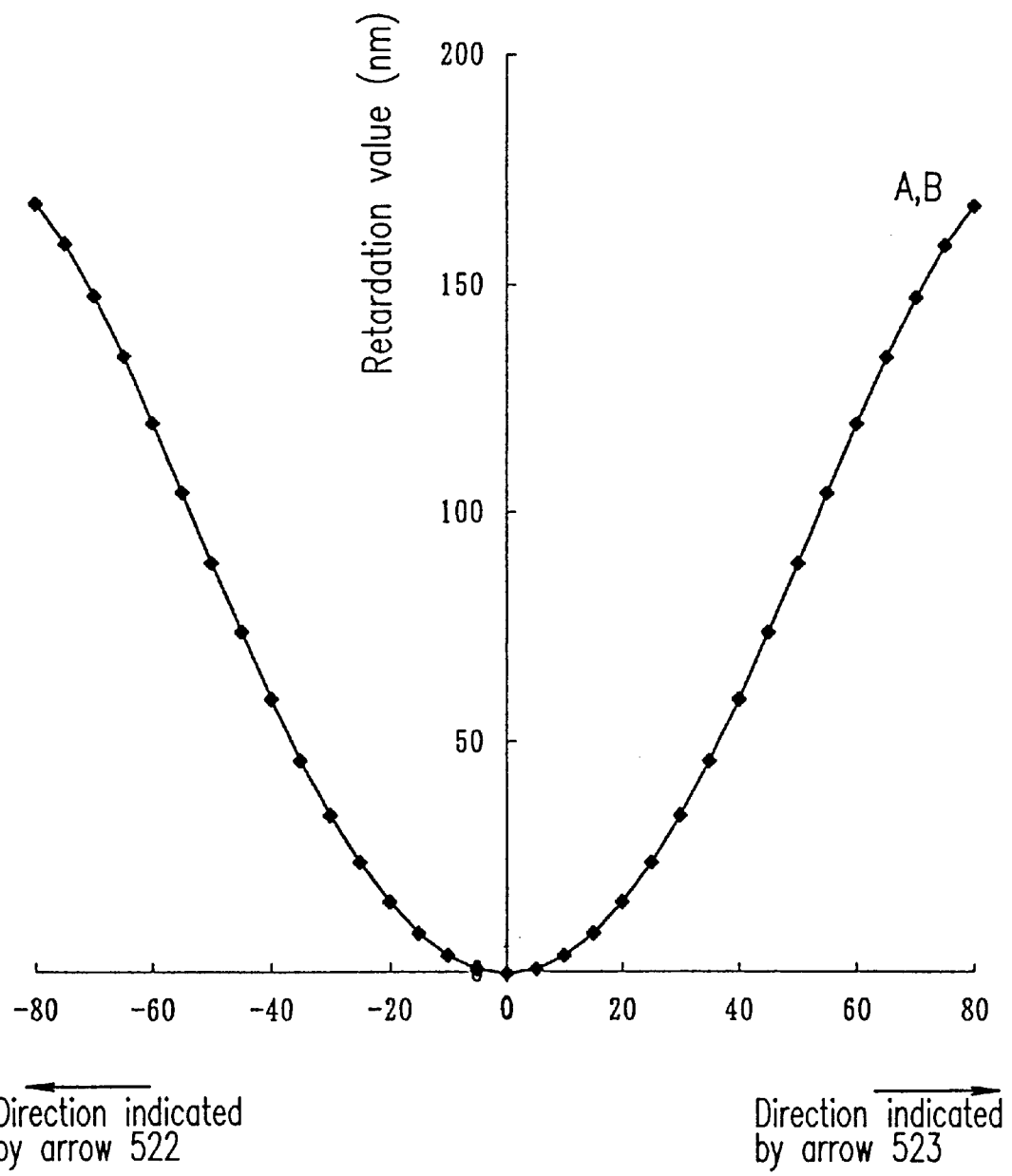

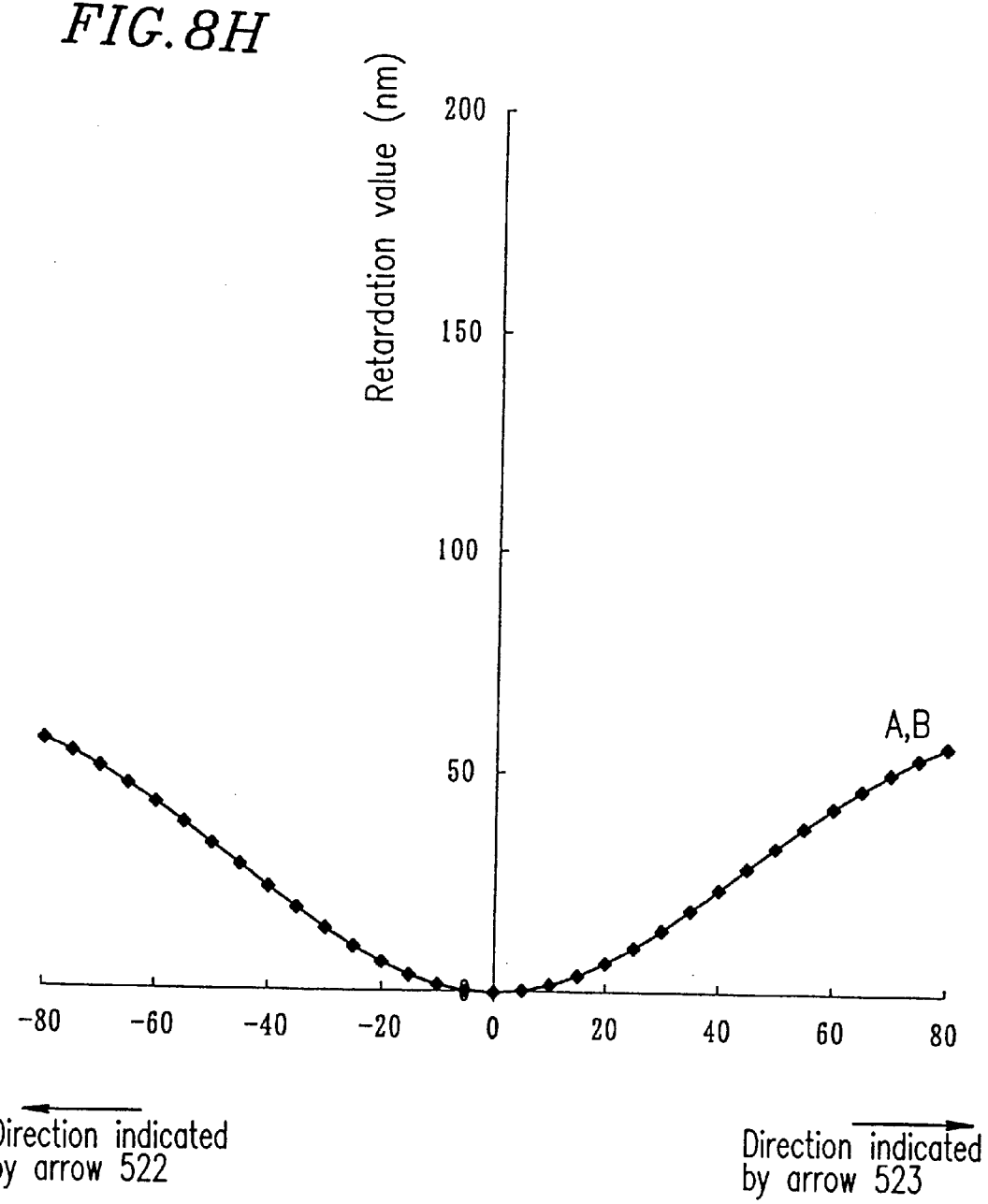

FIG. 9
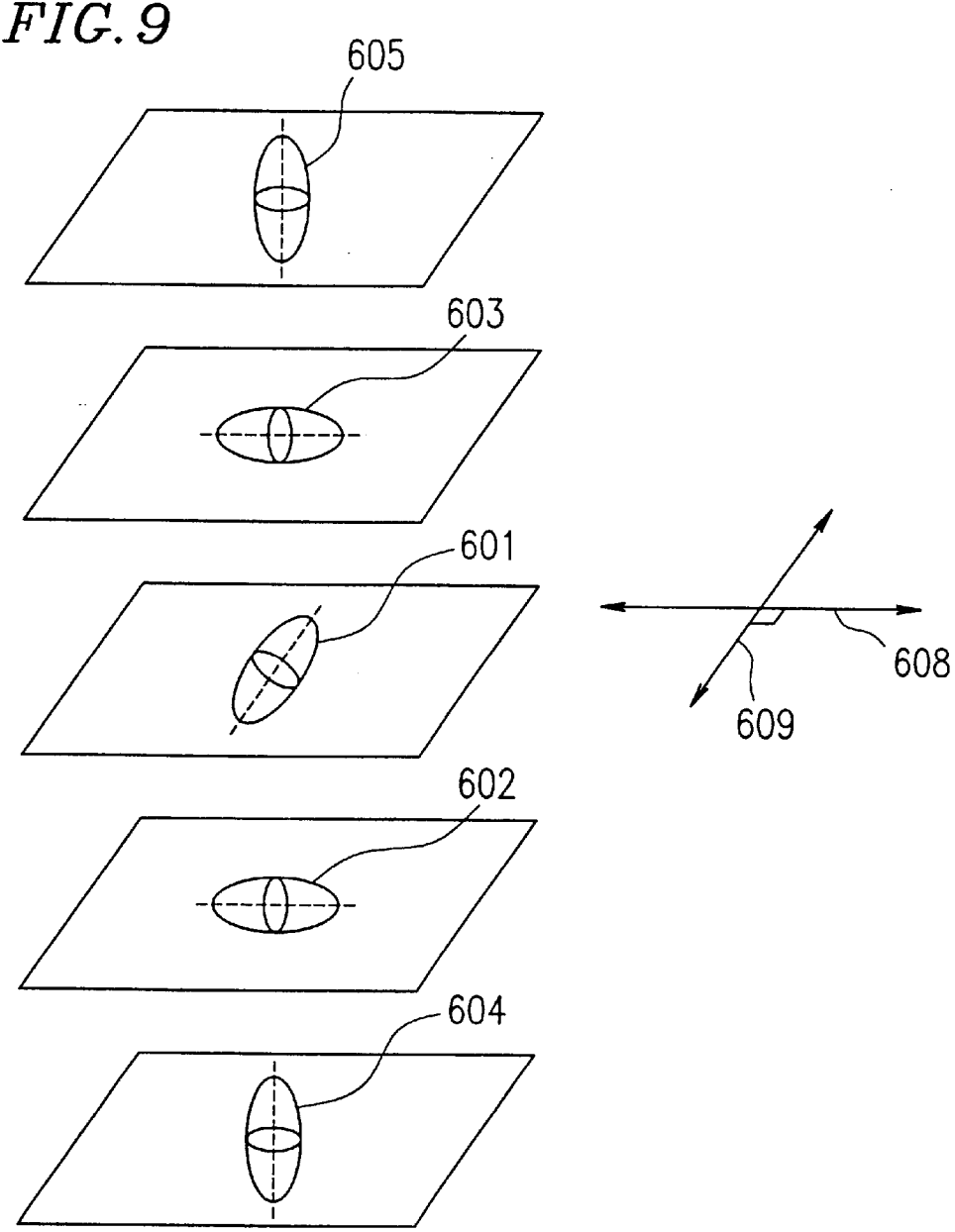
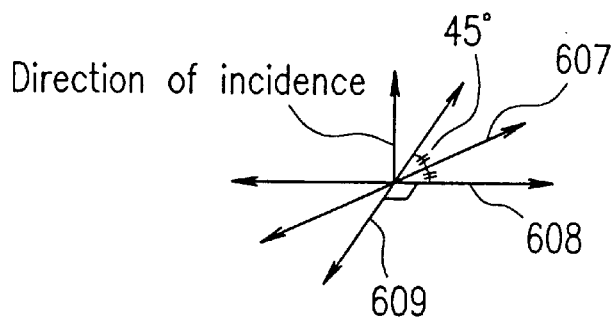

FIG.10A
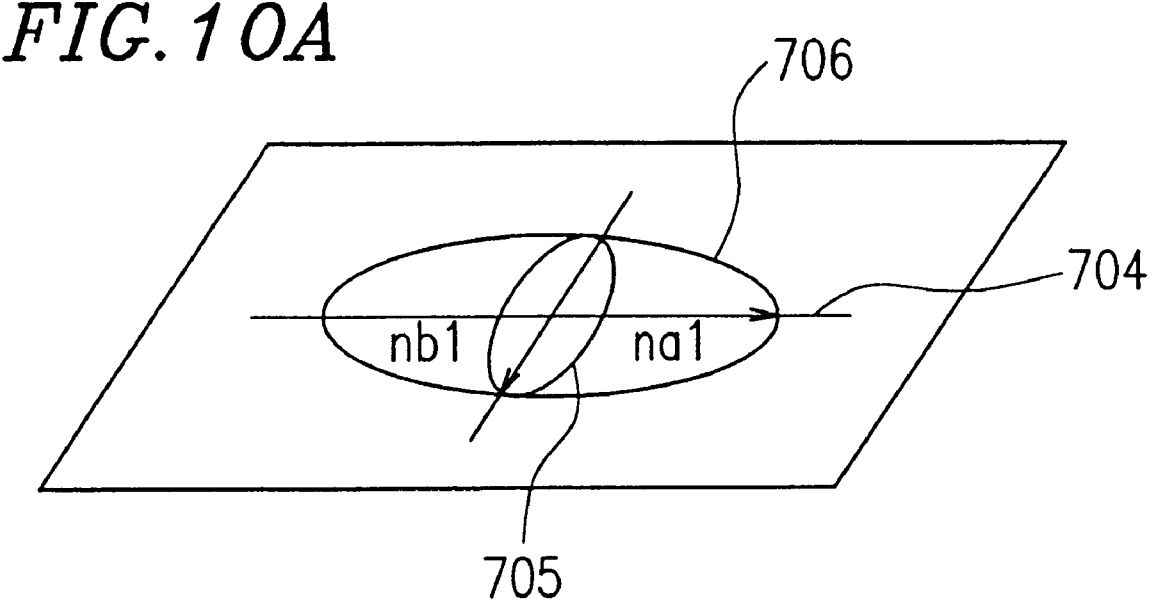
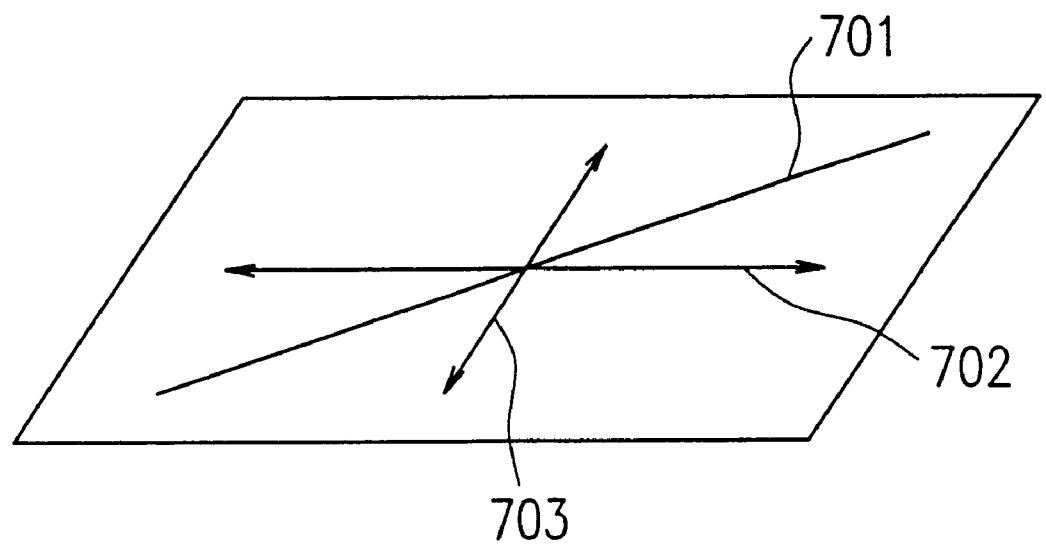

FIG.10B
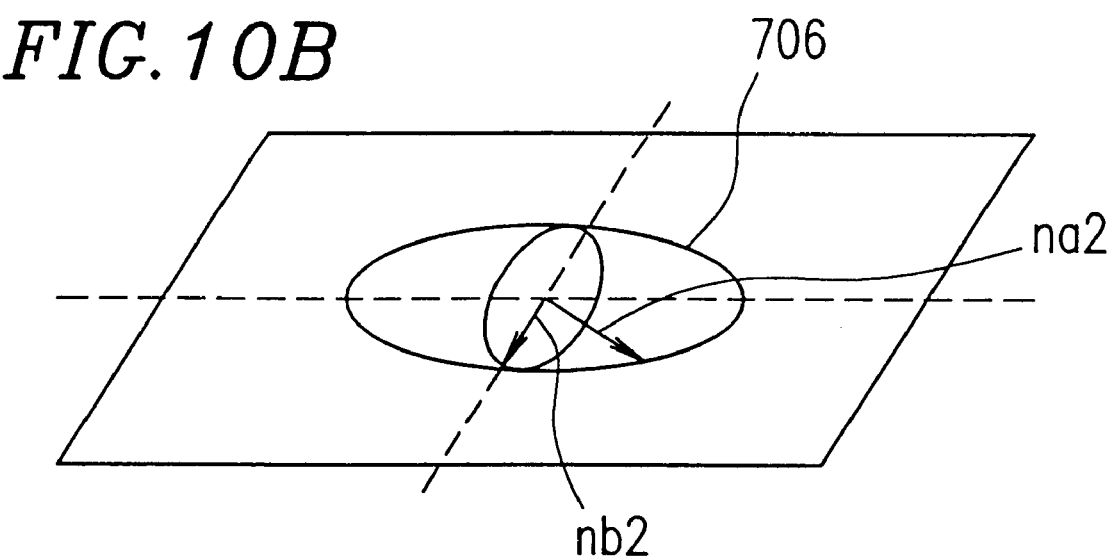
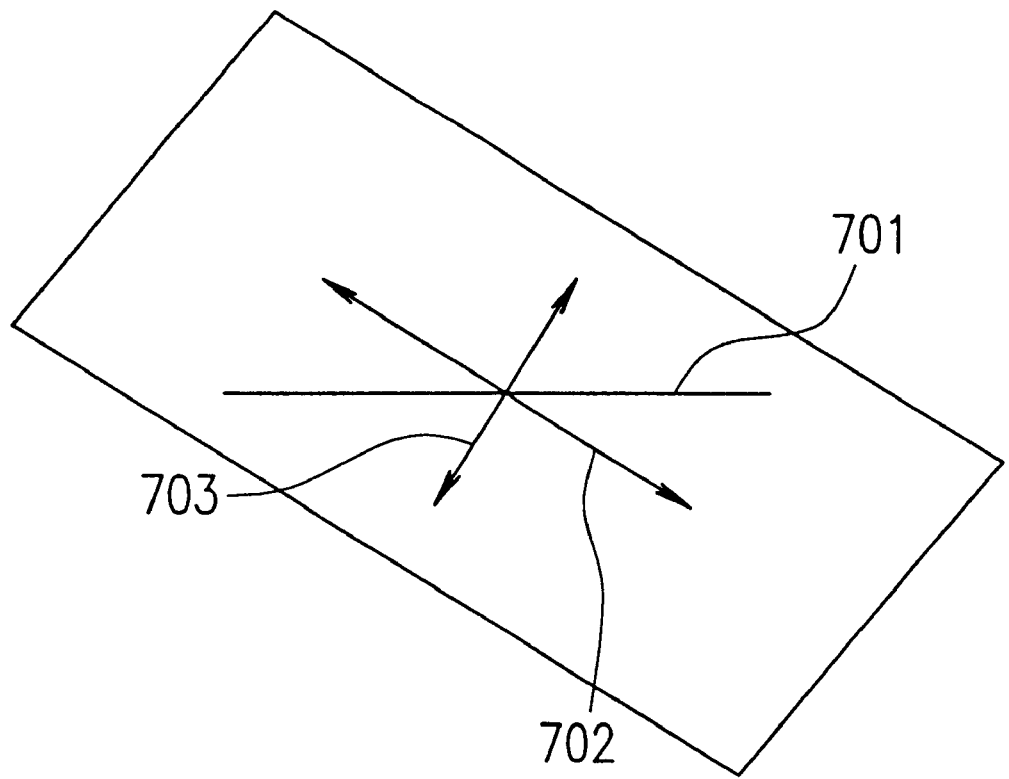

FIG.10C
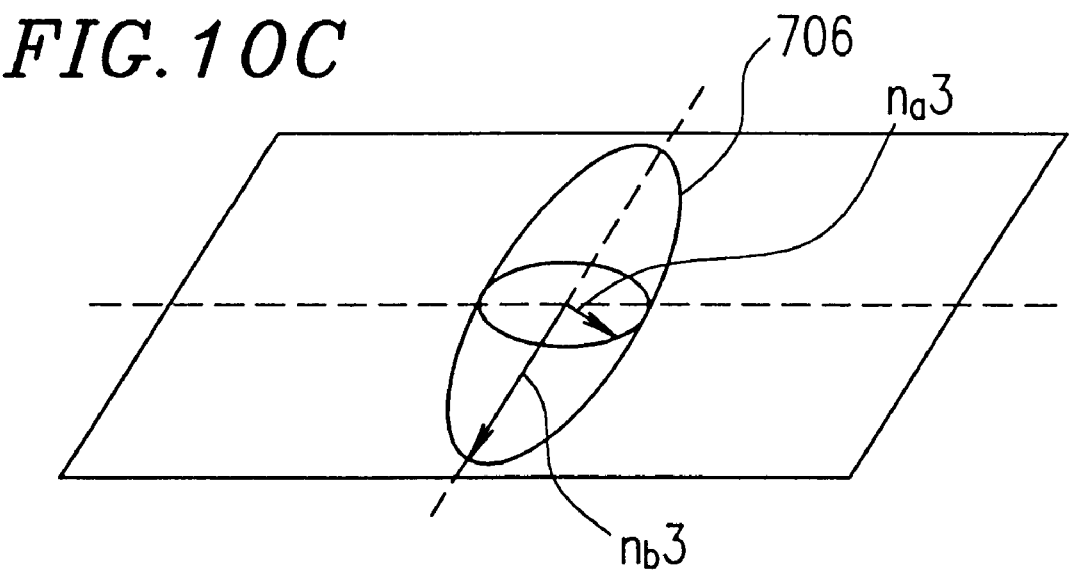
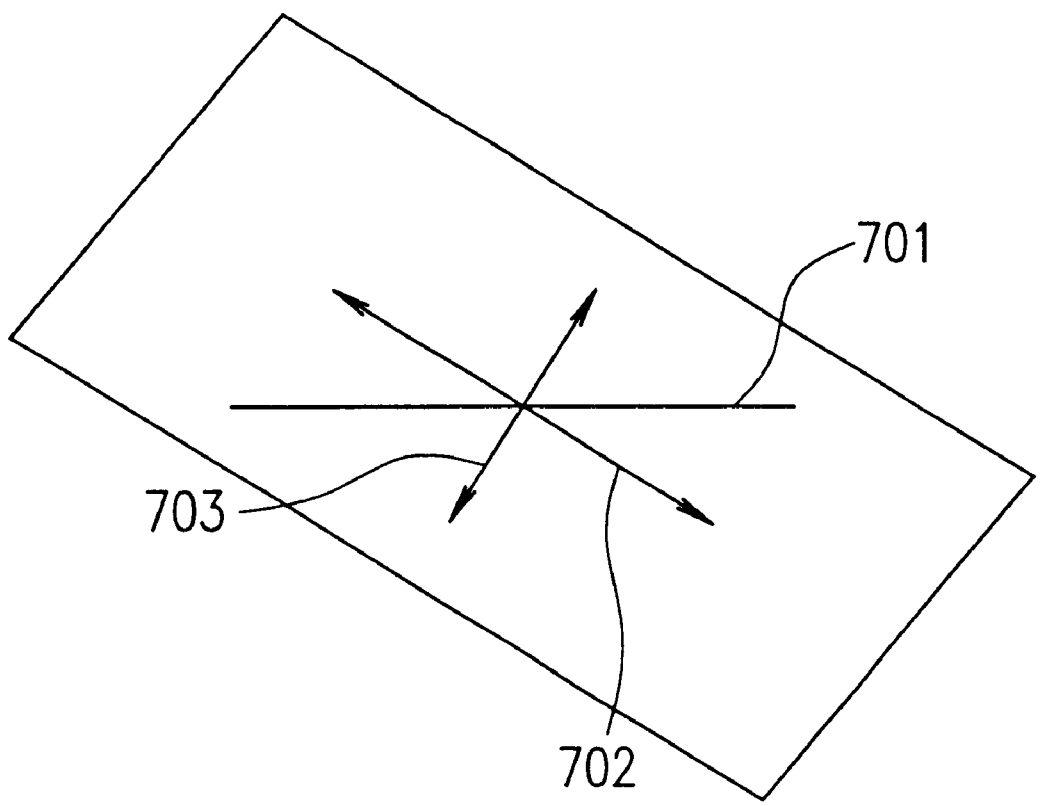

FIG.10D
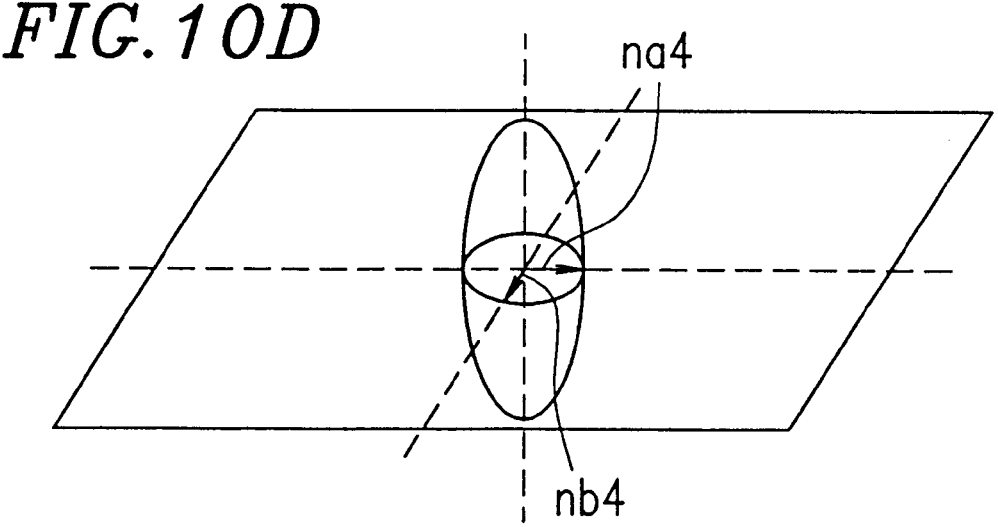
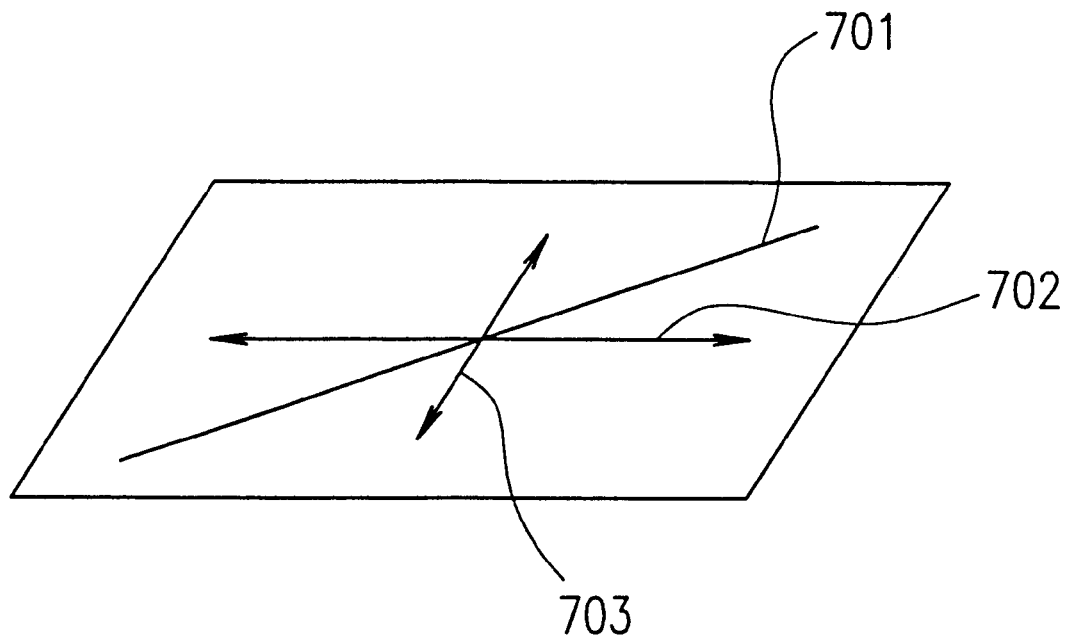

FIG.10E
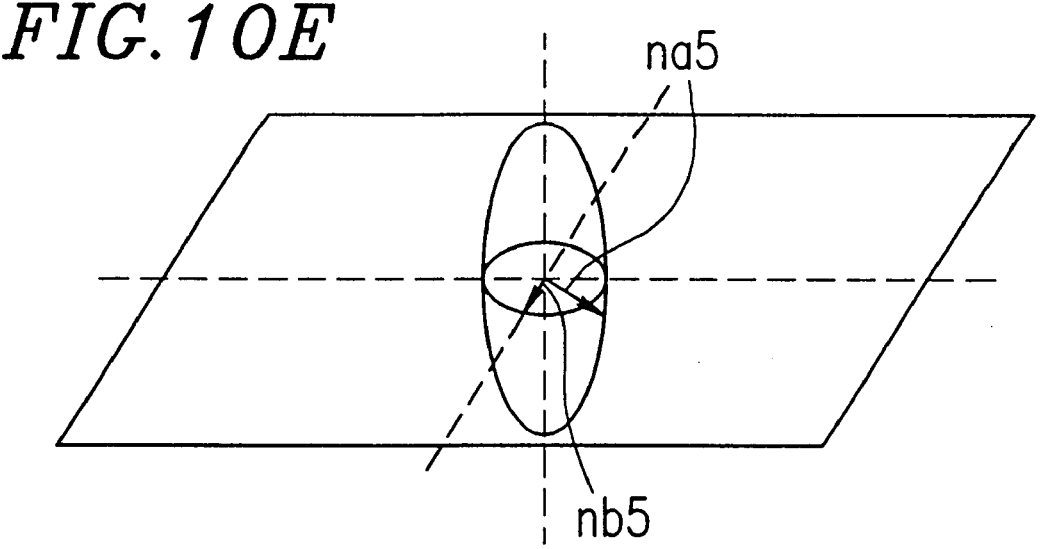
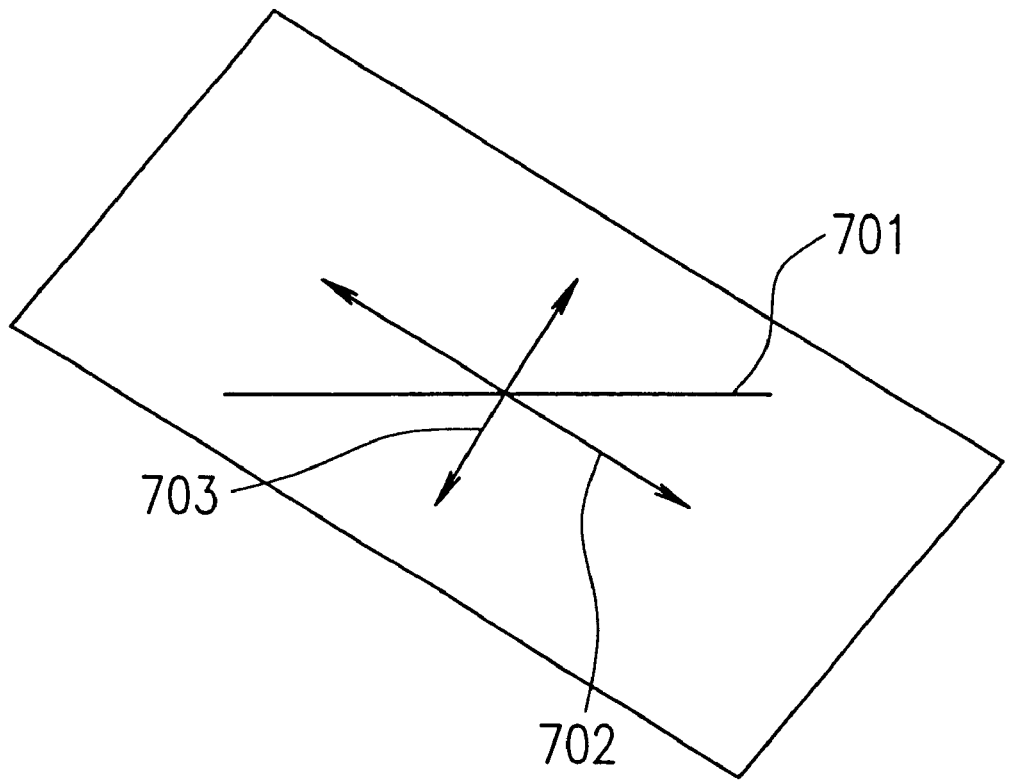

FIG. 13
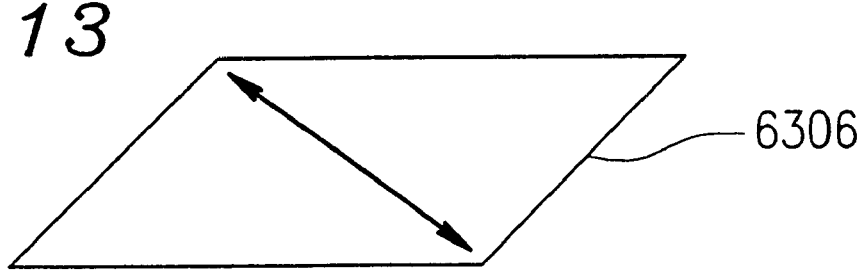
6306
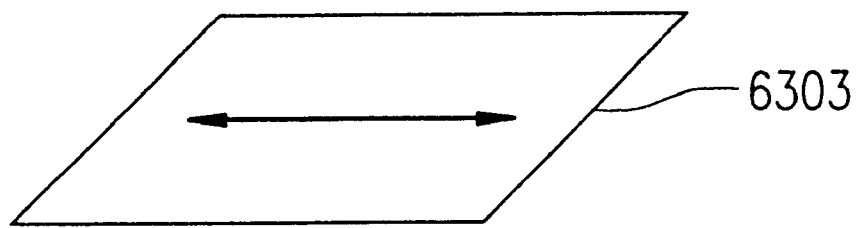
6303
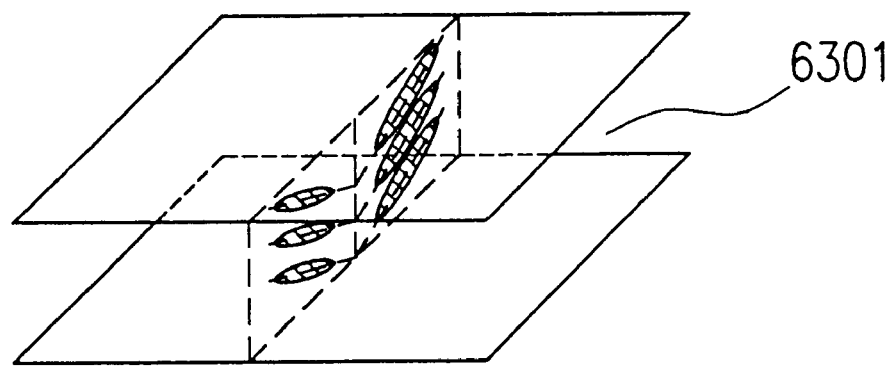
6301
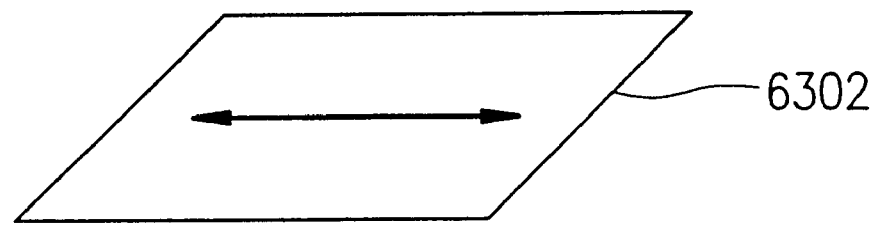
6302
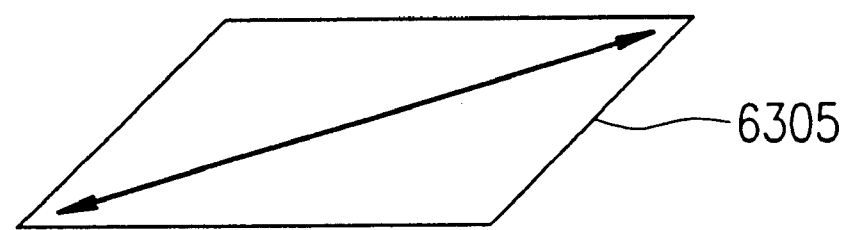
6305

FIG. 23
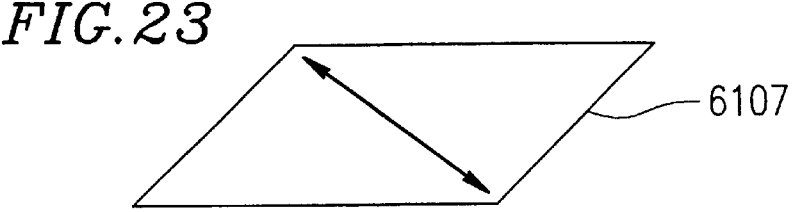
— 6107
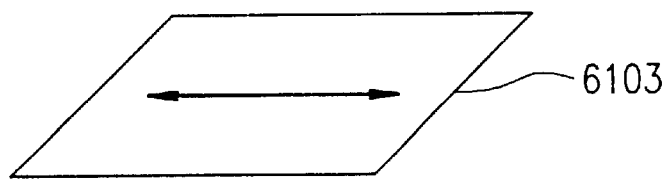
— 6103
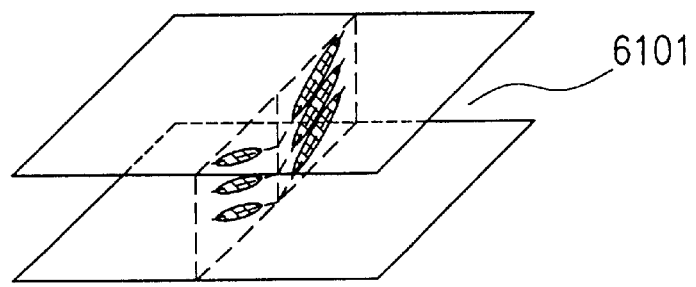
— 6101
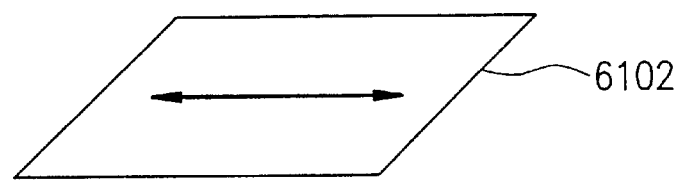
— 6102
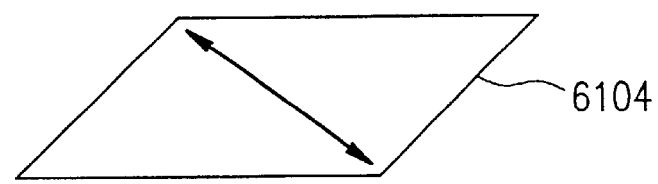
— 6104
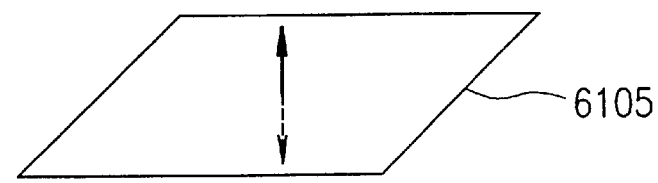
— 6105
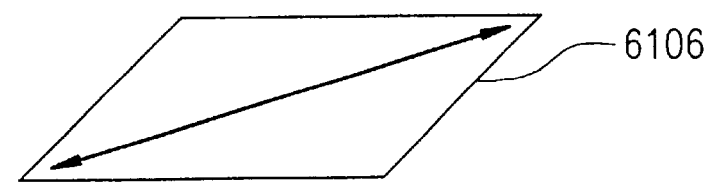
— 6106

FIG. 25
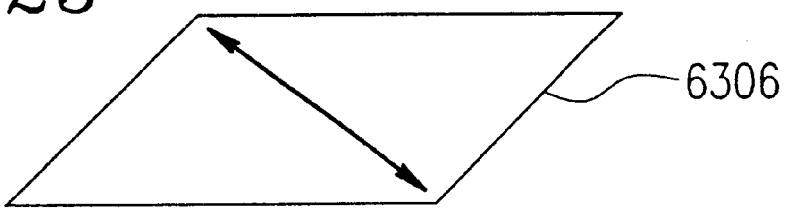
6306
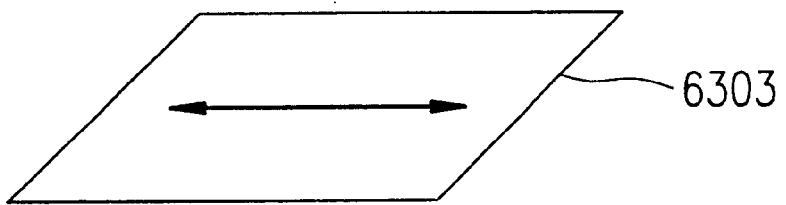
6303
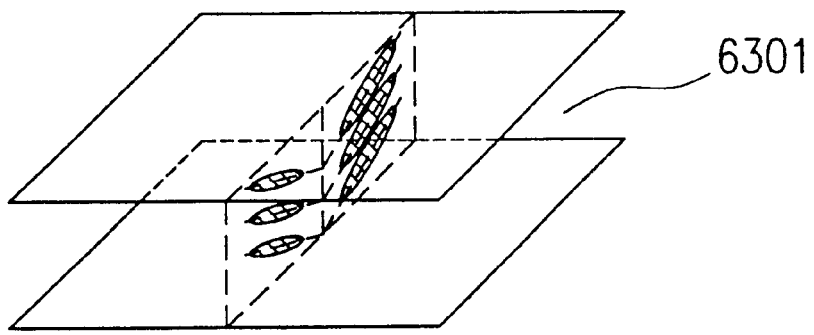
6301
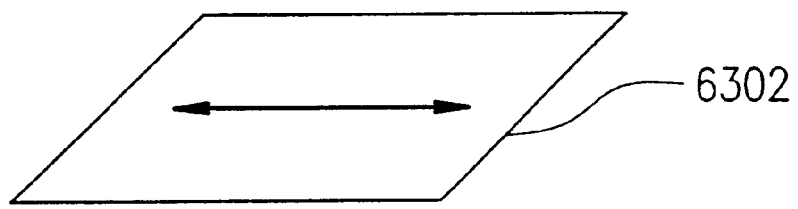
6302
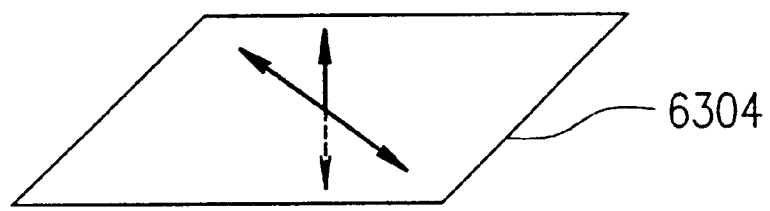
6304
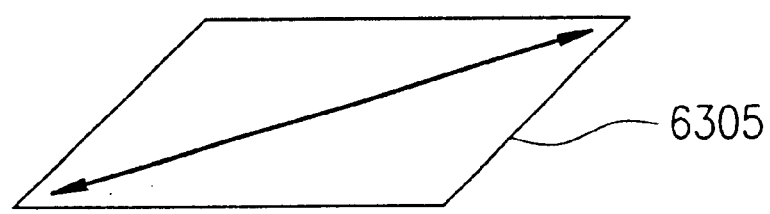
6305

FIG.26
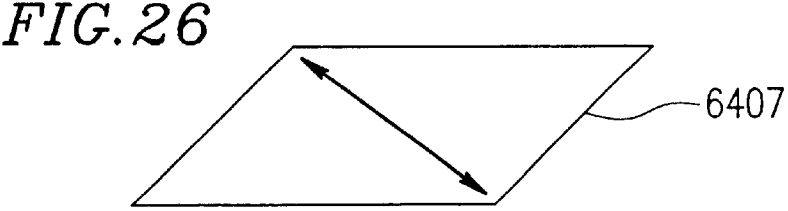
6407
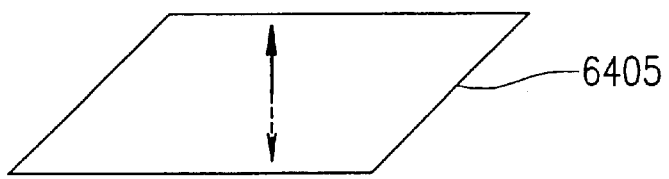
6405
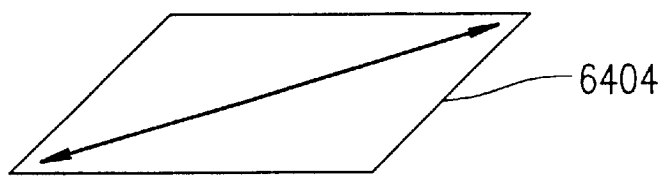
6404
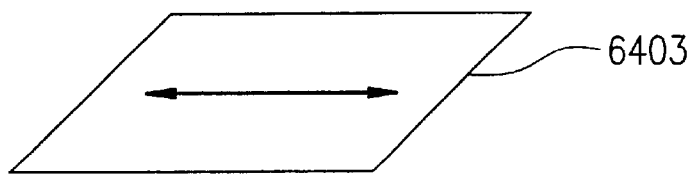
6403
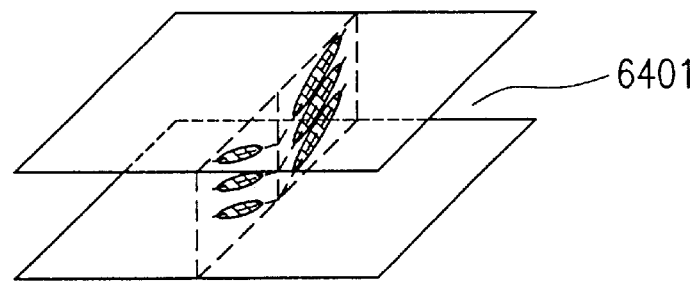
6401
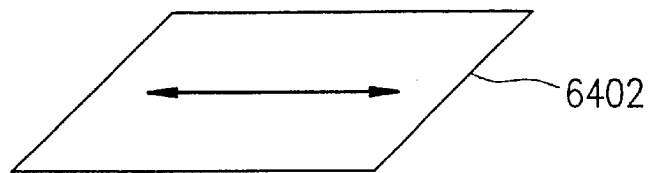
6402
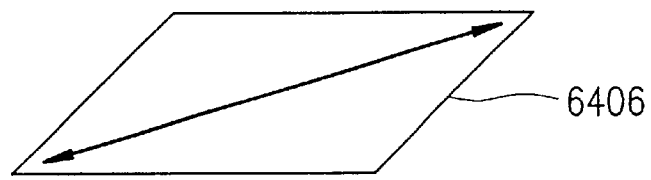
6406

FIG. 30
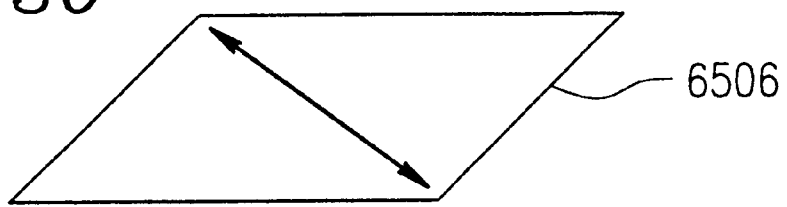
— 6506
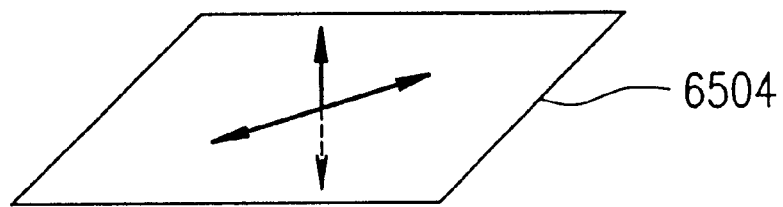
— 6504
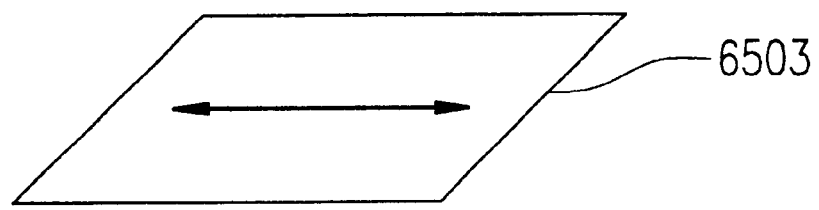
— 6503
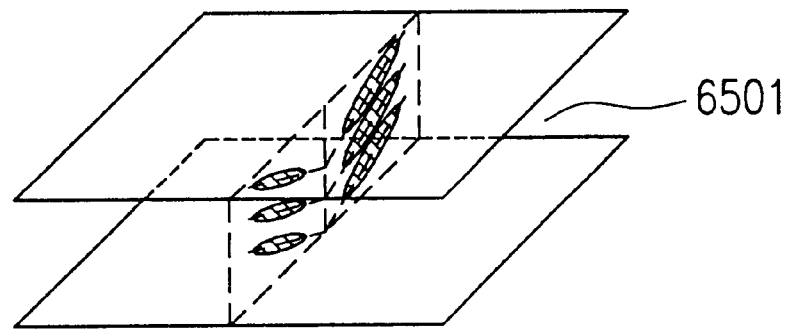
— 6501
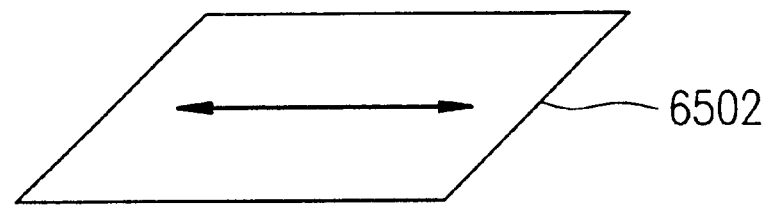
— 6502
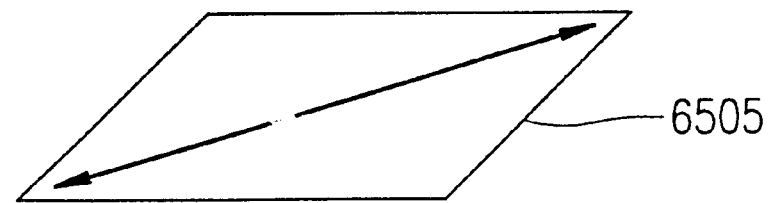
— 6505

FIG.31
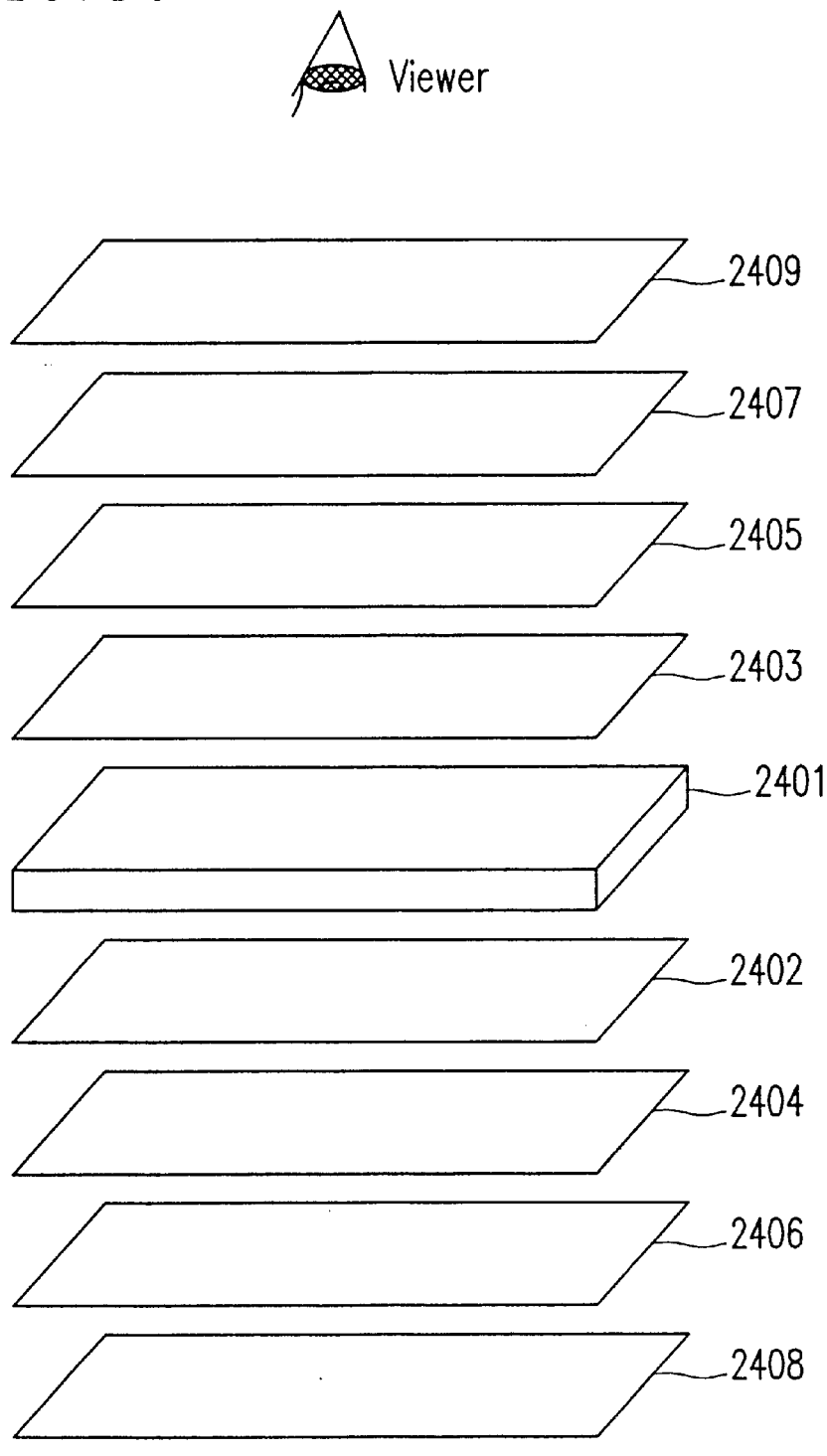
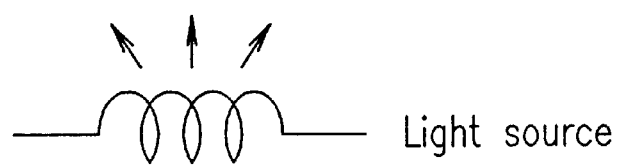

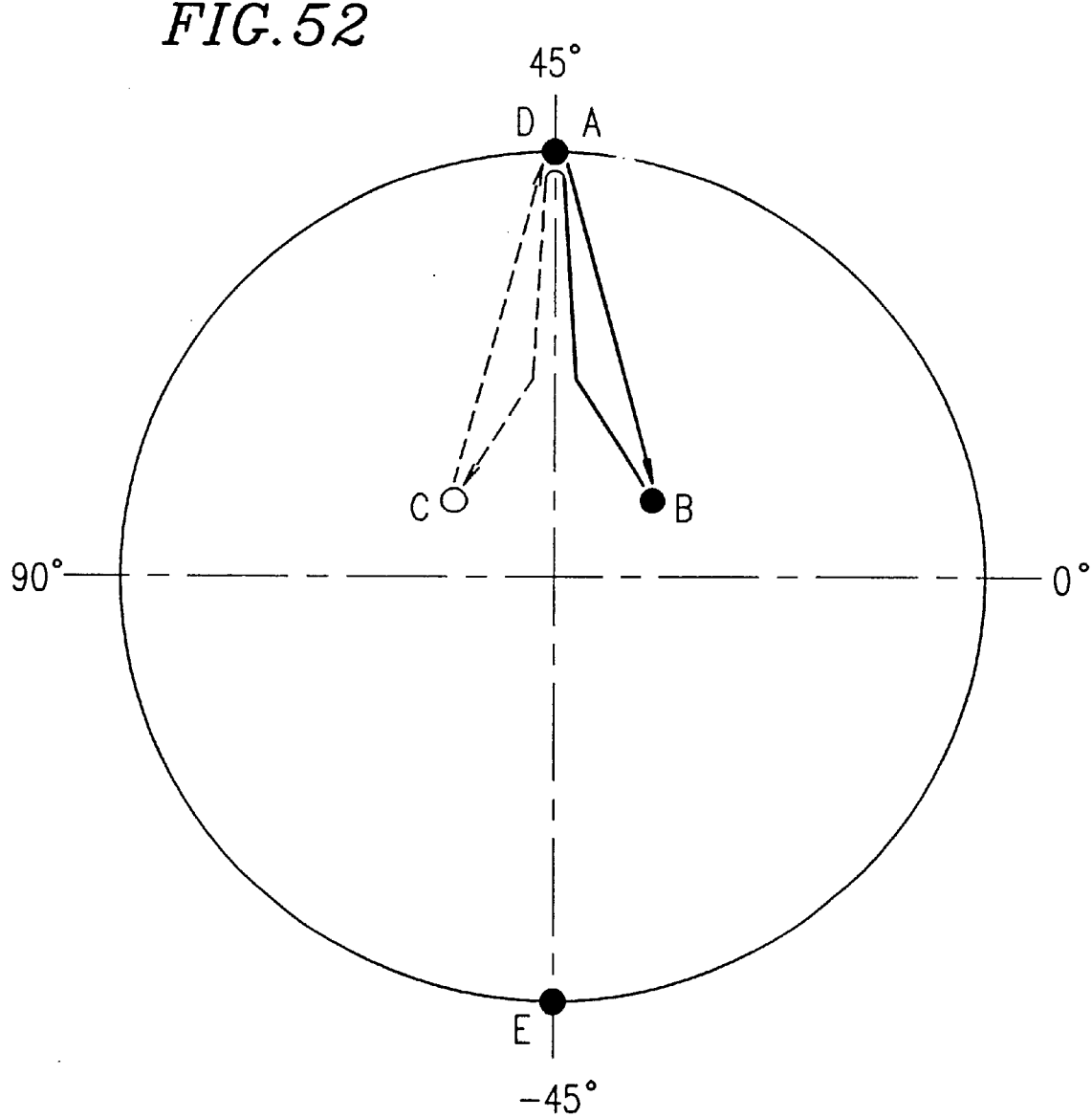

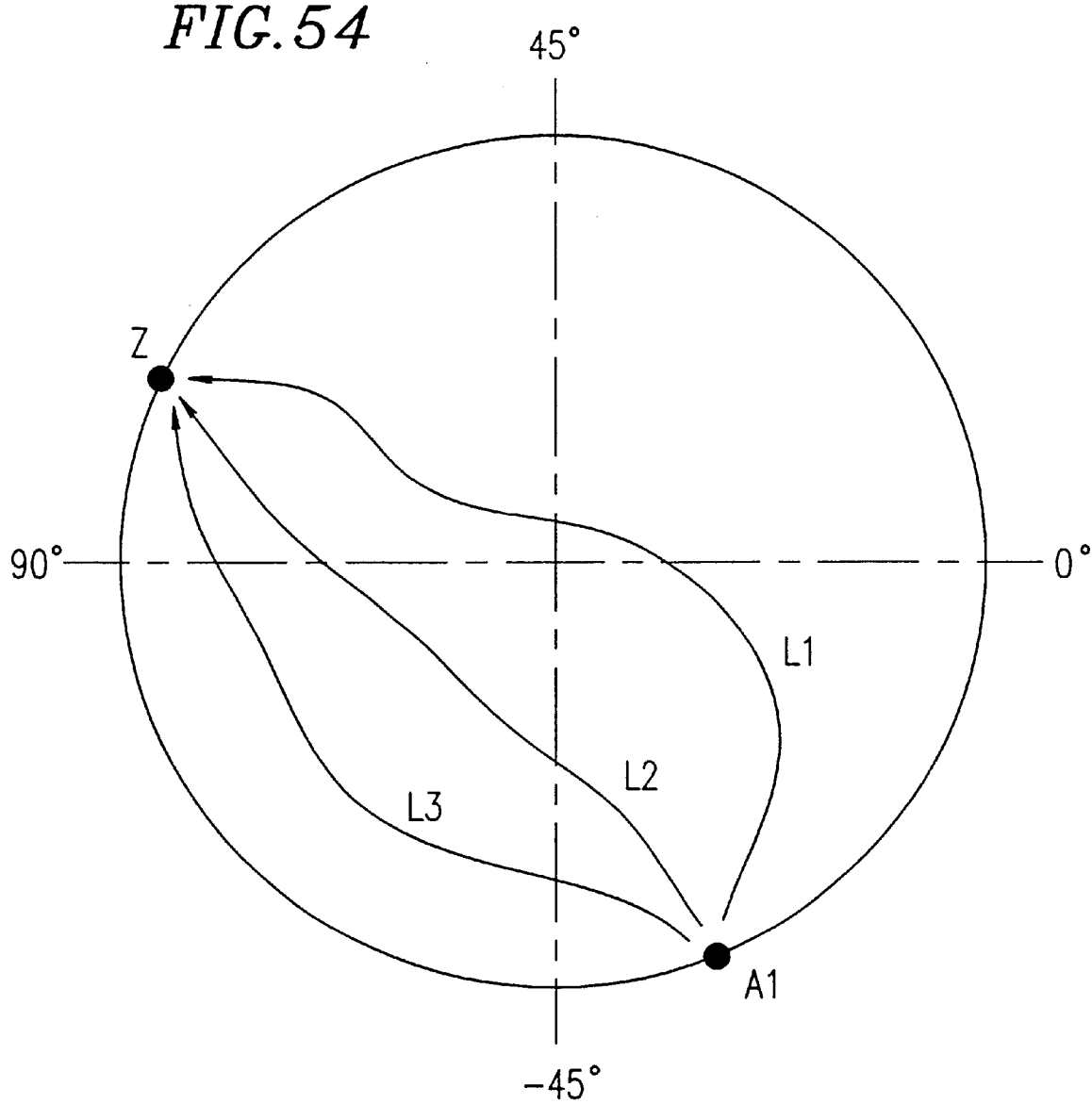

NEMATIC LIQUID CRYSTAL DISPLAY DEVICE WITH MULTI-DOMAIN PIXELS AND COMPENSATION WITH NC>NA>NB

BACKGROUND OF THE INVENTION

1. Field of the Invention

The present invention relates to a liquid crystal display device as a computer monitor and a liquid crystal display device for displaying video images and, more particularly, to a liquid crystal display device having desirable viewing angle characteristics.

2. Description of the Related Art

Various display modes have been proposed for improving the viewing angle of a liquid crystal display device. Typical examples of such display modes include: ① IPS (In-Plane Switching) mode which uses a transverse electric field to move the liquid crystal molecules in parallel with the substrate surface; ② a liquid crystal display device in which the liquid crystal molecules are oriented substantially vertically to the substrate surface in the absence of an applied voltage, and the liquid crystal molecules in different regions are inclined in respectively different directions in the presence of an applied voltage (Japanese Laid-Open Publication No. 7-28068); ③ a liquid crystal display device in which the liquid crystal molecules are oriented substantially horizontally to the substrate surface in the absence of an applied voltage, and the liquid crystal molecules in different regions rise in respectively different directions in the presence of an applied voltage, thereby improving the viewing angle of the device (Japanese Laid-Open Publication No. 10-3081); and ④ a liquid crystal display device of a normally black mode producing a black display in the absence of an applied voltage, in which an optical compensator is used to improve the viewing angle of the device (Japanese Laid-Open Publication No. 5-289097).

In the IPS mode ①, however, it is necessary to provide a plurality of opaque electrodes in a pixel, thereby reducing the aperture ratio and thus the transmissivity (brightness) of the device. The liquid crystal display device ② disclosed in Japanese Laid-Open Publication No. 7-28068 employs a liquid crystal material having a negative dielectric anisotropy (n-type liquid crystal material) and a substrate which has been subjected to a vertical alignment treatment In such a case, the liquid crystal injection process takes a period of time twice as long as that for a device which employs a p-type liquid crystal material having a positive dielectric anisotropy and a substrate which has been subjected to a horizontal alignment process, thereby reducing the production efficiency. The liquid crystal display device ③ disclosed in Japanese Laid-Open Publication No. 10-3081 employs transparent electrodes provided respectively on the upper and lower substrates to drive the liquid crystal molecules, thereby avoiding the reduction in transmissivity as in the IPS mode. Moreover, The liquid crystal display device ③ employs a liquid crystal material having a positive dielectric anisotropy and a substrate which has been subjected to a horizontal alignment treatment, thereby also avoiding the reduction in production efficiency as in the device ②. However, the device ③ has viewing angle characteristics that are inferior to those of the device ②. Particularly, the device ③ has asymmetric gray scale characteristics in the vertical direction along the display plane.

Referring to FIG. 55, the liquid crystal display device ④ disclosed in Japanese Laid-Open Publication No. 5-289097 includes a liquid crystal panel 4, a birefringence anisotropy compensation panel 3 provided optically continuously on the liquid crystal panel 4 for optically compensating the birefringence anisotropy of the liquid crystal panel 4 along the plane thereof, a viewing angle dependency compensation panel 2 provided on the birefringence anisotropy compensation panel 3, and a pair of polarizers 1 and 5 interposing the panels 2, 3 and 4 therebetween, so that the absorption axes (1.1) and (5.1) are perpendicular to each other. The birefringence anisotropy compensation panel 3 is arranged so that the optical axis (3.1) or (3.2) (or rubbing direction) thereof is parallel to the substrate surface of the liquid crystal panel 4 and perpendicular to the optical axis (4.1) or (4.2) (or rubbing direction) of the liquid crystal panel 4. The viewing angle dependency compensation panel 2 is arranged so that the optical axis (2.1) (or rubbing direction) thereof is perpendicular to the substrate surface of the liquid crystal panel 4. The device ④ provides a certain level of improvement in the viewing angle characteristics thereof by employing the viewing angle dependency compensation panel 2. However, the contrast of the device ④ is reduced as the viewing angle is inclined or shifted from a direction normal to the display plane. Thus, the viewing angle characteristics of the device ④ are not sufficiently desirable. Moreover, it is difficult to stably obtain a uniform orientation and transmissivity across the display plane of the liquid crystal panel 4 of the device ④ in the presence of an applied voltage.

SUMMARY OF THE INVENTION

According to one aspect of this invention, a liquid. crystal display device includes: a first transparent substrate and a second transparent substrate; a liquid crystal layer interposed between the first and second substrates, the layer being made of a nematic liquid crystal material having a positive dielectric anisotropy; a first electrode and a second electrode provided on the first and second substrates, respectively, for applying an electric field substantially vertical to the first and second substrates across the liquid crystal layer; and a first polarizing plate and a second polarizing plate each provided on an outer side of respective one of the first and second substrates, the first and second polarizing plates being arranged in a crossed Nicols arrangement. The liquid crystal layer in each pixel region includes at least a first domain and a second domain in which liquid crystal molecules are oriented in different orientations. A first phase difference compensator having a positive refractive index anisotropy is provided between the first polarizing plate and the first substrate, and a second phase difference compensator having a positive refractive index anisotropy is provided between the second polarizing plate and the second substrate, so that phase-delay axes of the first and second phase difference compensators are parallel to a substrate surface and to each other, and substantially perpendicular to a phase-delay axis of the liquid crystal layer in the absence of an applied voltage. At least one third phase difference compensator is provided between the first polarizing plate and the first phase difference compensator or between the second polarizing plate and the second phase difference compensator. A refractive index ellipse of the third phase difference compensator has three main axes a, b and c, and refractive indexes of na, nb and nc along the main axes a, b and c, respectively, wherein a relationship nc>na>nb holds, with the main axis a and the main axis b lying in a plane parallel to the substrate surface, the main axis c being parallel to a direction normal to the substrate surface, and the main axis a being perpendicular to a polarization axis of one of the polarizing plates which is adjacent to the phase difference compensator. The first, second and third phase difference compensators compensate for a refractive index anisotropy of the liquid crystal molecules of the liquid crystal layer which are in a substantially horizontal orientation with respect to the substrate surface in the absence of an applied voltage.

In one embodiment of the invention, where a retardation value of the liquid crystal layer is $d_{1c} \cdot \Delta n$, an in-plane retardation of the third phase difference compensator is $d \cdot (na-nb)$, and a retardation along a thickness direction thereof is $d \cdot (na-nc)$; parameters RL and NZ are defined as follows $RL = d \cdot (na-nc)/(d_{1c} \cdot \Delta n)$, and $NZ = (na-nc)/(na-nb)$;

two of the third phase difference compensators are provided respectively between the first polarizing plate and the first phase difference compensator, and between the second polarizing plate and the second phase difference compensator, with a sum of RL values of the two third phase difference compensators being defined as RLsum; then, $0 \leq |RLsum| \leq 2$; and each of the third phase difference compensators satisfies $\log(|NZ|) \geq 2.0 \cdot |RL| - 1.2$, where RL<0 and NZ<0.

In one embodiment of the invention, the RL value and the NZ value of one of the two third phase difference compensators are equal to the RL value and the NZ value, respectively, of the other one of the two third phase difference compensators.

According to another aspect of this invention, a liquid crystal display device includes: a first substrate and a second substrate at least one of which is transparent: a liquid crystal layer interposed between the first and second substrates, the layer being made of a nematic liquid crystal material having a positive dielectric anisotropy; a first electrode and a second electrode provided on the first and second substrates, respectively, for applying an electric field substantially vertical to the first and second substrates across the liquid crystal layer; a first polarizing plate and a second polarizing plate each provided on an outer side of respective one of the first and second substrates, the first and second polarizing plates being arranged in a crossed Nicols arrangement; and a phase difference compensator. The liquid crystal layer in each pixel region includes at least a first domain and a second domain in which liquid crystal molecules are oriented in different orientations. The phase difference compensator compensates for the refractive index anisotropy of the liquid crystal molecules in a substantially horizontal orientation with respect to the surfaces of the first and second substrates.

In one embodiment of the invention, the first and second substrates are both transparent, and the phase difference compensator comprises a first phase difference compensator provided between the first substrate and the first polarizing plate and a second phase difference compensator provided between the second substrate and the second polarizing plate.

In one embodiment of the invention, the first and second phase difference compensators each have a positive refractive index anisotropy, and phase-delay axes of the first and second phase difference compensators are substantially parallel to each other and substantially perpendicular to a phase-delay axis of the liquid crystal layer in the absence of an applied voltage.

In one embodiment of the invention, a third phase difference compensator is further provided between the first phase difference compensator and the first polarizing plate. The third phase difference compensator has a positive refractive index anisotropy. A phase-delay axis of the third phase difference compensator is substantially perpendicular to the first and second substrates.

In one embodiment of the invention, a fourth phase difference compensator is further provided between the second phase difference compensator and the second polarizing plate. The fourth phase difference compensator has a positive refractive index anisotropy. A phase-delay axis of the fourth phase difference compensator is substantially perpendicular to the first and second substrates.

In one embodiment of the invention, a fifth phase difference compensator is provided between the first phase difference compensator and the third phase difference compensator. A sixth phase difference compensator is provided between the second phase difference compensator and the fourth phase difference compensator. The fifth and sixth phase difference compensators each have a positive refractive index anisotropy. A phase-delay axis of the fifth phase difference compensator is substantially perpendicular to a polarization axis of the first polarizing plate. A phase-delay axis of the sixth phase difference compensator is substantially perpendicular to a polarization axis of the second polarizing plate.

In one embodiment of the invention, directors of the liquid crystal molecules in the first and second domains in the middle of the liquid crystal layer along a thickness direction thereof rise in respective directions which are different from each other by about 180°. The directions are at about 45° with respect to the polarization axis of each of the first and second polarizing plates.

In one embodiment of the invention, the liquid crystal molecules in the first and second domains are in a horizontal orientation.

In one embodiment of the invention, the liquid crystal molecules in the first and second domains are in a twist orientation.

In one embodiment of the invention, pre-tilt angles of the liquid crystal molecules on the first and second substrates in the first domain are different from those in the second domain.

In one embodiment of the invention, pre-tilt angles of the liquid crystal molecules on the first and second substrates in the first domain are different from those in the second domain.

In one embodiment of the invention, the liquid crystal layer in each pixel region includes a plurality of the first domains and a plurality of the second domains, the number of the first domains being the same as the number of the second domains.

In one embodiment of the invention, a total area of the first domains is equal to that of the second domains.

Thus, the invention described herein makes possible the advantage of providing a liquid crystal display device having desirable viewing angle characteristics without sacrificing production efficiency and transmissivity.

This and other advantages of the present invention will become apparent to those skilled in the art upon reading and understanding the following detailed description with reference to the accompanying figures.

BRIEF DESCRIPTION OF THE DRAWINGS

Each of FIGS. 1A, 1B and 1C is a view illustrating the definitions of the directions of main axes which are used in the description of various examples of the present invention;

FIG. 6C is a graph showing a change in transmissivity in the region A observed while shifting the viewing angle, with the transmissivity in the normal direction being used as a parameter;

FIG. 8C is a graph showing a change in retardation value observed while shifting the viewing angle along the orientation of the liquid crystal molecules in a black display in a normally black mode liquid crystal display device;

FIG. 8G is a graph showing a change in retardation value observed while shifting the viewing angle along a direction perpendicular to the orientation of the liquid crystal molecules in a black display in a normally black mode liquid crystal display device;

FIG. 8H is a graph showing a change in retardation value observed while shifting the viewing angle along a direction-perpendicular to the orientation of the liquid crystal molecules in a black display in a normally white mode liquid crystal display device;

FIG. 9 is a diagram illustrating an improvement in the viewing angle dependency of the contrast, showing the refractive index ellipse of the liquid crystal layer, the refractive index ellipses of a group of phase plates, and the polarization axis of incident linearly-polarized light;

FIG. 10A is a diagram illustrating a refractive index ellipse having a positive uniaxial refractive index anisotropy;

FIG. 10B is a diagram for illustrating transmitted light when linearly-polarized light which forms an angle of about 45° with respect to the phase-delay axis is incident upon a refractive index ellipse in a direction normal to a display plane;

FIG. 10C is a diagram for illustrating transmitted light when linearly-polarized light which forms an angle of about 45° with respect to the phase-delay axis is incident upon a refractive index ellipse having a positive uniaxial ellipse anisotropy in a direction inclined along the phase-delay axis from the normal to a plane, which includes the phase-delay axis thereof;

FIG. 10D is a diagram for illustrating transmitted light when linearly-polarized light is incident upon a refractive index ellipse having a positive uniaxial ellipse anisotropy, in a direction along the phase-delay axis thereof:

FIG. 10E is a diagram for illustrating transmitted light when linearly-polarized light is incident upon a refractive index ellipse having a positive uniaxial ellipse anisotropy, in a direction inclined from the phase-delay axis thereof;

FIG. 13 is a perspective view schematically illustrating a liquid crystal display device according to a comparative example;

FIG. 23 is a diagram schematically illustrating a structure of a liquid crystal display device according to an example of the present invention;

FIG. 25 is a diagram schematically illustrating a structure of a liquid crystal display device according to another example of the present invention;

FIG. 26 is a diagram schematically illustrating a structure of a liquid crystal display device according to another example of the present invention;

FIG. 30 is a diagram schematically illustrating a structure of a liquid crystal display device according to another example of the present invention;

FIG. 31 is a diagram illustrating a structure of a liquid crystal display device in Examples 15, 15-A to 15-D, Comparative Examples 13-E to 13-H, and Example 14.

FIG. 52 is a diagram illustrating the transition of polarization of light passing through a liquid crystal display device according to Example 11 in a direction parallel to the normal to the surface of the liquid crystal cell with an applied voltage of 0 V;

Figure 53A:
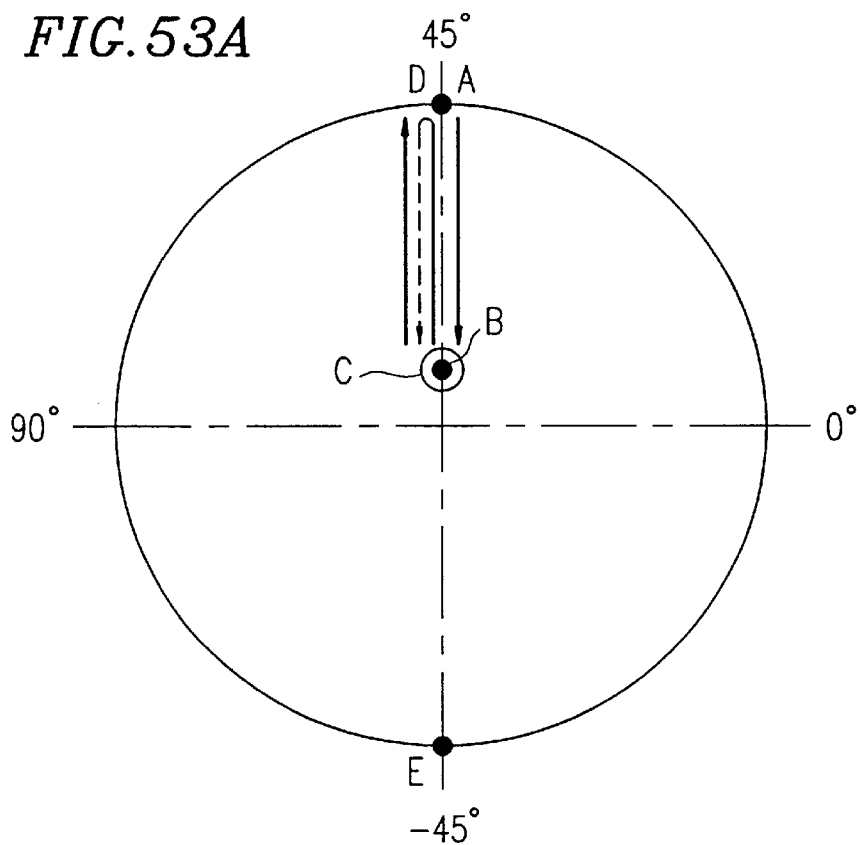
Figure 53B:
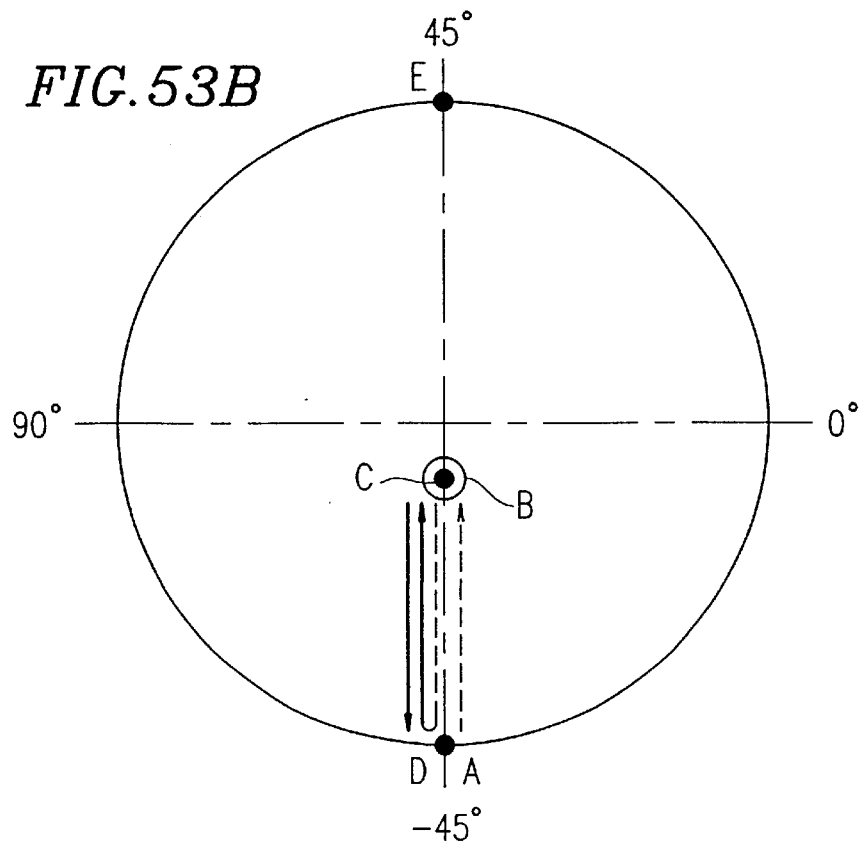
Figure 55:
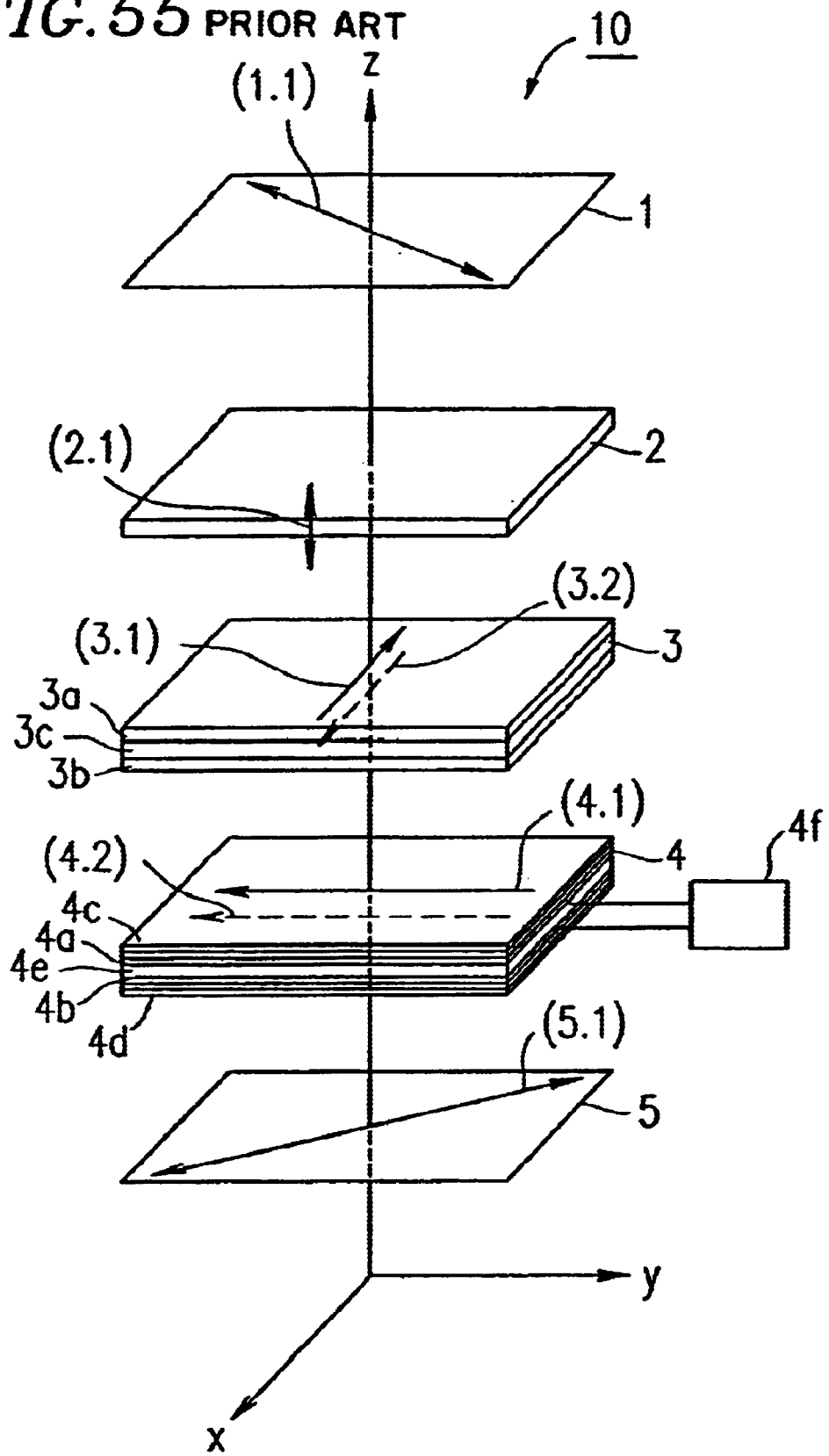

Each of FIGS. 53A and 53B is a diagram illustrating the transition of polarization of light passing through a liquid crystal display device according to Example 15 in a direction parallel to the normal to the surface of the liquid crystal cell with an applied voltage of 0 V;

FIG. 54 is a diagram used for showing that there exist a countless number of parameters for the liquid crystal cell, the phase difference compensators and the polarizers with which it is possible to obtain normally black electro-optical characteristics using a liquid crystal cell having a substantially horizontal orientation in the absence of an applied voltage; and FIG. 55 is a schematic diagram illustrating a liquid crystal display device as disclosed in Japanese Laid-Open Publication No. 5-289097.

DESCRIPTION OF THE PREFERRED EMBODIMENTS

The first part of the present invention will be described below, which comprises Examples 1 and 2.

First, definitions for parameters characterizing a liquid crystal layer, a polarizing plate and a phase plate used commonly in Embodiments 1 and 2 will be described.

Figure 1A:
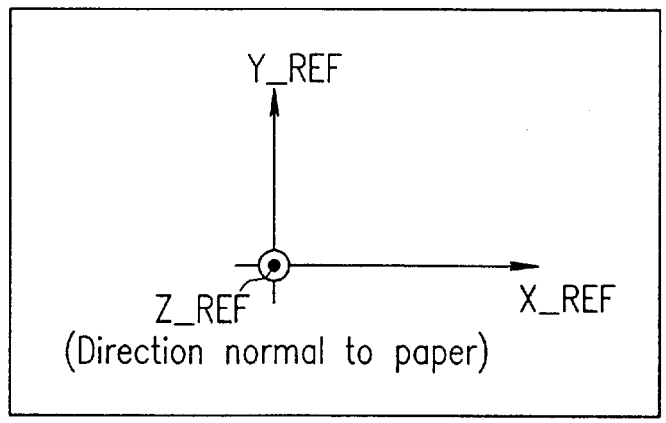
Figure 1B:
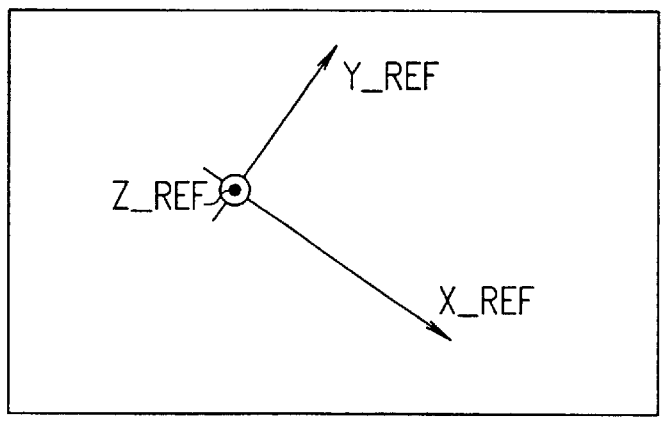
Figure 1C:
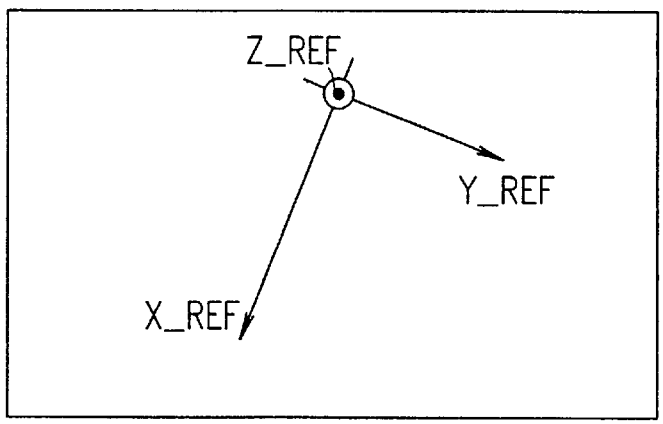

Each of the parameters, particularly angles, are defined based on an XYZ rectangular coordinate system which is appropriately assumed on a liquid crystal panel. As illustrated in FIGS. 1A–1C, the reference coordinate system only needs to have the XY plane thereof being parallel to the liquid crystal panel, and the direction of the X and Y axes is not limited to any particular direction (e.g., it may be any of those illustrated in FIGS. 1A–1C). Note, however, that for any particular liquid crystal display device, a set of axes is assumed commonly for the liquid crystal layer, the polarizing plate, and the phase plate thereof. In the following description, the main axes of the reference coordinate system are denoted by "X_REF", "Y_REF", and "Z_REF", respectively.

Figure 2A:
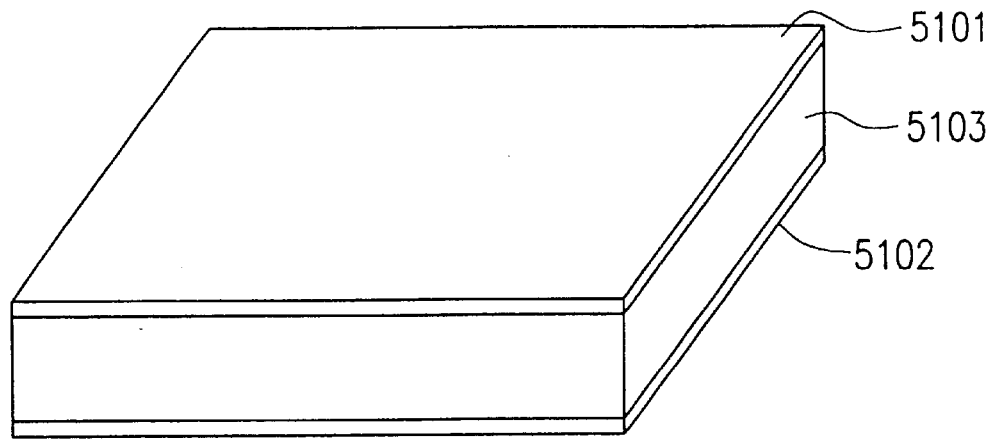
FIG. 2A is a perspective view illustrating a liquid crystal cell.

The parameters characterizing the orientation of the liquid crystal molecules in the liquid crystal layer will be described with reference to FIGS. 2A–2D. FIG. 2A is a perspective view illustrating a liquid crystal cell. For the sake of simplicity, a single domain across which orientation of liquid crystal molecules is uniform will be described below. Where a pixel region is divided into a plurality of domains having different orientations, parameters characterizing the liquid crystal layer for each domain include: ① the retardation value of the liquid crystal layer; ② the twist angle of the liquid crystal layer; and ③ the orientation of the liquid crystal molecules (those located in the middle of the liquid crystal layer along the thickness thereof) (i.e., the phase-delay axis of the liquid crystal layer).

Figure 2B:
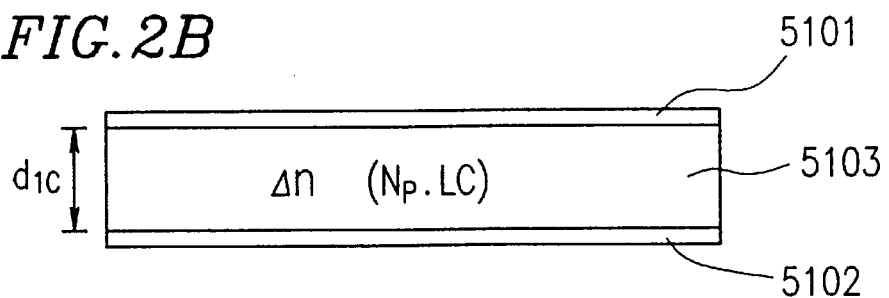
FIG. 2B is a cross-sectional view illustrating the liquid crystal layer.

FIG. 2B is a cross-sectional view illustrating a liquid crystal layer. The retardation value of the liquid crystal layer is defined as a product $d_{1c} \cdot \Delta n$ of the refractive index anisotropy $\Delta n$ of a liquid crystal material 5103 of the liquid crystal layer interposed between substrates 5101 and 5102 and the distance $d_{1c}$ of the substrate 5101 (e.g., a substrate on which a color filter is provided) and the substrate 5102 (e.g., a substrate on which a TFT array is provided) (the distance $d_{1c}$ corresponds to the thickness of the liquid crystal layer=the cell gap).

Figures 2C, 2D:
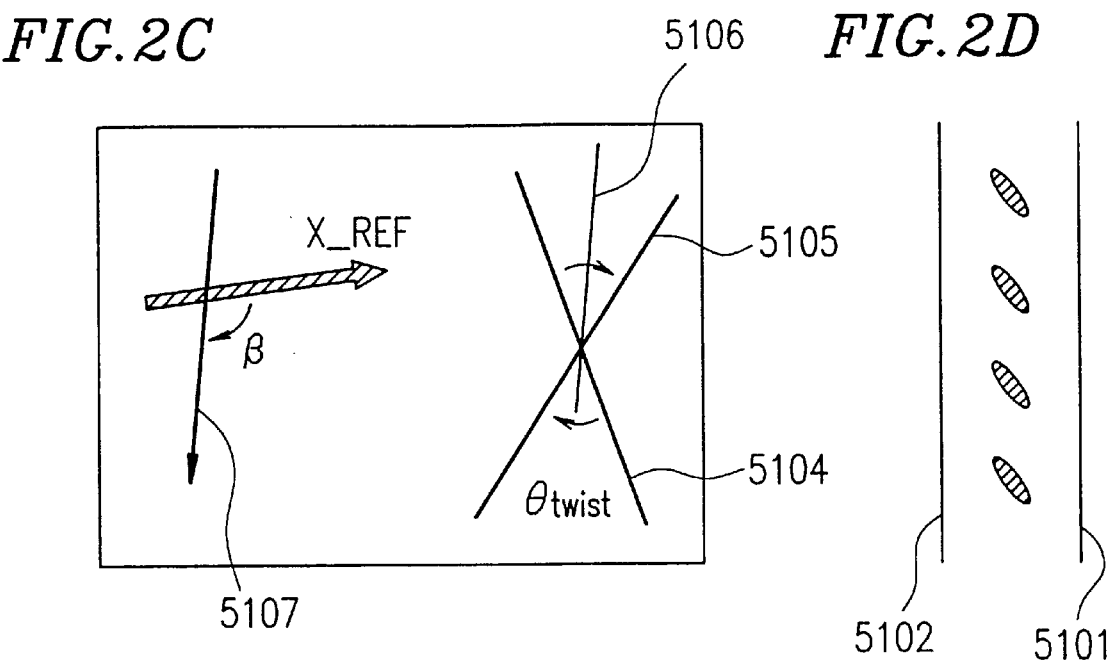
FIG. 2C is a plan view of the liquid crystal cell as viewed from the viewer side.
FIG. 2D is a cross-sectional view of the liquid crystal cell along the line 5106 in FIG. 2C.

FIG. 2C is a plan view of the liquid crystal cell as viewed from the viewer side. A line 5104 is parallel to the long axis of a liquid crystal molecule adjacent to the light source side substrate 5102, and a line 5105 is parallel to the long axis of another liquid crystal molecule adjacent to the viewer side substrate 5101. For the sake of simplicity, it is assumed in the following description that the twist angle of the liquid crystal molecules is about 90° or less. Herein, the twist angle of the liquid crystal layer is defined as an angle obtained by rotating the line 5104 to meet the line 5105, wherein a positive twist angle is obtained by rotating the line 5104 counterclockwise. The angle as defined above is denoted by "$\theta_{twist}$" in the figure.

The orientation of the liquid crystal layer is defined as follows. Referring again to FIG. 2C, a line 5106 is shown to equiangularly bisect the angle $\theta_{twist}$. The line 5106 represents a direction in which a liquid crystal molecule located in the middle of the liquid crystal layer along the thickness thereof rises in response to an applied electric field. This direction is called the orientation or phase-delay axis of the liquid crystal layer. Herein, only some of the liquid crystal molecules present in the liquid crystal layer will be considered, whose long axes are substantially parallel to the line 5106 in the presence of a voltage which gives the liquid crystal layer an intermediate transmissivity (a gray scale voltage). FIG. 2D is a cross-sectional view of the liquid crystal cell along the line 5106. FIG. 2C further shows an arrow 5107 parallel to the line 5106. The tip of the arrow 5107 corresponds to a rising tip (end) of a liquid crystal molecule. Then, the orientation of the liquid crystal layer is defined as an angle β between the arrow 5107 and the reference axis X_REF, wherein a positive orientation is obtained by rotating the reference axis X_REF counterclockwise.

A parameter for a polarizing plate is a direction (angle) of the polarization axis (transmission axis) thereof. Definition of the direction of the polarization axis will be described (not shown in the figures). The direction of the polarization axis is defined as an angle between the polarization axis and the reference axis X_REF, wherein a positive direction is obtained by rotating the reference axis X_REF counterclockwise. Of course, polarization axis directions α, α+180°, and α−180° all denote an equivalent polarizing plate.

Parameters for a phase plate are defined as follows. Parameters for a phase plate include: ① the in-plane retardation value (in a plane parallel to the display plane); ② the retardation value along the thickness direction (in a direction vertical to the liquid crystal display plane); ③ the angle of the main axis a (the angle between X_REF and the main axis a); ④ the parameter RL (the ratio of the retardation value along the thickness direction with respect to the retardation value of the liquid crystal layer); and ⑤ the parameter NZ (the ratio of the retardation value along the thickness direction with respect to the in-plane retardation value).

Figure 3A:
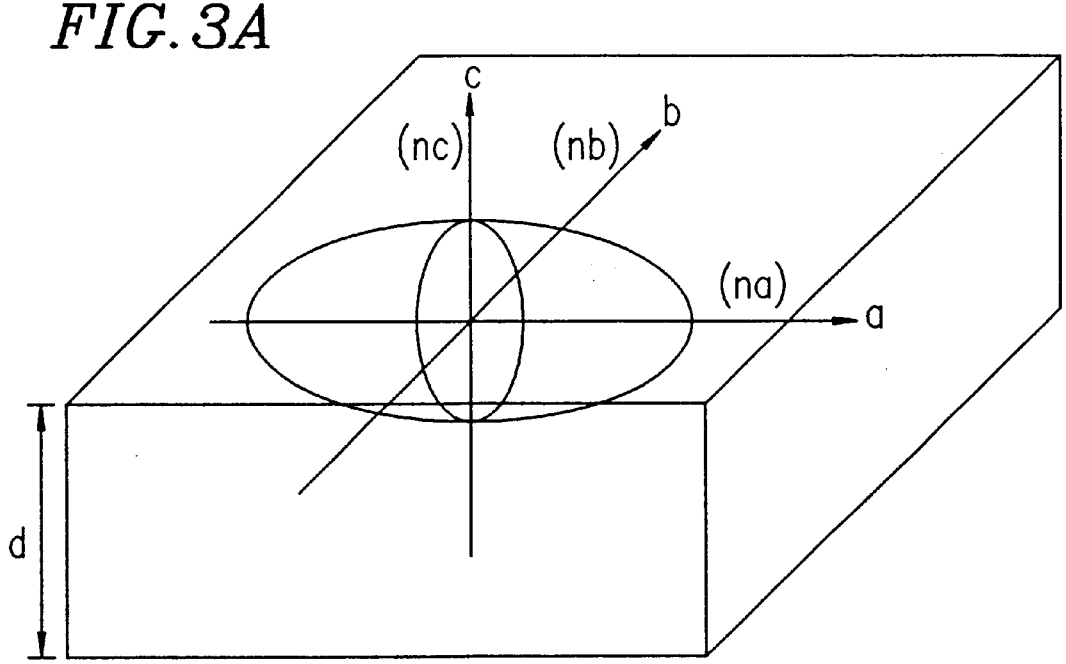
FIG. 3A and 3B schematically illustrate a refractive index ellipse of a phase plate used in the description of various examples of the present invention.
Figure 3B:
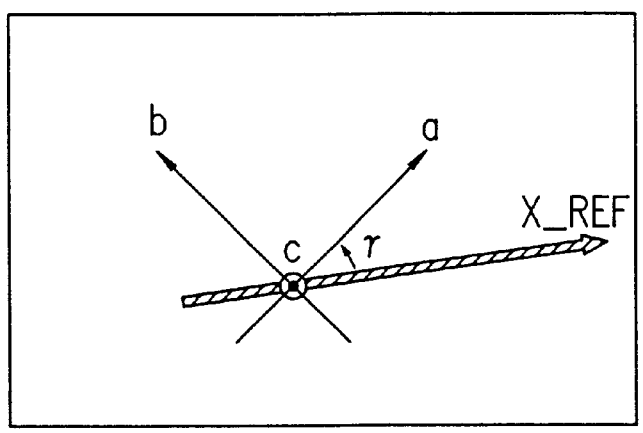

FIGS. 3A and 3B show a refractive index ellipse of the phase plate. The three main axes of the refractive index ellipse of the phase plate used in the examples of the present invention are denoted by a, b and c, respectively. The main axes a, b and c together form a rectangular coordinate system. The main axes a and b lie in a plane parallel to the phase plate surface, i.e., in a plane parallel to the display plane. The refractive index values along the main axes a, b and c are denoted by na, nb and nc, respectively. The thickness of the phase plate is denoted by d. Then, ① The in-plane retardation of the phase plate is defined as d·(na−nb);

② The retardation along the thickness direction is defined as d·(na−nc);

③ The angle of the main axis a is defined as an angle γ between the reference axis X_REF and the main axis a, wherein a positive angle is obtained by rotating the reference axis X_REF counterclockwise;

④ The parameter RL is defined as d·(na−nc)/($d_{1c}$·Δn); and

⑤ The parameter NZ is defined as (na−nc)/(na−nb).

The embodiments of the present invention will be described below with reference to the figures. First, the principle of operation of the liquid crystal display device according to the present invention will be described with reference to FIG. 4.

Figure 4:
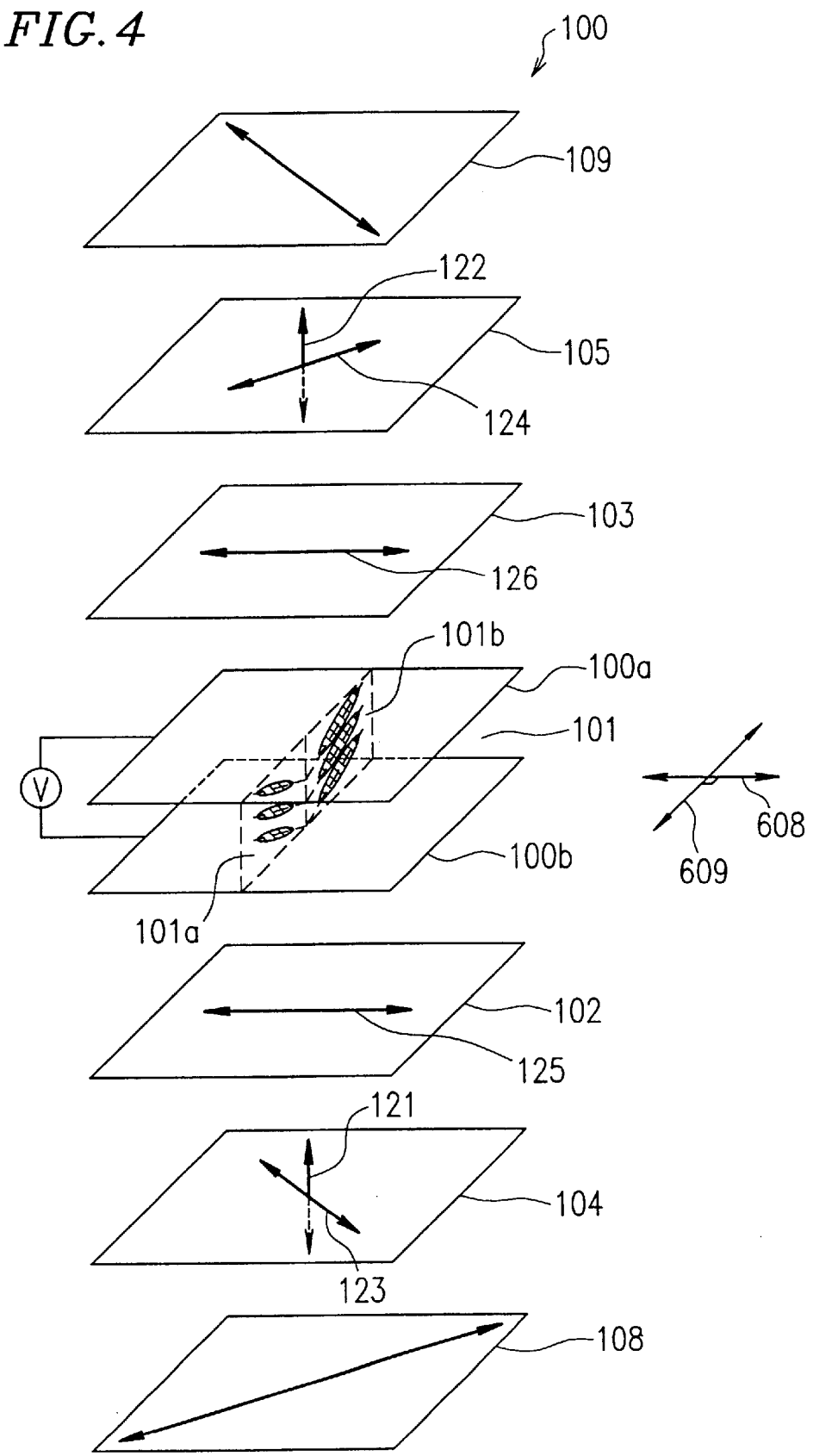
FIG. 4 is a perspective view schematically illustrating a liquid crystal display device according to an example of the present invention.

FIG. 4 schematically illustrates a liquid crystal display device 100 of the present invention. FIG. 4 illustrates a transmission-type liquid crystal display device.

The liquid crystal display device 100 includes: a liquid crystal layer 101; a pair of electrodes 100a and 100b for applying a voltage across the liquid crystal layer 101; a pair of phase plates 102 and 103 provided on the respective sides of the liquid crystal layer 101 (the phase plate may of course be of any type, including a phase difference compensation film, a liquid crystal cell, and the like, as long as it has an appropriate refractive index anisotropy); another pair of phase plates 104 and 105 provided on the phase plates 102 and 103, respectively; and a pair of polarizing plates 108 and 109 provided in a crossed Nicols arrangement so as to interpose the above-listed elements there between. The arrows in the polarizing plates 108 and 109 illustrated in FIG. 4 denote the respective polarization axes (transmission axes) thereof.

FIG. 4 illustrates the liquid crystal layer 101 corresponding to one pixel, and the orientation of the liquid crystal molecules therein in the absence of an applied voltage. An ellipse in FIG. 4 schematically represents a liquid crystal molecule. As the liquid crystal material, a nematic liquid crystal material having a positive dielectric anisotropy (hereinafter, referred to simply as the "Np liquid crystal material") may be used. The liquid crystal molecules are oriented substantially parallel to the surfaces of the pair of substrates (not shown) and electrodes. Electrodes 100a and 100b are provided on a side of the pair of substrates facing the liquid crystal layer 101 so as to interpose the liquid crystal layer 101 therebetween. By applying a voltage between the electrodes 100a and 100b, an electric field is applied across the liquid crystal layer 101 in a direction substantially vertical to the substrate surface.

As illustrated in FIG. 4, the liquid crystal layer 101 for each axis region includes a first domain 101a and a second domain 100b having different orientations from each other. In the example illustrated in FIG. 4, the director of the liquid crystal molecules in the first domain 101a and the director of the liquid crystal molecules in the second domain 100b are oriented to form an azimuth angle of about 180° with respect to each other. The orientation of the liquid crystal molecules is controlled so that when a voltage is applied between the electrodes 100a and 100b, the liquid crystal molecules in the first domain 101a rise in the clockwise direction while those in the second domain 101b rise in the counterclockwise direction, i.e., the molecules in the different domains rise in opposite directions. Such an orientation of the directors of the liquid crystal molecules can be achieved by using any orientation control technique known in the art using an alignment film. When a plurality of such first domains and a plurality of such second domains (in which the director is oriented in a direction different from that in the first domains by about 180°) are provided in each axis region, the viewing angle characteristics can be even more uniform.

Thus, when viewing a gray scale image on the liquid crystal display device 100 with pixels each divided into a plurality of regions having different orientations, the change in the brightness the image experienced while inclining the viewing angle from the direction normal to the display plane (hereinafter, also referred to as the "normal" or the "normal direction") toward the first domain 101a is symmetric with that experienced while inclining the viewing angle toward the second domain 101b. It is preferred that the area of the first domain 100a is substantially equal to that of the second domain 101b. The areas of respective domains do not have to be equal to one another for each pixel region, but substantially the same effect can be obtained when the total area of the first domains 101a is substantially equal to the total area of the second domains 101b for the entire display plane. Thus, the way to achieve the orientation division is not limited to that described above.

As illustrated in FIG. 4, the director of the liquid crystal molecules in the first domain 101a and the director of the liquid crystal molecules in the second domain 101b are oriented to form an azimuth angle of about 180° with respect to each other. This direction is parallel to the direction indicted by an arrow 609 in FIG. 4. In this specification, the direction 609 is assumed to be along the phase-delay axis of the liquid crystal layer in the absence of an applied voltage. Generally, the direction of the phase-delay axis of a liquid crystal layer in the absence of an applied voltage is defined as an azimuth angle in which liquid crystal molecules in the middle of the liquid crystal layer along the thickness thereof rise in response to an applied voltage. This definition can be applied not only to a liquid crystal layer in which the liquid crystal molecules are oriented horizontally to the substrate surface (including anti-parallel orientation), but also to a liquid crystal layer in which the liquid crystal molecules are in a twist orientation.

The first phase difference compensator 102 and the second phase difference compensator 103 typically have a positive uniaxial refractive index anisotropy, and the axis of the refractive index ellipse which has the maximum refractive index (i.e., the phase-delay axis) (the direction indicated by an arrow 125 or 126 in FIG. 4) is arranged to be parallel to the substrate surface and perpendicular to the phase-delay axis of the liquid crystal layer 101 in the absence of an applied voltage. Therefore, it is possible to control the light leakage due to the refractive index anisotropy of the liquid crystal molecules in the absence of an applied voltage and thus to obtain a desirable black display (or desirable normally black characteristics).

The third phase difference compensators 104 and 105 typically have a biaxial refractive index anisotropy, and the phase-delay axis (the direction indicated by an arrow 121 or 122 in FIG. 4) is arranged to be parallel to the direction normal to the substrate surface so as to compensate for the change in transmissivity associated with the change in viewing angle. Moreover, each of the third phase difference compensators 104 and 105 is arranged so that one of the main axes of the refractive index ellipse thereof parallel to the substrate surface which has a larger refractive index is perpendicular to the polarization axis of one of the polarizing plates closer to that phase difference compensator. Thus, it is possible to compensate for the rotation of the polarization axis of elliptically-polarized light, and further to provide a display with desirable viewing angle characteristics. Alternatively, only one of the third phase difference compensators 104 and 105 may be provided.

The elements of the present invention will be described in greater detail below.

Nematic Liquid Crystal Material Having Positive Dielectric Anisotropy: ND Liquid Crystal Material As in a liquid crystal display device of a widely-used TN mode, the present invention employs a substrate which has been subjected to a horizontal alignment treatment, and an Np liquid crystal material. Therefore, the time required for a liquid crystal injection process can be reduced to about half of that required in the liquid crystal display device of Japanese Laid-Open Publication No. 7-28068 which employs a substrate which has been subjected to a vertical alignment treatment and an Nn liquid crystal material. Generally, an Np liquid crystal material has a lower viscosity than that of an Nn liquid crystal material, and a substrate which has been subjected to a horizontal alignment treatment has a higher wettability for a liquid crystal material than that of a substrate which has been subjected to a vertical alignment treatment. These factors together provide a multiplier effect of enabling a high-speed liquid crystal injection. The liquid crystal injection process has a significant proportion in the total amount of time required for the production of a liquid crystal display device. Therefore, the substantial reduction in this process leads to a substantial improvement in the production efficiency of the liquid crystal display device.

Vertical Electric Field

According to the present invention, a pair of electrodes arranged to interpose a liquid crystal layer therebetween are used to apply a vertical (to the substrate) electric field across the liquid crystal layer so as to drive the liquid crystal molecules. Therefore, it is possible to realize an aperture ratio comparable to that of a conventional TN mode liquid crystal display device. Thus, it is not necessary to provide an opaque electrode within the pixel region as in the IPS mode, whereby it is possible to obtain a liquid crystal display device having a larger aperture ratio than a liquid crystal display device of the IPS mode.

Orientation Division

Figure 5A:
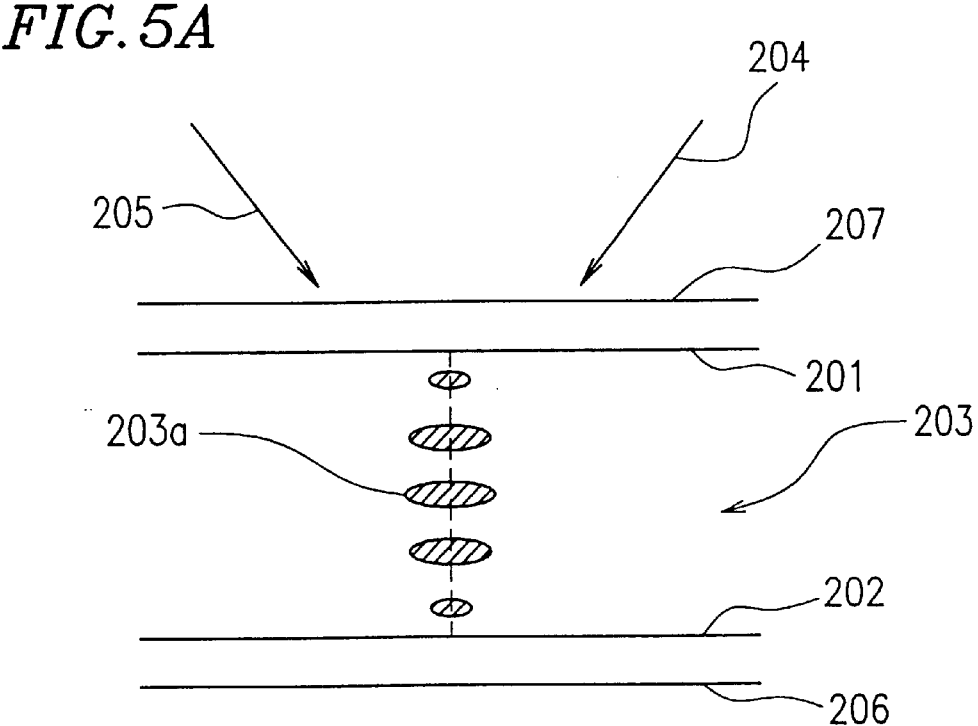
FIG. 5A is across-sectional view schematically illustrating an orientation of liquid crystal molecules in the absence of an applied voltage.
Figure 5B:
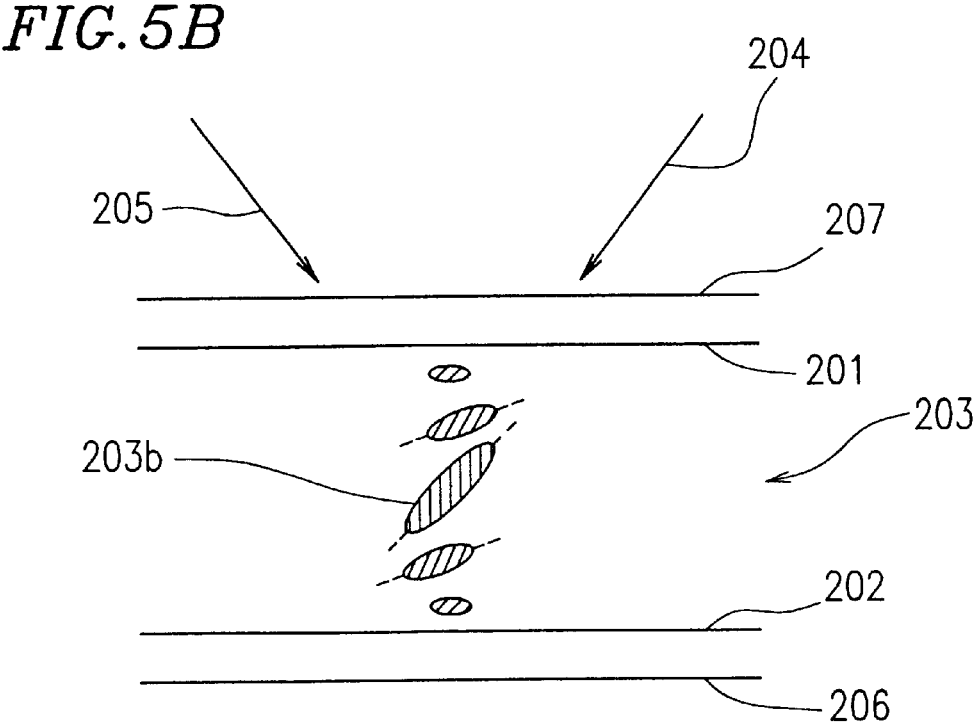
FIG. 5B is a cross-sectional view schematically illustrating an orientation of liquid crystal molecules in the presence of an applied voltage.

Including the TN mode which is currently widely used in the art, a liquid crystal display device in which the transmissivity is varied by moving the liquid crystal molecules in the thickness direction of the liquid crystal layer has a display brightness that is substantially dependent upon the viewing angle (inferior viewing angle characteristics). This will be further described with reference to FIGS. 5A, 5B and 5C. FIGS. 5A and 5B schematically illustrate a liquid crystal display device having a liquid crystal layer 203 having a twist orientation. Referring to FIGS. 5A and 5B, a pair of electrodes 201 and 202 are provided between a pair of polarizing plates 206 and 207 which are arranged in a crossed Nicols arrangement. The liquid crystal layer 203 is interposed between the electrodes 201 and 202. FIGS. 5A and 5B are drawn so that a liquid crystal molecule in the middle of the liquid crystal layer 203 along the thickness thereof has a long axis along the plane of the figures (such a molecule appears to be the longest). FIGS. 5A and 5B correspond to the absence and the presence of an applied voltage.

As illustrated in FIG. 5A, the liquid crystal molecule 203a in the middle of the liquid crystal layer 203 along the thickness thereof is oriented substantially parallel to the substrate surface. This state appears to be the same from a viewing angle 204 and from a viewing angle 205. When a gray scale voltage is applied as in FIG. 5B, different states are viewed from different viewing angles. This is due to the liquid crystal molecules having a positive uniaxial refractive index anisotropy (a cigar-shaped refractive index ellipse). In response to an applied voltage, a liquid crystal molecule 203b rises in a direction which is defined by the pre-tilt angle thereof (in the counter-clockwise direction in this example). When the liquid crystal molecule 203b is viewed from the viewing angle 204 (along the long axis of the molecule 203b), the refractive index anisotropy of the cigar-shaped refractive index ellipse disappears (the molecule 203b is viewed to have a circular shape). When the liquid crystal molecule 203b is viewed from the viewing angle 205, the refractive index anisotropy peaks.

Therefore, when the liquid crystal molecules 203b in the liquid crystal cell are viewed from the viewing angle 204, a majority of the molecules are viewed to have a circular shape, i.e., the refractive index anisotropy of the liquid crystal layer decreases. Thus, linearly-polarized light having passed through the polarizing plate 206 reaches the polarizing plate 207 without having been substantially altered by the liquid crystal layer 203, and then is blocked by the polarizing plate 207 whose polarization axis is perpendicular to that of the polarizing plate 206, thereby reducing the transmissivity. When the liquid crystal molecules 203b in the liquid crystal cell are viewed from the viewing angle 205, a majority of the molecules are viewed to have an elongated shape, i.e., the refractive index anisotropy of the liquid crystal layer 203 peaks. Therefore, polarized light having passed through the polarizing plate 206 has the polarization altered by the liquid crystal layer 203 so that the maximum amount of light passes through the polarizing plate 207.

Figure 5C:
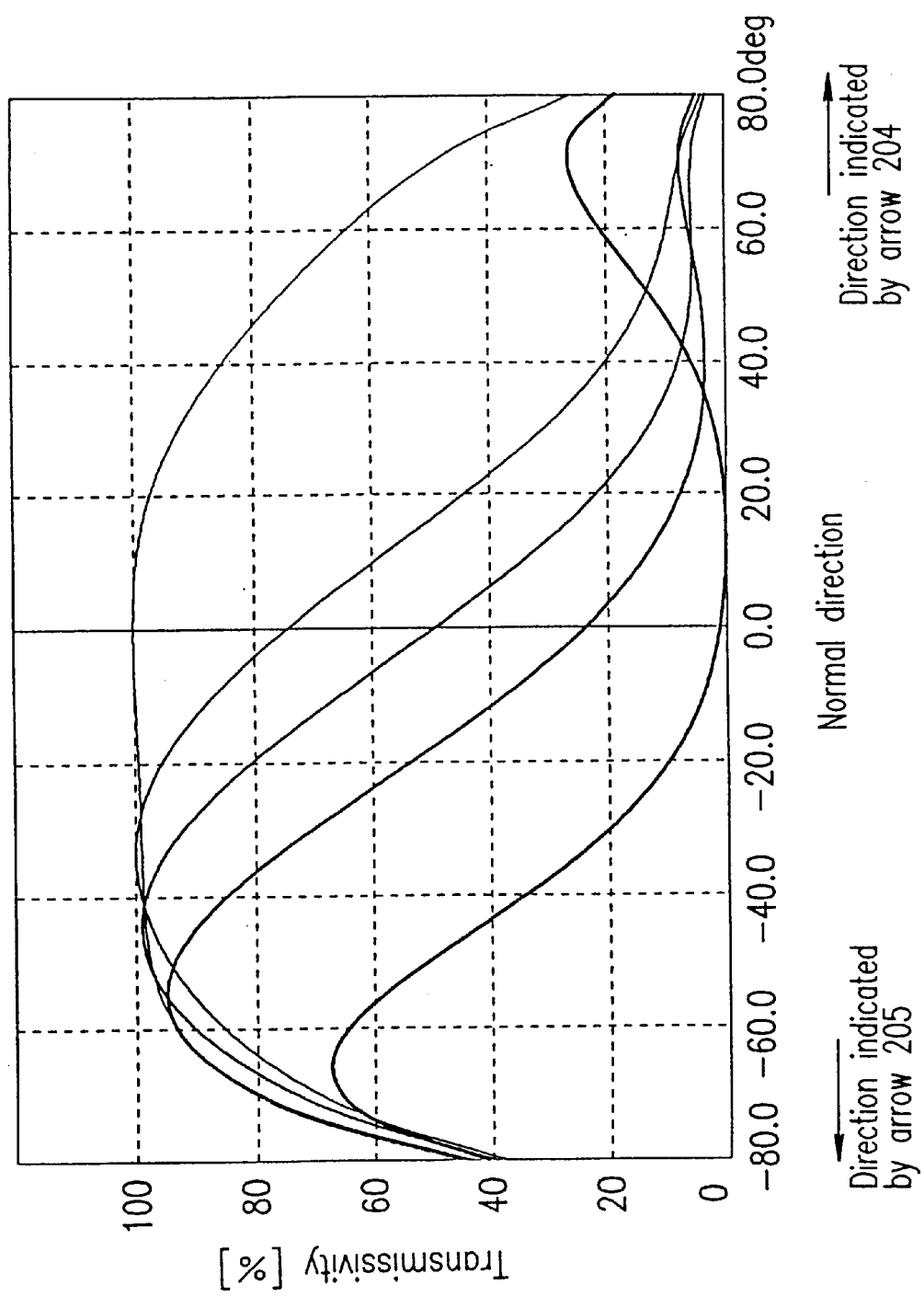
FIG. 5C is a graph showing a change in transmissivity in a region A observed while shifting the viewing angle, with the transmissivity in the normal direction being used as a parameter.

As a result, the brightness substantially changes while inclining the viewing angle between the direction in which the liquid crystal molecules rise (the viewing angle 204 in FIG. 5B) and the opposite direction (the viewing angle 205 in FIG. 5B), as illustrated in FIG. 5C. Typically, the viewing angles 204 and 205 are set to correspond to the lower side (the 6 o'clock direction) and the upper side (the 12 o'clock direction) of the panel. FIG. 5C illustrates various transmissivity curves for various applied voltages.

Thus, in the conventional TN mode, the brightness substantially varies as the viewing angle is inclined along the orientation of the liquid crystal molecules. As can be seen from the above description, such asymmetry in the gray scale characteristics is seen not only in the TN mode, but also commonly in other various display modes where the liquid crystal molecules are moved along the thickness of the liquid crystal cell, and where orientation division is not employed.

Figure 6A:
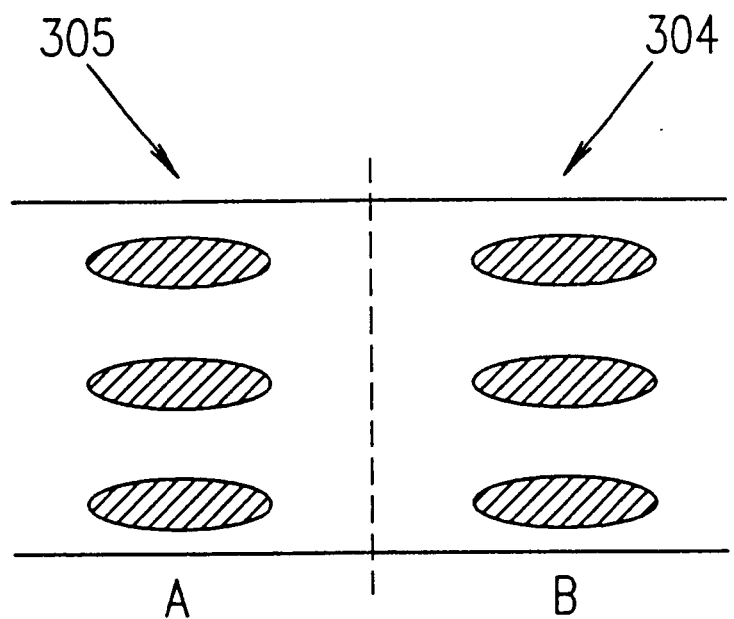
FIG. 6A is across-sectional view schematically illustrating respective orientations of liquid crystal molecules in the liquid crystal regions A and B in a black display.
Figure 6B:
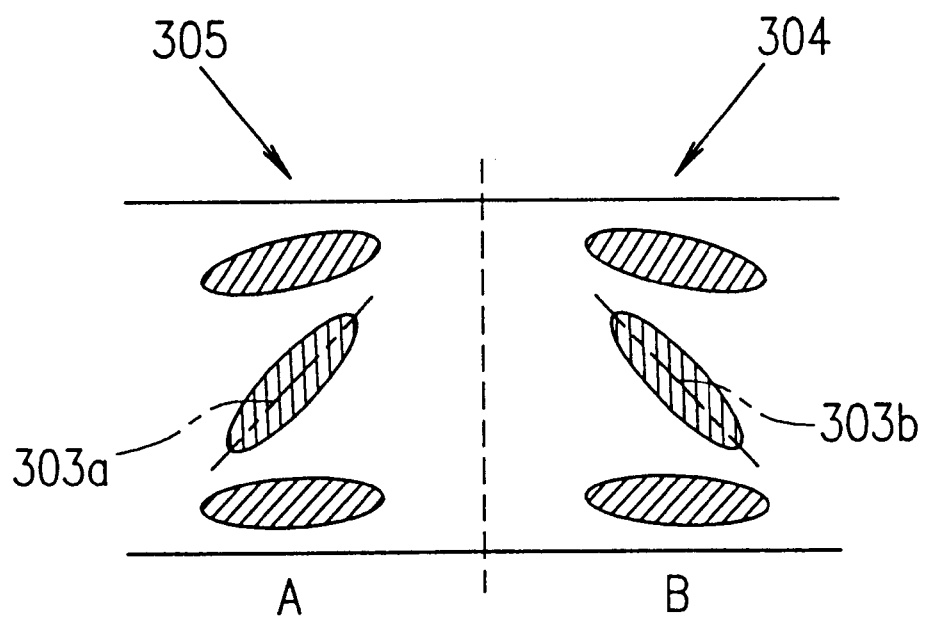
FIG. 6B is a cross-sectional view schematically illustrating respective orientations of liquid crystal molecules in the liquid crystal regions A and B in a gray scale display.
Figure 6D:
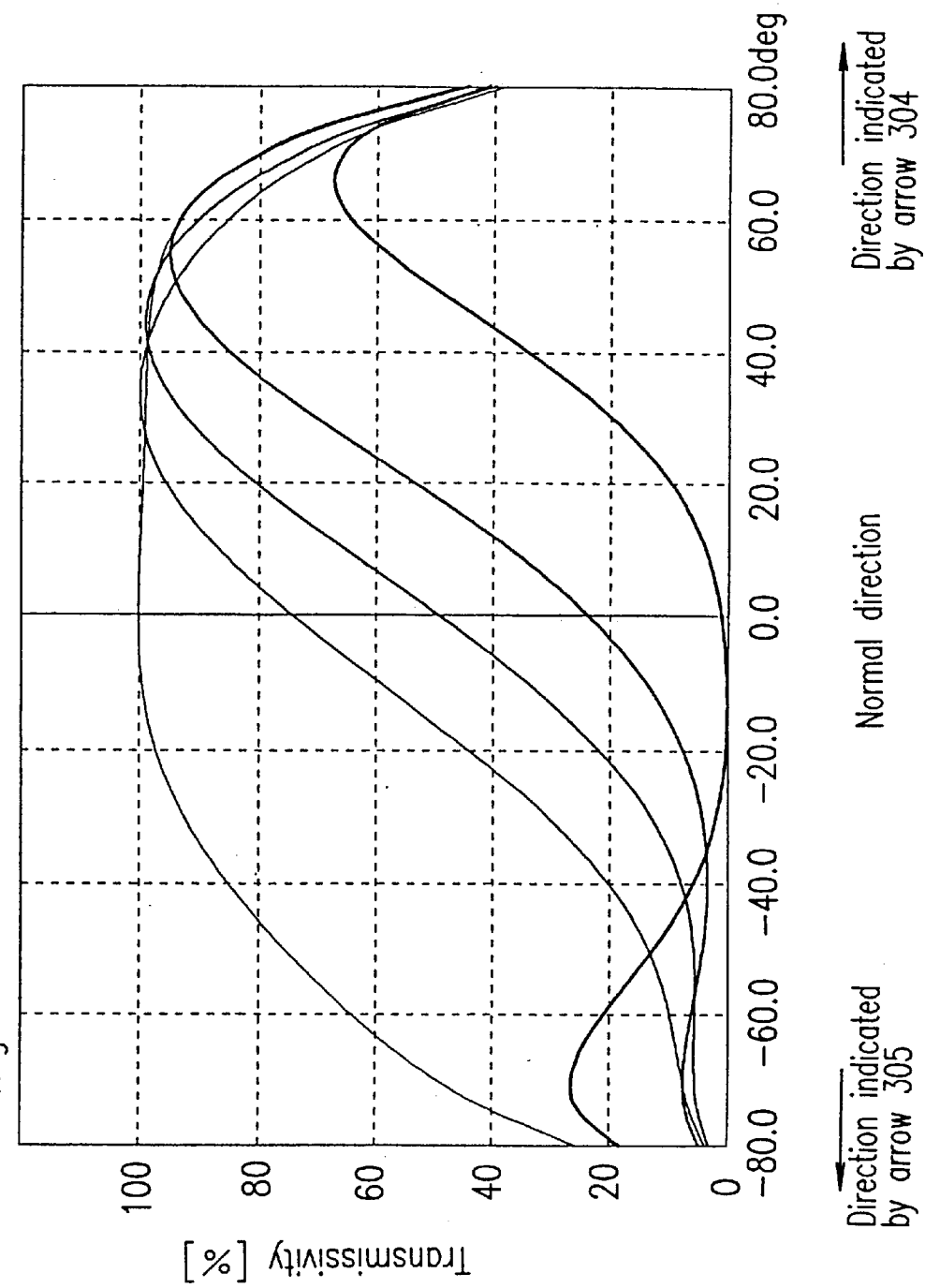
FIG. 6D is a graph showing a change in transmissivity in the region B observed while shifting the viewing angle, with the transmissivity in the normal direction being used as a parameter.
Figure 6E:
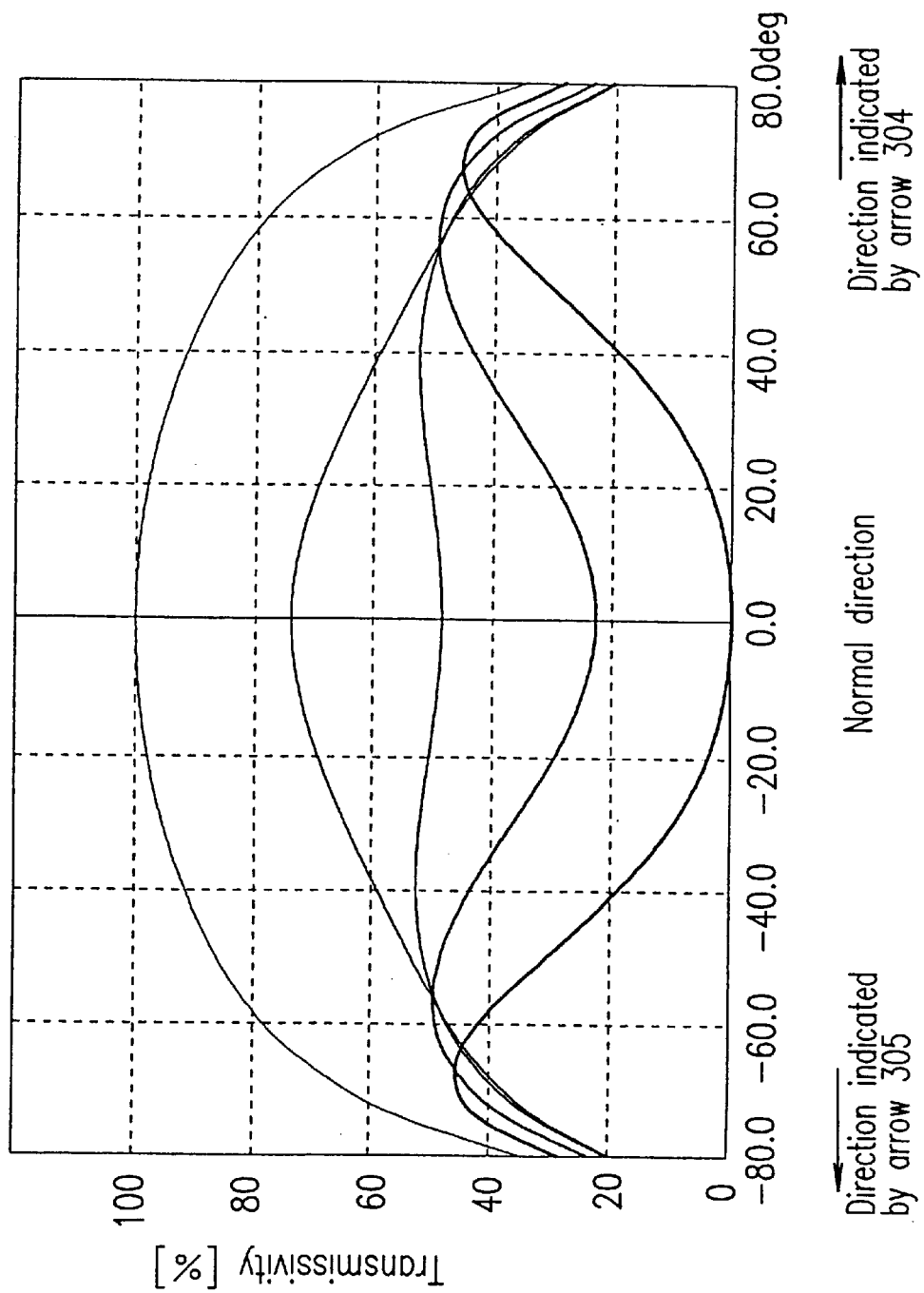
FIG. 6E is a graph showing a change in transmissivity in the regions A and B as a whole observed while shifting the viewing angle, with the transmissivity in the normal direction being used as a parameter.

By dividing a pixel into a plurality of regions having different orientations, it is possible to improve the asymmetry in the gray scale characteristics with respect to the viewing angle, and to obtain desirable gray scale characteristics (viewing angle characteristics) which are symmetric in the up-down direction and in the left-right direction. This will be further described with reference to FIGS. 6A–6E. For example, each pixel region is divided into two regions (first and second domains) A and B in which the liquid crystal molecules rise in response to an applied voltage in directions different from each other by about 180°, as illustrated in FIGS. 6A and 6B. In the absence of an applied voltage, the liquid crystal molecules in both regions are oriented substantially parallel to the substrate surface, as illustrated in FIG. 6A (the pre-tilt angle is ignored herein for simplicity). When a gray scale voltage is applied, a liquid crystal molecule 303a in the region A rise in the counter-clockwise direction and a liquid crystal molecule 303b in the region B rises in the clockwise direction, as illustrated in FIG. 6B (the rising direction is dictated by the pre-tilt angle). As described above, the gray scale characteristics in the regions A and B are dependent upon the viewing angles 304 and 305, as illustrated in FIGS. 6C and 6D. The regions A and B are present in one pixel region, and therefore the gray scale characteristics of the pixel region as a whole are the average of the respective gray scale characteristics illustrated in FIGS. 6C and 6D with the ratio between the respective areas of the regions A and B being taken into consideration. Thus, by setting the ratio between the area SA of the region A and the area SB of the region B to 1:1, it is possible to obtain gray scale characteristics that are symmetric for the viewing angles 304 and 305, as illustrated in FIG. 6E.

Figure 7A:
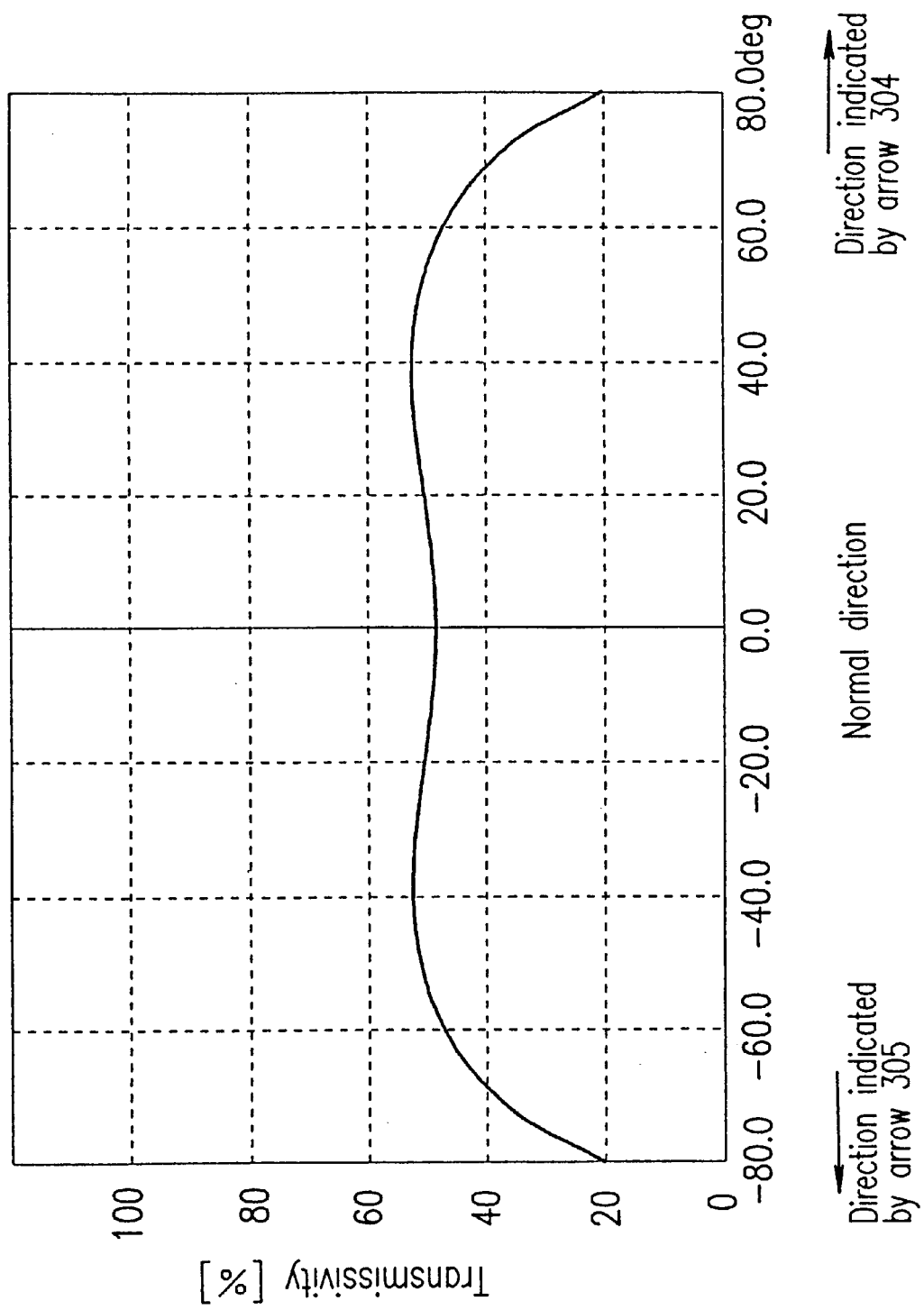
FIG. 7A illustrates a viewing angle dependency for one of the gray scale characteristics curves in FIG. 6E which is obtained for an applied voltage by which the transmissivity is about 50% from the normal direction.
Figure 7B:
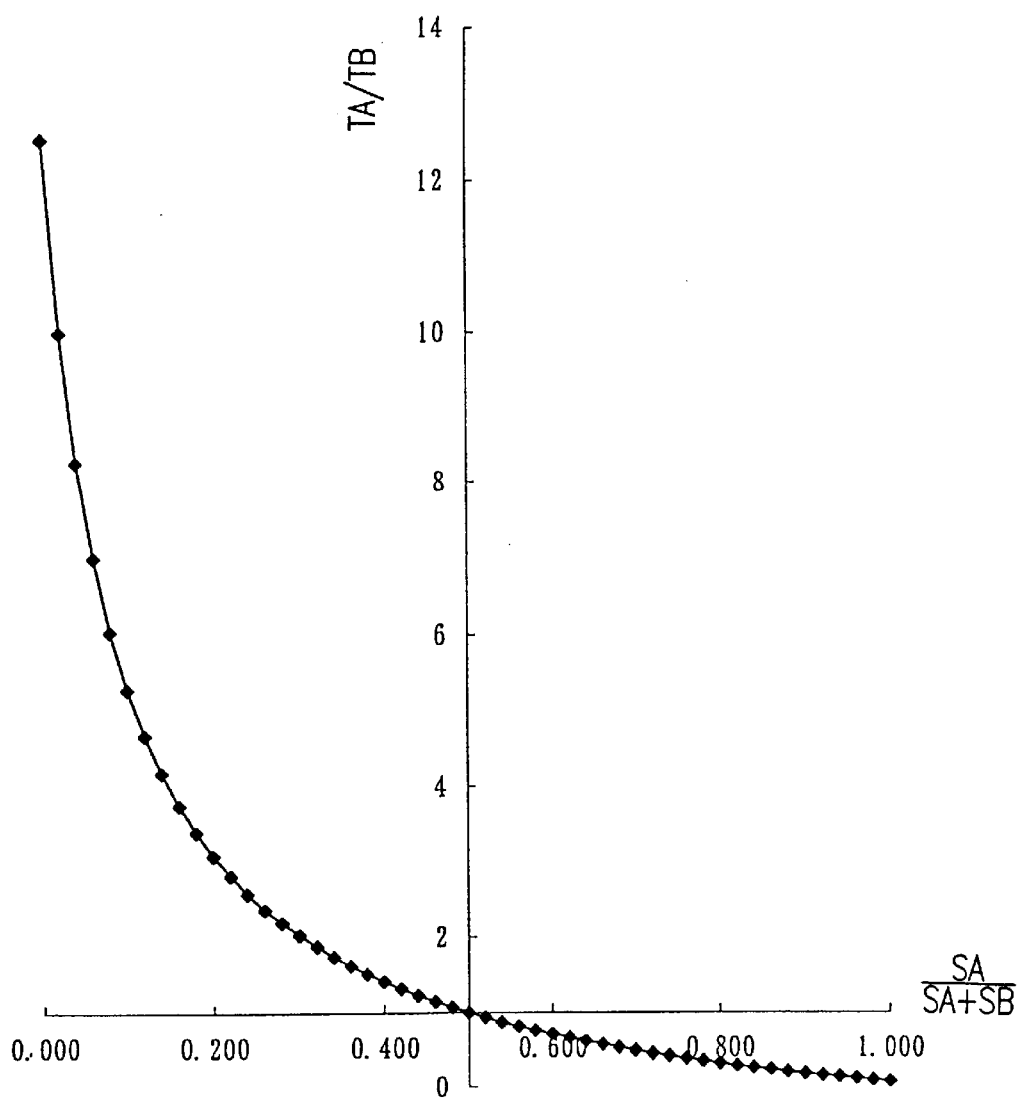
FIG. 7B illustrates the symmetry between the pixel division ratio (the ratio between the area of the region A and the area of the region B), showing the symmetry between the ratio between the area of the region A and the area of the region B and a gray scale level.

Next, the ratio SA:SB and the resulting gray scale characteristics will be described so as to estimate a range in which the orientation division effect can be obtained. FIG. 7A illustrates a viewing angle dependency for one of the gray scale characteristics curves in FIG. 6E which is obtained for an applied voltage by which the transmissivity is about 50% from the normal direction. For the symmetry in the up-down direction, FIG. 7B illustrates the relationship between the ratio TA/TB and the ratio SA/(SA+SB) between the areas SA and SB of the regions A and B. TA and TB denote transmissivities obtained in directions respectively at 50° in the viewing angles 304 (toward the upper side of the panel) and 305 (toward the lower side of the panel) as illustrated in FIGS. 6A and 6B. It can be seen from FIG. 7B that the gray scale characteristics become symmetric in the up-down direction (i.e., TA/TB=about 1) when the ratio SA/(SA+SB) is about 0.5.

Figure 7C:
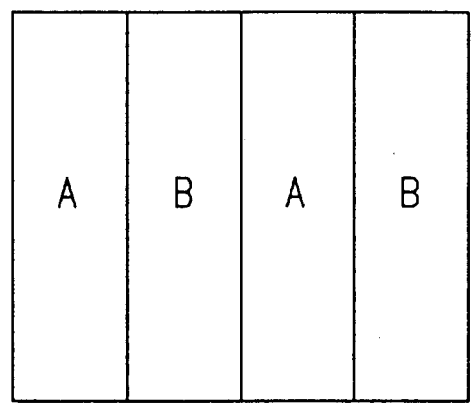
FIG. 7C schematically illustrates a variation of the orientation division of a single pixel region according to the present invention.
Figure 7D:
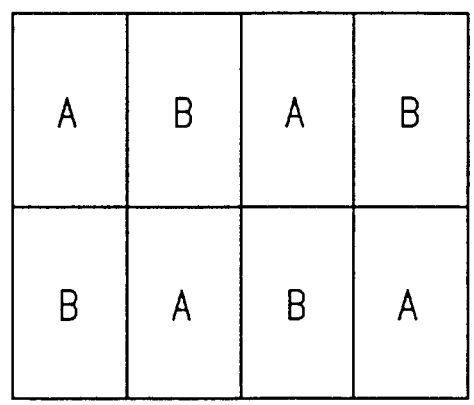
FIG. 7D schematically illustrates another variation of the orientation division of a single pixel region according to the present invention.
Figure 7E:
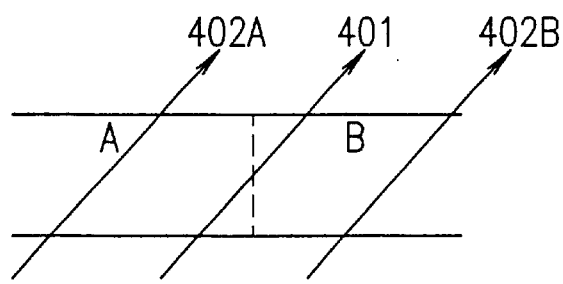
FIG. 7E is a schematic view illustrating the reason that the viewing angle characteristics can be even more uniform by reducing the size of the unit of orientation division.

The number of divided regions having different orientations is not limited to two, but may be any number as long as the total area of one region having a liquid crystal molecule rising direction and the total area of another region having the opposite liquid crystal molecule rising direction are substantially equal to each other for the entire display plane. In view of the display uniformity, it is preferred that a divided region has a small area, and each pixel region is divided into two or more domains having different orientations. Moreover, each pixel region may have a plurality of regions A and a plurality of regions B arranged in an alternate manner, as illustrated in FIGS. 7C and 7D. By reducing the size of the unit of orientation division, e.g., by providing a plurality of regions A and a plurality of regions B in each pixel region, the viewing angle characteristics can be even more uniform. This is because the proportion of light passing through both of the regions A and B (indicated by an arrow 401) with respect to light passing through only one of the regions A and B (indicated by an arrow 402A or 402B) increases when the liquid crystal display device is viewed from an inclined direction, as illustrated in FIG. 7E.

Normally Black Mode and Improvement of Contrast Ratio

The present invention is in a normally black mode in which a black display is produced in the absence of an applied voltage, and employs a third phase difference compensator so as to improve the viewing angle characteristics. The viewing angle characteristics as used herein refer to changes in displayed images observed when inclining the viewing angle from a direction vertical to the display plane of a liquid crystal display device toward an inclined viewing angle. Such changes observed in displayed images include a change in gray scale, a change in contrast ratio, a change in color, and the like. The change in gray scale can be improved by the orientation division as described above. A way to control the change in contrast ratio will be first described below, and a way to realize a normally black mode with the first and second phase difference compensators will also be described. Then, an effect of suppressing the change in contrast ratio (or an effect of improving the viewing angle dependency of the contrast ratio) will be described, which is provided by a combination of the first and second phase difference compensators with the third phase difference compensator. Finally, for comparison purposes, the difficulty in controlling the change in contrast ratio in a normally white mode will be described.

A contrast ratio (CR) is defined as a value obtained by dividing the maximum transmissivity (the transmissivity in a white display) by the minimum transmissivity (the transmissivity in a black display). In an ordinary liquid crystal display device, the change in transmissivity associated with an inclined viewing angle is greater in a black display than in a white display. Therefore, the change in transmissivity in a black display (also known as "degradation of black display") associated with an inclined viewing angle should be improved in order to improve the viewing angle dependency of the contrast ratio.

Figure 8A:
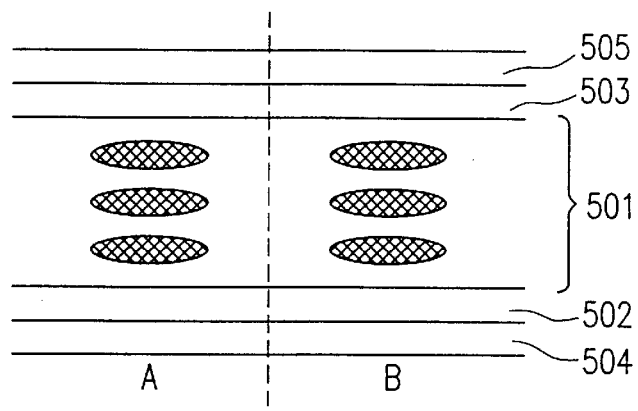
FIG. 8A is a schematic cross-sectional view illustrating the liquid crystal molecules in a black display in a normally black mode liquid crystal display device.

In order to realize a normally black mode, it is effective to compensate for (cancel out) the refractive index anisotropy of a liquid crystal layer in which the liquid crystal molecules are oriented parallel to the substrate surface in the absence of an applied voltage. According to the present invention, the compensation is provided by the phase plates 102 and 103 as illustrated in FIG. 4. In the example illustrated in FIG. 8A, phase plates 502 and 503 provide the same function as that of the phase plates 102 and 103. As illustrated in FIG. 8A, the liquid crystal layer of the present invention has a substantially horizontal orientation in the absence of an applied voltage. When the liquid crystal layer is viewed from the direction normal to the liquid crystal display device, the maximum refractive index results along a direction (orientation) indicated by an arrow 508 in FIG. 8B, and the minimum refractive index results along a direction perpendicular thereto. In the present invention, the value obtained by multiplying the difference between the maximum and minimum refractive indexes by the thickness of the liquid crystal layer, i.e., the retardation value of the liquid crystal layer, is set to be about 250 nm (in a range from about 50 nm to about 500 nm). Herein, the first and second phase plates 502 and 503 each having a positive uniaxial refractive index anisotropy are used in order to realize the normally black mode characteristics. More specifically, the retardation value of the phase plates 502 and 503 is set to be about ½ of that of the liquid crystal layer, i.e., about 125 nm, and the phase-delay axes thereof are aligned with the arrows 509 and 510 (perpendicular to the arrow 508), respectively. In this way, it is possible to cancel out the birefringence effect due to the liquid crystal layer in the absence of an applied voltage by the first and second phase plates.

In the case of a liquid crystal display device with such an orientation division according to the present invention, the phase difference compensation to improve degradation of the black display is more easily done in a normally black mode than in a normally white mode. As a result, it is possible to provide a liquid crystal display device in a normally black mode with a desirable viewing angle dependency of the contrast ratio, whereas it is more difficult to provide such a liquid crystal display device in a normally white mode. This will be further described below.

As illustrated in FIG. 8A, in a liquid crystal display device which produces a black display in the absence of an applied voltage, the region A and the region B of the liquid crystal layer have substantially the same orientation, i.e., parallel to the substrate surface. In other words, the regions A and B have substantially the same orientation, while one of the main axes of the refractive index ellipse representing the liquid crystal layer is parallel to the normal to the substrate, with the other two main axes lying in a plane parallel to the substrate surface. Moreover, one of the main axes of the refractive index ellipse representing the first and second phase plates is also parallel to the normal to the substrate, with the other two main axes lying in a plane parallel to the substrate surface.

Figure 8B:
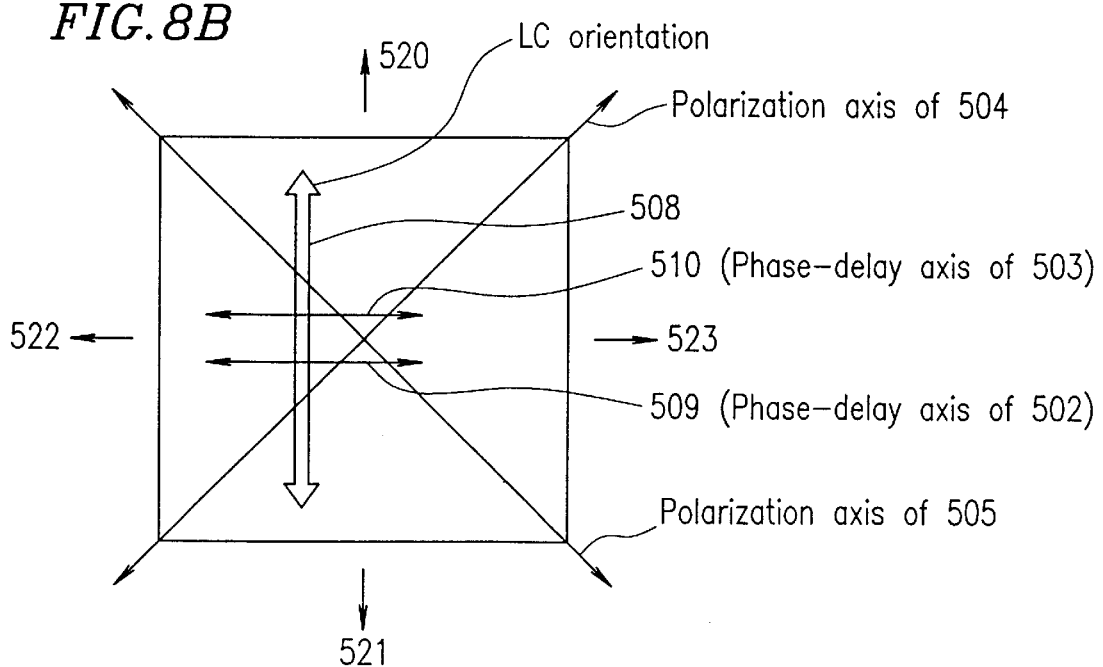
FIG. 8B is a diagram illustrating the relationship among the absorption axis of the polarizing plate, the orientation axis of the liquid crystal molecules, and the phase-delay axis of the phase plate, with which it is possible to obtain normally-black characteristics in a liquid crystal cell having a horizontal orientation.

FIG. 8C illustrates a change in retardation value for the regions A and B which is observed when shifting the viewing angle between the direction indicated by the arrow 520 and the direction indicated by the arrow 521 in FIG. 8B. FIG. 8G illustrates a change in retardation value observed when shifting the viewing angle between the direction indicated by the arrow 522 and the direction indicated by the arrow 523 in FIG. 8B.

The viewing angle dependency of the retardation value in region A is equal to that in region B. In addition, the limit of the retardation value (the bottom of the curve in FIGS. 8C and 8G) appears at the same degree for any of the viewing angles 520, 521, 522 and 523 (at 0° in the figures). The change in retardation value can be compensated for in order to control the degradation of black display associated with the change in viewing angle (the viewing angle dependency of the contrast ratio).

As can be seen from the characteristics of the change in the retardation value, in the liquid crystal display device of the present invention, it is possible to provide phase difference compensation by the same phase difference compensator (the third phase plate) for both of the regions A and B. In addition, it is possible to use, as the third phase difference compensator, a phase plate in which one of the main axes of the refractive index ellipse is parallel to the normal to the surface of the phase plate, with the other two main axes lying in a plane parallel to the surface of the phase plate. A phase plate having such characteristics can be easily and inexpensively produced by a conventional method such as the drawing method. A main feature of the present invention is to employ a normally black mode in a liquid crystal display device with such an orientation division, and to use one or more (third) phase plates having the same characteristics for any of the divided regions, so as to control the viewing angle dependency of the change in contrast ratio.

Figure 8D:
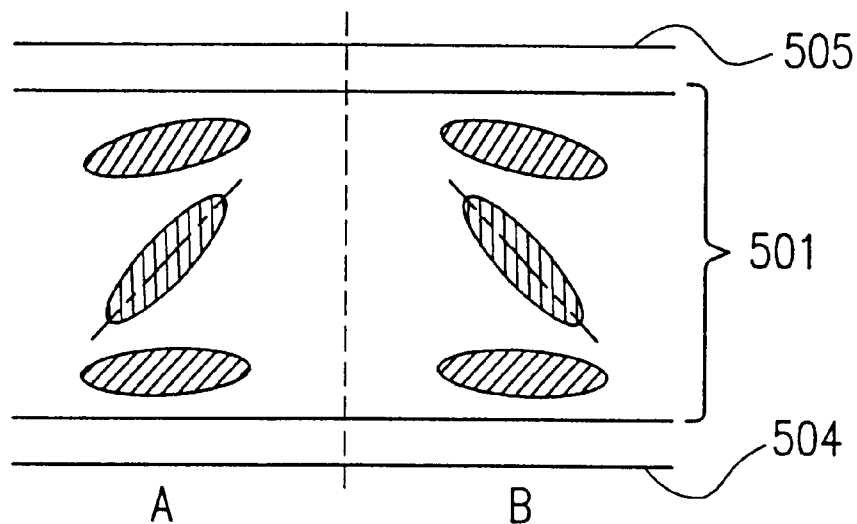
FIG. 8D is a schematic cross-sectional view illustrating an orientation of liquid crystal molecules in a black display in a normally white mode liquid crystal display device.
Figure 8E:
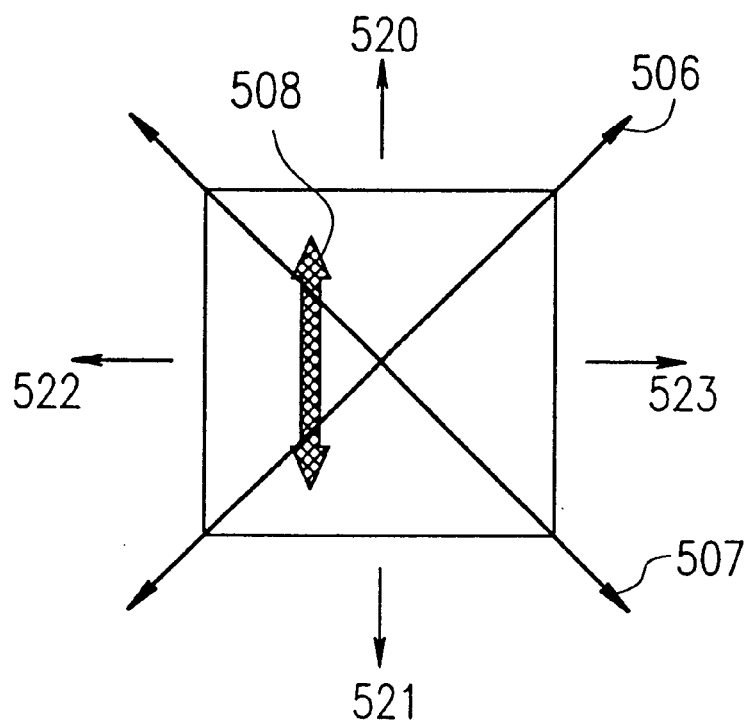
FIG. 8E is a diagram illustrating the relationship among the absorption axis of the polarizing plate and the orientation axis of the liquid crystal molecules, with which it is possible to obtain normally white characteristics in a liquid crystal cell having a horizontal orientation.
Figure 8F:
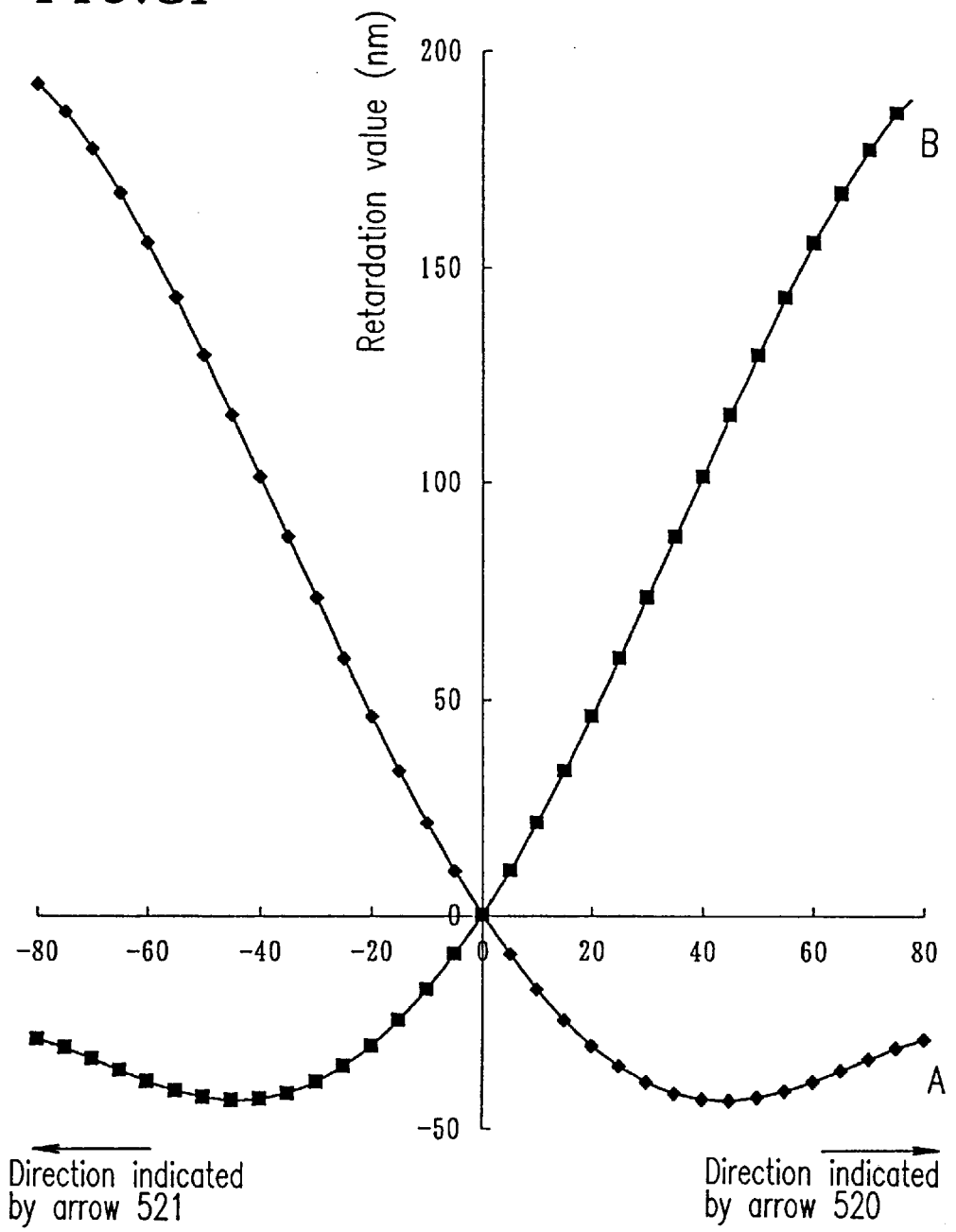
FIG. 8F is a graph showing a change in retardation value observed while shifting the viewing angle along the orientation of the liquid crystal molecules in a black display in a normally white mode liquid crystal display device.

In the case of a normally white mode as illustrated in FIG. 8D where a black display is produced in the presence of an applied voltage, the regions A and B have different orientations when producing a black display, and the main axis of the refractive index ellipse representing the liquid crystal layer is inclined from the normal to the substrate. FIG. 8F illustrates the change in retardation value for the regions A and B when viewing the liquid crystal display device in the normally white mode as illustrated in FIG. 8E while shifting the viewing angle between the direction indicated by the arrow 520 and the direction indicated by the arrow 521, and FIG. 8H illustrates a change in retardation value while shifting the viewing angle between the direction indicated by the arrow 522 and the direction indicated by the arrow 523.

Referring to FIG. 8F, the changes in retardation value between the directions 520 and 521 for the regions A and B, respectively, are substantially different from each other. For example, the retardation value for the region A takes the minimum value when it is viewed from a direction indicated by the arrow 520, whereas the retardation value for the region B takes the minimum value when it is viewed from direction indicated by the arrow 521.

Based on the above, in order to improve the degradation of the black display in the liquid crystal display device, as illustrated in FIG. 8D, it is required to provide different phase difference compensators for the regions A and B, respectively. As the regions A and B are obtained by dividing one pixel region and therefore have very small areas, it is practically very difficult to produce such phase difference compensators which improve the degradation of the black display.

Viewing Angle Compensation by Third Phase Difference Compensator

As described above, by employing a phase difference compensator in which one of the main axes of the refractive index ellipse is parallel to the normal to the surface of the phase plate, with the other two main axes lying in a plane parallel to the surface of the phase plate, it is possible to improve the change in retardation values of the liquid crystal layer 101, the first phase difference compensator 102, and the second phase difference compensator 103, as illustrated in FIG. 4, associated with an inclined viewing angle, i.e., degradation of black display. According to the present invention, the degradation of black display is compensated for by the third phase difference compensator.

How the degradation of black display can be compensated for by the third phase difference compensator will be described with reference to FIG. 9, with particular attention to the angular change in the refractive index anisotropy of the liquid crystal molecules and that of the phase difference compensator. FIG. 9 illustrates refractive index ellipses of the liquid crystal layer and the phase difference compensators used in the present invention. In particular, FIG. 9 illustrates a refractive index ellipse 601 of the liquid crystal layer 101 as illustrated in FIG. 4, and refractive index ellipses 602 and 603 of the first and second phase difference compensators 102 and 103. Each of the refractive index ellipses has positive uniaxiality, and the optical axis thereof lies in a plane parallel to the surface of the liquid crystal display device. The refractive index ellipses 604 and 605 of the third phase difference compensators 104 and 105 lie in a plane parallel to the normal to the surface of the liquid crystal display device.

The change in refractive index observed when viewing a refractive index ellipse 706 (a phase-delay axis 704 and an ellipse 705 perpendicular thereto) will be described with reference to FIGS. 10A–10E. First, a case where the liquid crystal display device is viewed from the normal direction will be discussed. The refractive index anisotropy contributing to the birefringence of the liquid crystal layer or the phase plate is a difference between two refractive indexes obtained respectively along directions parallel to axes 702 and 703 each of which lies in a plane whose normal is along the path of incident linearly-polarized light and forms an angle of about 45° with respect to a polarization axis 701 of the linearly-polarized light. Therefore, the refractive index anisotropy contributing to the transmissivity in the normal direction is the difference na1–nb1 between the refractive indexes na1 and nb1 as illustrated in FIG. 10A.

The refractive index anisotropy contributing to the change in transmissivity observed when shifting the viewing angle along the long axis of the refractive index ellipse of the liquid crystal molecules and the phase plate is the difference na2–nb2 between the refractive indexes na2 and nb2 as illustrated in FIG. 10B. In such a case, as illustrated in FIG. 10B, the refractive index na2 decreases in proportion to na1 in FIG. 10A. The values nb1 and nb2 are equal to each other (nb1=nb2). Thus, the refractive index anisotropy decreases while inclining the viewing angle along the long axis of the refractive index ellipse.

As illustrated in FIG. 100C, the refractive index anisotropy contributing to the change in transmissivity while shifting the viewing angle along the short axis of the refractive index ellipse is the difference na3–nb3 between the refractive indexes na3 and nb3. Thus, the refractive index anisotropy does not change when shifting the viewing angle along the short axis of the refractive index ellipse.

Finally, a case where the main axis of the refractive index ellipse corresponds to the normal to the display plane of the display device will be discussed. The refractive index contributing to the transmissivity in the normal direction is the difference na4–nb4 between the refractive indexes na4 and nb4 as illustrated in FIG. 10D. Therefore, when using a phase plate having a refractive index ellipse such that na4=nb4, the transmissivity in the normal direction does not change. When the viewing angle is shifted toward an inclined direction, the refractive index contributing to the transmissivity is the difference na5–nb5 between the refractive indexes na5 and nb5 shown in FIG. 10E. In such a refractive index ellipse, the refractive index anisotropy increases as the viewing angle is inclined from the normal direction. Thus, there is provided an effect of compensating for the change in refractive index.

In the above description, the refractive index ellipse of FIG. 10D has been described as a uniaxial refractive index ellipse. Each of the corresponding phase difference compensators 104 and 105 of FIG. 4 is a biaxial phase difference compensator which has a refractive index anisotropy also in a plane parallel to the surface of the liquid crystal display device (a large refractive index in the direction indicated by the arrow 123). However, the above discussion also applies to this case because the arrow 123 is substantially perpendicular to the polarization axis of the incident linearly-polarized light.

When using a biaxial phase difference compensator, as illustrated in FIG. 4, it is possible to compensate for the polarization axis of linearly-polarized light being incident from an inclined direction and for the rotation of the main axis of the elliptically-polarized light passing through the phase difference compensator 103 in an inclined direction. Therefore, it is possible to obtain better viewing angle characteristics than that obtained by using a uniaxial phase difference compensator. This will be more apparent from the description of the examples below.

Based on the discussion of the case of a single refractive index ellipse made with reference to FIG. 10A–10E, the effect of phase difference compensation provided by the group of refractive index ellipses illustrated in FIG. 9 according to one embodiment of the present invention will be summarized below. Table 1 shows the change (increase/decrease) in the refractive index anisotropy which affects the transmissivity when shifting the viewing angle toward the respective azimuth angles 608 and 609 with linearly-polarized light (polarization direction 607) being incident upon the group of refractive index ellipses representing the liquid crystal layer and the phase plate in the absence of an applied voltage according to one embodiment of the present invention illustrated in FIG. 9.

TABLE 1

| Direction toward which viewing angle is shifted | Change in refractive index anisotropy with respect to normal direction | | Compensation effect of group 604, 605 for group 601, 602, 603 |
|---|---|---|---|
| | 601 | 602, 603 | 604, 605 |
| 608 | No change | Decreased | Increased | Yes |
| 609 | Decreased | No change | Increased | Yes |

It can be seen from Table 1 that the change in viewing angle in an inclined direction can be compensated for by a phase plate having a refractive index ellipse whose refractive index is larger in the normal direction than in a plane parallel to the surface of the liquid crystal display device. Moreover, the refractive index contributing to the transmissivity is a refractive index in the direction at about 45° with respect to the polarization axis of the incident linearly-polarized light. Thus, it is easily understood that the refractive index in this direction is preferably smaller than the refractive index in the direction normal to the surface of the liquid crystal display device.

Production of Liquid Crystal Cell/Orientation Division

A method for producing a liquid crystal cell used in the present example, particularly, a method for the division of the orientation, will be described. The liquid crystal display device of the present invention can be produced by appropriately combining production methods known in the art.

The liquid crystal cell may be produced under conditions that are substantially the same as those for producing a currently-available TN liquid crystal cell on an ordinary TFT (thin film transistor) substrate. According to the present example, however, the rubbing direction (angle) is different from that of the conventional TN liquid crystal cell. Moreover, in order to produce the two divided orientations, UV radiation is performed on an alignment film for controlling the pre-tilt angle.

Figure 11A:
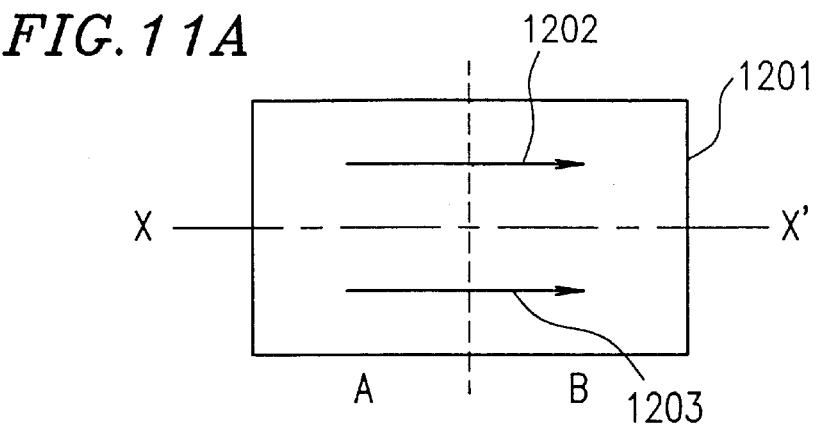
FIG. 11A is a schematic diagram illustrating a liquid crystal cell of a liquid crystal display device of the present invention, showing the rubbing direction.

FIG. 11A is a schematic view illustrating a liquid crystal cell of the present example as viewed from the viewer side substrate. FIG. 11A illustrates an arrow 1202 indicating the rubbing direction for the color filter substrate, and another arrow 1203 indicating the rubbing direction for the TFT substrate.

Figure 11B:
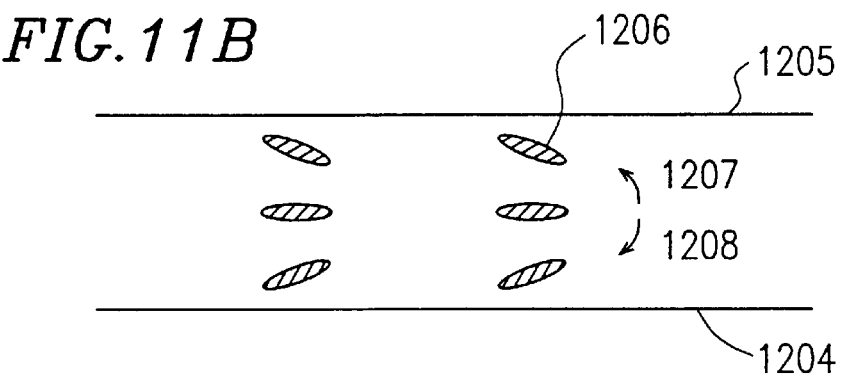
FIG. 11B is a schematic diagram illustrating a liquid crystal cell of a liquid crystal display device of the present invention, showing an orientation of the liquid crystal molecules along the cell thickness direction after the rubbing process as illustrated in FIG. 11A.

A liquid crystal material is injected into a gap between the substrates which have been rubbed in the respective rubbing directions described above, and the cell is subjected to a re-alignment treatment. The orientation of the liquid crystal molecules in such a liquid crystal cell will be described. It is believed that the orientation of liquid crystal molecules 1206 across across section along X–X' line in FIG. 11A, i.e., a cross section parallel to the rubbing direction, can be schematically represented as in FIG. 11B. The angle between the liquid crystal molecule 1206 and a viewer side substrate 1205 is substantially the same as the angle between the liquid crystal molecule 1206 and a light source side substrate 1204. Moreover, the liquid crystal molecules substantially in the middle of the liquid crystal cell along the thickness thereof are oriented substantially parallel to the substrate surface. When a voltage is applied across such a liquid crystal layer, a liquid crystal molecule in the intermediate layer may rotate (rise) in the direction indicated by an arrow 1207 or in the direction indicated by an arrow 1208 with the same probability.

Figure 11C:
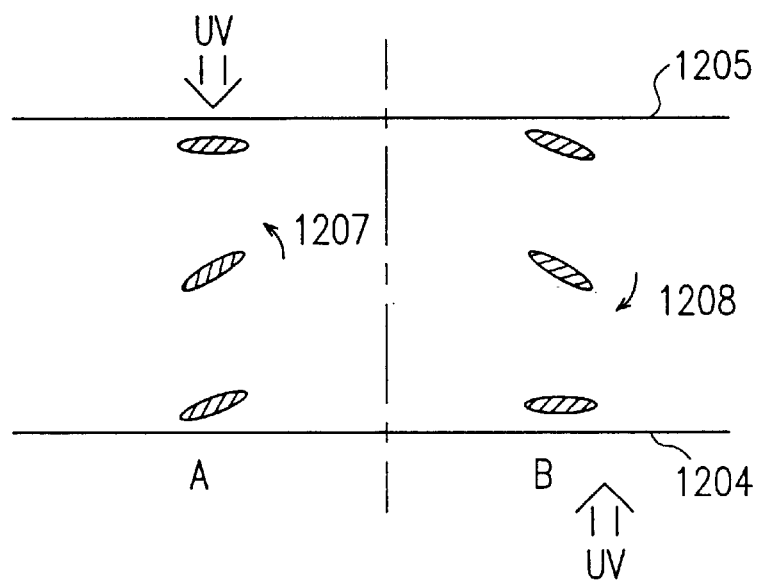
FIG. 11C is a schematic diagram illustrating a liquid crystal cell of a liquid crystal display device of the present invention, showing an orientation of the liquid crystal molecules along the cell thickness direction after the rubbing process as illustrated in FIG. 11A and an orientation division process.

According to the present invention, one of the upper or lower substrates is first irradiated with UV light and then subjected to a rubbing process. FIG. 11C schematically illustrates the orientation of the liquid crystal molecules along the X–X' cross section between such substrates. The UV irradiation process was performed while dividing each pixel into two regions A and B. Only the alignment film on the side of the counter substrate is irradiated with UV light in the region A, whereas only the alignment film on the side of the TFT substrate is irradiated with UV light in the region B. An evaluation of the optical characteristics of the liquid crystal cell which has been processed as described above showed that the liquid crystal molecules in the intermediate layer in the region A rotates in the direction indicated by the arrow 1207, whereas the liquid crystal molecules in the region B rotates in the direction indicated by the arrow 1208. In other words, the orientation (pre-tilt angle) of the liquid crystal molecules located in the middle of the liquid crystal layer along the thickness thereof was successfully controlled. Alternatively, the UV irradiation may be performed after the rubbing process. Moreover, the division of the orientation can be realized by means other than the combination of the UV irradiation and the rubbing process.

EXAMPLE 1

FIG. 4 illustrates Example 1 of the present invention. FIG. 4 illustrates the liquid crystal cell 101, the phase plates 102, 103, 104 and 105, and polarizing plates 108 and 109.

Each pixel in the liquid crystal cell 101 is divided into two regions A and B having different orientations. Orientation parameters for the respective regions are as follows.

TABLE 2

| Region | Area in percent for the entire pixel | Retardation value | Twist angle | Orientation |
|---|---|---|---|---|
| A | 50% | 240 nm | 0 deg | 90 deg |
| B | 50% | 240 nm | 0 deg | 270 deg |

Parameters for the polarizing plates are as follows.

TABLE 3

| Ref # of polarizing plate | Angle of transmission axis |
|---|---|
| 108 | 45 deg |
| 109 | −45 deg |

Parameters for the phase plates are as follows.

TABLE 4

| Ref # of phase plate | d*(na-nb) | d*(na-nc) | Angle of na axis |
|---|---|---|---|
| 102 | 120 nm | 0 nm | 0 deg |
| 103 | 120 nm | 0 nm | 0 deg |
| 104 | 57 nm | −72 nm | −45 deg |
| 105 | 57 nm | −72 nm | 45 deg |

Figure 12:
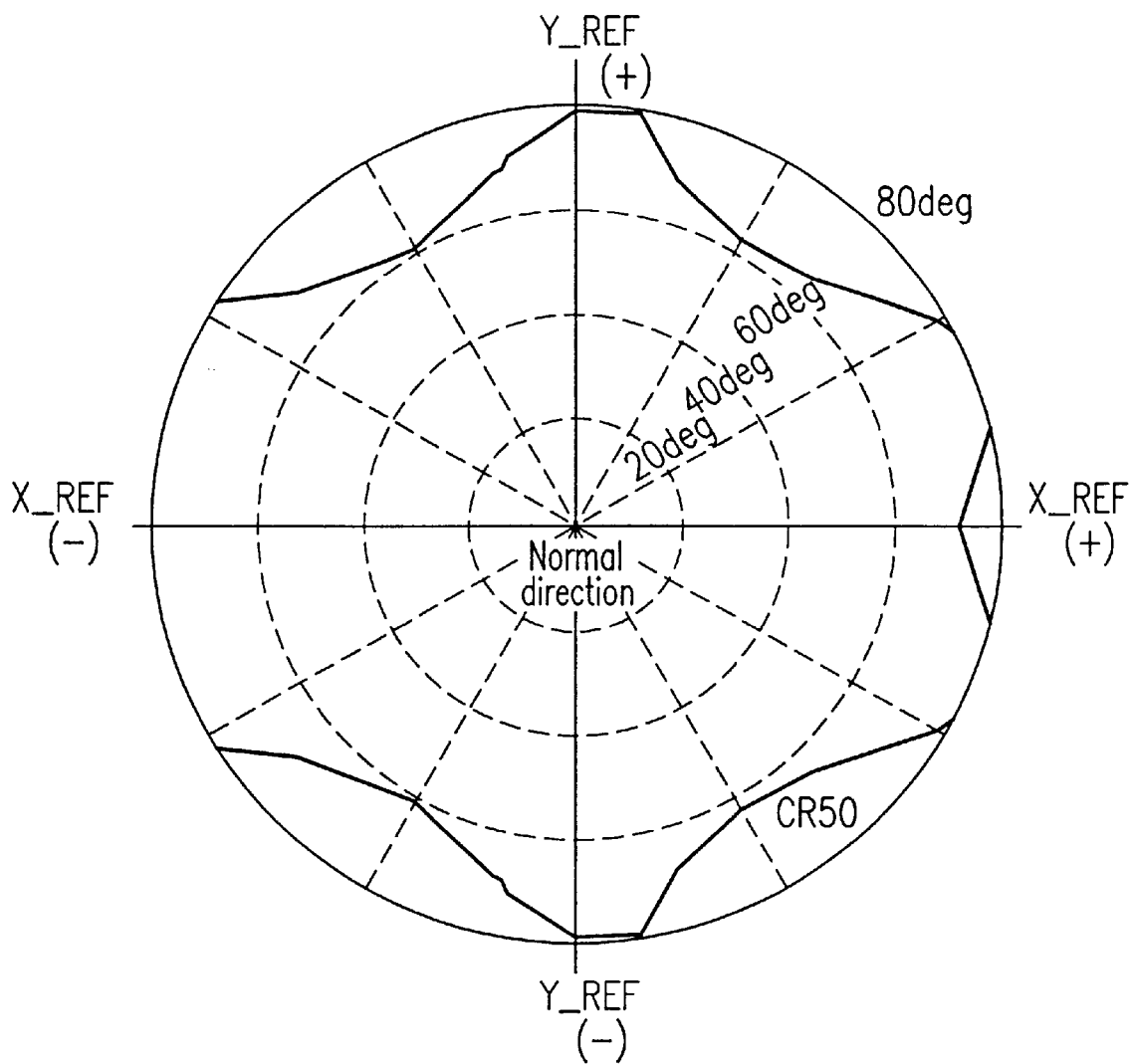
FIG. 12 is an isocontrast diagram for a liquid crystal display device according to an example of the present invention.

FIG. 12 illustrates an isocontrast diagram based on values (contrast ratios) obtained by dividing the transmissivity for an applied voltage of 4 V by the transmissivity for an applied voltage of 0 V. The center of the circle corresponds to a viewing angle normal to the display plane (viewing angle 0°), and the concentric circles about the center respectively correspond to various viewing angles of 20°, 40°, 60° and 80°, from the innermost circle. The horizontal axis and the vertical axis represent X_REF and Y_REF, respectively. The isocontrast curve corresponds to a contrast ratio (CR) of about 50. As is apparent from FIG. 12, the liquid crystal display device of the present example realizes a contrast ratio of about 50 or more in a wide range of viewing angles even over about 60° in any azimuth angle, indicating that the liquid crystal display device has desirable viewing angle characteristics.

COMPARATIVE EXAMPLE 1

Comparative Example 1 will be described with reference to FIG. 13. FIG. 13 illustrates a liquid crystal cell 6301, first and second phase difference compensators 6302 and 6303, and polarizing plates 6305 and 6306.

The liquid crystal cell 6301 is divided into two regions A and B having different orientations. The orientation parameters for the regions are as follows.

TABLE 5

| Region | Area in percent for the entire pixel | Retardation value | Twist angle | Orientation |
|---|---|---|---|---|
| A | 50% | 240 nm | 0 deg | 90 deg |
| B | 50% | 240 nm | 0 deg | 270 deg |

Parameters for the polarizing plates are as follows.

TABLE 6

| Ref # of polarizing plate | Angle of transmission axis |
|---|---|
| 6205 | 45 deg |
| 6206 | −45 deg |

Parameters for the phase plates are as follows.

TABLE 7

| Ref # of phase plate | d*(na−nb) | d*(na−nc) | Angle of na axis |
|---|---|---|---|
| 6202 | 120 nm | 0 nm | 0 deg |
| 6203 | 120 nm | 0 nm | 0 deg |

Figure 14:
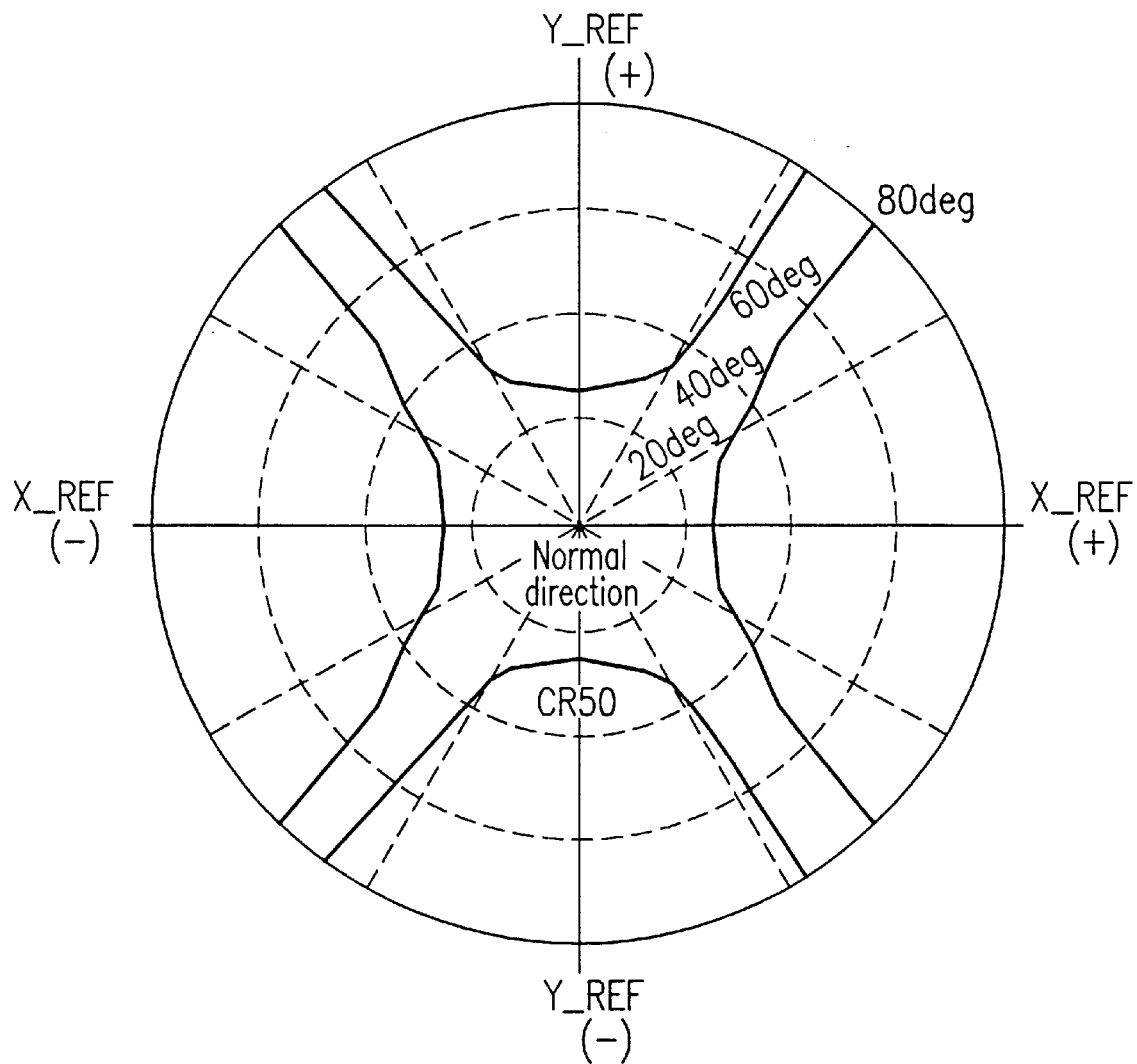
FIG. 14 is an isocontrast diagram for a liquid crystal display device according to a comparative example.

FIG. 14 illustrates an isocontrast diagram based on values (contrast ratios) obtained by dividing the transmissivity for an applied voltage of 4 V by the transmissivity for an applied voltage of 0 V. The center of the circle corresponds to a viewing angle normal to the display plane (viewing angle 0°), and the concentric circles about the center respectively correspond to various viewing angles of 20°, 40°, 60° and 80°, from the innermost circle. The horizontal axis and the vertical axis represent X_REF and Y_REF, respectively. The isocontrast curve corresponds to a contrast ratio (CR) of about 50. As is apparent from FIG. 14, the liquid crystal display device of Comparative Example 1 has poor viewing angle characteristics in the directions of X_REF and Y_REF.

EXAMPLE 2

In this example, various parameter ranges in which the phase difference compensators 104 and 105 function effectively were estimated. The parameters include the in-plane retardation d·(na−nb), the retardation along the thickness direction d·(na−nc), and the angle of the na axis. First, preferred ranges for the retardation values of the phase difference compensators d·(na−nb) and d·(na−nc) will be estimated.

Before estimating the parameter ranges, parameters RL and NZ will be defined as follows, with which the parameter ranges can be uniquely determined and compared with the retardation value ($d_{1c} \cdot \Delta n$) of the liquid crystal layer.

$$RL = d \cdot (na-nc)/(d_{1c} \cdot \Delta n)$$

$$NZ = (na-nc)/(na-nb)$$

The influence of the retardation was examined using a liquid crystal display device similar to that of Example 1. It was assumed that the parameters of the phase difference compensators 104 and 105 are equal to each other, and the parameters were varied in the following ranges.

$$0 < |RL| < 1 \text{ and } RL < 0$$

$$0.1 < |NZ| < 100 \text{ and } NZ < 0$$

The effect of each phase difference compensator was evaluated based on the contrast ratio of the liquid crystal display device at a viewing angle of about 60°. The evaluation parameters ηX_REF and ηY_REF were obtained as ratios of the contrast ratios CRcompX_REF and CRcompY_REF (obtained at a viewing angle of 60° in the X_REF and Y_REF directions with phase plate) with respect to the contrast ratio CRrefX_REF and CRrefY_REF (obtained at a viewing angle of 60° in the X_REF and Y_REF directions without phase plate as in Comparative Example 1). Thus, ηX_REF=CRcompX_REF/CRrefX_REF; and ηY_REF=CRcompY_REF/CRrefY_REF.

Relationship ηX_REF>1 or ηY_REF>1 indicates that there is improvement in the contrast ratio provided by the phase difference compensator.

Figure 15:
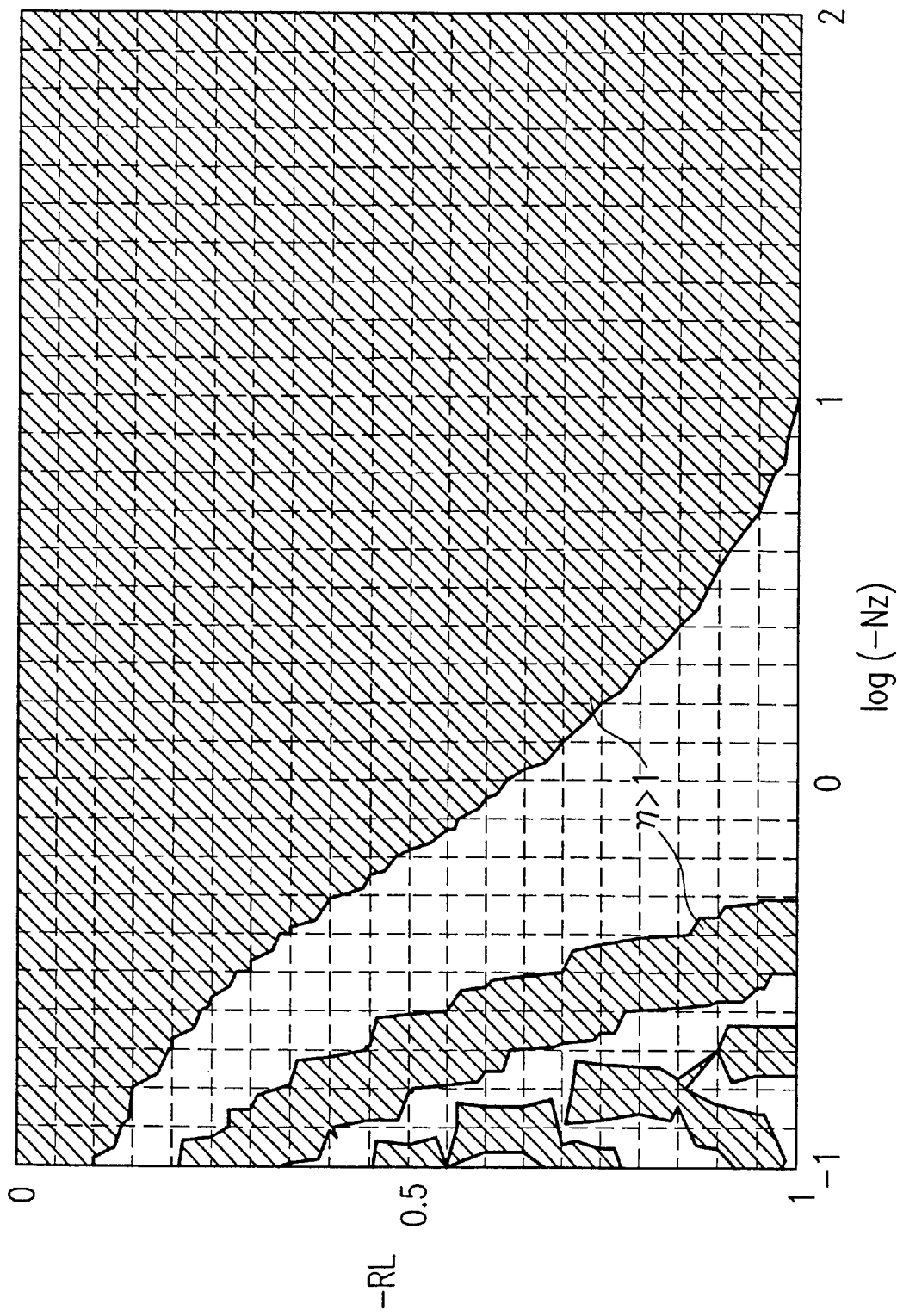
FIG. 15 is a graph showing a preferred range of retardation (in the X_REF direction) of a phase difference compensator of a liquid crystal display device according to an example of the present invention.
Figure 16:
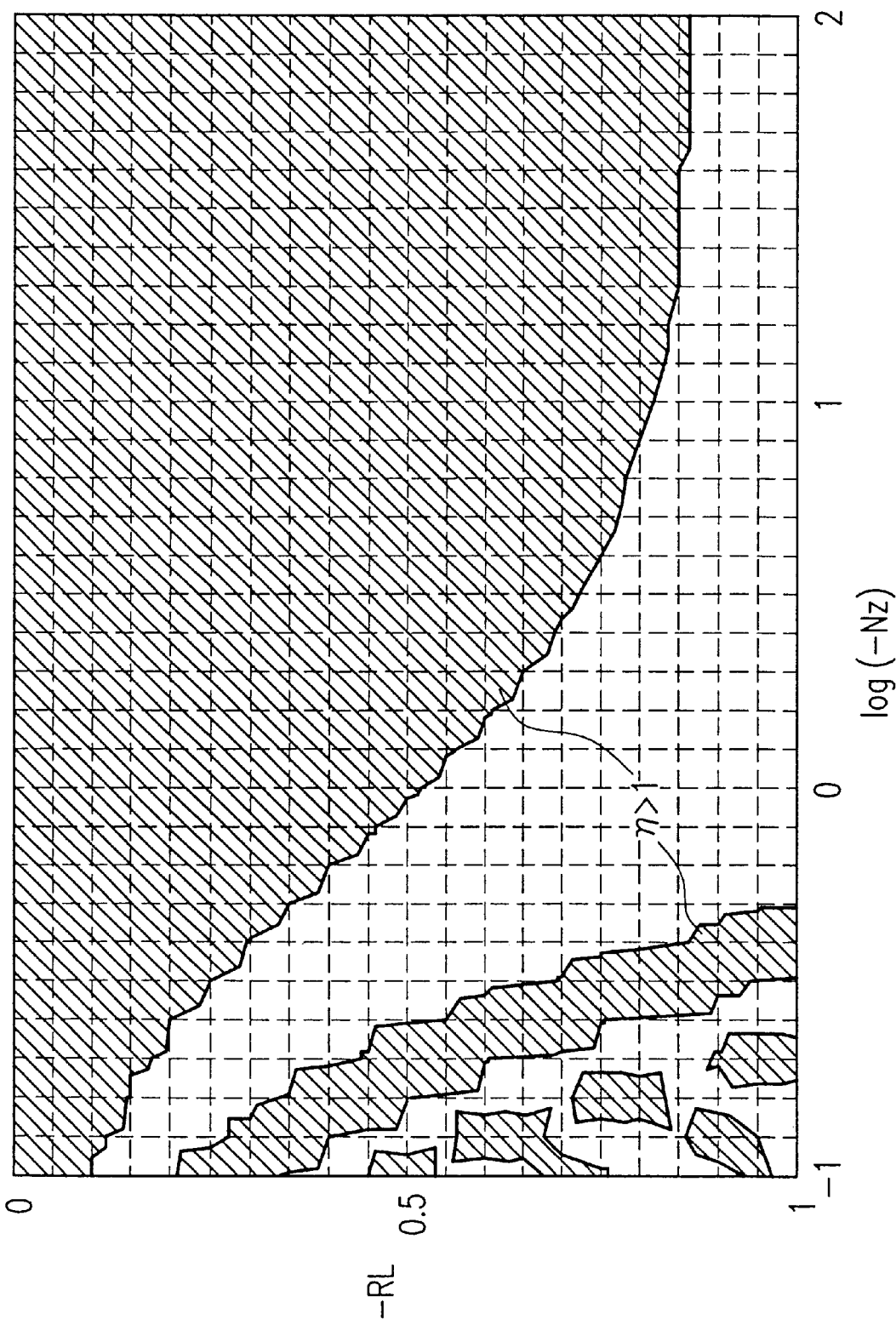
FIG. 16 is a graph showing a preferred range of retardation (in the Y_REF direction) of a phase difference compensator of a liquid crystal display device according to an example of the present invention.

FIGS. 15 and 16 illustrate the results for the ηX_REF and ηY_REF, respectively, while varying the retardation, in which the vertical axis represents −RL and the horizontal axis represents log(−NZ). Each region in which ηX_REF>1 or ηY_REF>1 is hatched in the figures.

As is apparent from FIGS. 15 and 16, the region in FIG. 15 where ηX_REF>1 is larger than the region in FIG. 16 where ηY_REF>1. In order to evaluate the effect of the phase difference compensators 104 and 105 as a whole, a range in which the average value of ηX_REF and ηY_REF is greater than 1 (ηX_REF+ηY_REF/2>1) was estimated. The results are shown in FIG. 17.

Figure 17:
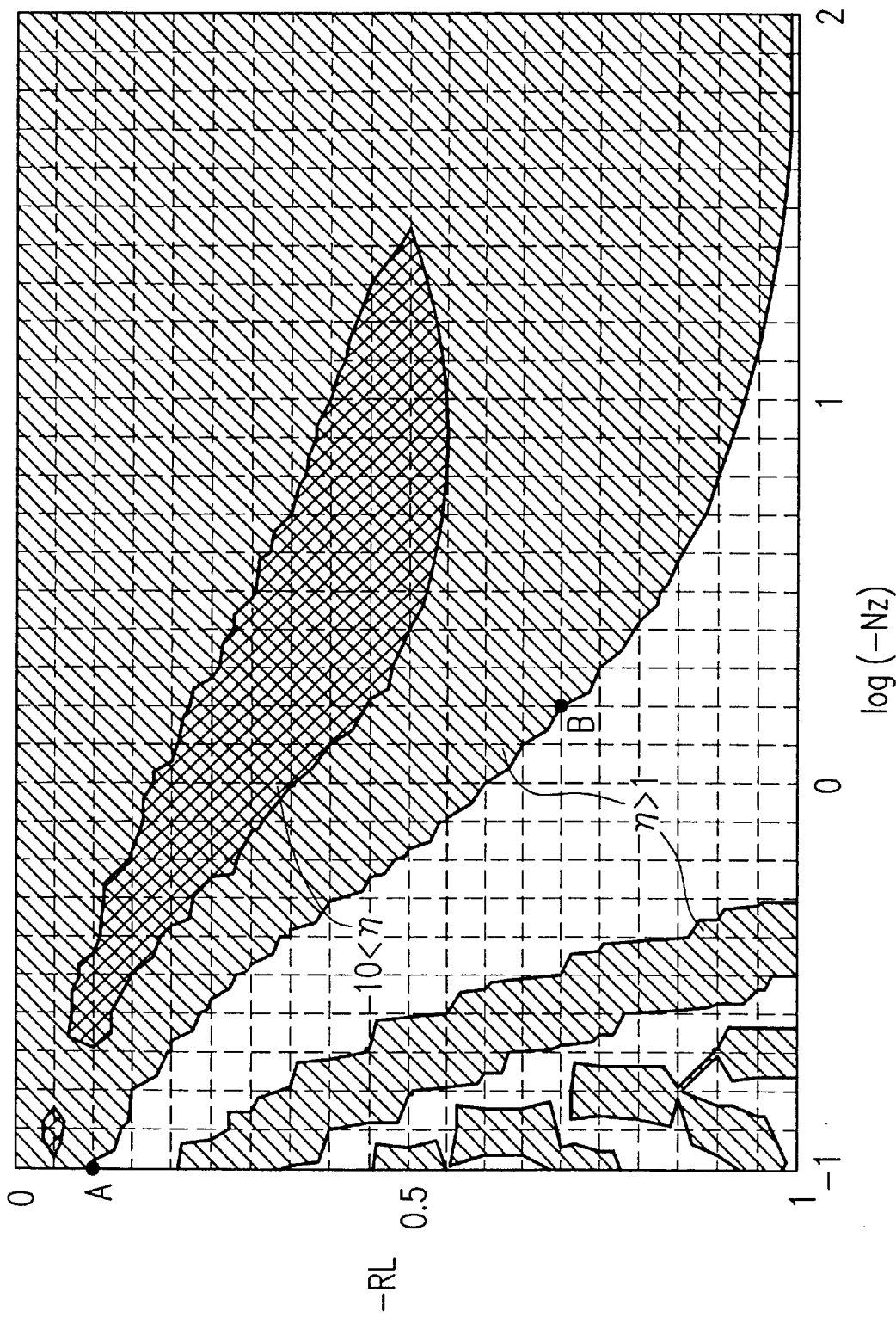
FIG. 17 is a graph showing a preferred range of retardation (average value) of a phase difference compensator of a liquid crystal display device according to an example of the present invention.

In FIG. 17, the vertical axis represents −RL, and the horizontal axis represents log(−NZ), and the region where ηX_REF+ηY_REF/2>1 is hatched, while the region where a significant effect is obtained (ηX_REF+ηY_REF/2>10) is double-hatched.

The above-described results show that the hatched region in FIG. 17 is the range of the parameters in which the phase difference compensators 104 and 105 provide a desirable effect.

Particularly, it is practically preferred to use a phase difference compensator whose parameters are in the range above (or on the upper-right side of) a straight line defined through a point which is generally indicated by "A" in FIG. 17 (−RL=0.1, log(−NZ)=−1.0) and the point "B" (−RL=0.7, log(−NZ)=−0.2); in other words, a phase difference compensator whose parameters satisfy 0<|−RL|<1 and log(|−NZ|)>2.0·|−RL|−1.2, because it is then possible to extend the margin for variation in characteristics of the phase difference compensator.

In the present example, the effect of the phase difference compensator is evaluated while using a combination of the phase difference compensators 104 and 105 which have the same characteristics (the same parameters). However, it can easily be appreciated that the combination is not limited to the above. For example, assuming that the parameters of the phase difference compensators 104 and 105 are RL_104, NZ_104 and RL_105, NZ_105, respectively, where RLsum=RL_104+RL_105, the range in which the effect of the present invention can be obtained will generally be as follows:

0≤|RLsum|2;

log(|NZ_104|)≤2.0·|RL_104|−1.2; and log(|NZ_105|)≤2.0·|RL_105|−1.2.

As shown in Example 1 and Comparative Example 1, sufficiently desirable viewing angle characteristics are obtained in a direction of X_REF±45°, irrespective of the presence/absence of the phase difference compensator. Moreover, desirable viewing angle characteristics have been confirmed for all of the parameters which have been examined in the present example. Therefore, it is believed that the viewing angle characteristics can be improved as long as the parameters for the phase difference compensators 104 and 105 are within the above-described ranges.

As described above, the liquid crystal display device of the present invention produces a display in a normally black mode (where a black display is produced in the absence of an applied voltage) by applying an electric field substantially vertical to a liquid crystal layer which is made of a nematic liquid crystal material having a positive dielectric anisotropy provided between a pair of polarizing plates which are arranged in a crossed Nicols arrangement. The liquid crystal layer in each pixel region has at least a first domain and a second domain having different orientations, thereby suppressing a change in display quality due to a change in the viewing angle.

By providing a phase difference compensator between a liquid crystal cell and a polarizing plate, the refractive index anisotropy of the liquid crystal molecules which are oriented substantially horizontally to the substrate surface in the absence of an applied voltage is compensated for, thereby realizing a black display with very little viewing angle dependency for any viewing angle including the normal direction. In other words, the refractive index anisotropy of the liquid crystal molecules as viewed from the normal direction can be effectively compensated for by arranging the first and second phase difference compensators each having a positive refractive index anisotropy on the respective sides of the liquid crystal cell so that the phase-delay axes thereof are parallel to the substrate surface and to each other, and perpendicular to the phase-delay axis of the liquid crystal layer. Moreover, by providing a third phase difference compensator having a positive refractive index anisotropy so that the phase-delay axis thereof is parallel to the direction normal to the substrate surface, it is possible to compensate for the change in transmissivity associated with the change in viewing angle, thereby reducing degradation of the black display. Furthermore, by arranging the main axis of the third phase difference compensator along which the in-plane refractive index is maximum to be substantially perpendicular to the polarization axis of the one of the polarizing plates which is closer to the third phase difference compensator, it is possible to compensate for rotation of the polarization axis of elliptically-polarized light, thereby producing a display with even better viewing angle characteristics.

Where the two parameters RL and NZ are defined as follows:

$$RL = d \cdot (na-nc)/(d_{1c} \cdot \Delta n)$$

$$NZ = (na-nc)/(na-nb)$$

wherein $(d_{1c} \cdot \Delta n)$ denotes the retardation value of the liquid crystal layer, $(d \cdot (na-nb))$ denotes the in-plane retardation value of the third phase difference compensator, and $(d \cdot (na-nc))$ denotes the retardation along the thickness direction, it is possible to realize a liquid crystal display device with a desirable contrast ratio which has very good viewing angle characteristics in substantially all directions, by appropriately selecting and combining the parameters RL and NZ.

The present invention provides a liquid crystal display device of a normally black mode which has a very small change in display quality due to the change in viewing angle. The liquid crystal display device of the present invention does not sacrifice any of the production efficiency and the transmissivity as in a conventional wide viewing angle liquid crystal display device. The liquid crystal display device of the present invention can be suitably used in various display device applications where a wide viewing angle is required, such as a liquid crystal display device as a computer monitor and a liquid crystal display device for displaying video images.

The second part of the present invention will be described below, which comprises Examples 3–16.

First, the principle of operation of the liquid crystal display device according to the present invention will be described with reference to FIG. 18.

Figure 18:
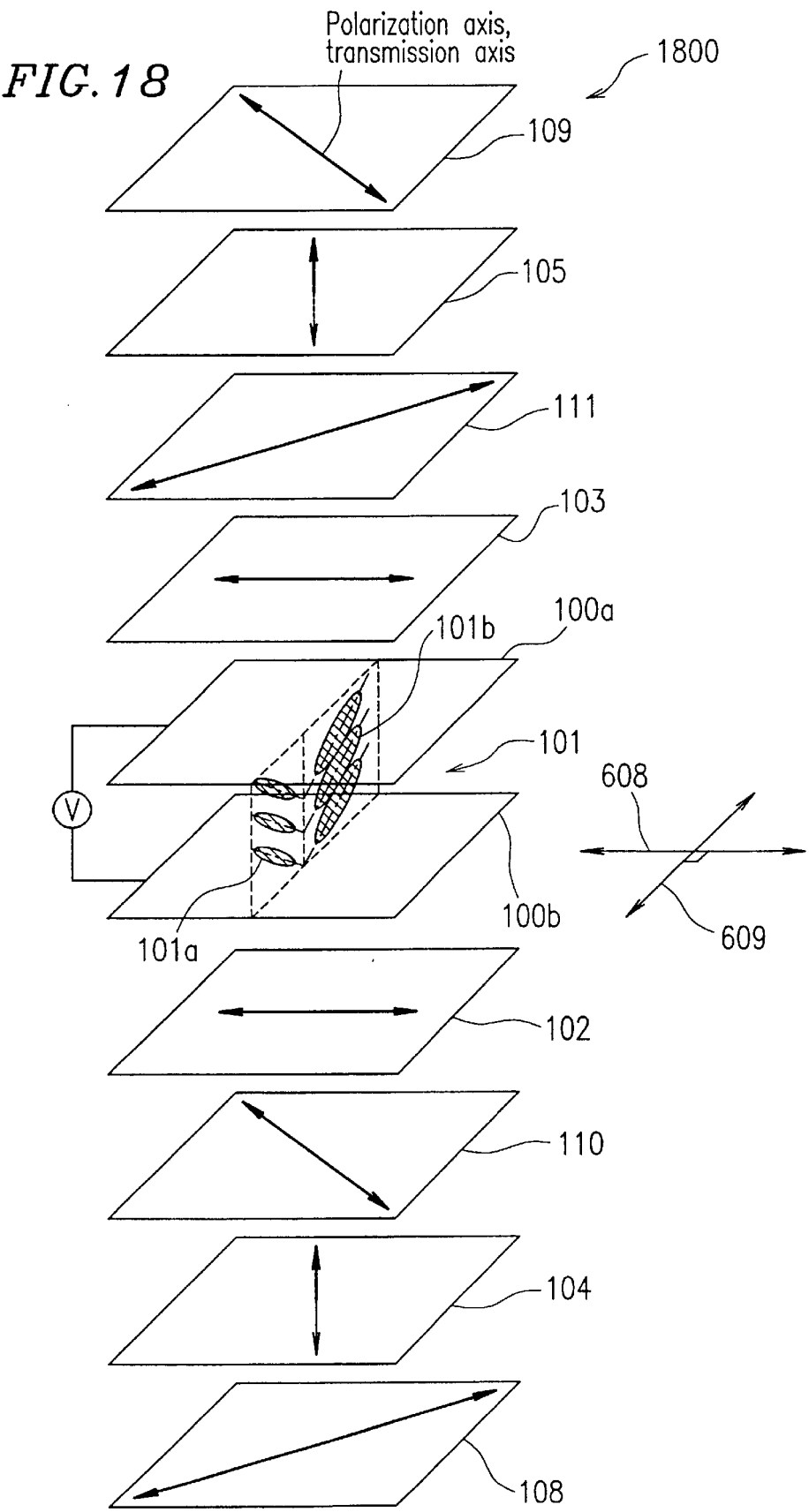
FIG. 18 is a perspective view schematically illustrating a liquid crystal display device according to an example of the present invention.

FIG. 18 schematically illustrates a liquid crystal display device 1800 of the present invention. FIG. 18 illustrates a transmission-type liquid crystal display device.

The liquid crystal display device 1800 includes: a liquid crystal layer 101; a pair of electrodes 100a and 100b for applying a voltage across the liquid crystal layer 101; a pair of phase plates 102 and 103 provided on the respective sides of the liquid crystal layer 101 (the phase plate may of course be of any type, including a phase difference compensation film, a liquid crystal cell, and the like, as long as it has an appropriate refractive index anisotropy); another pair of phase plates 104 and 105 provided on the phase plates 102 and 103, respectively; a further pair of polarizing plates 110 and 111; and a pair of polarizing plates 108 and 109 provided in a crossed Nicols arrangement so as to interpose the above-listed elements therebetween. The polarizing plates 104, 105, 110 and 111 are optional; none, one or more in any appropriate combination of them may be provided. Each ellipse in FIG. 18 schematically represents a liquid crystal molecules, and each of the arrows represent an axis of a refractive index ellipse of one of the polarizing plates (each having a positive uniaxial characteristic) along which the ellipse has its maximum refractive index (i.e., the phase-delay axis). The arrows in the polarizing plates 108 and 109 illustrated in FIG. 4 denote the respective polarization axes (transmission axes) thereof.

FIG. 18 illustrates the liquid crystal layer 101 corresponds to one pixel, and the orientation of the liquid crystal molecules therein in the absence of an applied voltage. As the liquid crystal material, a nematic liquid crystal material having a positive dielectric anisotropy (or an "Np liquid crystal material") may be used. The liquid crystal molecules are oriented substantially parallel to the surfaces of the pair of substrates (not shown). Electrodes 100a and 100b are provided on a side of the pair of substrates facing the liquid crystal layer 101 so as to interpose the liquid crystal layer 101 therebetween. By applying a voltage between the electrodes 100a and 100b, an electric field is applied across the liquid crystal layer 101 in a direction substantially vertical to the substrate surface.

As illustrated in FIG. 18, the liquid crystal layer 101 for each axis region includes a first domain 101a and a second domain 101b having different orientations from each other. In the example illustrated in FIG. 18, the director of the liquid crystal molecules in the first domain 101a and the director of the liquid crystal molecules in the second domain 101b are oriented to form an azimuth angle of about 180° with respect to each other. The orientation of the liquid crystal molecules is controlled so that when a voltage is applied between the electrodes 100a and 100b, the liquid crystal molecules in the first domain 101a rise in the clockwise direction while those in the second domain 101b rise in the counterclockwise direction, i.e., the molecules in the different domains rise in opposite directions. Such an orientation of the directors of the liquid crystal molecules can be achieved by using any orientation control technique known in the art using an alignment film. When a plurality of such first domains and a plurality of such second domains (in which the director is oriented in a direction different from that in the first domains by about 180°) are provided in each axis region, the viewing angle characteristics can be even more uniform.

Thus, when viewing a gray scale image on the liquid crystal display device 100 with pixels each divided into a plurality of regions having different orientations, the change in the brightness the image experienced while inclining the viewing angle from the normal toward the first domain 101a is symmetric with that experienced while inclining the viewing angle toward the second domain 101b. It is preferred that the area of the first domain 101a is substantially equal to that of the second domain 101b. The areas of respective domains do not have to be equal to one another for each pixel region, but substantially the same effect can be obtained when the total area of the first domains 101a is substantially equal to the total area of the second domains 101b for the entire display plane. Thus, the way to achieve the division of the orientation is not limited to that described above.

As illustrated in FIG. 18, the director of the liquid crystal molecules in the first domain 101a and the director of the liquid crystal molecules in the second domain 101b are oriented to form an azimuth angle of about 180° with respect to each other. This direction is parallel to the direction indicted by an arrow 609 in FIG. 18. Therefore, the refractive index of the liquid crystal molecules for light incident thereupon in a direction vertical to the display plane is maximum for polarized light whose polarization direction is along the direction 609, and minimum for polarized light whose polarization is along the direction 608 which is perpendicular to the direction 609. In this specification, the direction 609 is assumed to be along the phase-delay axis of the liquid crystal layer in the absence of an applied voltage. Generally, the direction of the phase-delay axis of a liquid crystal layer in the absence of an applied voltage is defined as an azimuth angle in which liquid crystal molecules in the middle of the liquid crystal layer along the thickness thereof rise in response to an applied voltage. This definition can be applied not only to a liquid crystal layer in which the liquid crystal molecules are oriented horizontally to the substrate surface (including anti-parallel orientation), but also to a liquid crystal layer in which the liquid crystal molecules are in a twist orientation.

Each of the phase difference compensators 102 and 103 typically has a positive uniaxial refractive index anisotropy, and is arranged so that the phase-delay axis thereof is perpendicular to the phase-delay axis of the liquid crystal layer 101 in the absence of an applied voltage. Therefore, it is possible to control the light leakage due to the refractive index anisotropy of the liquid crystal molecules in the absence of an applied voltage and thus to obtain a desirable black display (or desirable normally black characteristics).

Each of the phase difference compensators 104 and 105 typically has a positive uniaxial refractive index anisotropy, and the phase-delay axis thereof (the direction indicated by the arrow in FIG. 18) is arranged to be perpendicular to the substrate surface (i.e., perpendicular to the phase-delay axis of the liquid crystal layer 101, the phase plate 102 or the phase plate 103) so as to compensate for the change in transmissivity associated with the change in viewing angle. Particularly, light leakage (degradation of the black display) associated with the change in viewing angle in a black display is suppressed. Thus, it is possible to produce a display with even more desirable viewing angle characteristics by providing the phase plates 104 and 105. Alternatively, however, the phase plates 104 and 105 are optional, and none or only one of the phase difference compensators 104 and 105 may be provided.

Each of the phase plates 110 and 111 typically has a positive uniaxial refractive index anisotropy, and the phase-delay axis thereof (the direction indicated by the arrow in FIG. 18) is arranged to be perpendicular to the polarization axis of the polarizing plate (i.e., at about 45° with respect to the liquid crystal layer 101, and the polarizing plates 102 and 103) so as to compensate for the rotation of the polarization axis of elliptically-polarized light. Thus, it is possible to produce a display with even more desirable viewing angle characteristics by providing the phase plates 110 and 111. Alternatively, however, the phase difference compensators 110 and 111 are optional, and none or only one of the phase difference compensators 110 and 111 may be provided.

The above-described phase plate does not have to have a uniaxial refractive index anisotropy, but may alternatively have a positive biaxial refractive index anisotropy. A case where a phase plate having a positive biaxial refractive index anisotropy is used will be described in the other embodiments below.

The elements of the present invention will be described in greater detail below.

Np Liquid Crystal Material: Nematic Liquid Crystal Material Having Positive Dielectric Anisotropy As in a liquid crystal display device of a widely-used TN mode, the present invention employs a substrate which has been subjected to a horizontal alignment treatment, and an Np liquid crystal material. Therefore, the time required for a liquid crystal injection process can be reduced to about half of that required in the liquid crystal display device of Japanese Laid-Open Publication No. 7-28068 which employs a substrate which has been subjected to a vertical alignment treatment and an Nn liquid crystal material. Generally, an Np liquid crystal material has a lower viscosity than that of an Nn liquid crystal material, and a substrate which has been subjected to a horizontal alignment treatment has a higher wettability for a liquid crystal material than that of a substrate which has been subjected to a vertical alignment treatment. These factors together provide a multiplier effect of enabling a high-speed liquid crystal injection. The liquid crystal injection process has a significant proportion in the total amount of time required for the production of a liquid crystal display device. Therefore, the substantial reduction in this process leads to a substantial improvement in the production efficiency of the liquid crystal display device.

Vertical Electric Field

According to the present invention, a pair of electrodes (at least one of them needs to be transparent) arranged to interpose a liquid crystal layer therebetween are used to apply a vertical (to the substrate) electric field across the liquid crystal layer so as to drive the liquid crystal molecules. Therefore, it is possible to realize an aperture ratio comparable to that of a conventional TN mode liquid crystal display device. Thus, it is not necessary to provide an opaque electrode within the pixel region as in the IPS mode, whereby it is possible to obtain a liquid crystal display device having a larger aperture ratio than a liquid crystal display device of the IPS mode.

Orientation Division

Including the TN mode which is currently widely used in the art, a liquid crystal display device in which the transmissivity is varied by moving the liquid crystal molecules in the thickness direction of the liquid crystal layer has a display brightness that is substantially dependent upon the viewing angle (inferior viewing angle characteristics). This will be further described with reference to FIGS. 5A, 5B and 5C. FIGS. 5A and 5B schematically illustrate a liquid crystal display device having a liquid crystal layer 203 having a twist orientation. Referring to FIGS. 5A and 5B, a pair of electrodes 201 and 202 are provided between a pair of polarizing plates 206 and 207 which are arranged in a crossed Nicols arrangement. The liquid crystal layer 203 is interposed between the electrodes 201 and 202. FIG. 5A and 5B are drawn so that a liquid crystal molecule in the middle of the liquid crystal layer 203 along the thickness thereof has a long axis along the plane of the figures (such a molecule appears to be the longest). FIGS. 5A and 5B correspond to the absence and the presence of an applied voltage.

As illustrated in FIG. 5A, the liquid crystal molecule 203a in the middle of the liquid crystal layer 203 along the thickness thereof is oriented substantially parallel to the substrate surface. This state appears to be the same from a viewing angle 204 and from a viewing angle 205. When a gray scale voltage is applied as in FIG. 5B, different states are viewed from different viewing angles. This is due to the liquid crystal molecules having a positive uniaxial refractive index anisotropy (a cigar-shaped refractive index ellipse). In response to an applied voltage, a liquid crystal molecule 203b rises in a direction which is defined by the pre-tilt angle thereof (in the counter-clockwise direction in this example). When the liquid crystal molecule 203b is viewed from the viewing angle 204 (along the long axis of the molecule 203b), the refractive index anisotropy of the cigar-shaped refractive index ellipse disappears (the molecule 203b is viewed to have a circular shape). When the liquid crystal molecule 203b is viewed from the viewing angle 205, the refractive index anisotropy peaks.

Therefore, when the liquid crystal molecules 203b in the liquid crystal cell are viewed from the viewing angle 204, a majority of the molecules are viewed to have a circular shape, i.e., the refractive index anisotropy of the liquid crystal layer decreases. Thus, linearly-polarized light having passed through the polarizing plate 206 reaches the polarizing plate 207 without substantially altered by the liquid crystal layer 203, and then is blocked by the polarizing plate 207 whose polarization axis is perpendicular to that of the polarizing plate 206, thereby reducing the transmissivity. When the liquid crystal molecules 203b in the liquid crystal cell are viewed from the viewing angle 205, a majority of the molecules are viewed to have an elongated shape, i.e., the refractive index anisotropy of the liquid crystal layer 203 peaks. Therefore, polarized light having passed through the polarizing plate 206 has the polarization altered by the liquid crystal layer 203 so that the maximum amount of light passes through the polarizing plate 207.

As a result, the brightness substantially changes while inclining the viewing angle between the direction in which the liquid crystal molecules rise (the viewing angle 204 in FIG. 5B) and the opposite direction (the viewing angle 205 in FIG. 5B), as illustrated in FIG. 5C. Typically, the viewing angles 204 and 205 are set to correspond to the lower side (the 6 o'clock direction) and the upper side (the 12 o'clock direction) of the panel. FIG. 5C illustrates various transmissivity curves for various applied voltages. A higher transmissivity in the normal direction corresponds to a higher applied voltage (normally white mode).

Thus, in the conventional TN mode, the brightness substantially varies as the viewing angle is inclined along the orientation of the liquid crystal molecules. As can be seen from the above description, such asymmetry in the gray scale characteristics is seen not only in the TN mode, but also commonly in other various display modes where the liquid crystal molecules are moved along the thickness of the liquid crystal cell, and where orientation division is not employed.

By dividing a pixel into a plurality of regions having different orientations, it is possible to improve the asymmetry in the gray scale characteristics with respect to the viewing angle, and to obtain desirable gray scale characteristics (viewing angle characteristics) which are symmetric in the up-down direction and in the left-right direction. This will be further described with reference to FIGS. 6A–6E. For example, each pixel region is divided into two regions (first and second domains) A and B in which the liquid crystal molecules rise in response to an applied voltage in directions different from each other by about 180°, as illustrated in FIGS. 6A and 6B. In the absence of an applied voltage, the liquid crystal molecules in both regions are oriented substantially parallel to the substrate surface, as illustrated in FIG. 6A (the pre-tilt angle is ignored herein for simplicity). When a gray scale voltage is applied, a liquid crystal molecule 303a in the region A rise in the counter-clockwise direction and a liquid crystal molecule 303b in the region B rises in the clockwise direction, as illustrated in FIG. 6B (the rising direction is dictated by the pre-tilt angle). As described above, the gray scale characteristics in the regions A and B are dependent upon the viewing angles 304 and 305, as illustrated in FIGS. 6C and 6D. The regions A and B are present in one pixel region, and therefore the gray scale characteristics of the pixel region as a whole are the average of the respective gray scale characteristics illustrated in FIGS. 6C and 6D with the ratio between the respective areas of the regions A and B being taken into consideration. Thus, by setting the ratio between the area SA of the region A and the area SB of the region B to 1:1, it is possible to obtain gray scale characteristics that are symmetric for the viewing angles 304 and 305, as illustrated in FIG. 6E.

Next, the ratio SA:SB and the resulting gray scale characteristics will be described so as to estimate a range in which the orientation division effect can be obtained. FIG. 7A illustrates a viewing angle dependency for one of the gray scale characteristics curves in FIG. 6E which is obtained for an applied voltage by which the transmissivity is about 50% from the normal direction. For the symmetry in the up-down direction, FIG. 7B illustrates the relationship between the ratio TA/TB and the ratio SA/(SA+SB) between the areas SA and SB of the regions A and B. TA and TB denote transmissivities obtained in directions respectively at 50° in the viewing angles 304 (toward the upper side of the panel) and 305 (toward the lower side of the panel) as illustrated in FIGS. 6A and 6B. It can be seen from FIG. 7B that the gray scale characteristics become symmetric in the up-down direction (i.e., TA/TB=about 1) when the ratio SA/(SA+SB) is about 0.5.

The number of divided regions having different orientations is not limited to two, but may be any number as long as the total area of one region having a liquid crystal molecule rising direction and the total area of another region having the opposite liquid crystal molecule rising direction are substantially equal to each other for the entire display plane. In view of the display uniformity, it is preferred that a divided region has a small area, and each pixel region is divided into two or more domains having different orientations. Moreover, each pixel region may have a plurality of regions A and a plurality of regions B arranged in an alternate manner, as illustrated in FIGS. 7C and 7D. By reducing the size of the unit of orientation division, e.g., by providing a plurality of regions A and a plurality of regions B in each pixel region, the viewing angle characteristics can be even more uniform. This is because the proportion of light passing through both of the regions A and B (indicated by an arrow 401) with respect to light passing through only one of the regions A and B (indicated by an arrow 402A or 402B) increases when the liquid crystal display device is viewed from an inclined direction, as illustrated in FIG. 7E.

Normally Black Mode and Improvement of Contrast Ratio

The present invention is in a normally black mode in which a black display is produced in the absence of an applied voltage, and employs a phase difference compensator so as to improve the viewing angle characteristics. The viewing angle characteristics as used herein refer to changes in displayed images observed when inclining the viewing angle from a direction vertical to the display plane of a liquid crystal display device toward an inclined viewing angle. Such viewing angle characteristics (the display characteristics which change depending upon the viewing angle) include a change in gray scale, a change in contrast ratio, a change in color, and the like. The change in gray scale can be improved by the orientation division as described above. In the following description, the improvement the viewing angle dependency of the contrast ratio provided by the combination of a normally black mode and a phase difference compensator will be described.

A contrast ratio (CR) is defined as a value obtained by dividing the maximum transmissivity (the transmissivity in a white display) by the minimum transmissivity (the transmissivity in a black display). In an ordinary liquid crystal display device, the change in transmissivity associated with an inclined viewing angle is greater in a black display than in a white display. Therefore, the change in transmissivity in a black display (also known as "degradation of black display") associated with an inclined viewing angle should be improved in order to improve the viewing angle dependency of the contrast ratio.

This will be described with reference to FIG. 8A–8F. In order to realize a normally black mode, it is effective to compensate for (cancel out) the refractive index anisotropy of a liquid crystal layer in which the liquid crystal molecules are oriented parallel to the substrate surface in the absence of an applied voltage. The compensation is provided by the phase plates 102 and 103 as illustrated in FIG. 4. In the example illustrated in FIG. 8A, phase plates 502 and 503 provide the same function as that of the phase plates 102 and 103. As illustrated in FIG. 8A, the liquid crystal layer of the present invention has a substantially horizontal orientation in the absence of an applied voltage. When the liquid crystal layer is viewed from the direction normal to the liquid crystal display device, the maximum refractive index results along a direction (orientation) indicated by an arrow 508 in FIG. 8B, and the minimum refractive index results along a direction perpendicular thereto. In the present invention, the value obtained by multiplying the difference between the maximum and minimum refractive indexes by the thickness of the liquid crystal layer, i.e., the retardation value of the liquid crystal layer, is set to be about 250 nm (about 50 nm to about 500 nm). It is therefore understood that without the phase plates 502 and 503, the liquid crystal layer 501 interposed therebetween will transmit light due to the birefringence effect. In view of this, the phase plates 502 and 503 each having a positive uniaxial refractive index anisotropy are used in order to realize the normally black mode characteristics. More specifically, the retardation value of the phase plates 502 and 503 is set to be about ½ of that of the liquid crystal layer, i.e., about 125 nm, and the phase-delay axes thereof are aligned with the arrows 509 and 510 (perpendicular to the arrow 508), respectively. The retardation value of each of the phase plates 502 and 503 is not limited to about 125 nm.

It is only required that the sum of the retardation values of the phase plates 502 and 503 is substantially equal to that of the liquid crystal layer, whereby a black display is produced when viewed from the normal direction in the absence of an applied voltage.

Moreover, it is preferred that the wavelength dependency of the retardation value of the liquid crystal layer is appropriately adjusted with respect to (e.g., substantially equal to) the wavelength dependency of the sum of the retardation values of the phase plates 502 and 503, thereby obtaining a desirable black display when viewed from the normal direction in the absence of an applied voltage. Thus, the birefringence effect in the liquid crystal layer can be compensated for by the birefringence effect of the phase plate, thereby obtaining the normally black mode characteristics.

Next, the difference between the phase difference compensation for improving degradation of black display in the normally black mode and that in the normally white mode will be described. In a liquid crystal display device as illustrated in FIG. 8A where a black display is produced in the absence of an applied voltage, the regions A and B in the liquid crystal layer have substantially the same orientations. In the normally white mode, as illustrated in FIG. 8D, where a black display is produced in the presence of an applied voltage, the regions A and B have different orientations. This influences the viewing angle dependency of the retardation value in a black display.

FIG. 8C illustrates a change in retardation value for the regions A and B which is observed when shifting the viewing angle between the direction indicated by an arrow 520 and the direction indicated by an arrow 521 in FIG. 8A. FIG. 8G illustrates a change in retardation value observed when shifting the viewing angle between the direction indicated by an arrow 522 and the direction indicated by an arrow 523 in FIG. 8A. For comparison, FIG. 8F illustrates a change in retardation value observed when shifting the viewing angle between the direction indicated by an arrow 520 and the direction indicated by an arrow 521 (FIG. 8E) in the normally white mode, as illustrated in FIG. 8D; and FIG. 8H illustrates a change in retardation value observed when shifting the viewing angle between the direction indicated by an arrow 522 and the direction indicated by an arrow 523 (FIG. 8E) in the normally white mode, as illustrated in FIG. 8D.

Referring to FIGS. 8C and 8G, the viewing angle dependency of the retardation value in the region A is substantially equal to that in the region B for any of the viewing angles 520, 521, 522 and 523. In addition, the change in retardation is substantially the same for any of the viewing angles 520, 521, 522 and 523. In particular, the limit of the retardation value (the bottom of the curve in FIGS. 8C and 8G) appears at the same degree for any of the viewing angles 520, 521, 522 and 523 and in any of the regions (at 0° in the figures). Thus, according to the present invention, it is possible to compensate for the phase difference in a normally black mode using the same phase difference compensator in both of the regions A and B. Moreover, since the limit is at 0°, it is possible to arrange two of the main axes of the refractive index of the phase difference compensator in a plane parallel to the liquid crystal panel, with the other one main axis being arranged to be parallel to the normal to the surface of the liquid crystal panel. The phase difference compensator may be of a uniaxial type. This is due to the fact that the liquid crystal layer has substantially the same orientation in the region A and in the region B in a black display. Moreover, a comparison between FIGS. 8C and 8G shows that substantially the same change results for any of the viewing angles 520, 521, 522 and 523. This is due to the fact that the liquid crystal molecules are in a horizontal orientation, whereby the phase-delay axis of the liquid crystal layer and the phase-delay axis of each of the phase plates 502 and 503 are in the same plane and are perpendicular to each other. It is thus understood that it is possible to improve the degradation of the black display by compensating for the phase difference by using the same phase difference compensator for the regions A and B in which one of the main axes of the refractive index is parallel to the normal to the surface of the phase plate, with the other two main axes lying in a plane parallel to the surface of the phase plate.

Referring to FIG. 8F, the changes in retardation value between the directions 520 and 521 for the regions A and B, respectively, are substantially different from each other. For example, the retardation value for the region A takes the minimum value when it is viewed from a direction indicated by the arrow 520, whereas the retardation value for the region B takes the minimum value when it is viewed from direction indicated by the arrow 521.

Based on the above, in order to improve the degradation of the black display in the liquid crystal display device, as illustrated in FIG. 8A, it is required to provide different phase difference compensators for the regions A and B, respectively. As the regions A and B are obtained by dividing one pixel region and therefore have very small areas, it is difficult in practice to provide the phase difference compensation for improving the degradation of black display.

Phase Plate Having Phase-Delay Axis Along Normal to Display Plane

The phase plates 104 and 105 illustrated in FIG. 18 are provided to compensate for the changes in retardation value for the liquid crystal layer 101, and the phase plates 102 and 103, thereby compensating for the degradation of black display. In particular, the phase plates 104 and 105 are provided to compensate for the viewing angle dependency of the retardation value as illustrated in FIGS. 8C and 8G, so that the retardation value is constant (substantially zero) irrespective of the viewing angle. A specific way to achieve this is to employ a liquid crystal cell and a phase plate each having a positive uniaxial refractive index anisotropy, as illustrated in FIG. 18, while using a phase plate having a positive uniaxial refractive index anisotropy in the case of a liquid crystal display device in which the phase-delay axis is included in a plane parallel to the liquid crystal cell in a black display, with the phase-delay axis thereof being parallel to the normal to the surface of the liquid crystal cell.

This will be briefly described with reference to FIG. 9, with particular attention to the angular change in the refractive index anisotropy of the liquid crystal molecules and that of the phase plate. FIG. 9 illustrates a refractive index ellipse 601 of the liquid crystal layer 101, and refractive index ellipses 602 and 603 of the phase plates 102 and 103, respectively. Each of the refractive index ellipses has positive uniaxiality, and the optical axis thereof lies in a plane parallel to the surface of the liquid crystal cell.

The change in refractive index observed when viewing a refractive index ellipse 706 (a phase-delay axis 704 and an ellipse 705 perpendicular thereto) will be described with reference to FIGS. 10A–10E. First, a case where the liquid crystal display device is viewed from the normal direction will be discussed. The refractive index anisotropy contributing to the birefringence of the liquid crystal layer or the phase plate is a difference between two refractive indexes obtained respectively along directions parallel to axes 702 and 703 each of which lies in a plane whose normal is along the path of incident linearly-polarized light and forms an angle of about 45° with respect to a polarization axis 701 of the linearly-polarized light. Therefore, the refractive index anisotropy contributing to the transmissivity in the normal direction is the difference na1−nb1 between the refractive indexes na1 and nb1 as illustrated in FIG. 10A.

The refractive index anisotropy contributing to the change in transmissivity observed when shifting the viewing angle along the long axis of the refractive index ellipse of the liquid crystal molecules and the phase plate is the difference na2−nb2 between the refractive indexes na2 and nb2 as illustrated in FIG. 10B. In such a case, as illustrated in FIG. 10B, the refractive index na2 decreases in proportion to na1 in FIG. 10A. The values nb1 and nb2 are equal to each other (nb1=nb2). Thus, the refractive index anisotropy decreases while inclining the viewing angle along the long axis of the refractive index ellipse.

As illustrated in FIG. 10C, the refractive index anisotropy contributing to the change in transmissivity while shifting the viewing angle along the short axis of the refractive index ellipse is the difference na3−nb3 between the refractive indexes na3 and nb3. Thus, the refractive index anisotropy does not change when shifting the viewing angle along the short axis of the refractive index ellipse.

Finally, a case where the main axis of the refractive index ellipse corresponds to the normal to the display plane of the display device will be discussed. The refractive index contributing to the transmissivity in the normal direction is the difference na4−nb4 between the refractive indexes na4 and nb4 as illustrated in FIG. 10D. Therefore, when using a phase plate having a refractive index ellipse such that na4=nb4, the transmissivity in the normal direction does not change. When the viewing angle is shifted toward an inclined direction, the refractive index contributing to the transmissivity is the difference na5−nb5 between the refractive indexes na5 and nb5. In such a refractive index ellipse, the refractive index anisotropy increases as the viewing angle is inclined from the normal direction. Thus, there is provided an effect of compensating for the change in refractive index.

Based on the discussion of the case of a single refractive index ellipse made with reference to FIG. 10A–10E, the effect of phase difference compensation provided by the group of refractive index ellipses illustrated in FIG. 9 according to one embodiment of the present invention will be summarized below. Table 8 shows the change (increase/decrease) in the refractive index anisotropy which affects the transmissivity when shifting the viewing angle toward the respective azimuth angles 608 and 609 with linearly-polarized light (polarization direction 607) being incident upon the group of refractive index ellipses representing the liquid crystal layer and the phase plate in the absence of an applied voltage according to one embodiment of the present invention illustrated in FIG. 9.

TABLE 8

| Direction toward which viewing angle is shifted | Change in refractive index anisotropy with respect to normal direction | | | Compensation effect of group 604, 605 for group 601, 602, 603 |
|---|---|---|---|---|
| | 601 | 602, 603 | 604, 605 | |
| 608 | No change | Decreased | Increased | Yes |
| 609 | Decreased | No change | Increased | Yes |

It can be seen from Table 8 that the change in viewing angle in an inclined direction can be compensated for by a phase plate having a refractive index ellipse whose refractive index is maximum in the direction normal to the surface of the liquid crystal display device. Moreover, the refractive index contributing to the transmissivity is a refractive index in the direction at about 45° with respect to the polarization axis of the incident linearly-polarized light. Thus, it is easily understood that the refractive index in this direction is preferably smaller than the refractive index in the direction normal to the surface of the liquid crystal display device.

Phase Plate Having Phase-Delay Axis at 45° With Respect to Phase-Delay Axis of Liquid Crystal Layer The phase plates 110 and 111 illustrated in FIG. 18 rotate the main axis of elliptically-polarized light (including linearly-polarized light) incident thereupon.

For improving the contrast ratio, it is necessary to suppress the increase in transmissivity (degradation of the black display) in a black display as viewed from an inclined direction. In other words, polarized light being incident upon the polarizing plate 109 from any direction needs to be linearly-polarized light whose polarization axis is perpendicular to the polarization axis (transmission axis) of the polarizing plate 109, or elliptically-polarized light whose ellipticity is substantially zero and whose main axis is perpendicular to the polarization axis of the polarizing plate 109. The change in retardation of the liquid crystal layer 101 associated with the change in viewing angle is compensated for by the above-described phase plates 104 and 105. The compensation for the change in retardation primarily corresponds to suppression of the increase in ellipticity of elliptically-polarized light (i.e., suppressing the increase to substantially zero). Moreover, in order to obtain a desirable contrast, it is necessary to compensate for the rotation of the main axis of elliptically-polarized light associated with a change in viewing angle. The phase plates 110 and 111 compensate for the rotation of the main axis of elliptically-polarized light.

Figure 19:
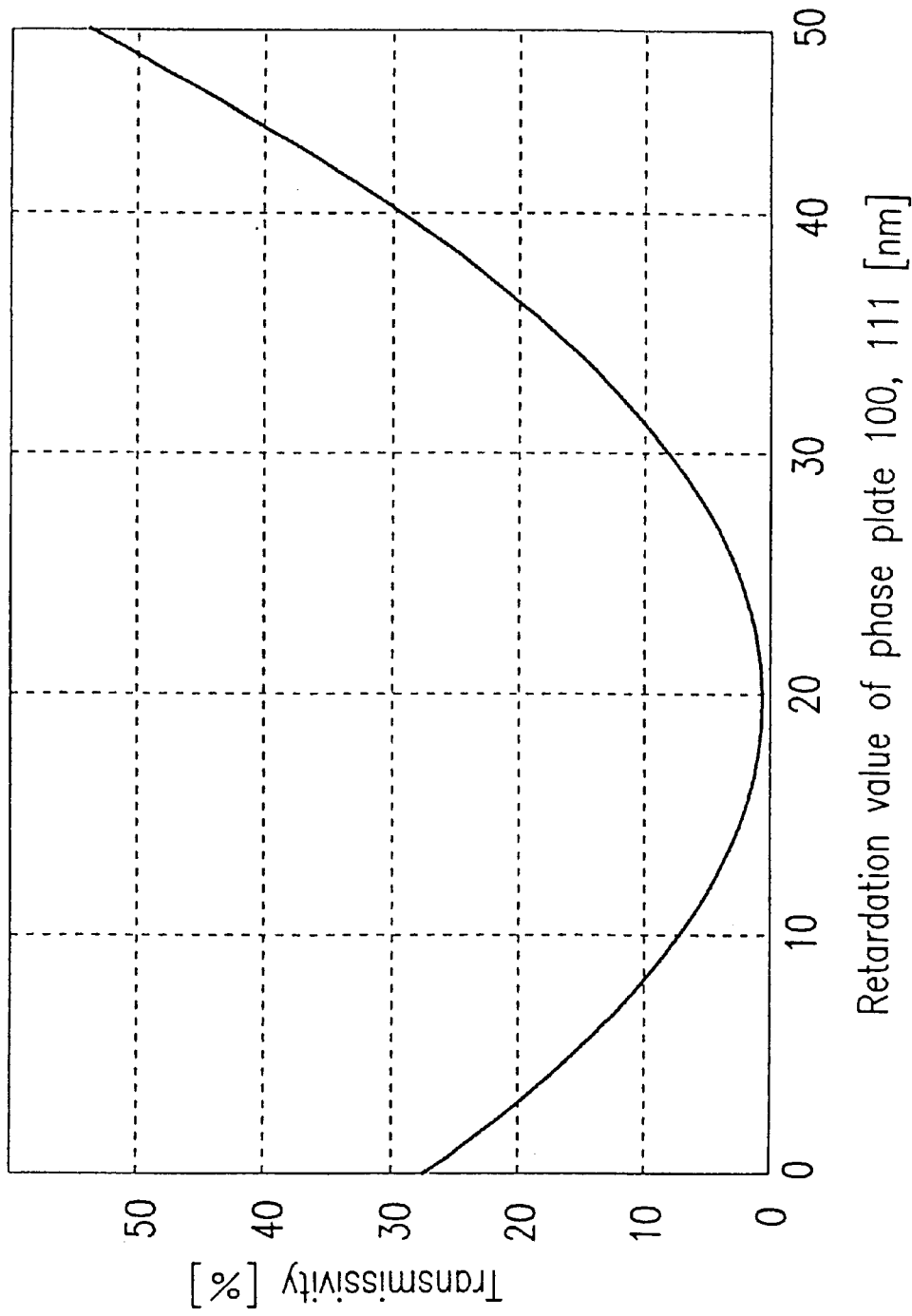
FIG. 19 is a graph showing the relationship between the retardation of a 45° phase plate and the transmissivity in a black display.

FIG. 19 illustrates the relationship between the transmissivity in a black display and the retardation value of the phase plates 110 and 111, where the viewing angle is set to about 60° in an azimuth angle parallel to the long axis of a liquid crystal molecule (the direction indicated by the arrow 609). As is apparent from FIG. 19, a desirable black display can be obtained by appropriately setting the retardation value of the phase plates 110 and 111, and adjusting the rotation angle of the main axis of elliptically-polarized light. Only one of the phase plates 110 and 111 may be used, alternatively.

Definitions for parameters characterizing a liquid crystal layer, a polarizing plate and a phase plate used commonly in the following examples will be described.

Each of the parameters, particularly angles, are defined based on an XYZ rectangular coordinate system which is appropriately assumed on a liquid crystal panel. As illustrated in FIGS. 1A–1C, the reference coordinate system only needs to have the XY plane thereof being parallel to the liquid crystal panel, and the direction of the X and Y axes is not limited to any particular direction (e.g., it may be any of those illustrated in FIGS. 1A–1C). Note, however, that for any particular liquid crystal display device, a set of axes is assumed commonly for the liquid crystal layer, the polarizing plate, and the phase plate thereof. In the following description, the main axes of the reference coordinate system are denoted by "X_REF", "Y_REF", and "Z_REF", respectively.

The parameters characterizing the orientation of the liquid crystal molecules in the liquid crystal layer will be described with reference to FIGS. 2A–2D. FIG. 2A is a perspective view illustrating a liquid crystal cell. For the sake of simplicity, a single domain across which orientation of liquid crystal molecules is uniform will be described below. Where a pixel region is divided into a plurality of domains having different orientations, parameters characterizing the liquid crystal layer for each domain include: ① the retardation value of the liquid crystal layer; ② the twist angle of the liquid crystal layer; and ③ the orientation of the liquid crystal molecules (those located in the middle of the liquid crystal layer along the thickness thereof) (i.e., the phase-delay axis of the liquid crystal layer).

FIG. 2B is a cross-sectional view illustrating a liquid crystal layer. The retardation value of the liquid crystal layer is defined as a product d·Δn of the refractive index anisotropy Δn of a liquid crystal material 5103 of the liquid crystal layer interposed between substrates 5101 and 5102 and the distance d of the substrate 5101 (e.g., a substrate on which a color filter is provided) and the substrate 5102 (e.g., a substrate on which a TFT array is provided) (the distance $d_{1c}$ corresponds to the thickness of the liquid crystal layer=the cell gap).

FIG. 2C is a plan view of the liquid crystal cell as viewed from the viewer side. A line 5104 is parallel to the long axis of a liquid crystal molecule adjacent to the light source side substrate 5102, and a line 5105 is parallel to the long axis of another liquid crystal molecule adjacent to the viewer side substrate 5101. For the sake of simplicity, it is assumed in the following description that the twist angle of the liquid crystal molecules is about 90° or less. Herein, the twist angle of the liquid crystal layer is defined as an angle obtained by rotating the line 5104 to meet the line 5105, wherein a positive twist angle is obtained by rotating the line 5104 counterclockwise. The angle as defined above is denoted by "$\theta_{twist}$" in the figure.

The orientation of the liquid crystal layer is defined as follows. Referring again to FIG. 2C, a line 5106 is shown to equiangularly bisect the angle $\theta_{twist}$. The line 5106 represents a direction in which a liquid crystal molecule located in the middle of the liquid crystal layer along the thickness thereof rises in response to an applied electric field. This direction is called the orientation or phase-delay axis of the liquid crystal layer. Herein, only some of the liquid crystal molecules present in the liquid crystal layer will be considered, whose long axes are substantially parallel to the line 5106 in the presence of a voltage which gives the liquid crystal layer an intermediate transmissivity (a gray scale voltage). FIG. 2D is a cross-sectional view of the liquid crystal cell along the line 5106. FIG. 2C further shows an arrow 5107 parallel to the line 5106. The tip of the arrow 5107 corresponds to a rising tip (end) of a liquid crystal molecule. Then, the orientation of the liquid crystal layer is defined as an angle β between the arrow 5107 and the reference axis X_REF, wherein a positive orientation is obtained by rotating the reference axis X_REF counterclockwise.

A parameter for a polarizing plate is a direction (angle) of the polarization axis (transmission axis) thereof. Definition of the direction of the polarization axis will be described (not shown in the figures). The direction of the polarization axis is defined as an angle between the polarization axis and the reference axis X_REF, wherein a positive direction is obtained by rotating the reference axis X_REF counterclockwise. Of course, polarization axis directions $\alpha$, $\alpha+180°$, and $\alpha-180°$ all denote an equivalent polarizing plate.

Parameters for a phase plate are defined as follows. Parameters for a phase plate include: ① the in-plane retardation value (in a plane parallel to the display plane); ② the retardation value along the thickness direction (in a direction vertical to the liquid crystal display plane); and ③ the angle of the axis a (the angle between X_REF and the axis a).

FIGS. 3A and 3B show a refractive index ellipse of the phase plate. The three main axes of the refractive index ellipse of the phase plate used in the examples of the present invention are denoted by a, b and c, respectively. The main axes a, b and c together form a rectangular coordinate system. The main axes a and b lie in a plane parallel to the phase plate surface, i.e., in a plane parallel to the display plane. The refractive index values along the main axes a, b and c are denoted by na, nb and nc, respectively. The thickness of the phase plate is denoted by d. Then, ① The in-plane retardation of the phase plate is defined as $d \cdot (na-nb)$;

② The retardation along the thickness direction is defined as $d \cdot (na-nc)$; and ③ The angle of the main axis a is defined as an angle $\gamma$ between the reference axis X_REF and the main axis a, wherein a positive angle is obtained by rotating the reference axis X_REF counterclockwise.

Production of Liquid Crystal Cell/Orientation Division

A method for producing a liquid crystal cell, particularly, a method for the orientation division, will be described below. The liquid crystal display device of the present invention can be produced by appropriately combining production methods known in the art.

The liquid crystal cell may be produced under conditions that are substantially the same as those for producing a currently-available TN liquid crystal cell on an ordinary TFT (thin film transistor) substrate. According to the present example, however, the rubbing direction (angle) is different from that of the conventional TN liquid crystal cell. Moreover, in order to produce the two divided orientations, UV radiation is performed on an alignment film for controlling the pre-tilt angle.

FIG. 11A is a schematic view illustrating a liquid crystal cell of the present example as viewed from the viewer side substrate. FIG. 11A illustrates an arrow 1202 indicating the rubbing direction for the color filter substrate, and another arrow 1202 indicating the rubbing direction for the TFT substrate.

A liquid crystal material is injected into a gap between the substrates which have been rubbed in the respective rubbing directions described above, and the cell is subjected to a re-alignment treatment. The orientation of the liquid crystal molecules in such a liquid crystal cell will be described. It is believed that the orientation of liquid crystal molecules 1206 across a cross section along the X–X' line in FIG. 11A, i.e., a cross section parallel to the rubbing direction, can be schematically represented as in FIG. 11B. The angle between the liquid crystal molecule 1206 and a viewer side substrate 1205 is substantially the same as the angle between the liquid crystal molecule 1206 and a light source side substrate 1204. Moreover, the liquid crystal molecules substantially in the middle of the liquid crystal cell along the thickness thereof are oriented substantially parallel to the substrate surface. When a voltage is applied across such a liquid crystal layer, a liquid crystal molecule in the intermediate layer may rotate (rise) in the direction indicated by an arrow 1207 or in the direction indicated by an arrow 1208 with the same probability.

According to the present invention, one of the upper or lower substrates is first irradiated with UV light and then subjected to a rubbing process. FIG. 11C schematically illustrates the orientation of the liquid crystal molecules along the X–X' cross section between such substrates.

The UV irradiation process was performed while dividing each pixel into two regions A and B. Only the alignment film on the side of the counter substrate is irradiated with UV light in the region A, whereas only the alignment film on the side of the TFT substrate is irradiated with UV light in the region B. An evaluation of the optical characteristics of the liquid crystal cell which has been processed as described above showed that the liquid crystal molecules in the intermediate layer in the region A rotates in the direction indicated by the arrow 1207, whereas the liquid crystal molecules in the region B rotates in the direction indicated by the arrow 1208. In other words, the orientation (pre-tilt angle) of the liquid crystal molecules located in the middle of the liquid crystal layer along the thickness thereof was successfully controlled. Alternatively, the UV irradiation may be performed after the rubbing process. Moreover, the orientation division can be realized by means other than the combination of the UV irradiation and the rubbing process.

Moreover, it is preferred to use light-blocking beads as spacer beads.

This is because, in the present invention, normally black mode characteristics are obtained by compensating for the retardation of the liquid crystal layer with a phase plate, i.e., if the retardation value of a portion the liquid crystal layer changes due to the beads, or the like, present therein, a black display cannot be obtained in the portion, thereby reducing the contrast. Thus, such a portion of the liquid crystal layer should be blocked from light (e.g., by using light-blocking beads) or such a portion should not be provided at all (e.g., by providing a bead-less liquid crystal display device).

EXAMPLE 3

A liquid crystal display device 1800 according to Example 3 of the present invention will be schematically illustrated with reference to FIG. 18. FIG. 18 illustrates a liquid crystal cell 101, phase plates 102, 103, 104, 105, 110 and 111, and polarizing plates 108 and 109.

The liquid crystal cell 101 in each pixel is divided into two regions A and B having different orientations. The orientation parameters for the regions are as follows.

TABLE 9

| Region | Area in percent for the entire pixel | Retardation value | Twist angle | Orientation |
|---|---|---|---|---|
| A | 50% | 261 nm | 0 deg | 90 deg |
| B | 50% | 261 nm | 0 deg | 270 deg |

Parameters f or the polarizing plates are as follows.

TABLE 10

| Ref # of polarizing plate | Angle of transmission axis |
|---|---|
| 108 | 45 deg |
| 109 | −45 deg |

Parameters f or the phase plates are as follows.

TABLE 11

| Ref # of phase plate | d*(na-nb) | d*(na-nc) | Angle of na axis |
|---|---|---|---|
| 102 | 130 nm | 0 nm | 0 deg |
| 103 | 130 nm | 0 nm | 0 deg |
| 104 | 0 nm | −131 nm | 0 deg |
| 105 | 0 nm | −131 nm | 0 deg |
| 110 | 29 nm | 0 nm | −45 deg |
| 111 | 29 nm | 0 nm | 45 deg |

Figure 20:
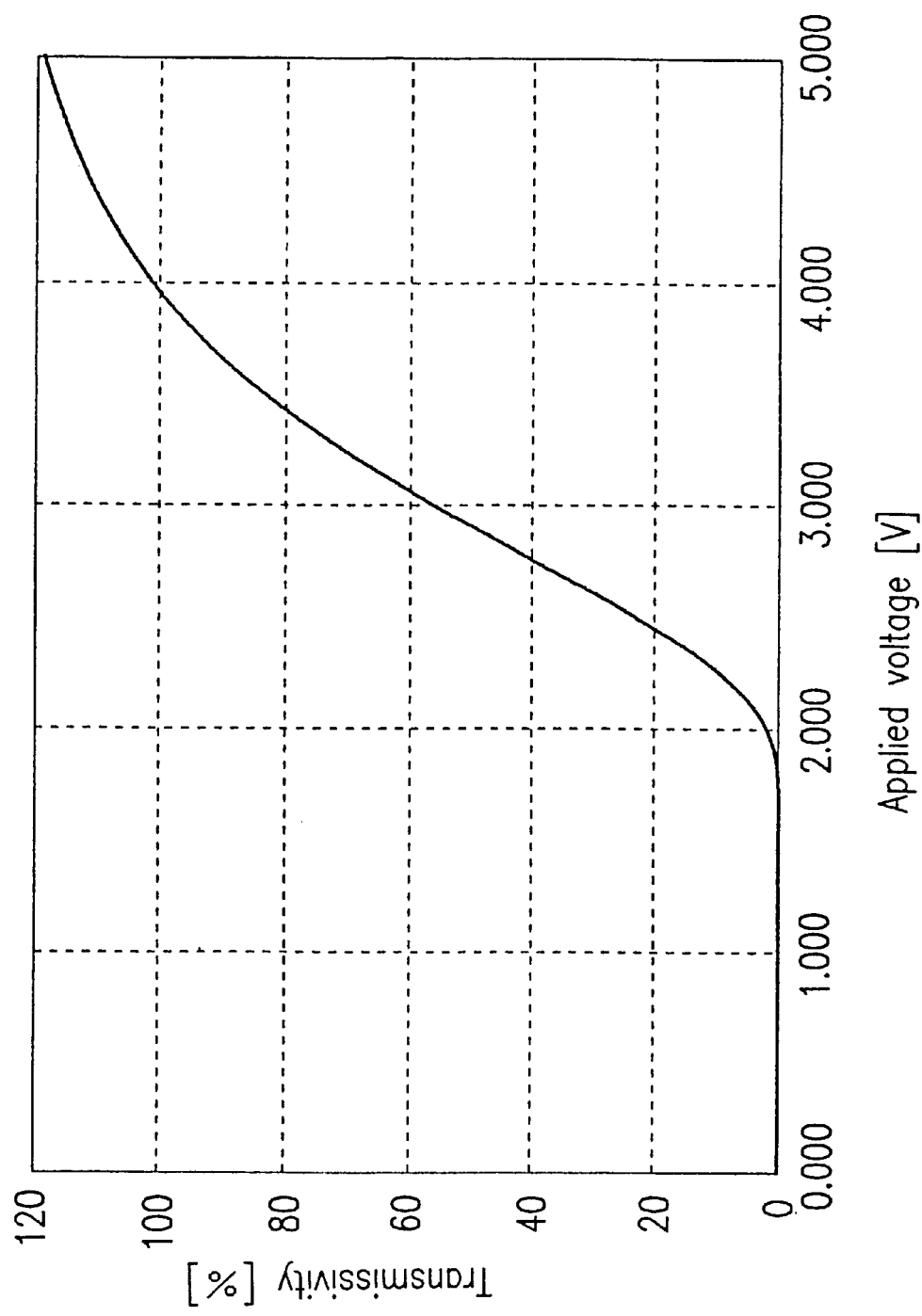
FIG. 20 is a graph illustrating the relationship between the transmissivity and the applied voltage in a liquid crystal display device according to an example of the present invention.

FIG. 20 illustrates the relationship between the transmissivity and the applied voltage in the liquid crystal display device of the present example. In FIG. 20, a transmissivity of 100% corresponds to the transmissivity for an applied voltage of about 4 V. It can be seen from FIG. 20 that the liquid crystal display device of the present example produces a black display at an applied voltage of 0 V, and the transmissivity increases (toward a white display) as the applied voltage increases.

Figure 21A:
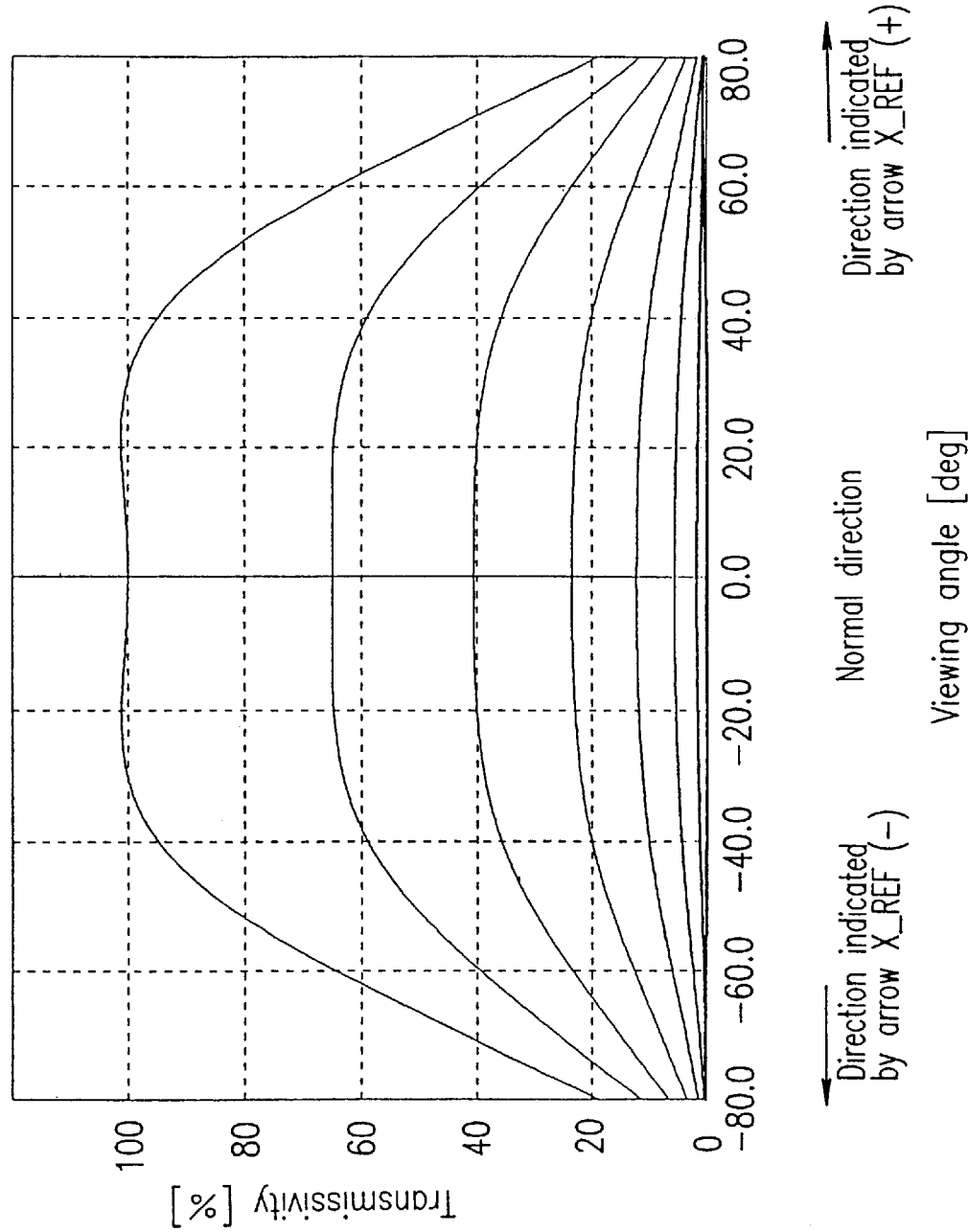
FIG. 21A is a graph illustrating the viewing angle dependency (along a direction parallel to the X_REF axis) of the transmissivity for various gray scale levels in an 8-gray-scale-level display produced by a liquid crystal display device according to an example of the present invention.
Figure 21B:
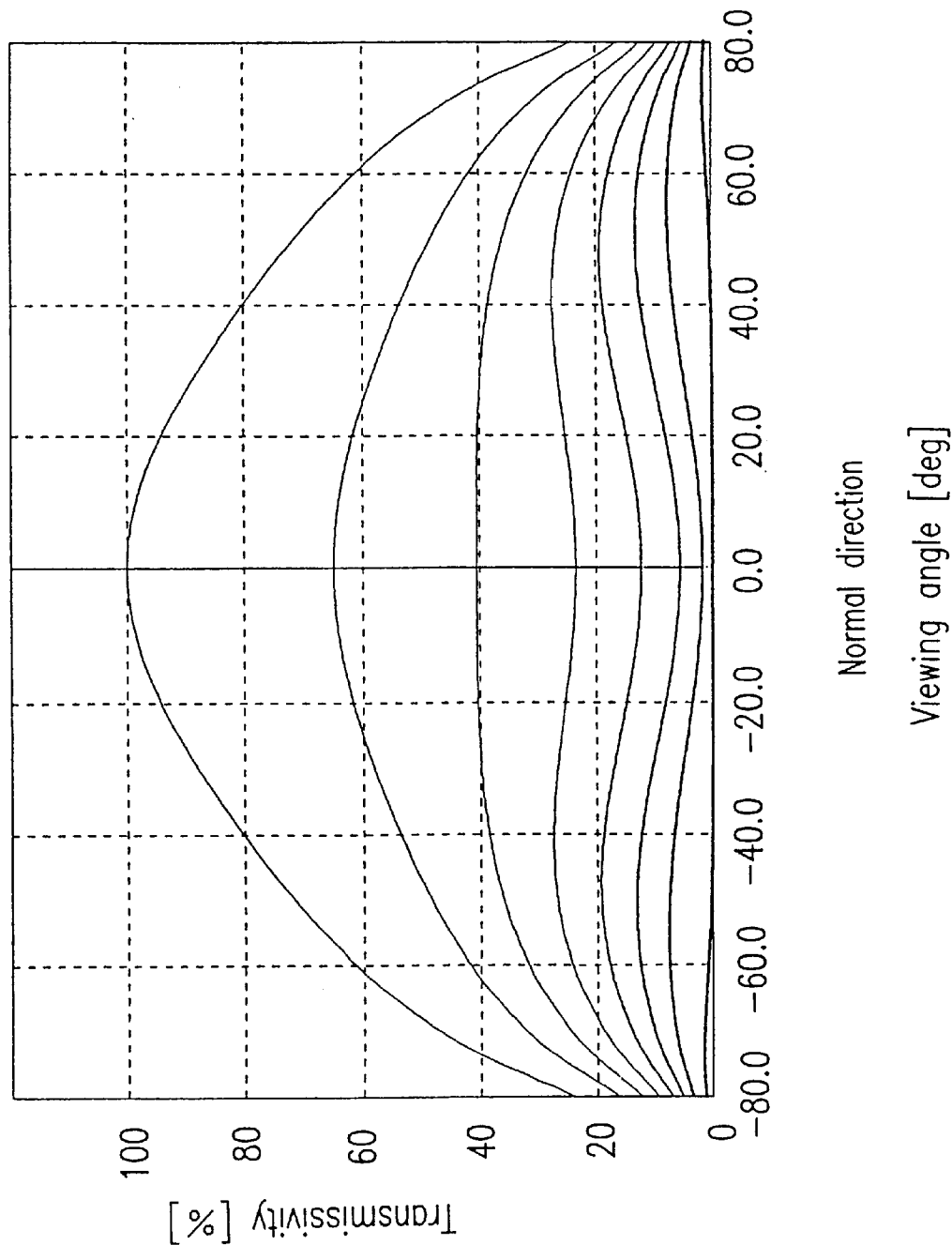
FIG. 21B is a graph illustrating the viewing angle dependency (along a direction parallel to the X_REF±45° axis) of the transmissivity for various gray scale levels in an 8-gray-scale-level display produced by a liquid crystal display device according to an example of the present invention.
Figure 21C:
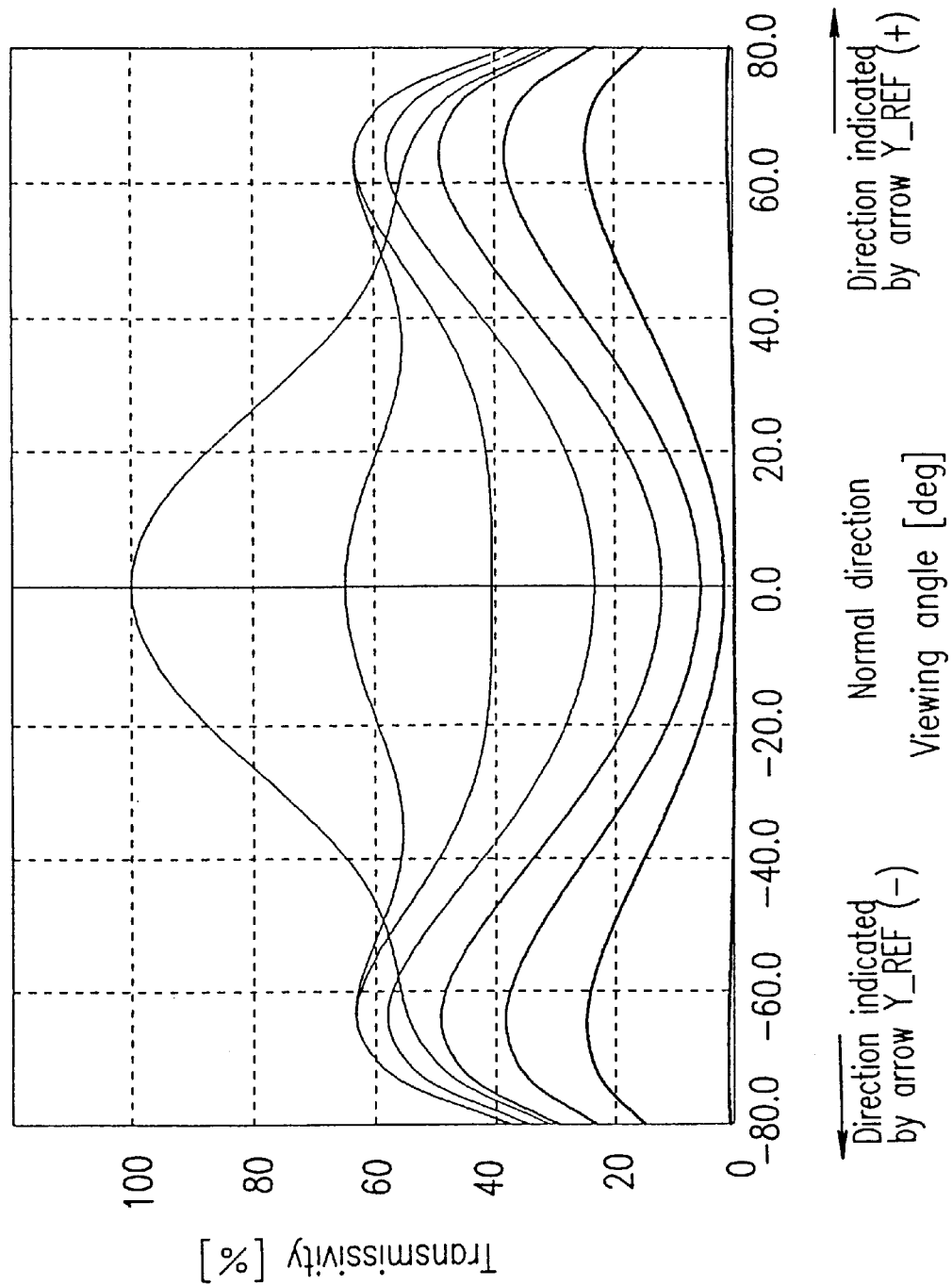
FIG. 21C is a graph illustrating the viewing angle dependency (along a direction parallel to the Y_REF axis) of the transmissivity for various gray scale levels in an 8-gray-scale-level display produced by a liquid crystal display device according to an example of the present invention.

Each of FIGS. 21A–21C illustrates the viewing angle (polar angle: an angle with respect to the normal to the display plane) dependency of the transmissivity for various gray scale levels in an 8-gray-scale-level display. The viewing angle is shifted along a direction parallel to the X_REF axis in FIG. 21A, along a direction parallel to the X_REF±45° axis in FIG. 21B, and along a direction parallel to the Y_REF axis in FIG. 21C. It can be seen from the figures that the gray scale characteristics of the liquid crystal display device of the present example are substantially symmetric.

Figure 22:
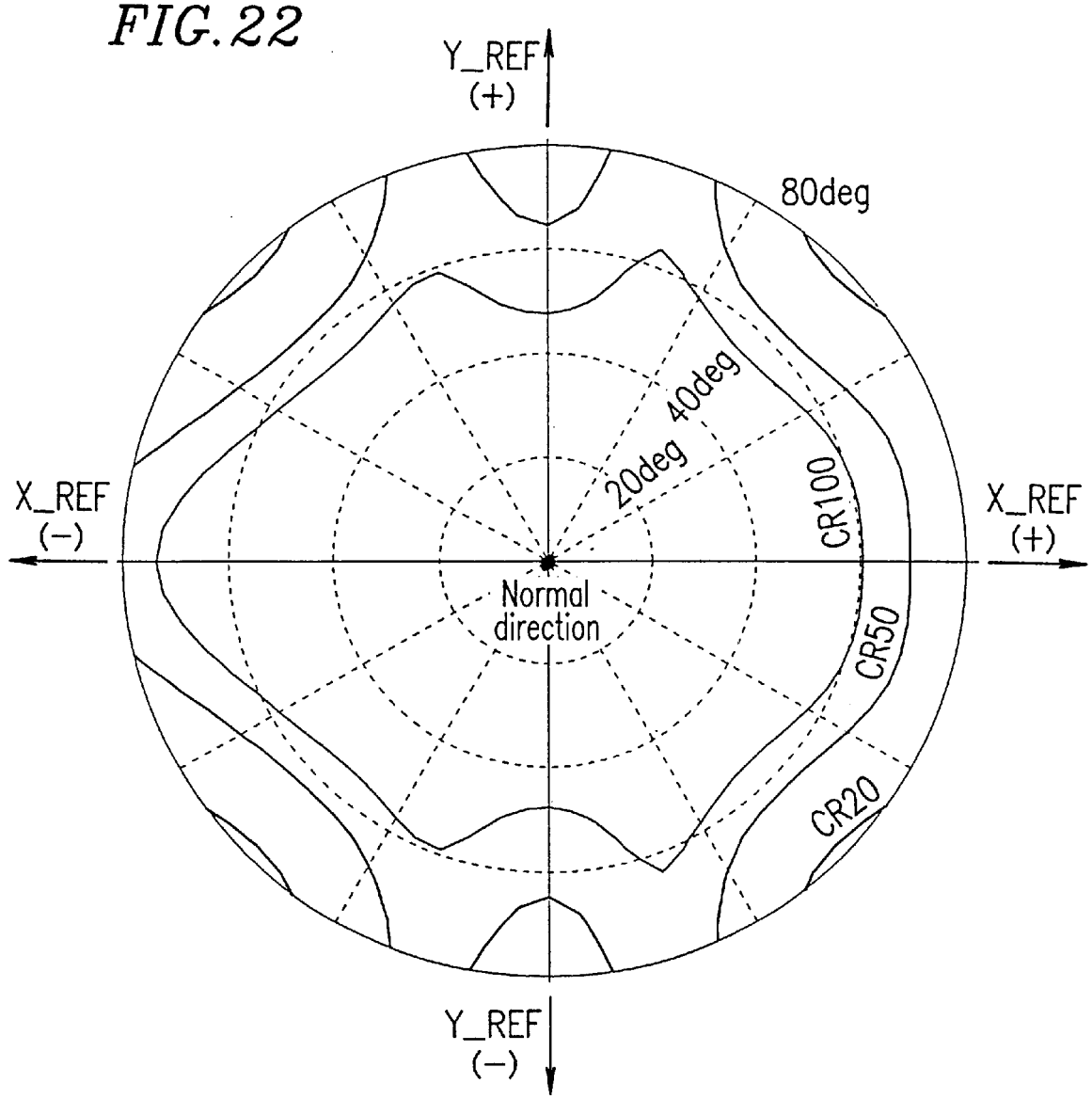
FIG. 22 is an isocontrast diagram for a liquid crystal display device according to an example of the present invention.

FIG. 22 illustrates an isocontrast diagram based on values (contrast ratios) obtained by dividing the transmissivity for an applied voltage of 4 V by the transmissivity for an applied voltage of 0 V. The center of the circle corresponds to a viewing angle normal to the display plane (viewing angle 0°), and the concentric circles about the center respectively correspond to various viewing angles of 20°, 40°, 60° and 80°, from the innermost circle. The horizontal axis and the vertical axis represent X_REF and Y_REF, respectively. The innermost, intermediate and outermost isocontrast curves correspond to contrast ratios (CRs) of about 100, 50 and 20, respectively. As is apparent from FIG. 22, the liquid crystal display device of the present example realizes a contrast ratio of about 50 or more in a wide range of viewing angles even over about 60° in any azimuth angle, indicating that the liquid crystal display device has desirable viewing angle characteristics.

EXAMPLE 4

FIG. 23 schematically illustrates the structure of a liquid crystal display device according to Example 4 of the present invention. FIG. 23 illustrates a liquid crystal cell 6101, phase plates 6102, 6103, 6104 and 6105, and polarizing plates 6106 and 6107.

The liquid crystal cell 6101 in each pixel is divided into two regions A and B having different orientations. The orientation parameters for the regions are as follows.

TABLE 12

| Region | Area in percent for the entire pixel | Retardation value | Twist angle | Orientation |
|---|---|---|---|---|
| A | 50% | 261 nm | 0 deg | 90 deg |
| B | 50% | 261 nm | 0 deg | 270 deg |

Parameters for the polarizing plates are as follows.

TABLE 13

| Ref # of polarizing plate | Angle of transmission axis |
|---|---|
| 6106 | 45 deg |
| 6107 | −45 deg |

Parameters for the phase plates are as follows.

TABLE 14

| Ref # of phase plate | d*(na-nb) | d*(na-nc) | Angle of na axis |
|---|---|---|---|
| 6102 | 130 nm | 0 nm | 90 deg |
| 6103 | 130 nm | 0 nm | 90 deg |
| 6104 | 36 nm | 0 nm | −45 deg |
| 6105 | 0 nm | −263 nm | 90 deg |

As in Example 3, the liquid crystal display device of the present example has very good viewing angle characteristics.

EXAMPLE 5

Figure 24:
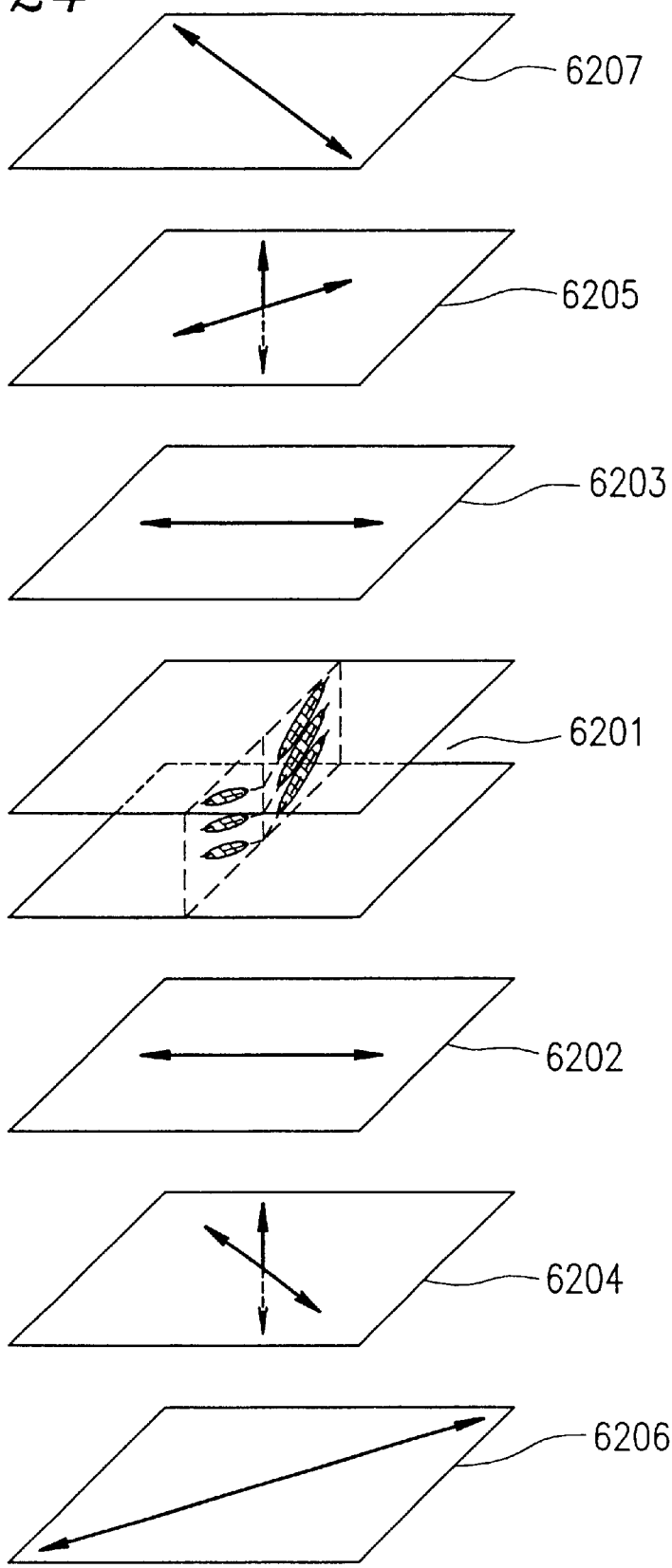
FIG. 24 is a diagram schematically illustrating a structure of a liquid crystal display device according to another example of the present invention.

FIG. 24 schematically illustrates the structure of a liquid crystal display device according to Example 5 of the present invention. FIG. 24 illustrates a liquid crystal cell 6201, phase plates 6202, 6203, 6204 and 6205, and polarizing plates 6206 and 6207.

The liquid crystal cell 6201 in each pixel is divided into two regions A and B having different orientations. The orientation parameters for the regions are as follows.

TABLE 15

| Region | Area in percent for the entire pixel | Retardation value | Twist angle | Orientation |
|---|---|---|---|---|
| A | 50% | 261 nm | 0 deg | 90 deg |
| B | 50% | 261 nm | 0 deg | 270 deg |

Parameters for the polarizing plates are as follows.

TABLE 16

| Ref # of polarizing plate | Angle of transmission axis |
| --- | --- |
| 6206 | 45 deg |
| 6207 | −45 deg |

Parameters for the phase plates are as follows.

TABLE 17

| Ref # of phase plate | d*(na-nb) | d*(na-nc) | Angle of na axis |
| --- | --- | --- | --- |
| 6202 | 130 nm | 0 nm | 0 deg |
| 6203 | 130 nm | 0 nm | 0 deg |
| 6204 | 50 nm | −96 nm | −45 deg |
| 6205 | 50 nm | −96 nm | 45 deg |

As in Example 3, the liquid crystal display device of the present example has very good viewing angle characteristics.

EXAMPLE 6

FIG. 25 schematically illustrates the structure of a liquid crystal display device according to Example 6 of the present invention. FIG. 25 illustrates a liquid crystal cell 6301, phase plates 6302, 6303 and 6304, and polarizing plates 6305 and 6306.

The liquid crystal cell 6301 in each pixel is divided into two regions A and B having different orientations. The orientation parameters for the regions are as follows.

TABLE 18

| Region | Area in percent for the entire pixel | Retardation value | Twist angle | Orientation |
| --- | --- | --- | --- | --- |
| A | 50% | 261 nm | 0 deg | 90 deg |
| B | 50% | 261 nm | 0 deg | 270 deg |

Parameters for the polarizing plates are as follows.

TABLE 19

| Ref # of polarizing plate | Angle of transmission axis |
| --- | --- |
| 6305 | 45 deg |
| 6306 | −45 deg |

Parameters for the phase plates are as follows.

TABLE 20

| Ref # of phase plate | d*(na-nb) | d*(na-nc) | Angle of na axis |
| --- | --- | --- | --- |
| 6302 | 130 nm | 0 nm | 90 deg |
| 6303 | 130 nm | 0 nm | 90 deg |
| 6304 | 62 nm | −193 nm | −45 deg |

As in Example 3, the liquid crystal display device of the present example has very good viewing angle characteristics.

EXAMPLE 7

FIG. 26 schematically illustrates the structure of a liquid crystal display device according to Example 7 of the present invention. FIG. 26 illustrates a liquid crystal cell 6401, phase plates 6402, 6403, 6404 and 6405 and polarizing plates 6406 and 6407.

The liquid crystal cell 6401 in each pixel is divided into two regions A and B having different orientations. The orientation parameters for the regions are as follows.

TABLE 21

| Region | Area in percent for the entire pixel | Retardation value | Twist angle | Orientation |
| --- | --- | --- | --- | --- |
| A | 50% | 261 nm | 0 deg | 90 deg |
| B | 50% | 261 nm | 0 deg | 270 deg |

Parameters for the polarizing plates are as follows.

TABLE 22

| Ref # of polarizing plate | Angle of transmission axis |
| --- | --- |
| 6406 | 45 deg |
| 6407 | −45 deg |

Parameters for the phase plates are as follows.

TABLE 23

| Ref # of phase plate | d*(na-nb) | d*(na-nc) | Angle of na axis |
| --- | --- | --- | --- |
| 6402 | 130 nm | 0 nm | 0 deg |
| 6403 | 130 nm | 0 nm | 0 deg |
| 6404 | 36 nm | 0 nm | 45 deg |
| 6405 | 0 nm | −263 nm | 0 deg |

As in Example 3, the liquid crystal display device of the present example has very good viewing angle characteristics.

EXAMPLE 8

FIG. 30 schematically illustrates the structure of a liquid crystal display device according to Example 8 of the present invention. FIG. 30 illustrates a liquid crystal cell 6501, phase plates 6502, 6503 and 6504 and polarizing plates 6505 and 6506.

The liquid crystal cell 6501 in each pixel is divided into two regions A and B having different orientations. The orientation parameters for the regions are as follows.

TABLE 24

| Region | Area in percent for the entire pixel | Retardation value | Twist angle | Orientation |
| --- | --- | --- | --- | --- |
| A | 50% | 261 nm | 0 deg | 90 deg |
| B | 50% | 261 nm | 0 deg | 270 deg |

Parameters for the polarizing plates are as follows.

TABLE 25

| Ref # of polarizing plate | Angle of transmission axis |
| --- | --- |
| 6505 | 45 deg |
| 6506 | −45 deg |

Parameters for the phase plates are as follows.

TABLE 26

| Ref # of phase plate | d*(na-nb) | d*(na-nc) | Angle of na axis |
|---|---|---|---|
| 6502 | 130 nm | 0 nm | 0 deg |
| 6503 | 130 nm | 0 nm | 0 deg |
| 6504 | 62 nm | −193 nm | 45 deg |

In all of Examples 3–8, the twist angle of the liquid crystal layer is 0°, though the effective twist angle the present invention is not limited to this angle. By providing the liquid crystal layer with any appropriate twist angle, the ranges, the margins, and the like, of the respective parameters may be extended. Particularly, in a range where the twist angle is 0° or greater and less than 90°, the orientation division can easily be achieved without having to mix a chiral agent in the liquid crystal material. An example with a twist angle of about 30° will be described below.

EXAMPLE 9

FIG. 18 schematically illustrates the structure of a liquid crystal display device according to Example 9 of the present invention. FIG. 18 illustrates a liquid crystal cell 101, phase plates 102, 103, 104, 105, 110 and 111, and polarizing plates 108 and 109.

The liquid crystal cell 101 in each pixel is divided into two regions A and B having different orientations. The orientation parameters for the regions are as follows.

TABLE 27

| Region | Area in percent for the entire pixel | Retardation value | Twist angle | Orientation |
|---|---|---|---|---|
| A | 50% | 303 nm | −30 deg | 90 deg |
| B | 50% | 303 nm | −30 deg | 270 deg |

Parameters for the polarizing plates are as follows.

TABLE 28

| Ref # of polarizing plate | Angle of transmission axis |
|---|---|
| 108 | 45 deg |
| 109 | −45 deg |

Parameters for the phase plates are as follows.

TABLE 29

| Ref # of phase plate | d*(na-nb) | d*(na-nc) | Angle of na axis |
|---|---|---|---|
| 102 | 154 nm | 0 nm | 9.4 deg |
| 103 | 154 nm | 0 nm | −9.4 deg |
| 104 | 0 nm | −150 nm | 0 deg |
| 105 | 0 nm | −150 nm | 0 deg |
| 110 | 48 nm | 0 nm | −45 deg |
| 111 | 48 nm | 0 nm | 45 deg |

Figure 27:
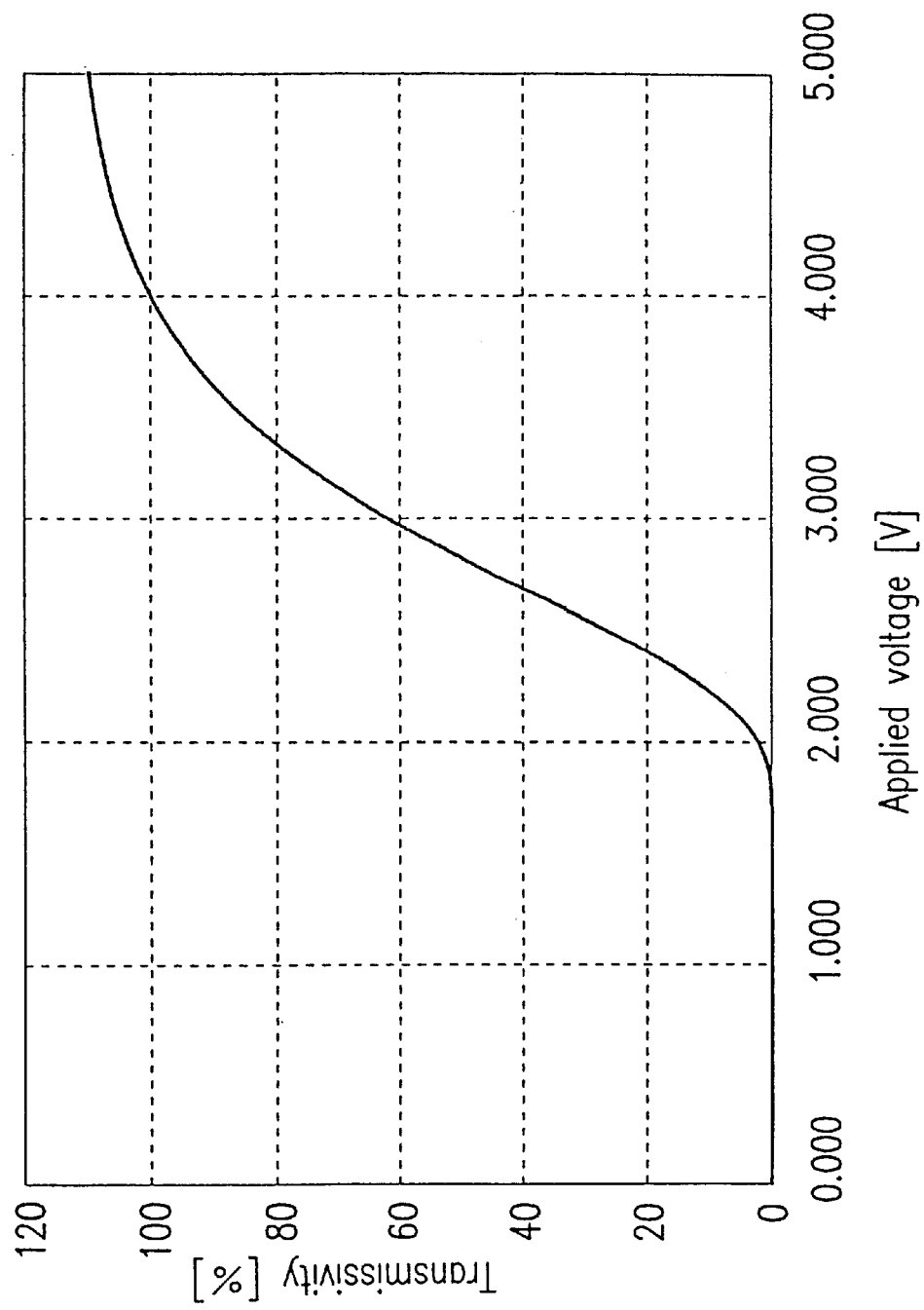
FIG. 27 is a graph illustrating the relationship between the transmissivity and the applied voltage in a liquid crystal display device according to an example of the present invention.

FIG. 27 illustrates the relationship between the transmissivity and the applied voltage in the liquid crystal display device of the present example. In FIG. 27, a transmissivity of 100% corresponds to the transmissivity for an applied voltage of about 4 V. It can be seen from FIG. 27 that the liquid crystal display device of the present example produces a black display at an applied voltage of 0 V, and the transmissivity increases (toward a white display) as the applied voltage increases.

Figure 28A:
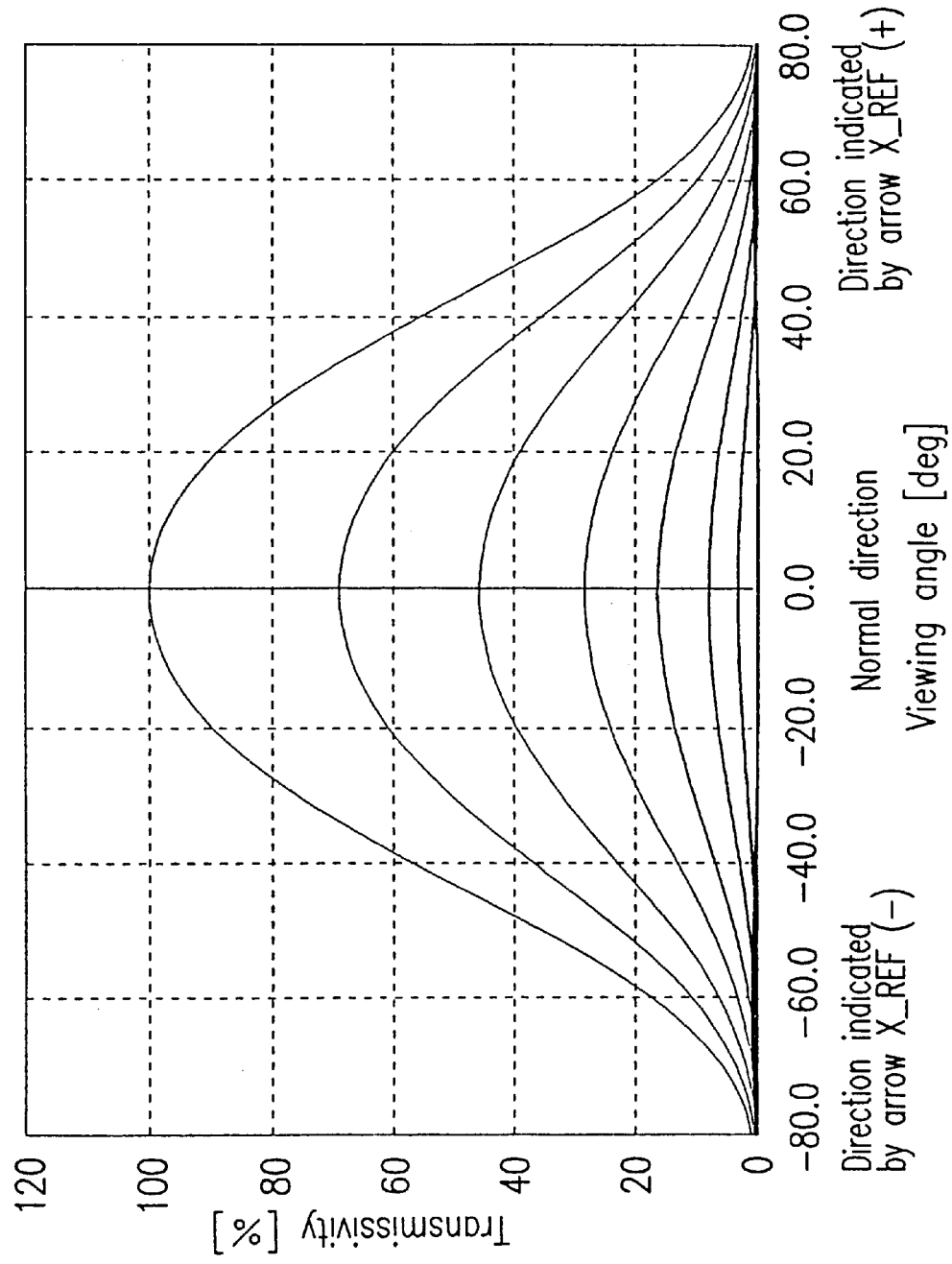
FIG. 28A is a graph illustrating the viewing angle dependency (along a direction parallel to the X_REF axis) of the transmissivity for various gray scale levels in an 8-gray-scale-level display produced by a liquid crystal display device according to an example of the present invention.
Figure 28B:
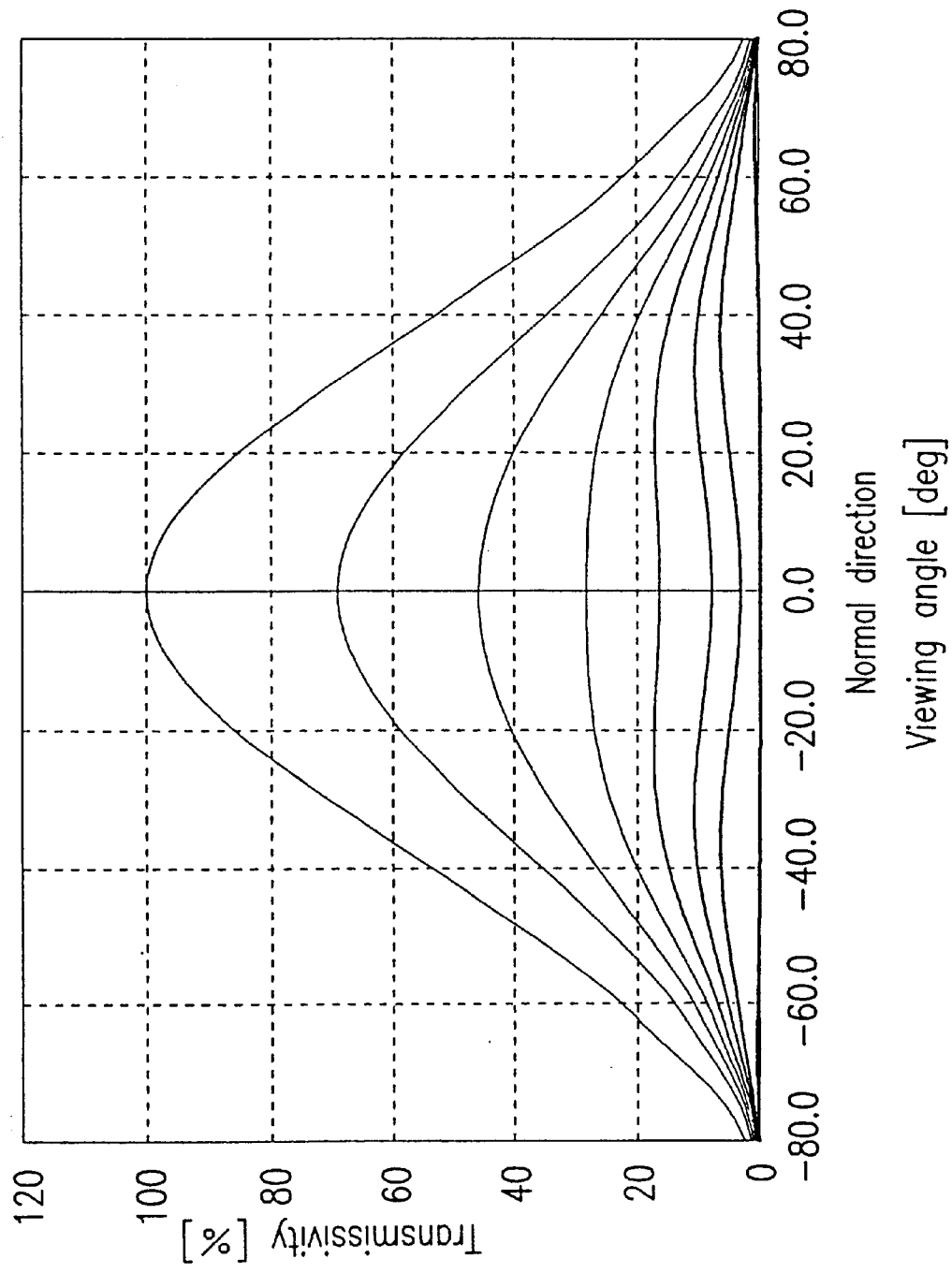
FIG. 28B is a graph illustrating the viewing angle dependency (along a direction parallel to the X_REF±45° axis) of the transmissivity for various gray scale levels in an 8-gray-scale-level display produced by a liquid crystal display device according to an example of the present invention.
Figure 28C:
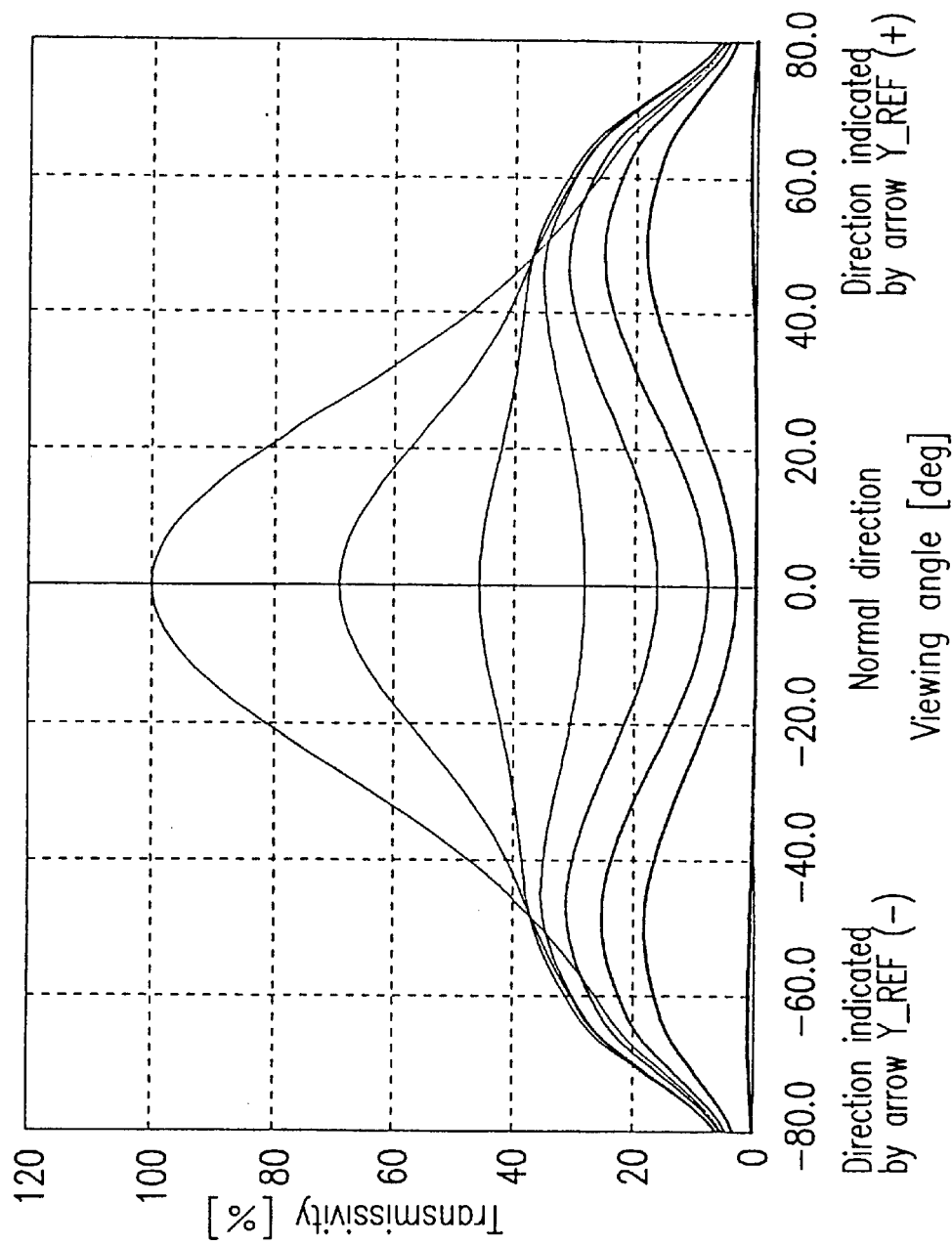
FIG. 28C is a graph illustrating the viewing angle dependency (along a direction parallel to the Y_REF axis) of the transmissivity for various gray scale levels in an 8-gray-scale-level display produced by a liquid crystal display device according to an example of the present invention.

Each of FIGS. 28A–28C illustrates the viewing angle (polar angle: an angle with respect to the normal to the display plane) dependency of the transmissivity for various gray scale levels in an 8-gray-scale-level display. The viewing angle is shifted along a direction parallel to the X_REF axis in FIG. 28A, along a direction parallel to the X_REF±45° axis in FIG. 28B, and along a direction parallel to the Y_REF axis in FIG. 28C. It can be seen from the figures that the gray scale characteristics of the liquid crystal display device of the present example are substantially symmetric.

Figure 29:
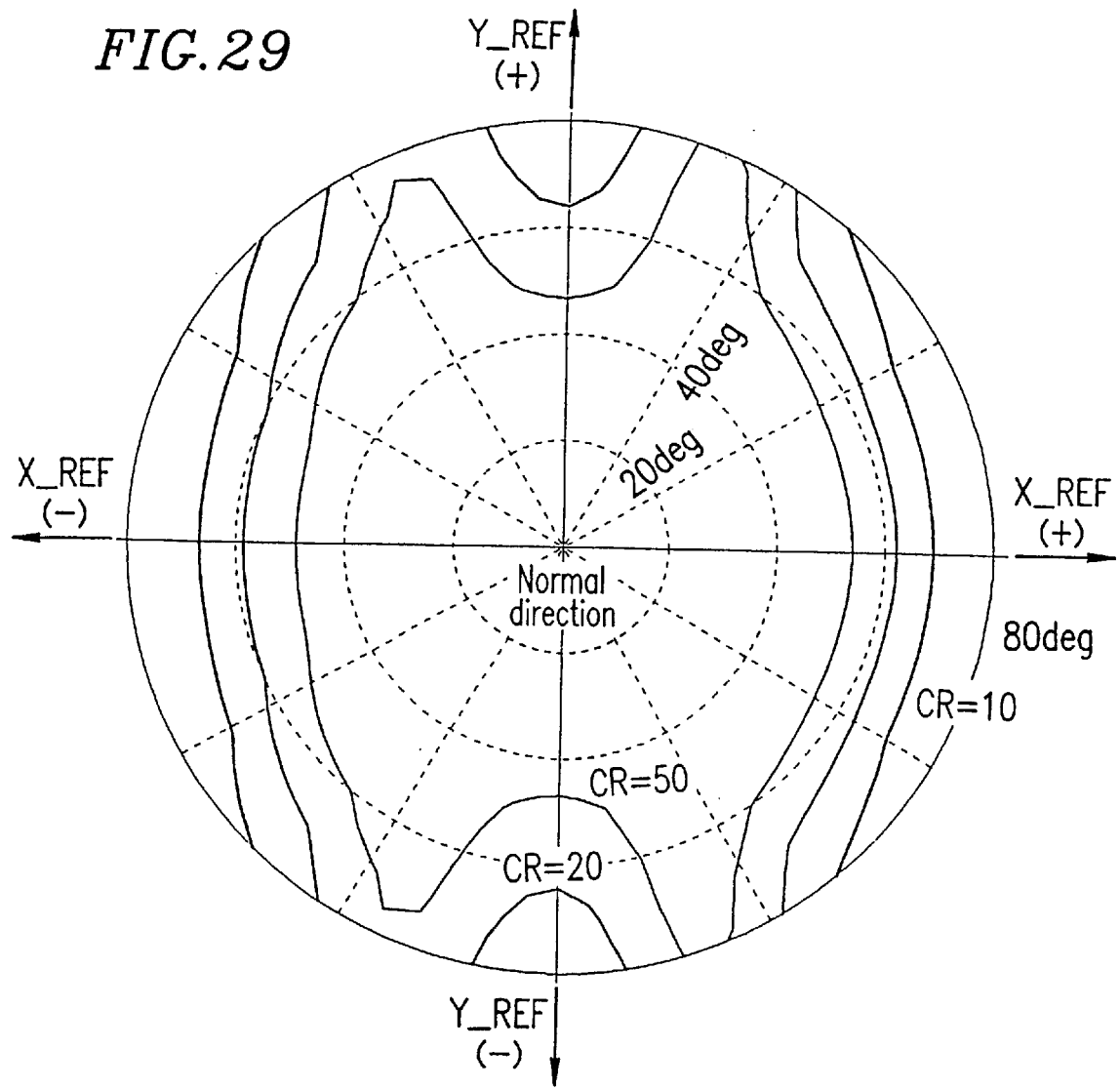
FIG. 29 is an isocontrast diagram for a liquid crystal display device according to an example of the present invention.

FIG. 29 illustrates an isocontrast diagram based on values (contrast ratios) obtained by dividing the transmissivity for an applied voltage of 4 V by the transmissivity for an applied voltage of 0 V. The center of the circle corresponds to a viewing angle normal to the display plane (viewing angle 0°), and the concentric circles about the center respectively correspond to various viewing angles of 20°, 40°, 60° and 80°, from the innermost circle. The horizontal axis and the vertical axis represent X_REF and Y_REF, respectively. The innermost, intermediate and outermost isocontrast curves correspond to contrast ratios (CRs) of about 100, 50 and 20, respectively. As is apparent from FIG. 29, the liquid crystal display device of the present example realizes a contrast ratio of about 10 or more in a wide range of viewing angles even over about 60° in any azimuth angle, indicating that the liquid crystal display device has desirable viewing angle characteristics.

EXAMPLE 10

FIG. 23 schematically illustrates the structure of a liquid crystal display device according to Example 10 of the present invention. FIG. 23 illustrates a liquid crystal cell 6101, phase plates 6102, 6103, 6104 and 6105, and polarizing plates 6106 and 6107.

The liquid crystal cell 6101 in each pixel is divided into two regions A and B having different orientations. The orientation parameters for the regions are as follows.

TABLE 30

| Region | Area in percent for the entire pixel | Retardation value | Twist angle | Orientation |
|---|---|---|---|---|
| A | 50% | 303 nm | −30 deg | 90 deg |
| B | 50% | 303 nm | −30 deg | 270 deg |

Parameters for the polarizing plates are as follows.

TABLE 31

| Ref # of polarizing plate | Angle of transmission axis |
|---|---|
| 6106 | 45 deg |
| 6107 | −45 deg |

Parameters for the phase plates are as follows.

TABLE 32

| Ref # of phase plate | d*(na-nb) | d*(na-nc) | Angle of na axis |
|---|---|---|---|
| 6102 | 154 nm | 0 nm | 9.4 deg |
| 6103 | 154 nm | 0 nm | −9.4 deg |
| 6104 | 58 nm | 0 nm | −45 deg |
| 6105 | 0 nm | −317 nm | 90 deg |

As in Example 9, the liquid crystal display device of the present example has very good viewing angle characteristics.

EXAMPLE 11

FIG. 24 schematically illustrates the structure of a liquid crystal display device according to Example 11 of the present invention. FIG. 24 illustrates a liquid crystal cell 6201, phase plates 6202, 6203, 6204 and 6205, and polarizing plates 6206 and 6207.

The liquid crystal cell 6201 in each pixel is divided into two regions A and B having different orientations. The orientation parameters for the regions are as follows.

TABLE 33

| Region | Area in percent for the entire pixel | Retardation value | Twist angle | Orientation |
|---|---|---|---|---|
| A | 50% | 303 nm | 30 deg | 90 deg |
| B | 50% | 303 nm | 30 deg | 270 deg |

Parameters for the polarizing plates are as follows.

TABLE 34

| Ref # of polarizing plate | Angle of transmission axis |
|---|---|
| 6206 | 45 deg |
| 6207 | −45 deg |

Parameters for the phase plates are as follows.

TABLE 35

| Ref # of phase plate | d*(na-nb) | d*(na-nc) | Angle of na axis |
|---|---|---|---|
| 6202 | 154 nm | 0 nm | 9.4 deg |
| 6203 | 154 nm | 0 nm | −9.4 deg |
| 6204 | 95 nm | −123 nm | −45 deg |
| 6205 | 95 nm | −123 nm | 45 deg |

As in Example 9, the liquid crystal display device of the present example has very good viewing angle characteristics.

EXAMPLE 12

FIG. 25 schematically illustrates the structure of a liquid crystal display device according to Example 12 of the present invention. FIG. 25 illustrates a liquid crystal cell 6301, phase plates 6302, 6303 and 6304, and polarizing plates 6305 and 6306.

The liquid crystal cell 6301 in each pixel is divided into two regions A and B having different orientations. The orientation parameters for the regions are as follows.

TABLE 36

| Region | Area in percent for the entire pixel | Retardation value | Twist angle | Orientation |
|---|---|---|---|---|
| A | 50% | 303 nm | −30 deg | 90 deg |
| B | 50% | 303 nm | −30 deg | 270 deg |

Parameters for the polarizing plates are as follows.

TABLE 37

| Ref # of polarizing plate | Angle of transmission axis |
|---|---|
| 6305 | 45 deg |
| 6306 | −45 deg |

Parameters for the phase plates are as follows.

TABLE 38

| Ref # of phase plate | d*(na-nb) | d*(na-nc) | Angle of na axis |
|---|---|---|---|
| 6302 | 154 nm | 0 nm | 9.4 deg |
| 6303 | 154 nm | 0 nm | −9.4 deg |
| 6304 | 113 nm | −260 nm | −45 deg |

As in Example 9, the liquid crystal display device of the present example has very good viewing angle characteristics.

EXAMPLE 13

FIG. 26 schematically illustrates the structure of a liquid crystal display device according to Example 13 of the present invention. FIG. 26 illustrates a liquid crystal cell 6401, phase plates 6402, 6403, 6404 and 6405, and polarizing plates 6406 and 6407.

The liquid crystal cell 6401 in each pixel is divided into two regions A and B having different orientations. The orientation parameters for the regions are as follows.

TABLE 39

| Region | Area in percent for the entire pixel | Retardation value | Twist angle | Orientation |
|---|---|---|---|---|
| A | 50% | 303 nm | −30 deg | 90 deg |
| B | 50% | 303 nm | −30 deg | 270 deg |

Parameters for the polarizing plates are as follows.

TABLE 40

| Ref # of polarizing plate | Angle of transmission axis |
|---|---|
| 6406 | 45 deg |
| 6407 | −45 deg |

Parameters for the phase plates are as follows.

TABLE 41

| Ref # of phase plate | d*(na-nb) | d*(na-nc) | Angle of na axis |
|---|---|---|---|
| 6402 | 154 nm | 0 nm | 9.4 deg |
| 6403 | 154 nm | 0 nm | −9.4 deg |
| 6404 | 58 nm | 0 nm | 45 deg |
| 6405 | 0 nm | −317 nm | 0 deg |

As in Example 9, the liquid crystal display device of the present example has very good viewing angle characteristics.

EXAMPLE 14

FIG. 30 schematically illustrates the structure of a liquid crystal display device according to Example 14 of the present invention. FIG. 30 illustrates a liquid crystal cell 6501, phase plates 6502, 6503 and 6504, and polarizing plates 6505 and 6506.

The liquid crystal cell 6501 in each pixel is divided into two regions A and B having different orientations. The orientation parameters for the regions are as follows.

TABLE 42

| Region | Area in percent for the entire pixel | Retardation value | Twist angle | Orientation |
|---|---|---|---|---|
| A | 50% | 303 nm | −30 deg | 90 deg |
| B | 50% | 303 nm | −30 deg | 270 deg |

Parameters for the polarizing plates are as follows.

TABLE 43

| Ref # of polarizing plate | Angle of transmission axis |
|---|---|
| 6505 | 45 deg |
| 6506 | −45 deg |

Parameters for the phase plates are as follows.

TABLE 44

| Ref # of phase plate | d*(na-nb) | d*(na-nc) | Angle of na axis |
|---|---|---|---|
| 6502 | 154 nm | 0 nm | 9.4 deg |
| 6503 | 154 nm | 0 nm | −9.4 deg |
| 6504 | 113 nm | −260 nm | 45 deg |

As in Example 9, the liquid crystal display device of the present example has very good viewing angle characteristics.

EXAMPLE 15

Example 5 employs the phase plates 6204 and 6205 so as to compensate for the degradation of black display due to a change in retardation of the liquid crystal layer 6201, the phase plate 6202 and 6203 associated with an inclined viewing angle. The polarizing plate used in the present invention may be provided with a protective film made of a material such as TAC on a surface thereof. When TAC, or the like, having a refractive index anisotropy is used as a material protecting the polarizing plate, it may be necessary to consider the refractive index anisotropy of TAC when designing the optical system for suppressing the degradation of black display associated with an inclined viewing angle. The viewing angle characteristics can be improved by appropriately selecting the retardation values for the phase plates 6204 and 6205 to compensate for the degradation of black display, while considering the change in retardation value of TAC as well as the change in retardation values of the phase plates 6202 and 6203. In this and following examples, TAC is employed and considered as an independent phase difference compensator (phase plate).

The present example will be described with reference to FIG. 31. FIG. 31 illustrates a liquid crystal cell 2401, phase plates 2402, 2403, 2404 and 2405, and polarizing plates 2408 and 2409. FIG. 31 also illustrates TACs 2406 and 2407 provided for the purpose of protecting the polarizing plates. Since TAC has a refractive index anisotropy, each TAC between a polarizing plate and the liquid crystal cell is shown in FIG. 31 to be an independent phase plate.

The liquid crystal cell 2401 is divided into two regions A and B having different orientations. The orientation parameters for the regions are as follows.

TABLE 45

| Region | Area in percent for the entire pixel | Retardation value | Twist angle | Orientation |
|---|---|---|---|---|
| A | 50% | 260 nm | 0 deg | 90 deg |
| B | 50% | 260 nm | 0 deg | 270 deg |

Parameters for the polarizing plates are as follows.

TABLE 46

| Ref # of polarizing plate | Angle of transmission axis |
|---|---|
| 2408 | 45 deg |
| 2409 | −45 deg |

Parameters for the phase plates are as follows.

TABLE 47

| Ref # of phase plate | d*(na-nb) | d*(na-nc) | Angle of na axis |
|---|---|---|---|
| 2402 | 130 nm | 0 nm | 0 deg |
| 2403 | 130 nm | 0 nm | 0 deg |
| 2404 | 92 nm | −92 nm | −45 deg |
| 2405 | 92 nm | −92 nm | 45 deg |
| 2406 | 5 nm | 50 nm | −45 deg |
| 2407 | 5 nm | 50 nm | 45 deg |

Figure 32:
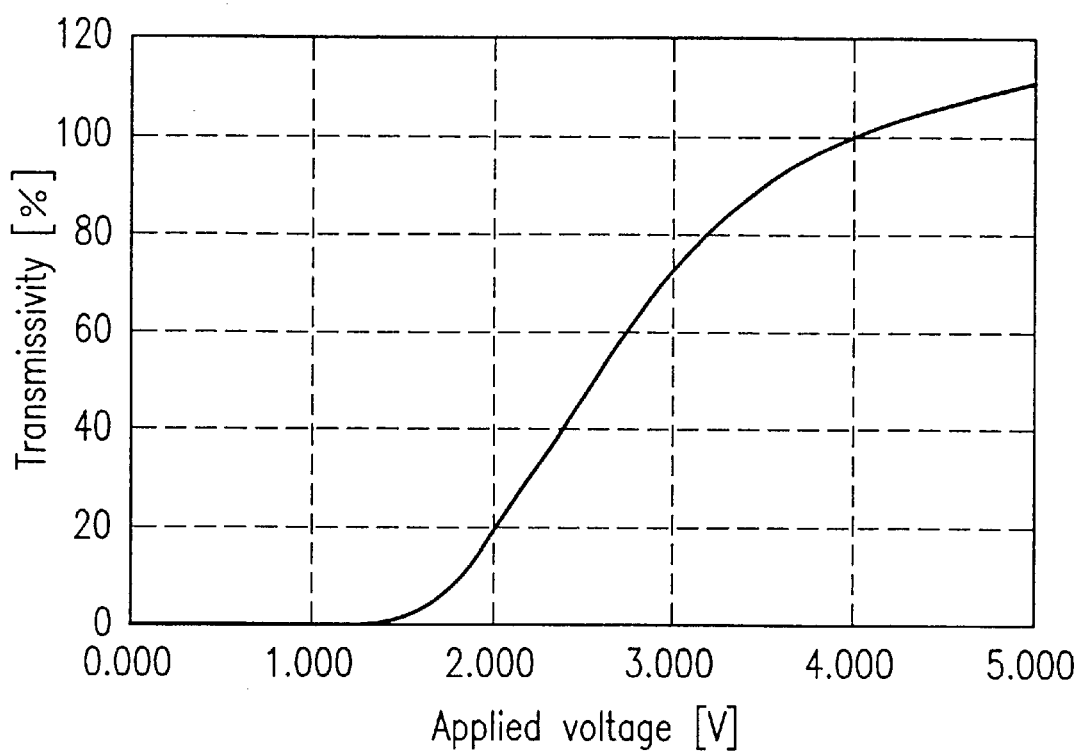
FIG. 32 is a graph illustrating the relationship between the transmissivity as viewed from the normal direction and the applied voltage in a liquid crystal display device according to Example 15.
Figure 33:
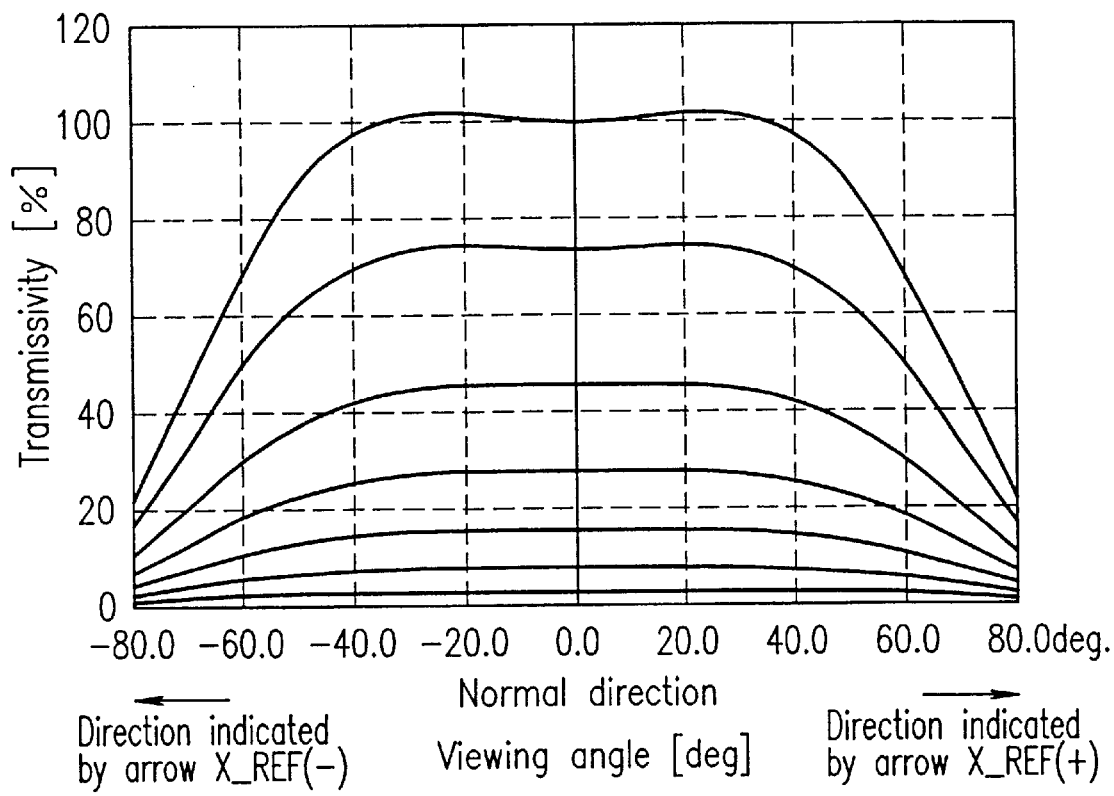
FIG. 33 is a graph illustrating a change in transmissivity for various gray scale levels with respect to a change in the viewing angle along the X_REF axis direction in an 8-gray-scale-level display produced by a liquid crystal display device according to Example 15.
Figure 34:
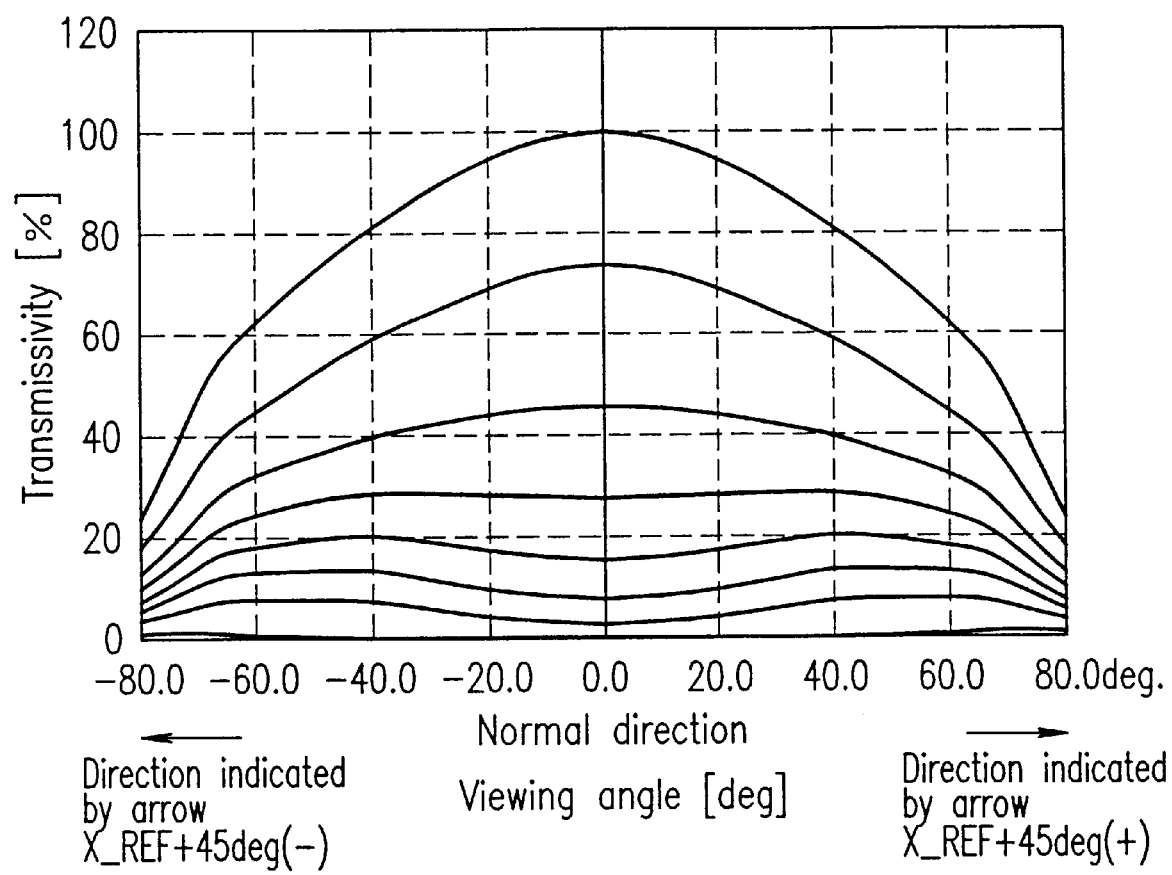
FIG. 34 is a graph illustrating a change in transmissivity for various gray scale levels with respect to a change in the viewing angle along the X_REF+45° axis direction in an 8-gray-scale-level display produced by a liquid crystal display device according to Example 15.
Figure 35:
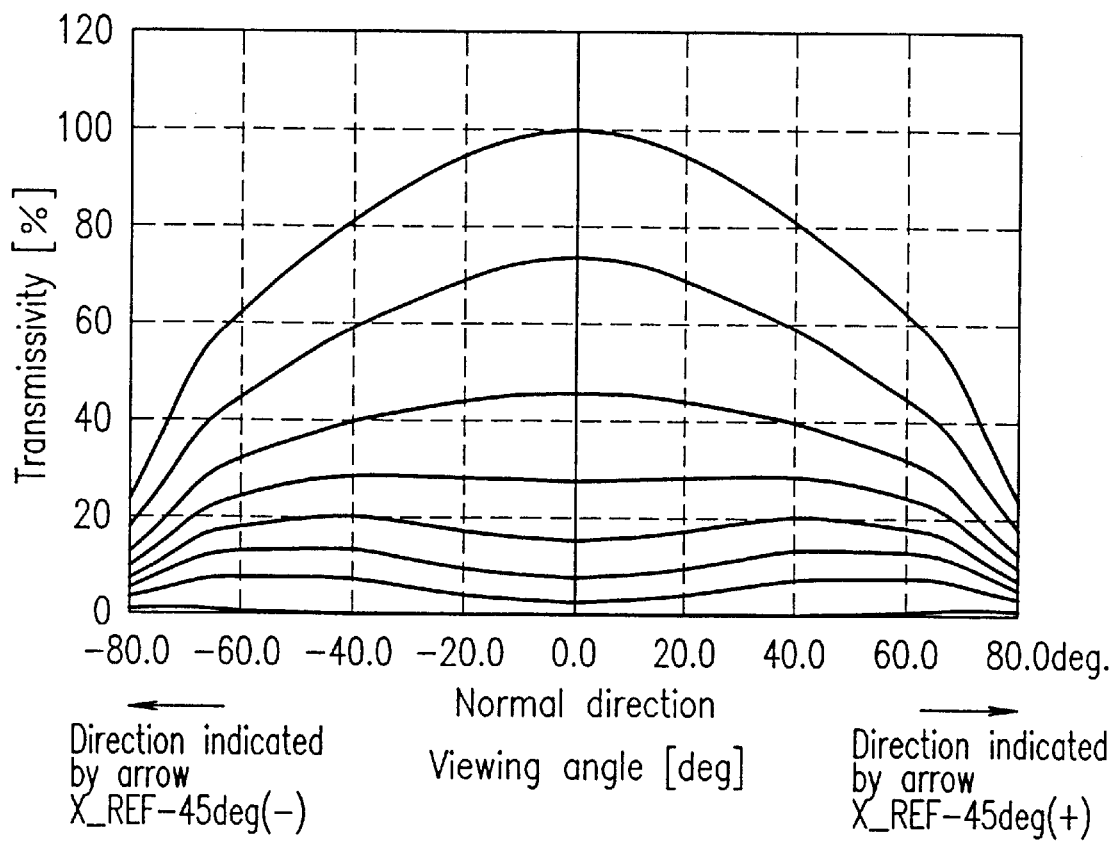
FIG. 35 is a graph illustrating a change in transmissivity for various gray scale levels with respect to a change in the viewing angle along the X_REF−45° axis direction in an 8-gray-scale-level display produced by a liquid crystal display device according to Example 15.
Figure 36:
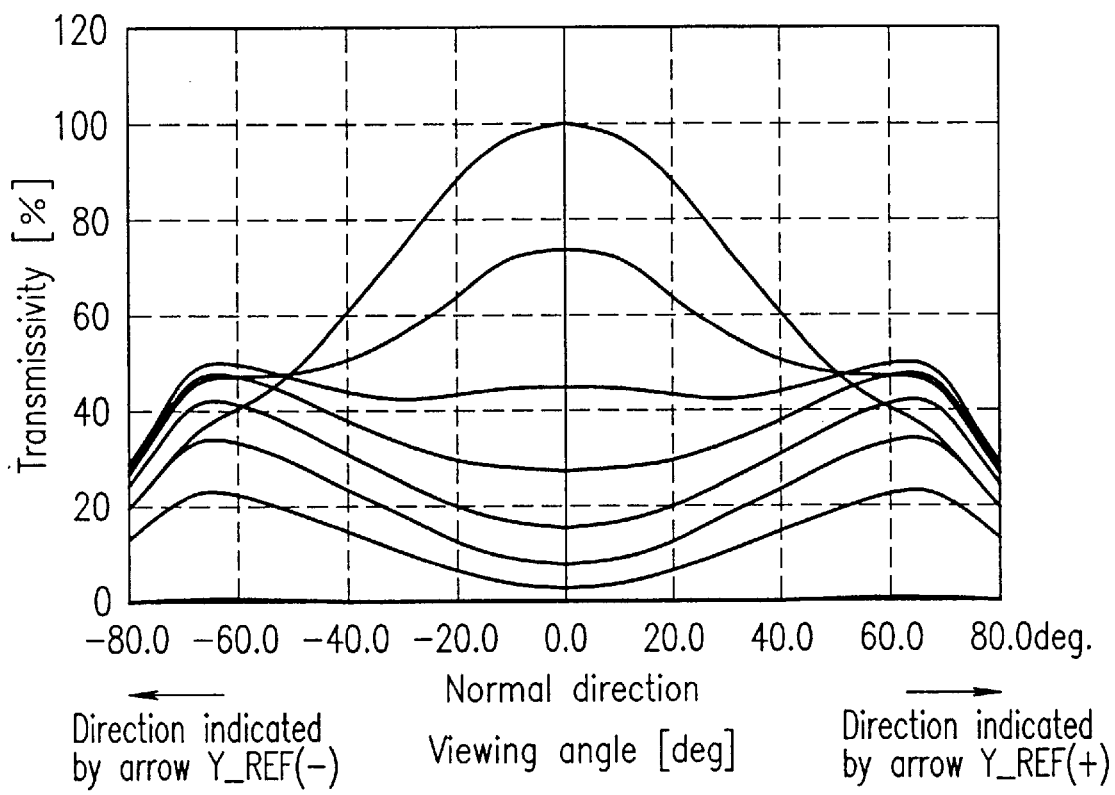
FIG. 36 is a graph illustrating a change in transmissivity for various gray scale levels with respect to a change in the viewing angle along the Y_REF axis direction in an 8-gray-scale-level display produced by a liquid crystal display device according to Example 15.

FIG. 32 illustrates the relationship between the transmissivity and the applied voltage in the liquid crystal display device of the present example. In FIG. 32, a transmissivity of 100% corresponds to the transmissivity for an applied voltage of about 4 V. It can be seen from FIG. 32 that the liquid crystal display device of the present example produces a black display at an applied voltage of 0 V, and the transmissivity increases (toward a white display) as the applied voltage increases.

Each of FIGS. 33–36 illustrates the viewing angle (polar angle: an angle with respect to the normal to the display plane) dependency of the transmissivity for various gray scale levels in an 8-gray-scale-level display. The viewing angle is shifted along a direction parallel to the X_REF axis in FIG. 33, along a direction parallel to the X_REF±45° axis in FIG. 34, along a direction parallel to the X_REF−45° axis in FIG. 35, and along a direction parallel to the Y_REF axis in FIG. 36. It can be seen from the figures that the gray scale characteristics of the liquid crystal display device of the present example are substantially symmetric.

Figure 37:
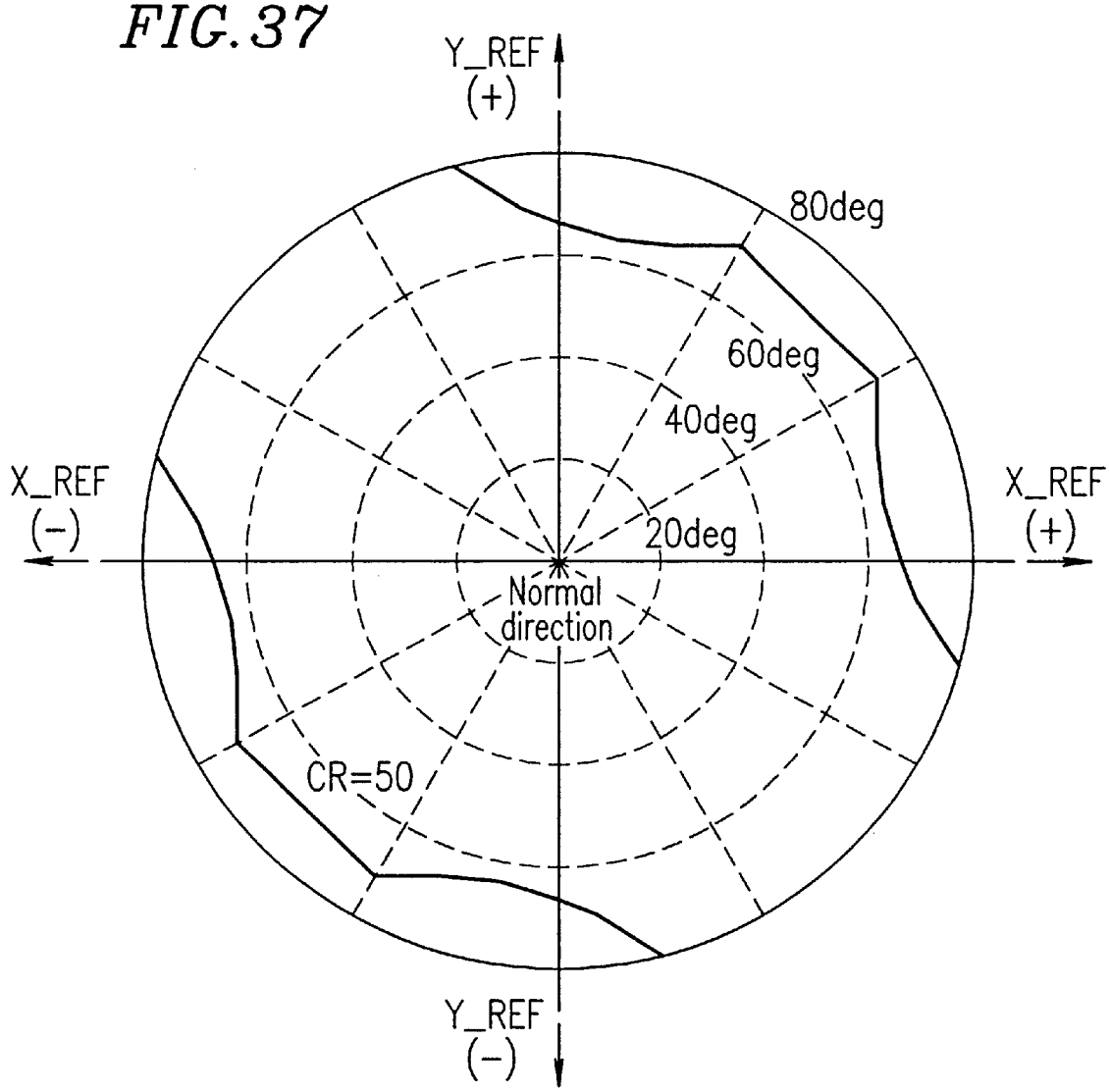
FIG. 37 is an isocontrast contour curve for a liquid crystal display device according to Example 15.

FIG. 37 illustrates an isocontrast diagram based on values (contrast ratios) obtained by dividing the transmissivity for an applied voltage of 4 V by the transmissivity for an applied voltage of 0 V. The center of the circle corresponds to a viewing angle normal to the display plane (viewing angle 0°), and the concentric circles about the center respectively correspond to various viewing angles of 20°, 40°, 60° and 80°, from the innermost circle. The horizontal axis and the vertical axis represent X_REF and Y_REF, respectively. The isocontrast curve corresponds to a contrast ratio (CR) of about 50. As is apparent from FIG. 37, the liquid crystal display device of the present example realizes a contrast ratio of about 50 or more in a wide range of viewing angles even over about 60° in any azimuth angle, indicating that the liquid crystal display device has desirable viewing angle characteristics.

Although Example 15 is based on the various conditions shown in Tables 45–47, the effective conditions of the present invention are not limited to these conditions. In particular, the above-described effects can be obtained as long as the liquid crystal display device has a liquid crystal layer in which the liquid crystal molecules are in a substantially horizontal orientation in the absence of an applied voltage and which exhibits at least two different orientations in the presence of an applied voltage, while the liquid crystal display device employs a phase difference compensator which is designed to compensate for the refractive index anisotropy exhibited by the liquid crystal layer in the absence of an applied voltage substantially in any direction.

Figure 38:
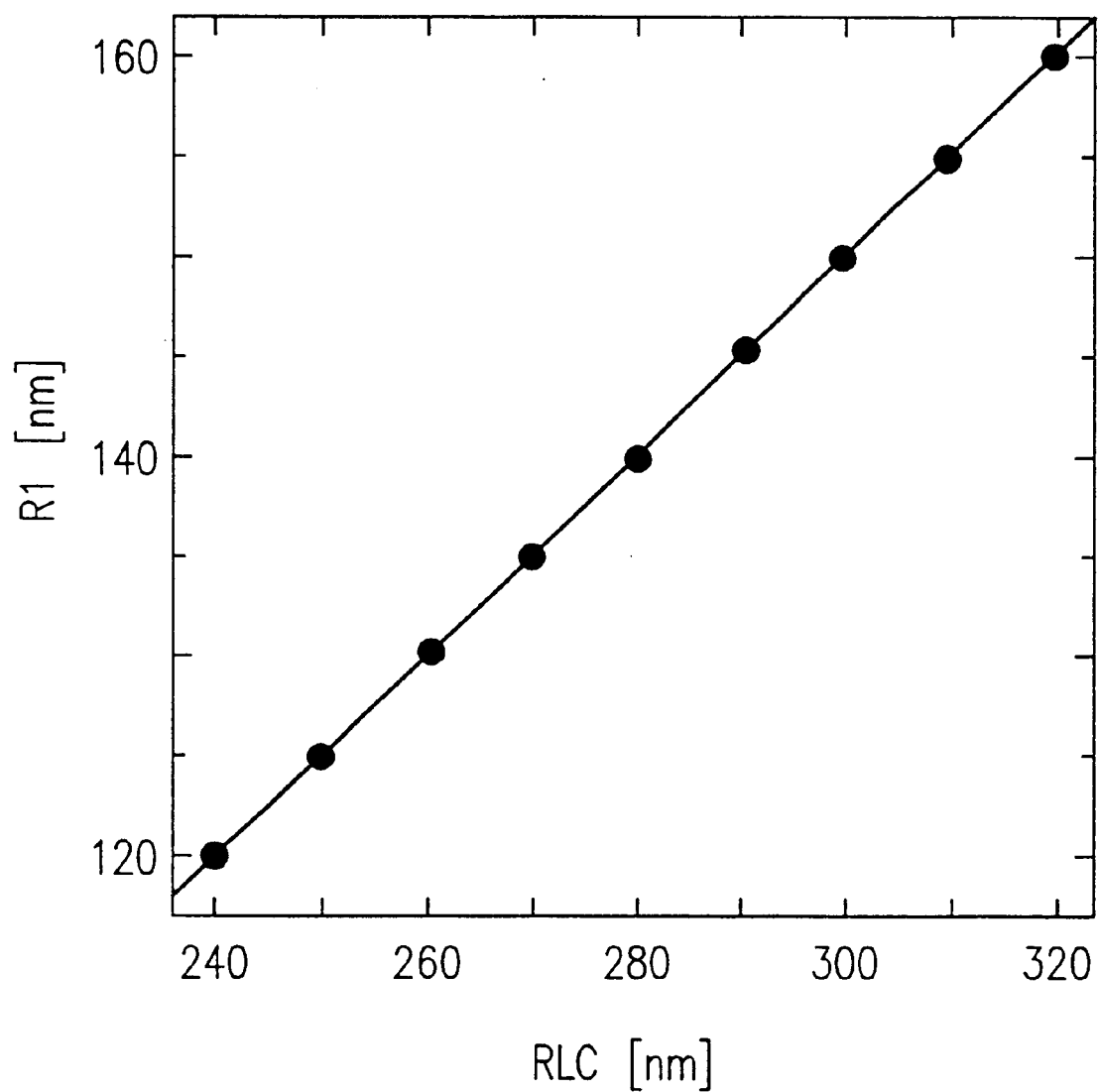
FIG. 38 is a graph showing the optimal value of the retardation value d·(na−nb) (R1) of the phase difference compensators 2402 and 2403 with respect to the retardation value d·Δn(RLC) of the liquid crystal cell according to Example 15.

For example, it is possible to appropriately select the most suitable phase plate for any of various retardation values of a liquid crystal layer in a liquid crystal display device having a structure as illustrated in FIG. 31. Such a selection for the phase plates will be described with reference to FIGS. 38–40. In FIG. 38, the horizontal axis RLC represents a retardation value of the liquid crystal layer (see Table 45), the vertical axis R1 represents the retardation value d·(na−nb) (=R1) of the phase difference compensator 2402 and 2403 illustrated in FIG. 31, and the line/curve in the figure represents the most suitable value for R1 for various retardation values of the liquid crystal layer.

Figure 39:
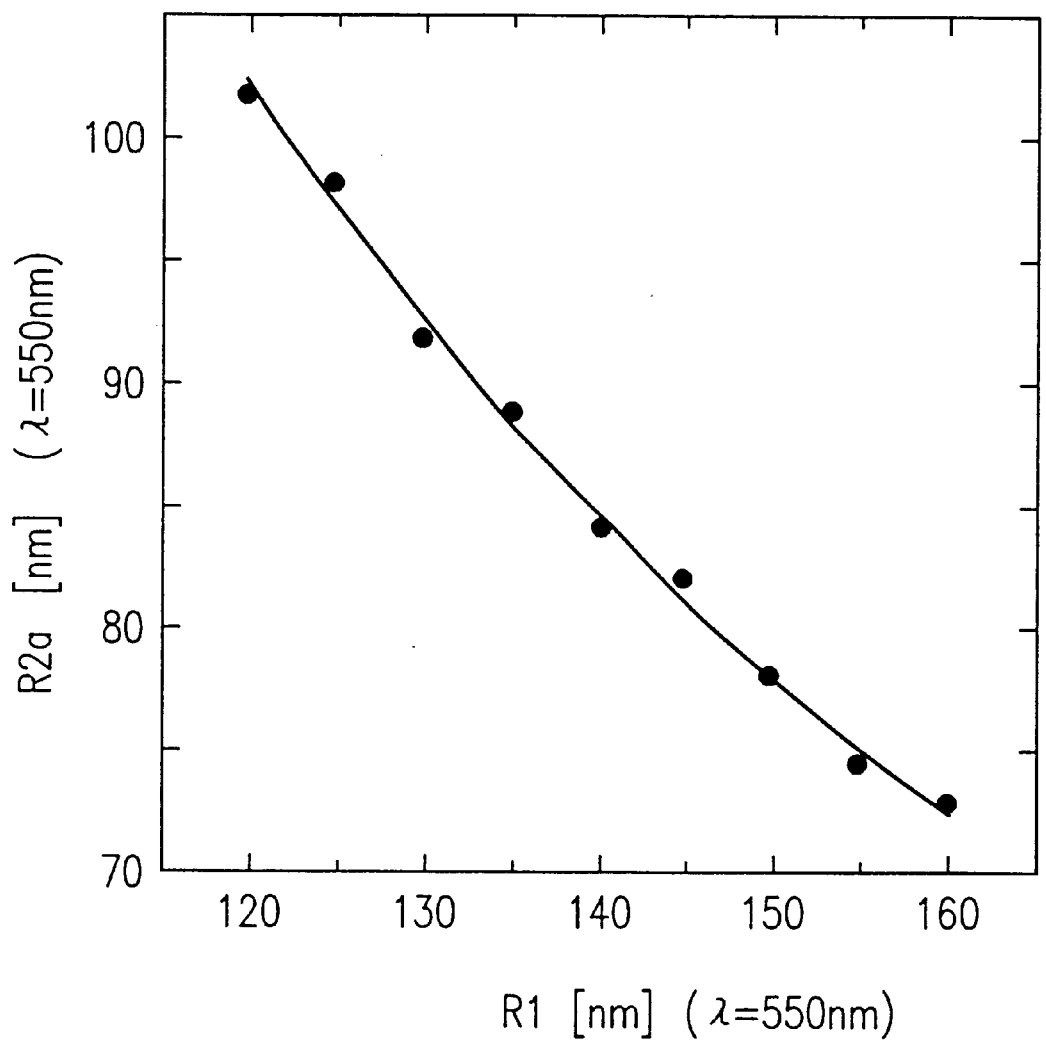
FIG. 39 is a graph showing the optimal value of the retardation value d·(na−nb) (R2a) of the phase difference compensators 2404 and 2405 with respect to the retardation value d·(na−nb) (R1) of the phase difference compensators 2402 and 2403 according to Example 15.

In FIG. 39, the horizontal axis represents the above-described value R1, the vertical axis R2a represents the retardation value d·(na−nb) of the phase plates 2404 and 2405, and the line/curve in the figure represents the most suitable value for R2a for various values of R1.

Figure 40:
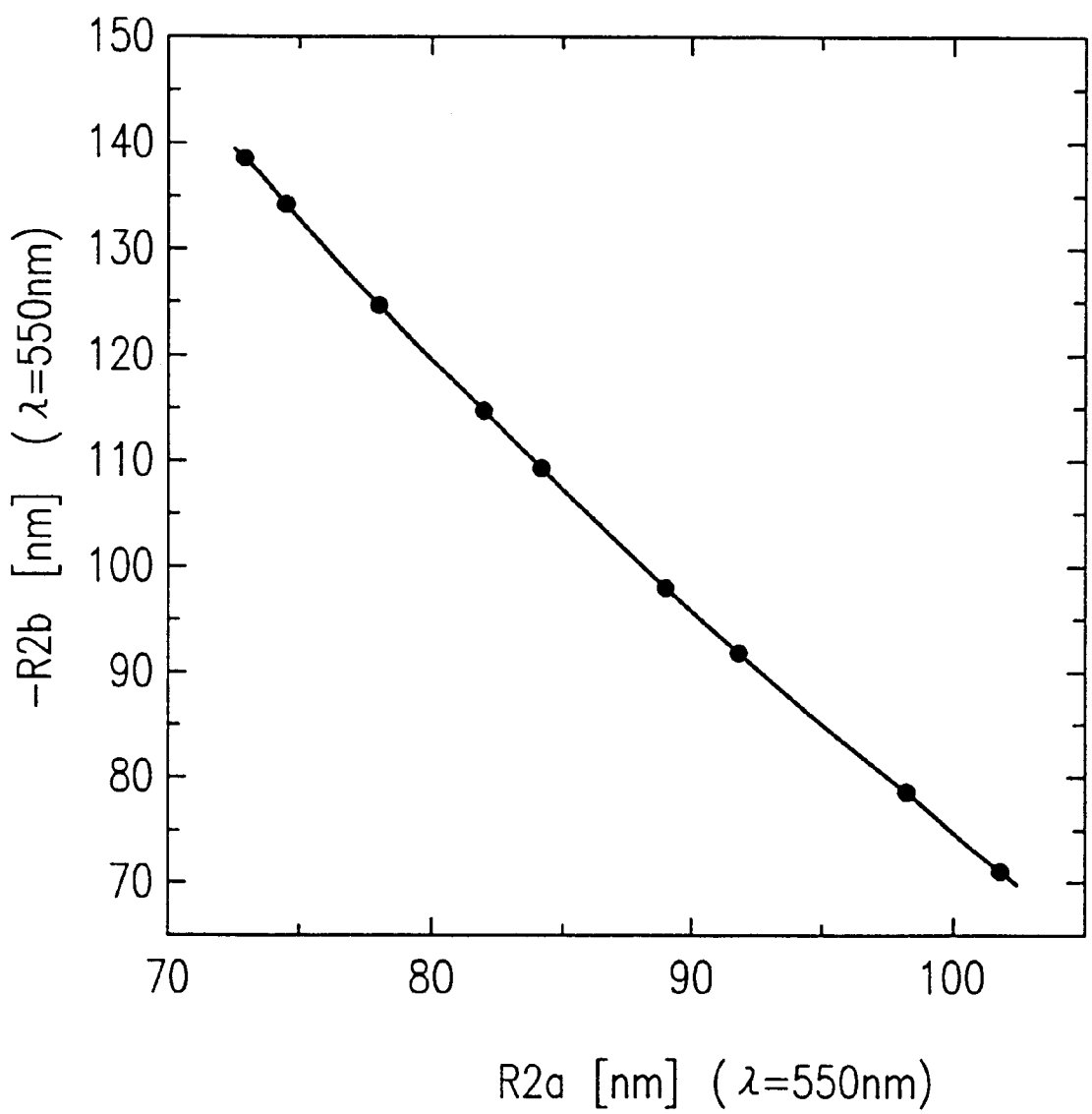
FIG. 40 is a graph showing the optimal value of the retardation value −d·(na−nc) (−R2b) of the phase difference compensators 2404 and 2405 with respect to the retardation value d·(na−nb) (R2a) of the phase difference compensators 2404 and 2405 according to Example 15.

In FIG. 40, the horizontal axis represents the above-described value R2a, the vertical axis −R2b represents the retardation value −d·(na−nc) of the phase plates 2404 and 2405, and the line/curve in the figure represents the most suitable value for R2b for various values of R2a.

Substantially any liquid crystal display device having the retardation value as shown in FIGS. 38–40 exhibits good viewing angle characteristics. Thus, the effective range of retardation value of the present invention is not limited to those described in the examples above, but it is possible to obtain desirable viewing angle characteristics by appropriately setting the retardation value of the liquid crystal layer and that of the phase difference compensator. The effects of the present invention can be sufficiently realized when the retardation value of the liquid crystal layer is in the range of about 240 nm to about 320 nm.

Moreover, the effective conditions of the present invention are not limited to those shown in FIGS. 38–40. This is because the lines/curves shown in FIGS. 38 and 39 are obtained by optimizing the retardation values for the liquid crystal cell based on the retardation values of the polarizing plate protecting TACs 2406 and 2407 as shown in Table 47; therefore, the lines/curves shown in FIGS. 38 and 39 may change when the polarizing plate protecting material and thus the retardation value thereof, or the like, is changed. Moreover, the line/curve shown in FIG. 38 only holds for the twist angles and orientations shown in Table 45 and the angles of the na axes of the phase plates 2402 and 2403. Thus, the line/curve of FIG. 37 may change as these values change. Furthermore, the line/curve of FIG. 38 holds as long as the liquid crystal cell 2401 produces a black display in the absence of an applied voltage. Using a Poincare' sphere, there are typically a countless number of phase difference compensator settings which provide the above-described effect, for various liquid crystal orientations (the twist angle, the orientation). Even then, by using the phase difference compensator 2402 and 2403, or other phase difference compensators, it is possible to suppress the degradation of black display in an inclined viewing angle in the absence of an applied voltage, thereby obtaining desirable viewing angle characteristics. It has been particularly illustrated that the black display is suppressed in various examples above. Moreover, it will be briefly discussed in Example 16 below that there are a countless number of combinations and arrangements of a liquid crystal cell, phase difference compensators, and polarizing plates with which the normally black mode characteristics can be obtained.

EXAMPLES 15-A TO 15-D AND COMPARATIVE EXAMPLES 15-E TO 15-H

In Example 15, the three pairs of phase difference compensators (2402, 2403), (2404, 2405) and (2406, 2407), each pair having the same refractive index anisotropy, are provided to interpose the liquid crystal cell 2401 therebetween. In Examples 15-A to 15-D and Comparative Examples 15-E to 15-H, the effect of providing omitting one phase difference compensator from one or more pairs of phase difference compensators. However, both of the TACs for protecting polarizing plates, i.e., the phase plates 2406 and 2407 are always provided on the respective sides of the liquid crystal cell in any of the examples.

Table 48 below shows the arrangement (presence/absence) of the respective phase difference compensators for each of the examples.

TABLE 48

| Example # | 2402 | 2403 | 2404 | 2405 | 2406 | 2407 | Viewing angle characteristics |
|---|---|---|---|---|---|---|---|
| Example 15 | Yes | Yes | Yes | Yes | Yes | Yes | ⊙ |
| Example 15-A | Yes | Yes | Yes | No | Yes | Yes | ○ |
| Example 15-B | Yes | Yes | No | Yes | Yes | Yes | ○ |
| Example 15-C | No | Yes | Yes | Yes | Yes | Yes | ○ |
| Example 15-D | Yes | No | Yes | Yes | Yes | Yes | ○ |
| Comparative example 15-E | No | Yes | Yes | No | Yes | Yes | x |
| Comparative example 15-F | No | Yes | No | Yes | Yes | Yes | x |

TABLE 48-continued

| Example # | 2402 | 2403 | 2404 | 2405 | 2406 | 2407 | Viewing angle characteristics |
|---|---|---|---|---|---|---|---|
| Comparative example 15-G | Yes | No | Yes | No | Yes | Yes | x |
| Comparative example 15-H | Yes | No | No | Yes | Yes | Yes | x |

EXAMPLE 15-A

A structure of a liquid crystal display device according to Example 15-A will be described below. The basic structure of the liquid crystal display device is as illustrated in FIG. 31, except that the phase difference compensator 2405 is omitted as shown in Table 48.

First, the parameters for the liquid crystal cell are shown in Table 49 below.

TABLE 49

| Region | Area in percent for the entire pixel | Retardation value | Twist angle | Orientation |
|---|---|---|---|---|
| A | 50% | 260 nm | 0 deg | 90 deg |
| B | 50% | 260 nm | 0 deg | 270 deg |

Next, the parameters for the polarizers are shown in Table 50 below.

TABLE 50

| Ref # of polarizing plate | Angle of transmission axis |
|---|---|
| 2408 | 45 deg |
| 2409 | −45 deg |

Finally, the parameters for the phase difference compensators are shown in Table 51 below.

TABLE 51

| Ref # of phase plate | d*(na-nb) | d*(na-nc) | Angle of na axis |
|---|---|---|---|
| 2402 | 130 nm | 0 nm | 0 deg |
| 2403 | 130 nm | 0 nm | 0 deg |
| 2404 | 184 nm | −184 nm | −45 deg |
| 2405 | - - - Not provided - - - | | |
| 2406 | 5 nm | 50 nm | −45 deg |
| 2407 | 5 nm | 50 nm | 45 deg |

Figure 41:
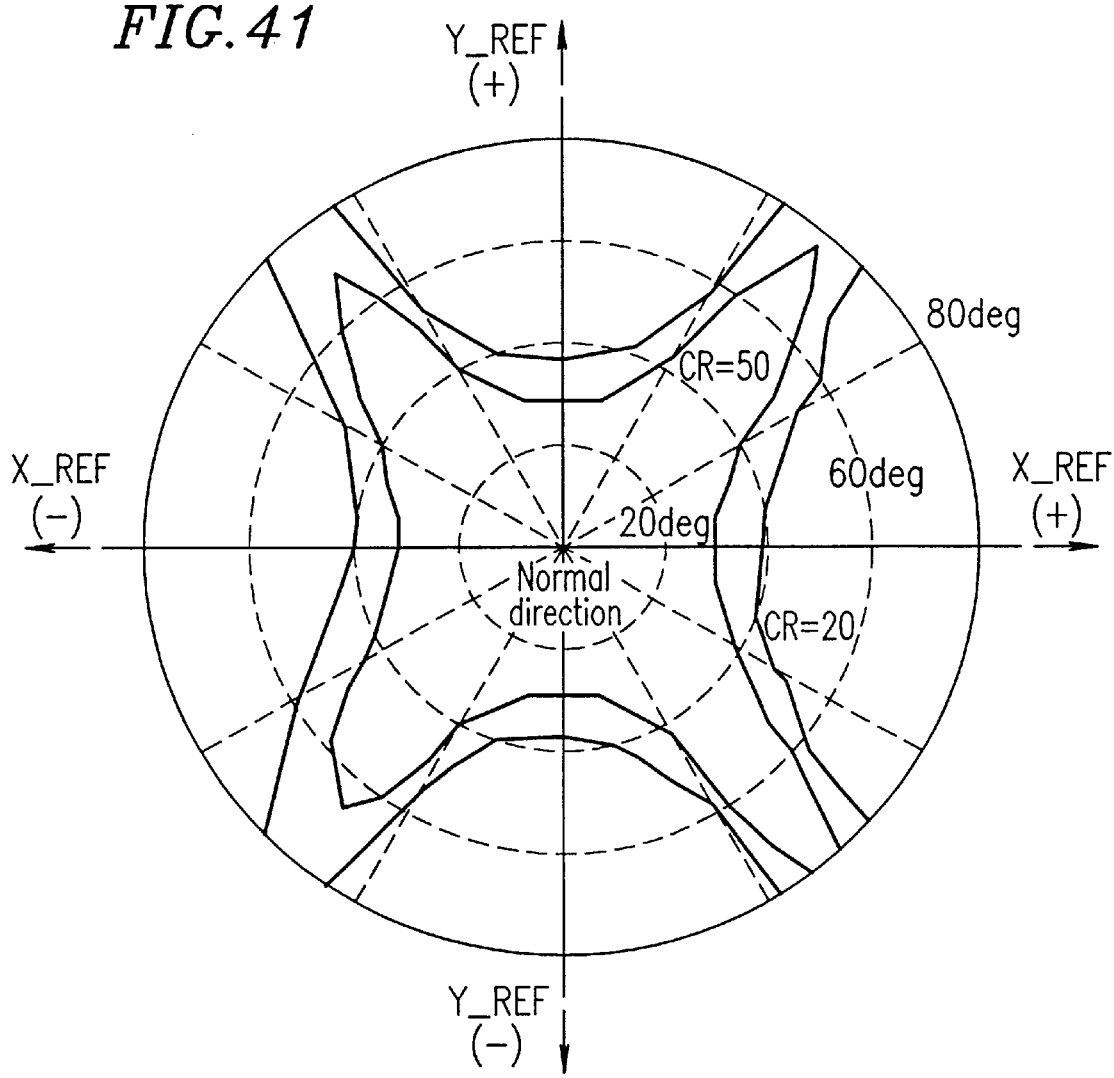
FIG. 41 is an isocontrast contour curve for a liquid crystal display device according to Example 15-A.

FIG. 41 illustrates an isocontrast contour curve based on values obtained by dividing the transmissivity for an applied voltage of 4 V by the transmissivity for an applied voltage of 0 V in the liquid crystal display device of Example 15-A.

EXAMPLE 15-B

The structure of a liquid crystal display device according to Example 15-B will be described below. The basic structure of the liquid crystal display device is as illustrated in FIG. 31, except that the phase difference compensator 2404 is omitted as shown in Table 48.

First, the parameters for the liquid crystal cell are shown in Table 52 below.

TABLE 52

| Region | Area in percent for the entire pixel | Retardation value | Twist angle | Orientation |
|---|---|---|---|---|
| A | 50% | 260 nm | 0 deg | 90 deg |
| B | 50% | 260 nm | 0 deg | 270 deg |

Next, the parameters for the polarizers are shown in Table 53 below.

TABLE 53

| Ref # of polarizing plate | Angle of transmission axis |
|---|---|
| 2408 | 45 deg |
| 2409 | −45 deg |

Finally, the parameters for the phase difference compensators are shown in Table 54 below.

TABLE 54

| Ref # of phase plate | d*(na-nb) | d*(na-nc) | Angle of na axis |
|---|---|---|---|
| 2402 | 130 nm | 0 nm | 0 deg |
| 2403 | 130 nm | 0 nm | 0 deg |
| 2404 | - - - Not provided - - - | | |
| 2405 | 184 nm | −184 nm | 45 deg |
| 2406 | 5 nm | 50 nm | −45 deg |
| 2407 | 5 nm | 50 nm | 45 deg |

Figure 42:
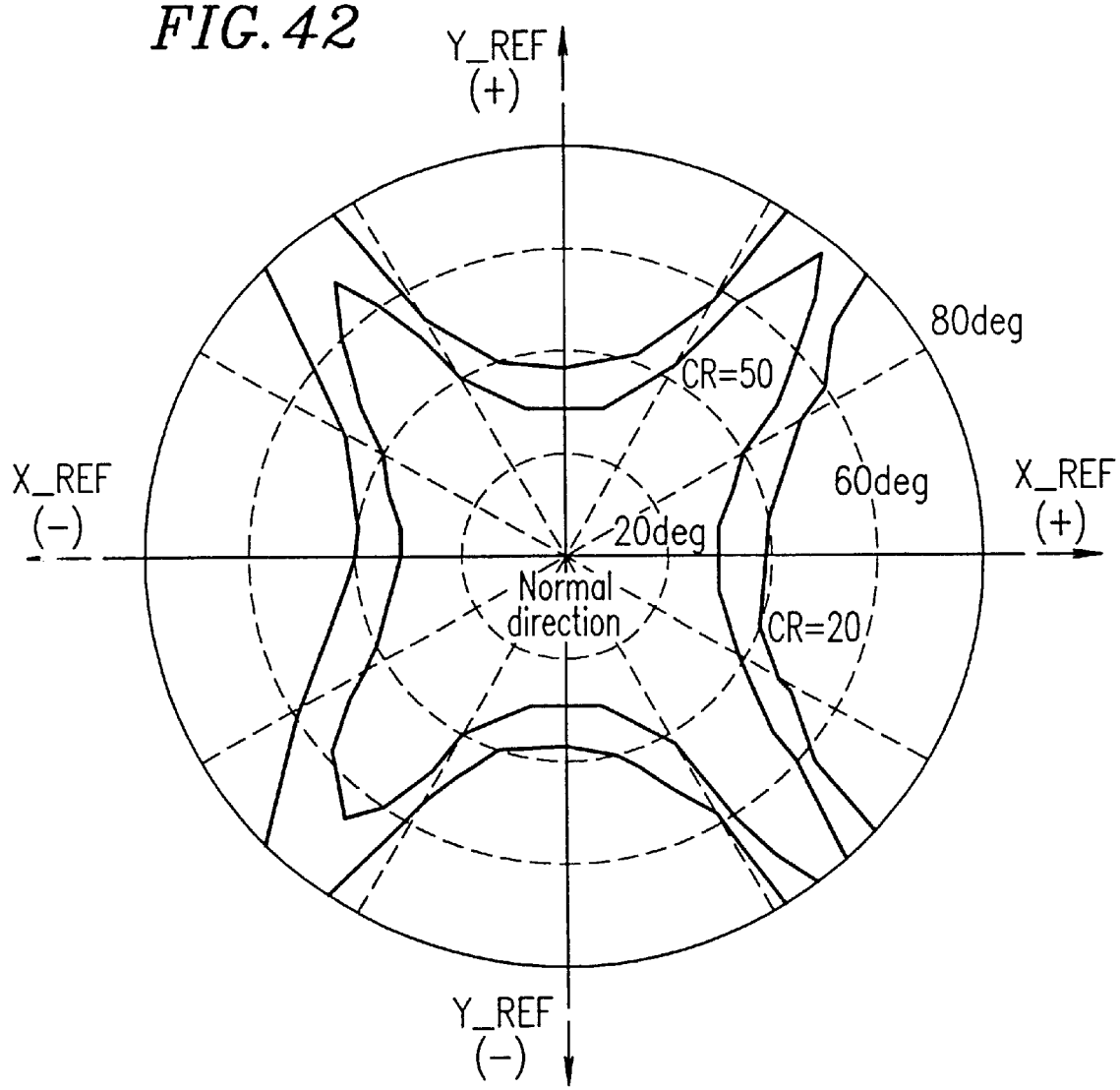
FIG. 42 is an isocontrast contour curve for a liquid crystal display device according to Example 15-B.

FIG. 42 illustrates an isocontrast contour curve based on values obtained by dividing the transmissivity for an applied voltage of 4 V by the transmissivity for an applied voltage of 0 V in the liquid crystal display device of Example 15-B.

EXAMPLE 15-C

The structure of a liquid crystal display device according to Example 15-C will be described below. The basic structure of the liquid crystal display device is as illustrated in FIG. 31, except that the phase difference compensator 2402 is omitted as shown in Table 48.

First, the parameters for the liquid crystal cell are shown in Table 55 below.

TABLE 55

| Region | Area in percent for the entire pixel | Retardation value | Twist angle | Orientation |
|---|---|---|---|---|
| A | 50% | 260 nm | 0 deg | 90 deg |
| B | 50% | 260 nm | 0 deg | 270 deg |

Next, the parameters for the polarizers are shown in Table 56 below.

TABLE 56

| Ref # of polarizing plate | Angle of transmission axis |
|---|---|
| 2408 | 45 deg |
| 2409 | −45 deg |

Finally, the parameters for the phase difference compensators are shown in Table 57 below.

TABLE 57

| Ref # of phase plate | d*(na-nb) | d*(na-nc) | Angle of na axis |
|---|---|---|---|
| 2402 | - - - Not provided - - - | | |
| 2403 | 260 nm | 0 nm | 0 deg |
| 2404 | 92 nm | −92 nm | −45 deg |
| 2405 | 92 nm | −92 nm | 45 deg |
| 2406 | 5 nm | 50 nm | −45 deg |
| 2407 | 5 nm | 50 nm | 45 deg |

Figure 43:
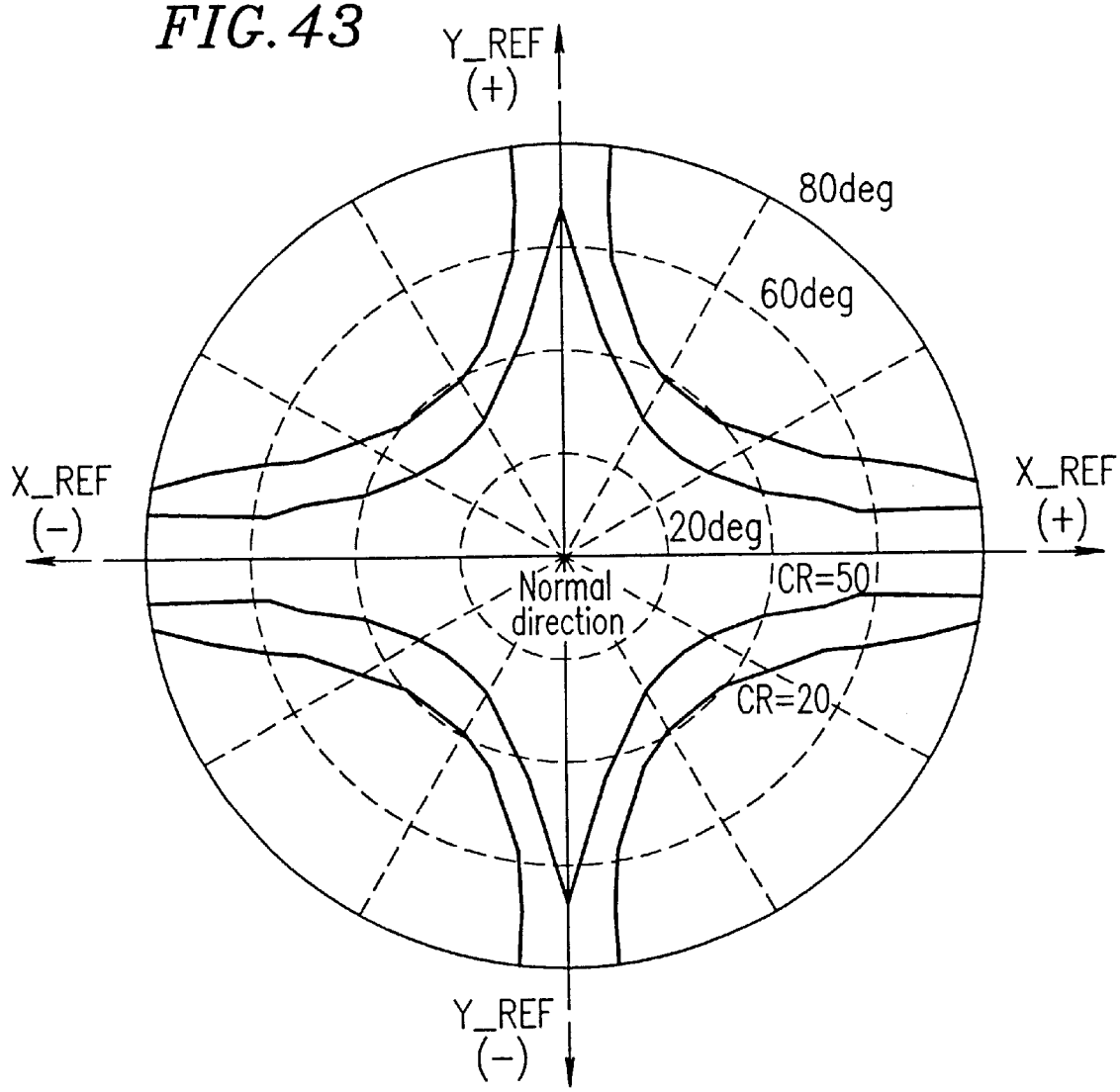
FIG. 43 is an isocontrast contour curve for a liquid crystal display device according to Example 15-C.

FIG. 43 illustrates an isocontrast contour curve based on values obtained by dividing the transmissivity for an applied voltage of 4 V by the transmissivity for an applied voltage of 0 V in the liquid crystal display device of Example 15-C.

EXAMPLE 15-D

The structure of a liquid crystal display device according to Example 15-D will be described below. The basic structure of the liquid crystal display device is as illustrated in FIG. 31, except that the phase difference compensator 2403 is omitted as shown in Table 48.

First, the parameters for the liquid crystal cell are shown in Table 58 below.

TABLE 58

| Region | Area in percent for the entire pixel | Retardation value | Twist angle | Orientation |
|---|---|---|---|---|
| A | 50% | 260 nm | 0 deg | 90 deg |
| B | 50% | 260 nm | 0 deg | 270 deg |

Next, the parameters for the polarizers are shown in Table 59 below.

TABLE 59

| Ref # of polarizing plate | Angle of transmission axis |
|---|---|
| 2408 | 45 deg |
| 2409 | −45 deg |

Finally, the parameters for the phase difference compensators are shown in Table 60 below.

TABLE 60

| Ref # of phase plate | d*(na-nb) | d*(na-nc) | Angle of na axis |
|---|---|---|---|
| 2402 | 260 nm | 0 nm | 0 deg |
| 2403 | - - - Not provided - - - | | |
| 2404 | 92 nm | −92 nm | −45 deg |
| 2405 | 92 nm | −92 nm | 45 deg |
| 2406 | 5 nm | 50 nm | −45 deg |
| 2407 | 5 nm | 50 nm | 45 deg |

Figure 44:
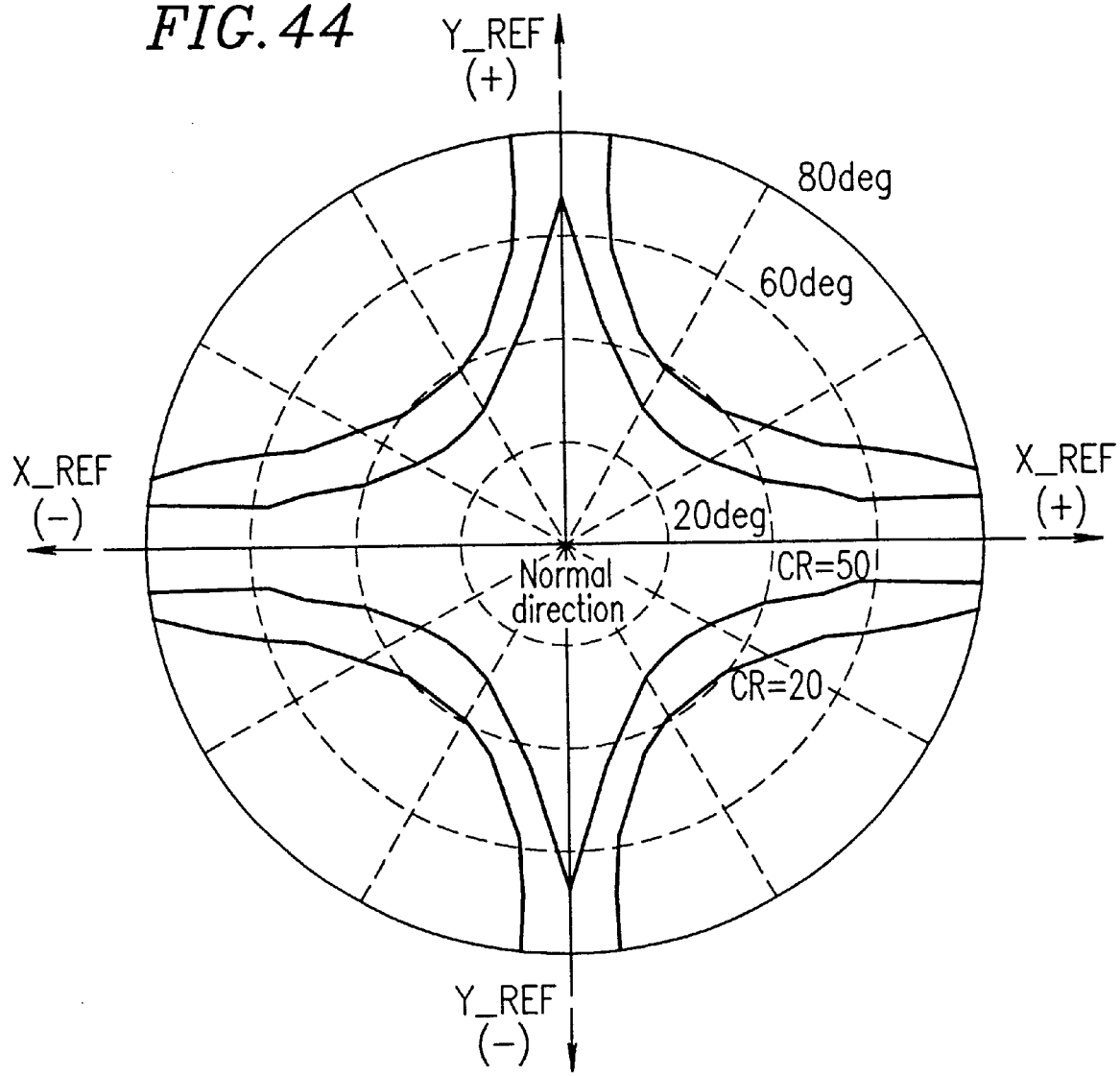
FIG. 44 is an isocontrast contour curve for a liquid crystal display device according to Example 15-D.

FIG. 44 illustrates an isocontrast contour curve based on values obtained by dividing the transmissivity for an applied voltage of 4 V by the transmissivity for an applied voltage of 0 V in the liquid crystal display device of Example 15-D.

EXAMPLE 15-E

The structure of a liquid crystal display device according to Example 15-E will be described below. The basic structure of the liquid crystal display device is as illustrated in FIG. 31, except that the phase difference compensators 2402 and 2405 are omitted as shown in Table 48.

First, the parameters for the liquid crystal cell are shown in Table 61 below.

TABLE 61

| Region | Area in percent for the entire pixel | Retardation value | Twist angle | Orientation |
|---|---|---|---|---|
| A | 50% | 260 nm | 0 deg | 90 deg |
| B | 50% | 260 nm | 0 deg | 270 deg |

Next, the parameters for the polarizers are shown in Table 62 below.

TABLE 62

| Ref # of polarizing plate | Angle of transmission axis |
|---|---|
| 2408 | 45 deg |
| 2409 | −45 deg |

Finally, the parameters for the phase difference compensators are shown in Table 63 below.

TABLE 63

| Ref # of phase plate | d*(na-nb) | d*(na-nc) | Angle of na axis |
|---|---|---|---|
| 2402 | - - - Not provided - - - | | |
| 2403 | 260 nm | 0 nm | 0 deg |
| 2404 | 184 nm | −184 nm | −45 deg |
| 2405 | - - - Not provided - - - | | |
| 2406 | 5 nm | 50 nm | −45 deg |
| 2407 | 5 nm | 50 nm | 45 deg |

Figure 45:
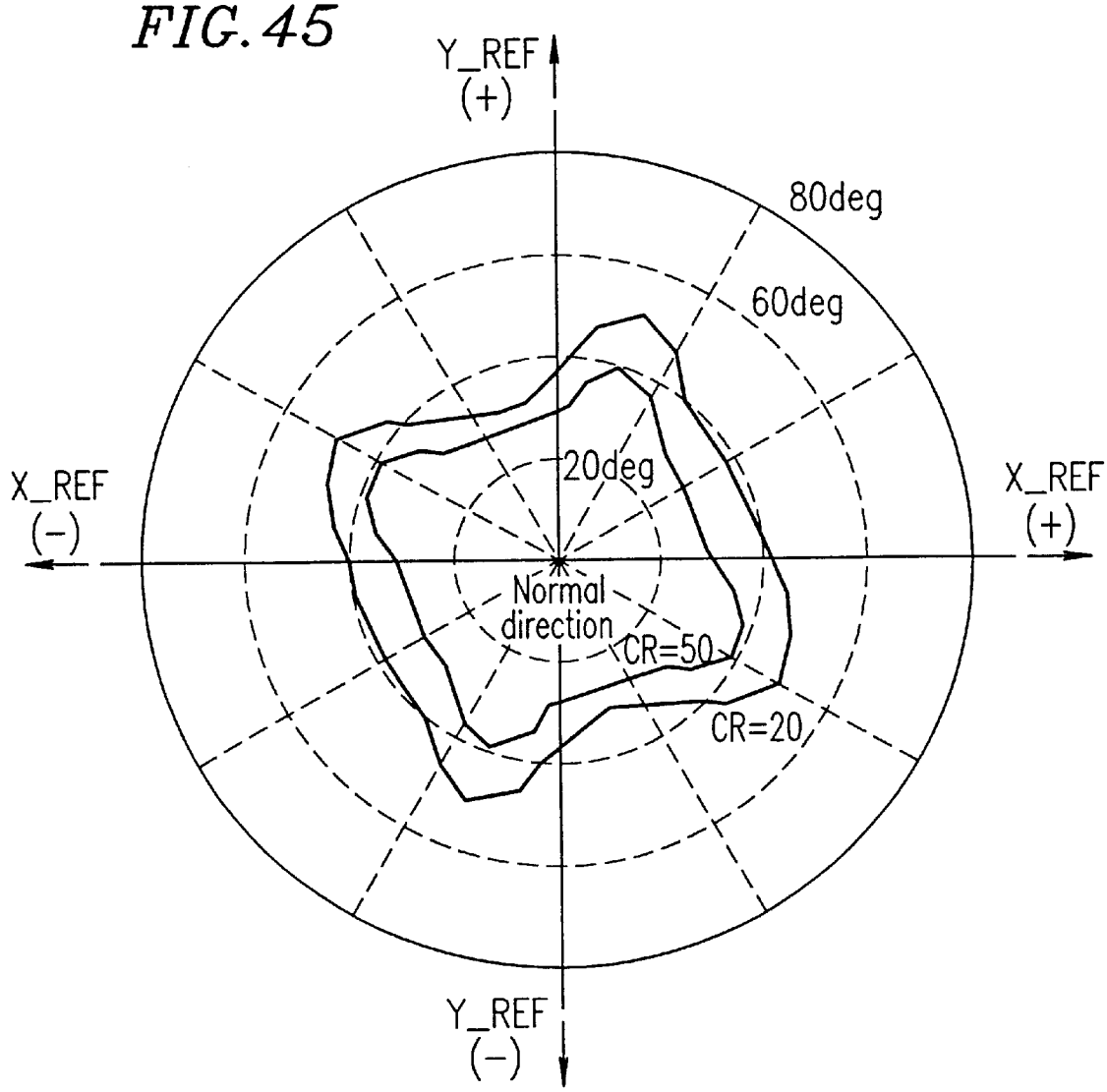
FIG. 45 is an isocontrast contour curve for a liquid crystal display device according to Example 15-E.

FIG. 45 illustrates an isocontrast contour curve based on values obtained by dividing the transmissivity for an applied voltage of 4 V by the transmissivity for an applied voltage of 0 V in the liquid crystal display device of Example 15-E.

COMPARATIVE EXAMPLE 15-F

The structure of a liquid crystal display device according to Comparative Example 15-F will be described below. The basic structure of the liquid crystal display device is as illustrated in FIG. 31, except that the phase difference compensators 2402 and 2404 are omitted as shown in Table 48.

First, the parameters for the liquid crystal cell are shown in Table 64 below.

TABLE 64

| Region | Area in percent for the entire pixel | Retardation value | Twist angle | Orientation |
|---|---|---|---|---|
| A | 50% | 260 nm | 0 deg | 90 deg |
| B | 50% | 260 nm | 0 deg | 270 deg |

Next, the parameters for the polarizers are shown in Table 65 below.

TABLE 65

| Ref # of polarizing plate | Angle of transmission axis |
|---|---|
| 2408 | 45 deg |
| 2409 | −45 deg |

Finally, the parameters for the phase difference compensators are shown in Table 66 below.

TABLE 66

| Ref # of phase plate | d*(na-nb) | d*(na-nc) | Angle of na axis |
|---|---|---|---|
| 2402 | - - - Not provided - - - | | |
| 2403 | 260 nm | 0 nm | 0 deg |
| 2404 | - - - Not provided - - - | | |
| 2405 | 184 nm | −184 nm | 45 deg |
| 2406 | 5 nm | 50 nm | −45 deg |
| 2407 | 5 nm | 50 nm | 45 deg |

Figure 46:
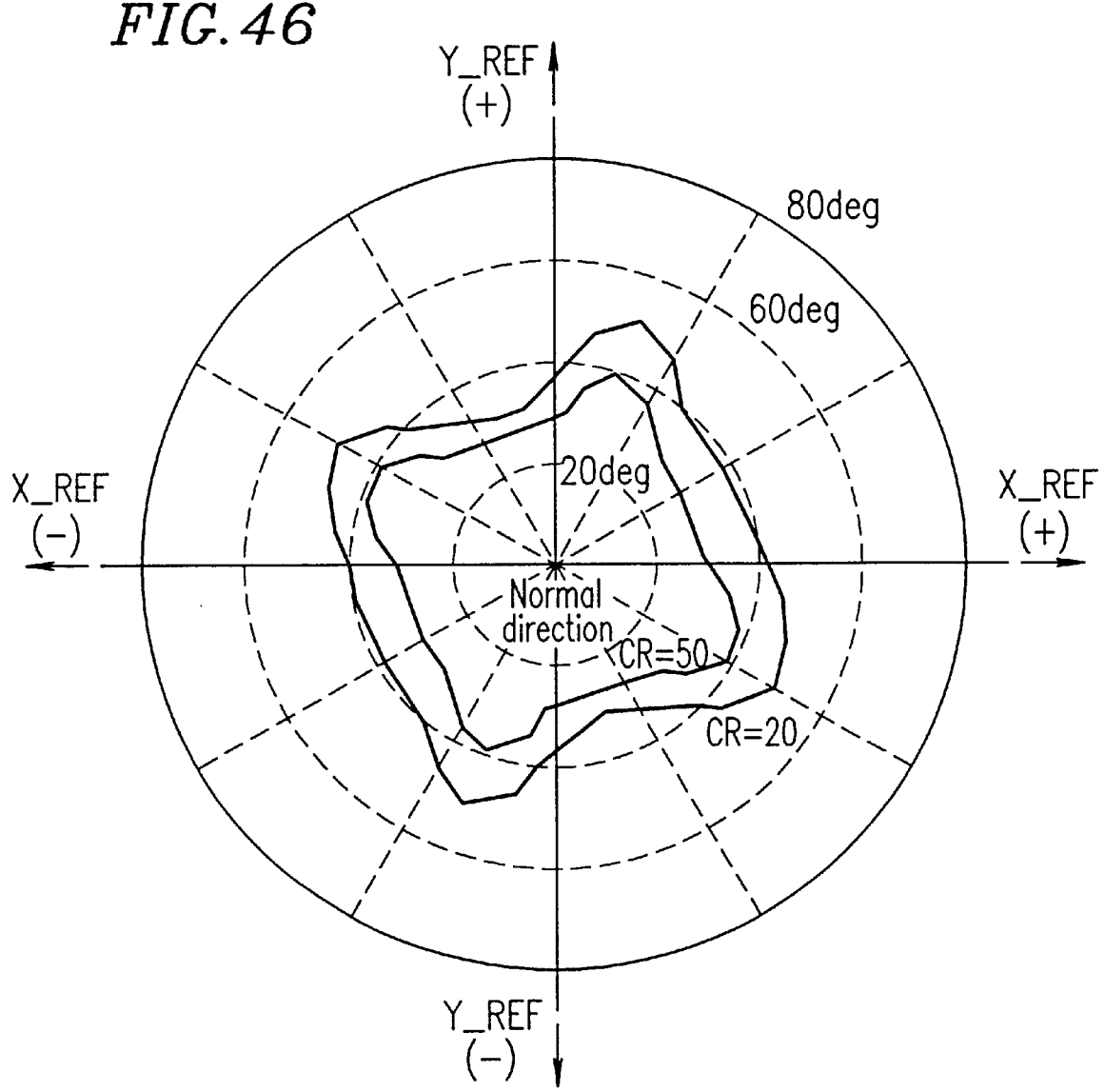
FIG. 46 is an isocontrast contour curve for a liquid crystal display device according to Example 15-F.

FIG. 46 illustrates an isocontrast contour curve based on values obtained by dividing the transmissivity for an applied voltage of 4 V by the transmissivity for an applied voltage of 0 V in the liquid crystal display device of Comparative Example 15-F.

COMPARATIVE EXAMPLE 15-G

The structure of a liquid crystal display device according to Comparative Example 15-G will be described below. The basic structure of the liquid crystal display device is as illustrated in FIG. 31, except that the phase difference compensators 2403 and 2405 are omitted as shown in Table 48.

First, the parameters for the liquid crystal cell are shown in Table 67 below.

TABLE 67

| Region | Area in percent for the entire pixel | Retardation value | Twist angle | Orientation |
|---|---|---|---|---|
| A | 50% | 260 nm | 0 deg | 90 deg |
| B | 50% | 260 nm | 0 deg | 270 deg |

Next, the parameters for the polarizers are shown in Table 68 below.

TABLE 68

| Ref # of polarizing plate | Angle of transmission axis |
|---|---|
| 2408 | 45 deg |
| 2409 | −45 deg |

Finally, the parameters for the phase difference compensators are shown in Table 69 below.

TABLE 69

| Ref # of phase plate | d*(na-nb) | d*(na-nc) | Angle of na axis |
|---|---|---|---|
| 2402 | 260 nm | 0 nm | 0 deg |
| 2403 | - - - Not provided - - - | | |
| 2404 | 184 nm | −184 nm | −45 deg |
| 2405 | - - - Not provided - - - | | |
| 2406 | 5 nm | 50 nm | −45 deg |
| 2407 | 5 nm | 50 nm | 45 deg |

Figure 47:
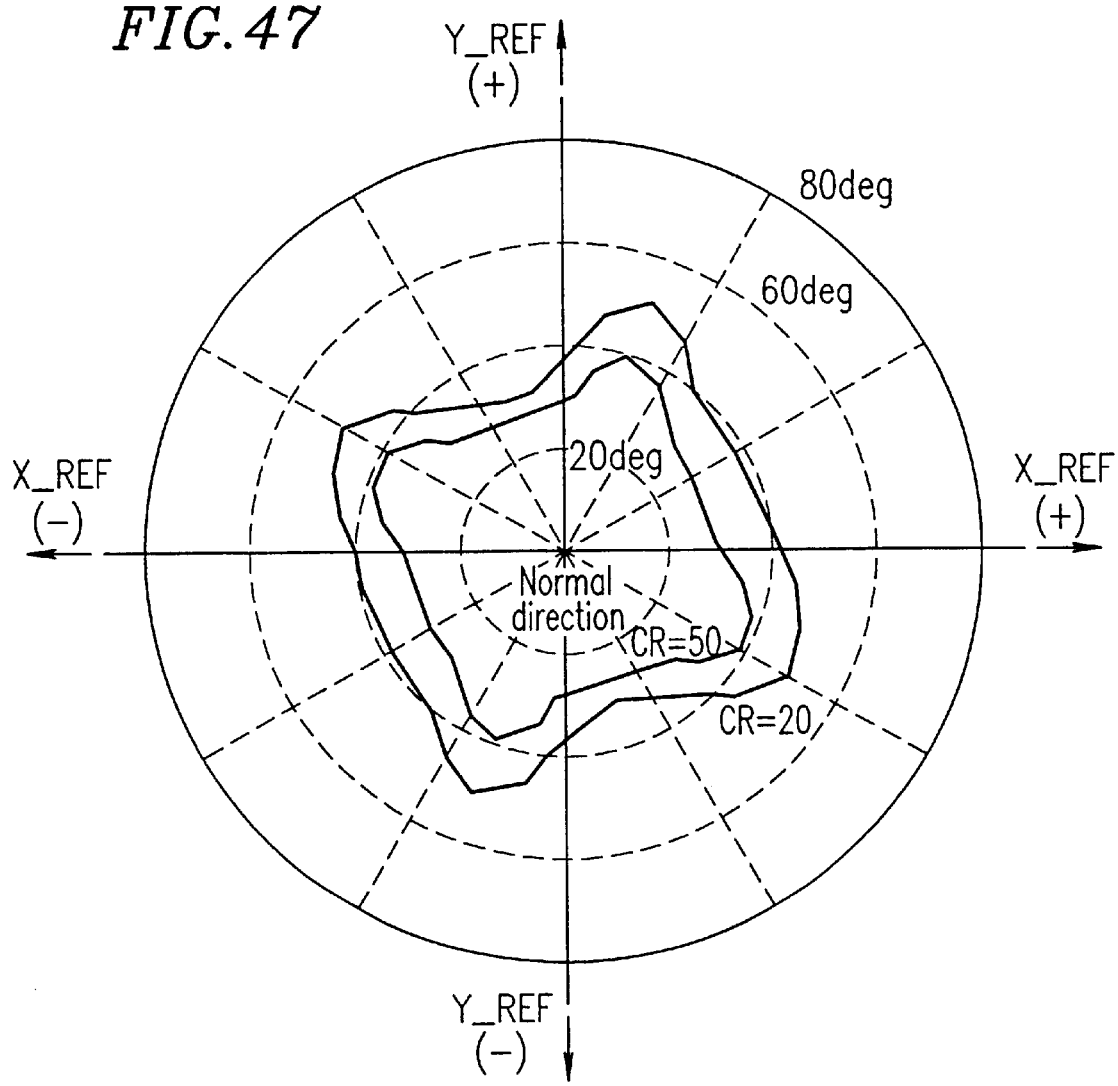
FIG. 47 is an isocontrast contour curve for a liquid crystal display device according to Example 15-G.

FIG. 47 illustrates an isocontrast contour curve based on values obtained by dividing the transmissivity for an applied voltage of 4 V by the transmissivity for an applied voltage of 0 V in the liquid crystal display device of Comparative Example 15-G.

COMPARATIVE EXAMPLE 15-H

The structure of a liquid crystal display device according to Comparative Example 15-H will be described below. The basic structure of the liquid crystal display device is as illustrated in FIG. 31, except that the phase difference compensators 2403 and 2404 are omitted as shown in Table 48.

First, the parameters for the liquid crystal cell are shown in Table 70 below.

TABLE 70

| Region | Area in percent for the entire pixel | Retardation value | Twist angle | Orientation |
|---|---|---|---|---|
| A | 50% | 260 nm | 0 deg | 90 deg |
| B | 50% | 260 nm | 0 deg | 270 deg |

Next, the parameters for the polarizers are shown in Table 71 below.

TABLE 71

| Ref # of polarizing plate | Angle of transmission axis |
|---|---|
| 2408 | 45 deg |
| 2409 | −45 deg |

Finally, the parameters for the phase difference compensators are shown in Table 72 below.

TABLE 72

| Ref # of phase plate | d*(na-nb) | d*(na-nc) | Angle of na axis |
|---|---|---|---|
| 2402 | 260 nm | 0 nm | 0 deg |
| 2403 | - - - Not provided - - - | | |
| 2404 | - - - Not provided - - - | | |
| 2405 | 184 nm | −184 nm | 45 deg |
| 2406 | 5 nm | 50 nm | −45 deg |
| 2407 | 5 nm | 50 nm | 45 deg |

Figure 48:
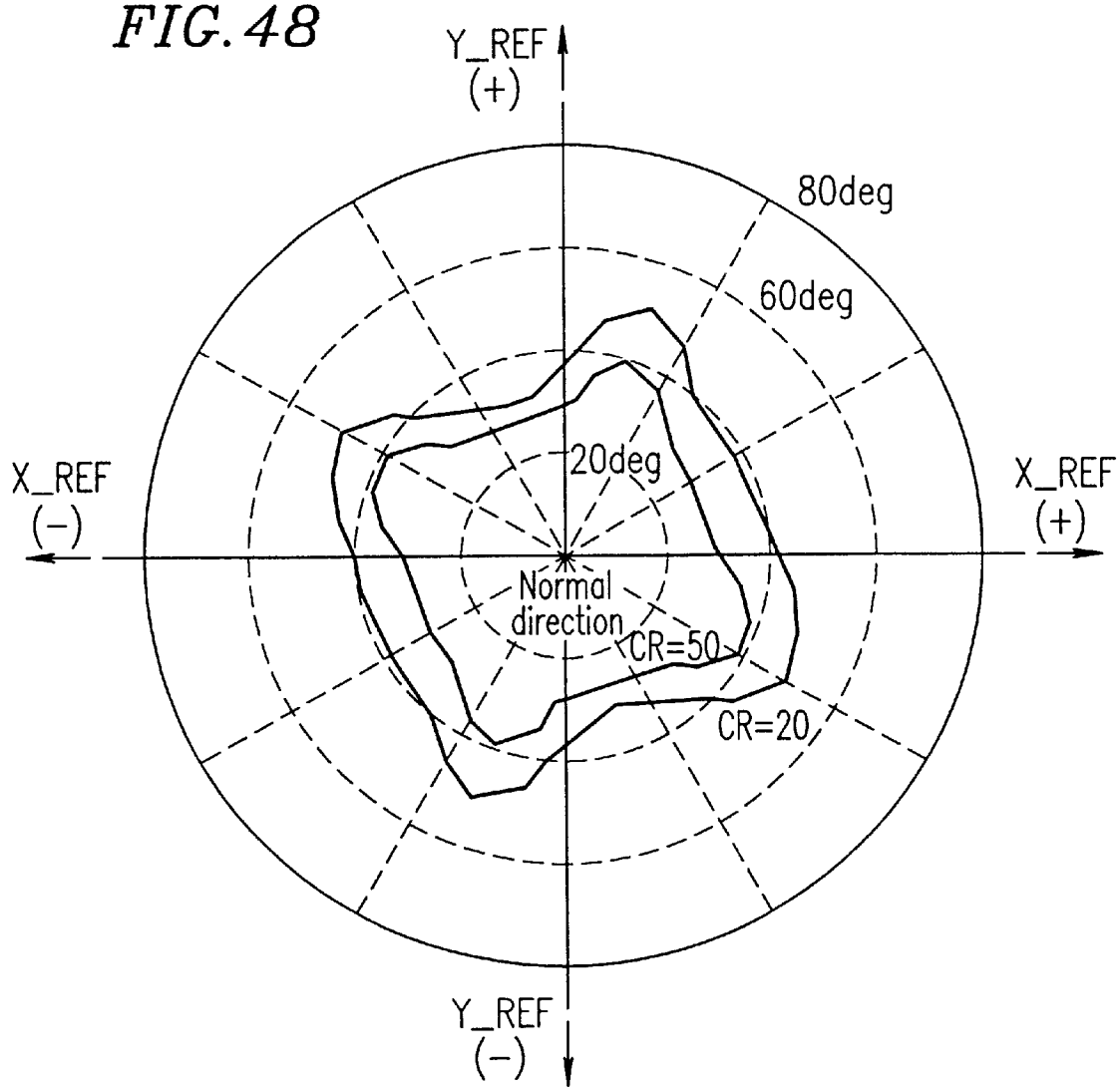
FIG. 48 is an isocontrast contour curve for a liquid crystal display device according to Example 15-H.

FIG. 48 illustrates an isocontrast contour curved based on values obtained by dividing the transmissivity for an applied voltage of 4 V by the transmissivity for an applied voltage of 0 V in the liquid display device of Comparative Example 15-H.

In Comparative Examples 15-E to 15-H where one of the phase difference compensators 2402 and 2403 is omitted while also omitting one of the phase difference compensators 2404 and 2405 from the structure of Example 15, the contrast is about 20 or less for a viewing angle of about 50° or greater in any azimuth angle including the X_REF±45° directions, the X_REF direction and the Y_REF direction, indicating deterioration of the viewing angle characteristics, as shown in the respective isocontrast contour curves (FIGS. 45 to 48).

In Examples 15-C and 15-D where only one of the phase difference compensators 2402 and 2403 is omitted from the structure of Example 15, the isocontrast contour curve (see FIGS. 43 and 44) indicates better characteristics in the X_REF and Y_REF directions than those indicated by any of the isocontrast contour curves of Comparative Examples 15-E to 15-H.

In Examples 15-A and 15-B where only one of the phase difference compensators 2404 and 2405 is omitted from the structure of Example 15, the isocontrast contour curve (see FIGS. 41 and 42) indicates better characteristics in the X_REF±45° directions than those indicated by any of the isocontrast contour curves of Comparative Examples 15-E to 15-H.

Thus, desirable viewing angle characteristics can be obtained by providing both of at least one of the pairs of phase difference compensators (2402, 2403) and (2404, 2405) on the respective sides of the liquid crystal cell.

Preferably, the same number of phase difference compensators are symmetrically provided respectively on the light source side and on the viewer side of the liquid crystal cell, as in Example 15. In such a case, even better viewing angle characteristics can be obtained. More preferably, a pair of phase difference compensators provided respectively on the light source side and on the viewer side at the same distance from the intermediate layer of the liquid crystal cell have the same retardation value. In Example 15, a pair of phase difference compensators 2402 and 2403 have the same retardation value, while another pair of phase difference compensators 2404 and 2405 have the same retardation value. In Examples 15-A to 15-D, one of the phase difference compensators 2402, 2403, 2404 and 2405 is omitted or has a retardation value of zero. Thus, it can be expected that desirable viewing angle characteristics can be obtained also when none of the phase difference compensators 2402, 2403, 2404 and 2405 is omitted, but a pair of phase difference compensators have different retardation values.

A common requirement for Examples 11 and 15 is that the transmission axis of the light source side polarizer (6206, 2408) is perpendicular to the transmission axis of the viewer side polarizer (6207, 2409). Another requirement common to these examples is that the na axis of any one of the phase difference compensators 6204, 6205, 2404 and 2405 is substantially perpendicular to the transmission axis of the immediately adjacent one of the phase difference compensators. There is no limitation to the angle of the light source side polarizer, but the angle may be about −45°, or any other angle, other than about 45° as in the illustrated examples. It should be noted, however, that when the angle is about 0° or about 90°, a sufficient transmissivity may not be obtained in the presence of an applied voltage (when producing a white display). As long as the common requirements are satisfied, the effects of the present invention can be obtained with a liquid crystal cell having a twist angle of about 0°. In Examples 11 and 13, the na axes of the phase difference compensators 6202 and 6203 (6402 and 6403) are parallel to each other and perpendicular to the rubbing axis of the liquid crystal cell 6201 (6401), in order to obtain even more desirable effects.

EXAMPLE 16

In Example 11 above, the na axis of a phase plate adjacent to the liquid crystal cell having no twist is varied so as to obtain a desirable black display in the direction normal to the liquid crystal display device, with a liquid crystal cell having a twist angle of about 30°. In particular, the na axes of the phase difference compensators on the respective sides of the liquid crystal cell are parallel to each other at a twist angle of zero, while the na axes are at an appropriate setting angle (about 18.8° in Example 11) at a twist angle of about 30°. In Example 16, it will be confirmed that a desirable black display in the normal direction as in Example 11 can be obtained for a liquid crystal cell having a twist angle other than about 0°, by methods other than the above. It will also be discussed briefly that there exist a countless number of combinations of phase difference compensators with which a black display can be produced in the normal direction in the absence of an applied voltage by using Poincare' sphere.

A liquid crystal cell of Example 16 is structurally similar to that illustrated in FIG. 31, but the parameters for the polarizers, the liquid crystal cell and the phase difference compensators are different. The parameters for the liquid crystal cell 2401 of Example 16 are as follows.

TABLE 73

| Region | Area in percent for the entire pixel | Retardation value | Twist angle | Orientation |
|--------|--------------------------------------|-------------------|-------------|-------------|
| A | 50% | 260 nm | −30 deg | 90 deg |
| B | 50% | 260 nm | −30 deg | 270 deg |

Next, the parameters for the polarizers of Example 16 are shown in Table 74 below.

TABLE 74

| Ref # of polarizing plate | Angle of transmission axis |
|---------------------------|----------------------------|
| 2408 | 28 deg |
| 2409 | −28 deg |

Finally, the parameters for the phase difference compensators of Example 16 are shown in Table 75 below.

TABLE 75

| Ref # of phase plate | d*(na-nb) | d*(na-nc) | Angle of na axis |
|----------------------|-----------|-----------|------------------|
| 2402 | 75 nm | 0 nm | 0 deg |
| 2403 | 75 nm | 0 nm | 0 deg |
| 2404 | 92 nm | −92 nm | −45 deg |
| 2405 | 92 nm | −92 nm | 45 deg |
| 2406 | 5 nm | 50 nm | −62 deg |
| 2407 | 5 nm | 50 nm | 62 deg |

Figure 49:
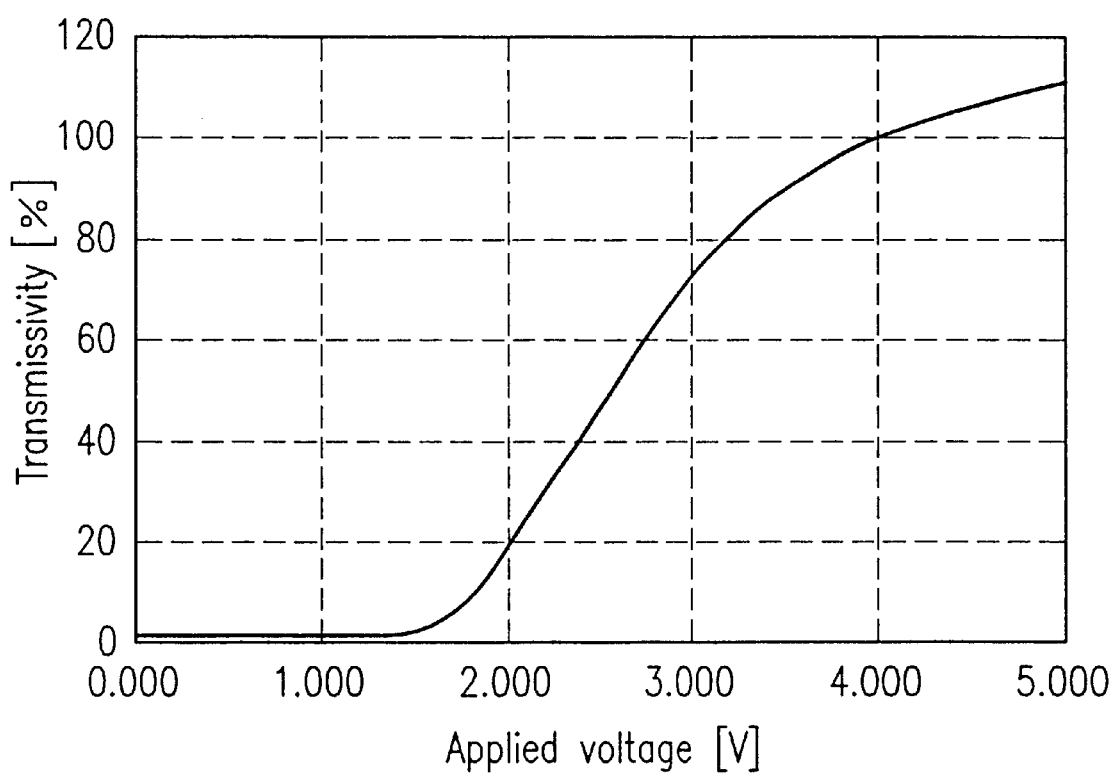
FIG. 49 is a graph illustrating the relationship between the transmissivity as viewed from the normal direction and the applied voltage in a liquid crystal display device according to Example 16.

FIG. 49 illustrates the relationship between the transmissivity in the normal direction and the applied voltage in the liquid crystal display device of the present example. As illustrated in FIG. 49, the liquid crystal display device of the present example has a transmissivity of substantially 0% when the applied voltage is about 0 V. The liquid crystal display device has normally black electro-optical characteristics where the transmissivity increases as the applied voltage increases to be about 1.5 V or more. It is also shown that desirable contrast characteristics are obtained because the transmissivity is about 0% when the applied voltage is about 0 V.

Figure 50:
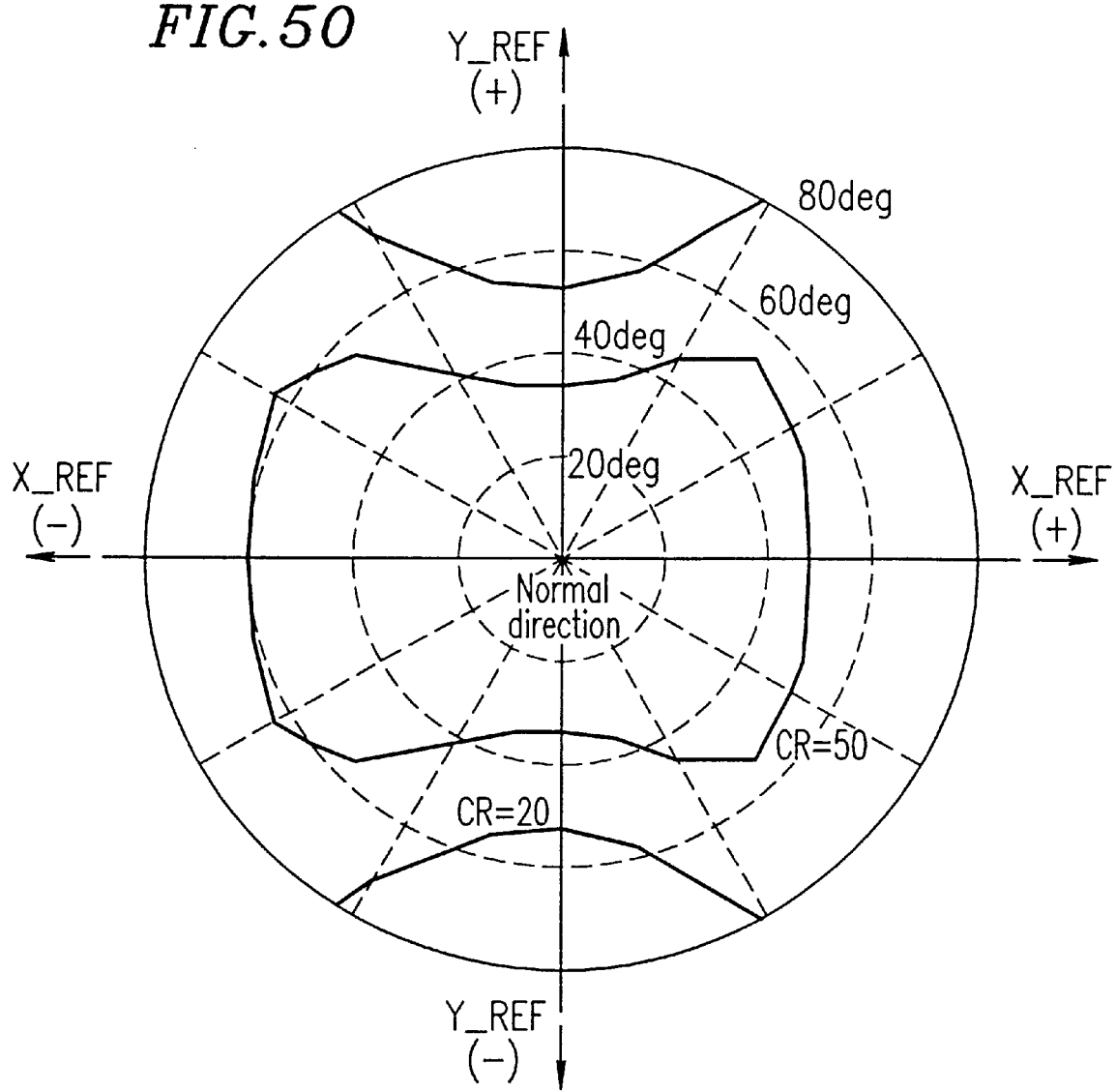
FIG. 50 is an isocontrast contour curve for a liquid crystal display device according to Example 16.

FIG. 50 illustrates an isocontrast curve for the liquid crystal display device of the present example. The isocontrast contour curve of FIG. 50 is based on values (contrast ratios) obtained by dividing the transmissivity for an applied voltage of 4 V by the transmissivity for an applied voltage of 0 V. It can be seen from FIG. 50 that the liquid crystal display device of the present example has desirable electro-optical characteristics as in other examples such as Examples 15 and 11.

Next, it will be discussed that there are a countless number of setting combinations respectively for the liquid crystal cell, for the polarizing plates, and for the phase difference compensators, with which a black display is obtained in the normal direction.

Figure 51:
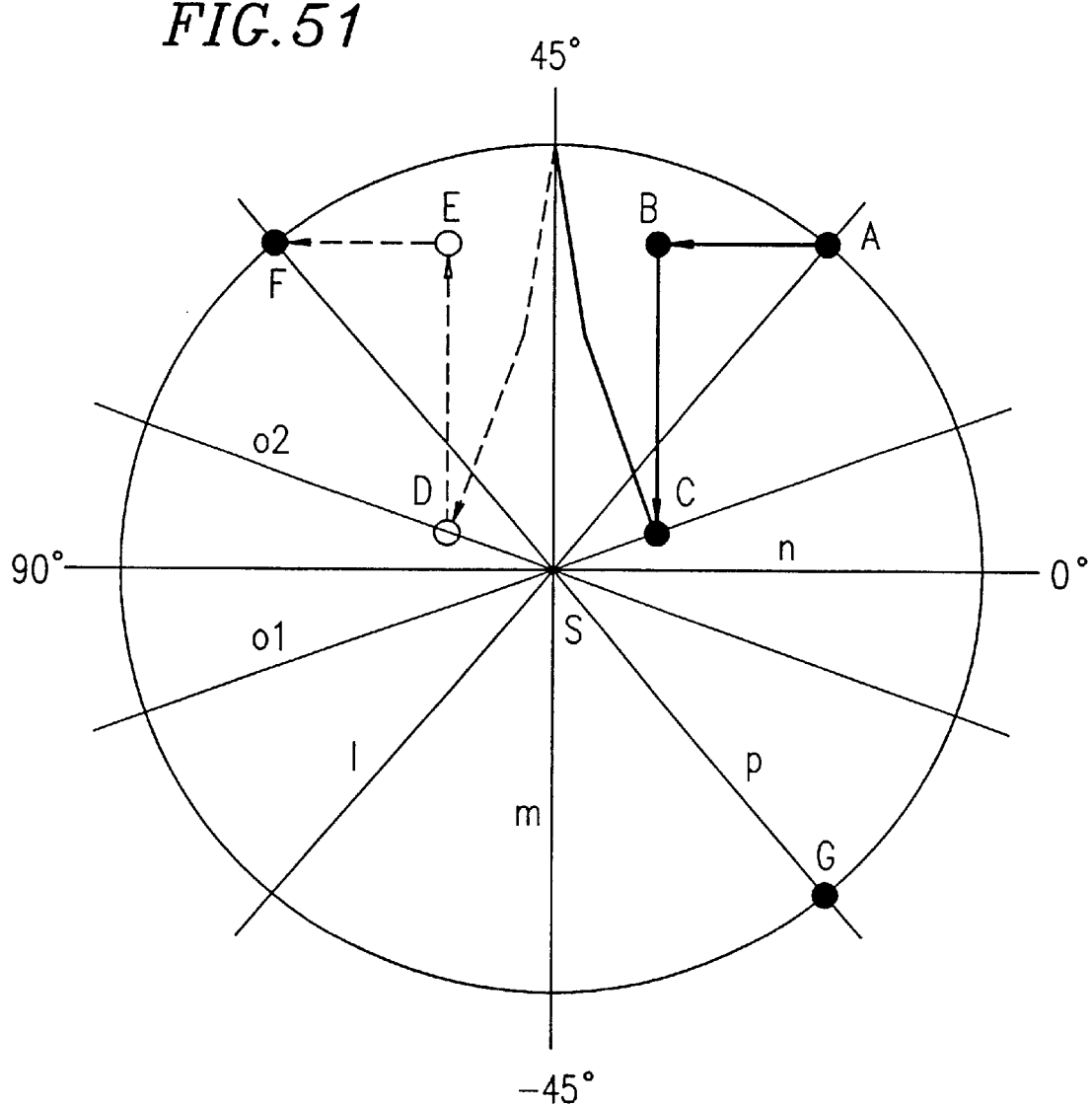
FIG. 51 is a diagram illustrating the transition of polarization of light passing through a liquid crystal display device according to Example 16 in a direction parallel to the normal to the surface of the liquid crystal cell with an applied voltage of 0 V.

First, how a black display is obtained in the normal direction in Example 16 will be generally discussed, with reference to Poincare' sphere shown in FIG. 51, wherein:

Point A represents the polarization of light having passed through the polarizing plate 2408 and the phase difference compensator 2406;

Point B represents the polarization of light having passed through the phase difference compensator 2404;

Point C represents the polarization of light having passed through the phase difference compensator 2402;

Point D represents the polarization of light having passed through the liquid crystal cell 2401;

Point E represents the polarization of light having passed through the phase difference compensator 2403;

Point F represents the polarization of light having passed through the phase difference compensators 2405 and 2407;

Point G represents the polarization of light which is transmitted by the polarizer 2409;

Axis 1 represents a rotary axis on the Poincare' sphere which corresponds to the birefringence effect provided by the phase difference compensator 2406;

Axis m represents a rotary axis on the Poincare' sphere which corresponds to the birefringence effect provided by the phase difference compensators 2404 and 2405;

Axis n represents a rotary axis on the Poincare' sphere which corresponds to the birefringence effect provided by the phase difference compensator 2402;

Axis o1 represents a rotary axis on the Poincare' sphere which corresponds to the birefringence effect provided by liquid crystal molecules in the liquid crystal cell which are adjacent to the phase difference compensator 2402;

Axis o2 represents a rotary axis on the Poincare' sphere which corresponds to the birefringence effect provided by liquid crystal molecules in the liquid crystal cell which are adjacent to the phase difference compensator 2403; and Axis p represents a rotary axis on the Poincare' sphere which corresponds to the birefringence effect provided by the phase difference compensator 2407.

FIG. 51 illustrates a Poincare' sphere as viewed from a pole thereof. Therefore, the center point S in FIG. 51 represents circularly-polarized light, a point along the periphery (equator) represents linearly-polarized light, and a point between the center point S and the periphery represents elliptically-polarized light. Each of the numerals shown around the periphery is the angle between the polarization axis of the corresponding linearly-polarized light and the X_REF axis.

Referring to FIG. 51, the transition of polarization of light having a wavelength of about 550 nm traveling from the light source to the viewer will be described.

The linearly-polarized light passing through the polarizing plate 2408 illustrated in FIG. 31 is at point A. Since the na axis of the phase difference compensator 2406 is perpendicular to the transmission axis of the polarizing plate 2408, the linearly-polarized light at Point A is rotated about Axis 1 by the phase difference compensator 2406. As a result, the light at Point A is not moved from Point A.

Since the angle of the na axis of the phase difference compensator 2404 is about −45°, the light at Point A along the equator is rotated about Axis m. Since the value of d·(na−nb) of the phase difference compensator 2404 is about 92 nm, the rotation angle is about 60°. As a result, the light at Point A along the equator is moved to Point B.

Since the na axis of the phase difference compensator 2402 is about 0°, the light at Point B is rotated about Axis n. Since the value of d·(na−nb) of the phase difference compensator 2402 is about 75 nm, the rotation angle is about 49°. As a result, the light at Point B is moved to Point C.

Since the main axis of the refractive index anisotropy of the liquid crystal cell 2401 continuously rotates from about 105° to about 75°, from the light source side to the viewer side, the light at Point C is rotated about an axis which continuously moves from Axis o1 to Axis o2. Since the retardation value of the liquid crystal cell 2401 is about 260 nm, the rotation angle about the axis is about 170°. As a result, the light at Point C is moved generally along a path as illustrated in FIG. 51 to Point D which is located on the other (hidden) hemisphere via the equator.

Since the na axis of the phase difference compensator 2403 is about 0°, the light at Point D is rotated about Axis n. Since the retardation value d·(na−nb) of the phase difference compensator 2403 is about 75 nm, the rotation angle is about 49°. As a result, the light at Point D is moved to Point E.

Since the na axis of the phase difference compensator 2405 is about 45°, the light at Point E is rotated about Axis m. Since the value d·(na−nb) of the phase difference compensator 2405 is about 92 nm, the rotation angle is about 60°. As a result, the light at Point E is moved to Point F which is generally along the equator.

Since the na axis of the phase difference compensator 2407 is perpendicular to the transmission axis of the polarizer 2409, the light at Point F is rotated about Axis p. As a result, the light at Point F is not moved from Point F.

Then, since the transmission axis of the polarizer 2409 at Point G is on the opposite end of Axis p with respect to Point F, the polarized light having passed through the phase difference compensator 2407 is blocked by the polarizer 2409. As a result, the liquid crystal display device of the present example exhibits normally black electro-optical characteristics in which the transmissivity is about 0% for an applied voltage of about 0 V.

Example 11 (another example where the twist angle of the liquid crystal cell is about 30°) can also be examined as in Example 16. FIG. 52 illustrates a path of transition of polarized light in Example 11, wherein:

Point A represents the polarization of light having passed through the polarizer 6206 and the phase difference compensator 6204;

Point B represents the polarization of light having passed through the phase difference compensator 6202;

Point C represents the polarization of light having passed through the liquid crystal cell 6201;

Point D represents the polarization of light having passed through the phase difference compensators 6203 and 6205; and Point E represents the polarization of light which is transmitted by the polarizer 6207.

The transition will be briefly described below. The linearly-polarized light having passed through the polarizer 6206 illustrated in FIG. 24 is located at Point A. The phase difference compensator 6204 does not move the light at Point A. Then, the light is moved to Point B by the phase difference compensator 6202, to Point C by the liquid crystal cell 6201, and to Point D by the phase difference compensator 6203. The light at Point D is not moved by the phase difference compensator 6205. Point D is substantially identical to Point A, which is on the opposite end of an axis of the sphere with respect to Point E representing the polarization of linearly-polarized light which is transmitted by the polarizer 6207 on the viewer side. Therefore, the polarized light having passed through the phase difference compensator 6205 is blocked by the polarizer 6207. Thus, the liquid crystal display device of Example 11 also exhibits normally black mode electro-optical characteristics in which the transmissivity is about 0% for an applied voltage of about 0 V.

Finally, a case where the liquid crystal cell has a twist angle of about 0°, e.g., Example 15, will be examined as in Example 16. FIGS. 53A and 53B illustrate a path of transition of polarized light in Example 15, wherein:

- Point A represents the polarization of light having passed through the polarizer 2408 and the phase difference compensators 2406 and 2404;
- Point B represents the polarization of light having passed through the phase difference compensator 2402;
- Point C represents the polarization of light having passed through the liquid crystal cell 2401;
- Point D represents the polarization of light having passed through the phase difference compensators 2403, 2405 and 2407; and
- Point E represents the polarization of light which is transmitted by the polarizer 2409.

The transition will be briefly described below. The linearly-polarized light having passed through the polarizer 2408 illustrated in FIG. 31 is located at Point A. The phase difference compensators 2406 and 2404 do not move the light at Point A. Then, the light is moved to Point B by the phase difference compensator 2402, to Point C which is located on the other (hidden) hemisphere by the liquid crystal cell 2401, and to Point D along the equator by the phase difference compensator 2403. The light at Point D is not moved by the phase difference compensators 2405 and 2407. Point D is substantially identical to Point A, which is on the opposite end of an axis of the sphere with respect to Point E representing the polarization of linearly-polarized light which is transmitted by the polarizer 2409 on the viewer side. Therefore, the polarized light having passed through the phase difference compensator 2407 is blocked by the polarizer 2409. Thus, the liquid crystal display device of Example 15 also exhibits normally black mode electro-optical characteristics in which the transmissivity is about 0% for an applied voltage of about 0 V.

As described above with respect to the illustrative examples of the present invention, normally black mode characteristics which produce a black display in the absence of an applied voltage can be obtained by appropriately setting the parameters of the liquid crystal cell and the phase difference compensators so that the polarization direction of light having passed through the polarizing plate on the light source side is at a right angle with the polarization direction of light which is transmitted by the polarizing plate on the viewer side, i.e., along the polarization direction of light which is absorbed by a polarizing plate on the viewer side. A countless number of such settings can be found by using a Poincare' sphere. This is because, referring to FIG. 54, there exist a countless number of possible paths extending from Point A (representing the polarization of light having passed through the polarizing plate on the light source side) to Point Z (representing the polarization of light which is absorbed by the polarizing plate on the viewer side.

However, as can be seen from the comparative examples above, it is preferred in view of obtaining desirable viewing angle characteristics to symmetrically provide the same number of phase difference compensators on the light source side and the viewer side of the liquid crystal cell.

As described above, the liquid crystal display device of the present invention performs a display in a normally black mode (where a black display is produced in the absence of an applied voltage) by applying a substantially vertical electric field across a liquid crystal layer made of a nematic liquid crystal material having a positive dielectric anisotropy which is provided between a pair of polarizing plates in a crossed Nicols arrangement. The liquid crystal layer in each pixel region includes at least a first domain and a second domain where the liquid crystal molecules have different orientations, whereby it is possible to suppress the change in display quality due to the change in viewing angle.

In any viewing angle including the normal direction, the phase difference compensator compensates for the refractive index anisotropy of liquid crystal molecules which are in a substantially horizontal orientation with respect to the substrate surface in the absence of an applied voltage, thereby realizing a black display with a reduced viewing angle dependency. Moreover, when using, as phase difference compensators, a pair of phase plates each having a positive refractive index anisotropy which are arranged on the respective sides of the liquid crystal layer so that the phase-delay axes thereof are parallel to the substrate surface and perpendicular to the phase-delay axis of the liquid crystal layer, it is possible to effectively compensate for the refractive index anisotropy of the liquid crystal molecules as viewed from the normal direction.

Furthermore, by arranging the phase plate having a positive refractive index anisotropy so that the phase-delay axis thereof is substantially perpendicular to the substrate surface, it is possible to compensate for the change in retardation of the liquid crystal layer whose phase-delay axis lies in a plane parallel to the substrate surface and that of the phase difference compensator, which result as the viewing direction (viewing angle) is inclined.

Moreover, by arranging the phase plate having a positive refractive index anisotropy so that the phase-delay axis thereof is perpendicular to the polarization axis of the polarizing plate (i.e., at about 45° with respect to the phase-delay axis of the liquid crystal layer), it is possible to compensate for the rotation of elliptically-polarized light. As a result, a desirable black display can be obtained in any viewing angle including the normal direction.

The present invention provides a liquid crystal display device in a normally black mode in which the change in display quality due to a change in viewing angle is significantly reduced. The liquid crystal display device of the present invention does not sacrifice any of the production efficiency and the transmissivity as in a conventional wide viewing angle liquid crystal display device. The liquid crystal display device of the present invention can be suitably used in various display device applications where a wide viewing angle is required, such as a liquid crystal display device as a computer monitor and a liquid crystal display device for displaying video images.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device, comprising:
   a first transparent substrate and a second transparent substrate;
   a liquid crystal layer interposed between the first and second substrates, the layer being made of a nematic liquid crystal material having a positive dielectric anisotropy;
   a first electrode and a second electrode provided on the first and second substrates, respectively, for applying an electric field substantially vertical to the first and second substrates across the liquid crystal layer; and
   a first polarizing plate and a second polarizing plate each provided on an outer side of respective one of the first and second substrates, the first and second polarizing plates being arranged in a crossed Nicols arrangement, wherein:
     the liquid crystal layer in each pixel region includes at least a first domain and a second domain in which liquid crystal molecules are oriented in different orientations;
     a first phase difference compensator having a positive refractive index anisotropy is provided between the first polarizing plate and the first substrate, and a second phase difference compensator having a positive refractive index anisotropy is provided between the second polarizing plate and the second substrate, so that phase-delay axes of the first and second phase difference compensators are parallel to a substrate surface and to each other, and substantially perpendicular to a phase-delay axis of the liquid crystal layer in the absence of an applied voltage;
     at least one third phase difference compensator is provided between the first polarizing plate and the first phase difference compensator or between the second polarizing plate and the second phase difference compensator;
     a refractive index ellipse of the third phase difference compensator has three main axes a, b and c, and refractive indexes of na, nb and nc along the main axes a, b and c, respectively, wherein a relationship nc>na>nb holds, with the main axis a and the main axis b lying in a plane parallel to the substrate surface, the main axis c being parallel to a direction normal to the substrate surface, and the main axis a being perpendicular to a polarization axis of one of the polarizing plates which is adjacent to the phase difference compensator; and
     the first, second and third phase difference compensators compensate for a refractive index anisotropy of the liquid crystal molecules of the liquid crystal layer which are in a substantially horizontal orientation with respect to the substrate surface in the absence of an applied voltage.

2. A liquid crystal display device according to claim 1, wherein:
   where a retardation value of the liquid crystal layer is $d_{1c} \cdot \Delta n$, an in-plane retardation of the third phase difference compensator is $d \cdot (na-nb)$, and a retardation along a thickness direction thereof is $d \cdot (na-nc)$;
   parameters RL and NZ are defined as follows $$RL = d \cdot (na-nc)/(d_{1c} \Delta n), \text{ and}$$

$$NZ = (na-nc)/(na-nb);$$

two of the third phase difference compensators are provided respectively between the first polarizing plate and the first phase difference compensator, and between the second polarizing plate and the second phase difference compensator, with a sum of RL values of the two third phase difference compensators being defined as RLsum; then, $$0 \leq |RLsum| \leq 2; \text{ and}$$

each of the third phase difference compensators satisfies $\log(|NZ|) \geq 2.0 \cdot |RL| - 1.2$, where RL<0 and NZ<0.

3. A liquid crystal display device according to claim 2, wherein the RL value and the NZ value of one of the two third phase difference compensators are equal to the RL value and the NZ value, respectively, of the other one of the two third phase difference compensators.

* * * * *